(12) United States Patent
Tajima et al.

(10) Patent No.: US 9,195,419 B2
(45) Date of Patent: Nov. 24, 2015

(54) PRINT CONTROL SYSTEM

(71) Applicant: Seiko Epson Corporation, Tokyo (JP)

(72) Inventors: Shigeo Tajima, Shiojiri (JP); Yuichi Shito, Chino (JP); Koji Nishizawa, Shiojiri (JP); Keigo Mori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/532,655

(22) Filed: Nov. 4, 2014

(65) Prior Publication Data

US 2015/0124290 A1    May 7, 2015

(30) Foreign Application Priority Data

| Nov. 7, 2013 | (JP) | 2013-230945 |
|---|---|---|
| Nov. 7, 2013 | (JP) | 2013-231016 |
| Nov. 7, 2013 | (JP) | 2013-231620 |
| Nov. 22, 2013 | (JP) | 2013-241718 |
| Nov. 29, 2013 | (JP) | 2013-247389 |
| Dec. 27, 2013 | (JP) | 2013-272562 |
| Dec. 27, 2013 | (JP) | 2013-273017 |

(51) Int. Cl.
*G06F 3/12* (2006.01)
*G06Q 20/20* (2012.01)
*G06Q 10/10* (2012.01)

(52) U.S. Cl.
CPC ............ *G06F 3/1236* (2013.01); *G06F 3/1205* (2013.01); *G06Q 10/10* (2013.01); *G06Q 20/209* (2013.01)

(58) Field of Classification Search
CPC ... G06F 3/1204; G06F 3/1288; G06F 3/1225; G06F 3/1229; G06F 3/1206; G06F 3/122; G06F 3/1224; G06F 3/1232; G06F 3/1247; G06F 3/126; G06F 3/1272; G06F 3/1287; G06F 3/1289; G06F 3/1292; G06F 3/1236; G06F 3/1285; G06F 1/3215; H04N 2201/0094; H04N 1/0001; H04N 1/00061; H04N 1/00095; H04N 21/23614; H04N 21/42207; H04N 21/436; H04N 21/6332
USPC .................. 358/1.15, 1.16, 1.14; 379/100.02, 379/142.06, 29.1, 32.05, 88.13, 88.17; 709/203, 206, 217, 218, 219; 725/141, 725/149, 151, 80
See application file for complete search history.

(56) References Cited

U.S. PATENT DOCUMENTS

| 6,947,182 | B1 * | 9/2005 | Kumagai | 358/402 |
|---|---|---|---|---|
| 7,277,101 | B2 * | 10/2007 | Zeng | 345/600 |
| 7,337,228 | B2 * | 2/2008 | Maeda et al. | 709/227 |
| 8,169,639 | B2 * | 5/2012 | Aoki et al. | 358/1.15 |

(Continued)

FOREIGN PATENT DOCUMENTS

| JP | 2000-029349 A | 1/2000 |
|---|---|---|
| JP | 2002-269061 A | 9/2002 |

(Continued)

*Primary Examiner* — Negussie Worku

(57) ABSTRACT

A print control system 1 includes a printer 12 that prints based on print data; a connection server 50 that connects to the printer 12, generates print data based on print information data, and sends the print data to the printer 12; a management server 60 that connects to the connection server 50 and sends print information data to the connection server 50; and a management device 14 that connects to the management server 60, generates print information data, and sends the generated print information data to the management server 60.

6 Claims, 43 Drawing Sheets

(56) References Cited

U.S. PATENT DOCUMENTS

| | | | |
|---|---|---|---|
| 8,405,852 B2* | 3/2013 | Noguchi et al. | 358/1.15 |
| 8,675,216 B2* | 3/2014 | Miyazaki et al. | 358/1.13 |
| 8,937,730 B2* | 1/2015 | Homma | 358/1.14 |
| 8,970,879 B2* | 3/2015 | Nakamura | 358/1.15 |
| 2005/0068565 A1 | 3/2005 | Maeda | |
| 2006/0047853 A1 | 3/2006 | Igarashi et al. | |
| 2006/0200534 A1* | 9/2006 | Nagai et al. | 709/212 |
| 2006/0244993 A1 | 11/2006 | Konnai | |
| 2007/0104180 A1 | 5/2007 | Aizu et al. | |
| 2011/0035437 A1 | 2/2011 | Toumura | |
| 2011/0078303 A1 | 3/2011 | Li et al. | |
| 2012/0026548 A1 | 2/2012 | Nakagawa | |
| 2012/0254443 A1 | 10/2012 | Ueda | |
| 2013/0003115 A1 | 1/2013 | Uchikawa | |
| 2013/0044345 A1* | 2/2013 | Sakai | 358/1.14 |
| 2013/0163038 A1* | 6/2013 | Oishi | 358/1.15 |
| 2013/0314375 A1* | 11/2013 | Rickstrom et al. | 345/174 |
| 2013/0321861 A1* | 12/2013 | Ishihara et al. | 358/1.15 |

FOREIGN PATENT DOCUMENTS

| | | |
|---|---|---|
| JP | 2005-100270 A | 4/2005 |
| JP | 2005092645 A | 4/2005 |
| JP | 2006-067480 A | 3/2006 |
| JP | 2006-259889 A | 9/2006 |
| JP | 2007-528528 A | 10/2007 |
| JP | 2011-039725 A | 2/2011 |
| JP | 2011-108097 A | 6/2011 |
| JP | 2011-113267 A | 6/2011 |
| JP | 2011-170718 A | 9/2011 |
| JP | 2011-197950 A | 10/2011 |
| JP | 2011-233034 A | 11/2011 |
| JP | 2012-208781 A | 10/2012 |
| JP | 2013-012053 A | 1/2013 |
| JP | 2013-037544 A | 2/2013 |
| JP | 2013-506908 A | 2/2013 |
| JP | 2013-162468 A | 8/2013 |

* cited by examiner

| PRINTER IDENTIFICATION INFORMATION | CONNECTION SERVER ADDRESS INFORMATION |
|---|---|

FIG. 8A

| STORE | FLOOR | LANE NUMBER | PRINTER IDENTIFICATION INFORMATION |
|---|---|---|---|

FIG. 8B

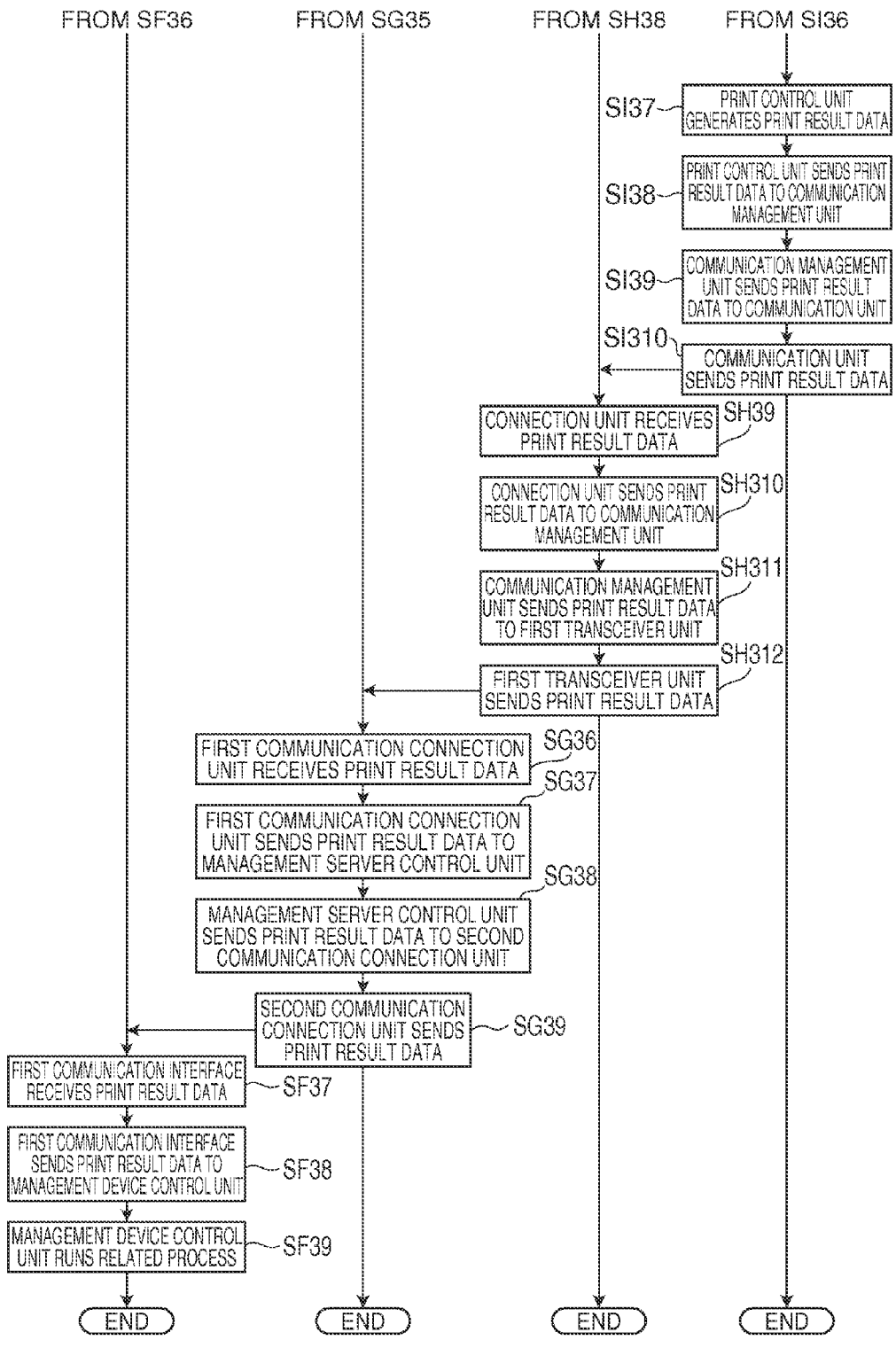

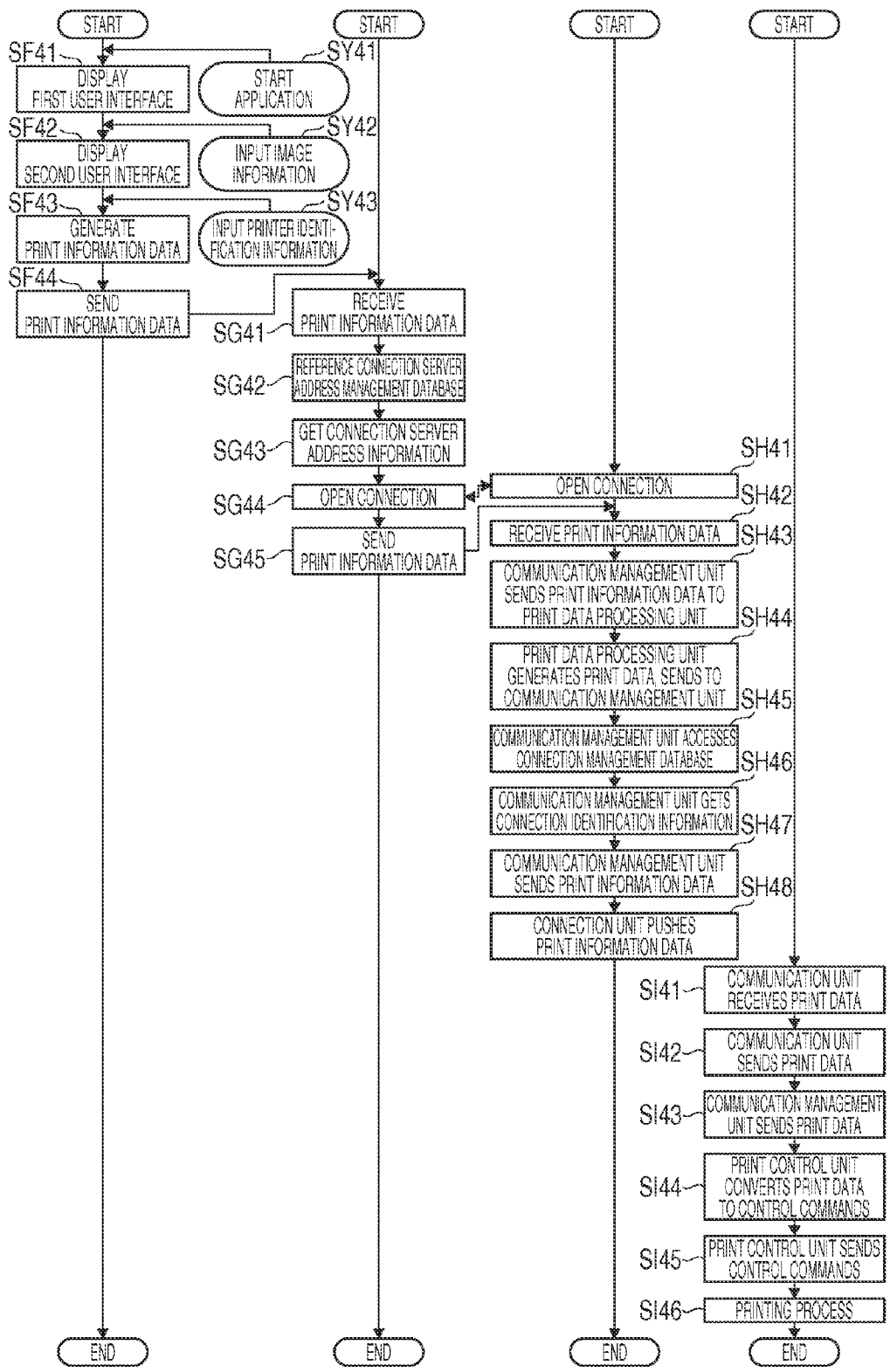

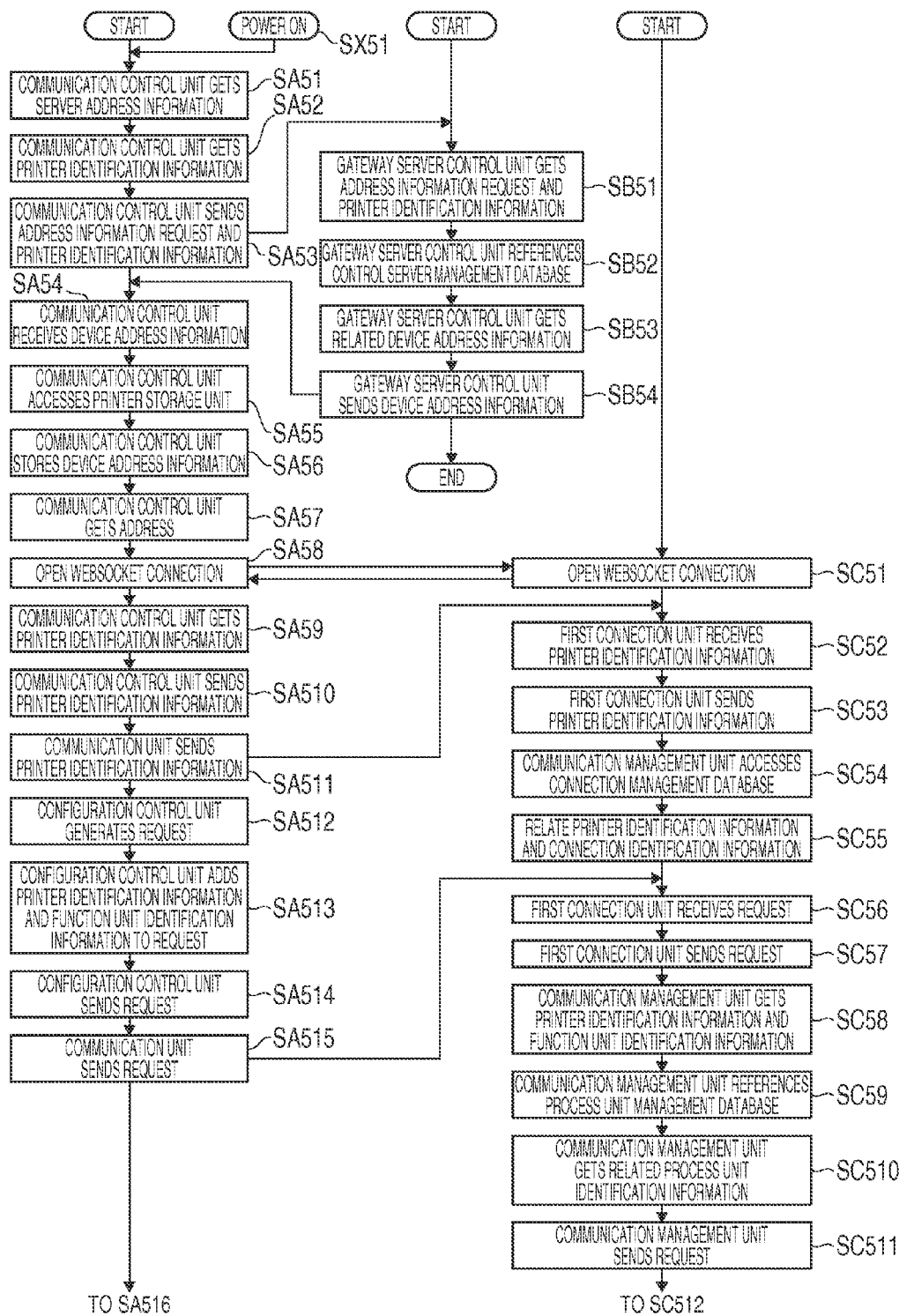

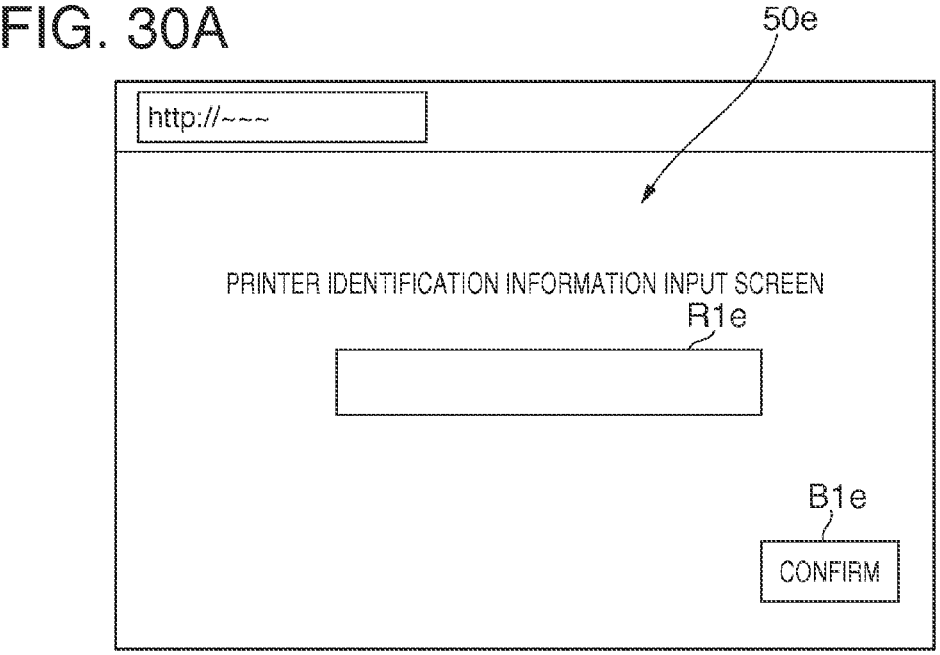
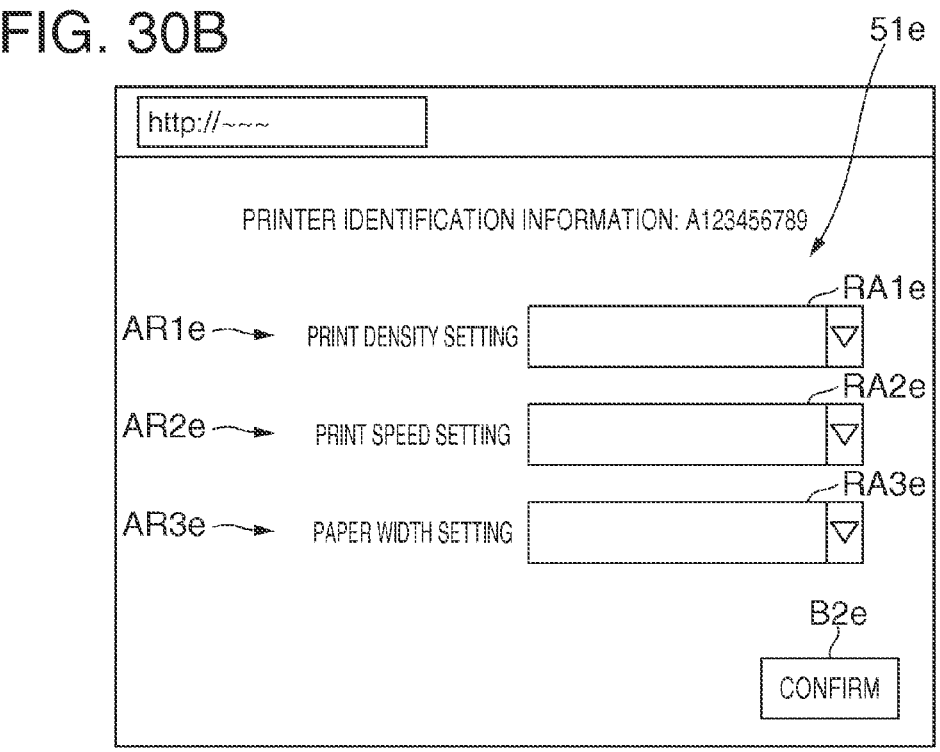

PRINT CONTROL SYSTEM

CROSS REFERENCE TO RELATED APPLICATION(S)

Priority is claimed under 35 U.S.C. §119 to Japanese Application nos. 2013-231620 filed Nov. 7, 2013, 2013-231016 filed Nov. 7, 2013, 2013-230945 filed Nov. 7, 2013, 2013-241718 filed Nov. 22, 2013, 2013-247389 filed Nov. 29, 2013, 2013-272562 filed Dec. 27, 2013 and 2013-273017 filed Dec. 27, 2013, are hereby incorporated by reference in their entirety.

BACKGROUND

1. Technical Field

The present disclosure relates to a print control system.

2. Related Art

A print control system that prints on print media and produces receipts with a printing device as controlled by a print control device is described, for example, in JP-A-2011-108097. In this type of print control system, the printing device and a server as the print control device are connected over a network and communicate through the network.

When building a system in which a printing device and a server communicate over a network such as described in JP-A-2011-108097, the system must be compatible with configurations in which a printing device with a printing function and the server communicate over a network.

SUMMARY

With consideration for the foregoing problem, the present invention makes a print control system in which a printer and a server communicate over a network compatible with configurations in which multiple devices communicate over a network.

A print control system according to one aspect of the invention includes a printing device that prints based on print data; a connection server that connects to the printing device and sends the print data to the printing device; a management server that connects to the connection server, generates the print data based on print information data, and sends the generated print data to the connection server; and a management device that connects to the management server, generates the print information data, and sends the generated print information data to the management server.

Thus comprised, a print control system in which a printer and a server communicate over a network can be made compatible with configurations in which devices communicate over a network.

A print control system according to another aspect of the invention preferably includes a second printing device that connects to the connection server; a second connection server that connects to the management server; and a third printing device that connects to the second connection server; wherein the print information data that the management device sends to the management server includes identification information of the printing device, the second printing device, or the third printing device; and the management server has a search unit that, when the print information data is received from the management device, looks for the connection server that connects to the printing device identified by the identification information based on the identification information in the print information data.

Thus comprised, the management server can send print information data received from the management device to the appropriate printer.

In a print control system according to another aspect of the invention the invention, the search unit searches based on information relating the identification information of the printing device and information about the connection server.

Thus comprised, the search unit can find the connection server to connect to the related printer based on the information relating the identification information of the printing device and information about the connection server.

In a print control system according to another aspect of the invention the invention, the management device has an input unit to which information related to the printing device is input, adds the information related to the printing device input to the input unit to the print information data, and then sends the print information data to the management server; and the search unit of the management server searches based on the information related to the printing device added to the print information data, and information relating the information related to the printing device to the identification information of the printing device.

This configuration enables printing from the related printer using the information related to the printing device that is input to the input unit instead of using the printer identification information of the printer to use for printing.

In a print control system according to another aspect of the invention the invention, the printing device and the connection server communicate by asynchronous duplex communication.

Thus comprised, the connection server can send data to the printer and control the printer to execute a process based on the data at any time.

In a print control system according to another aspect of the invention the invention, the management server has a server communication unit that communicates with a first connection server connecting to a printing device, and a second connection server connecting to another printing device; a server reception unit that receives print data to which identification information for the printing device is added; and a search unit that, based on the identification information of the printing device added to the print data received by the server reception unit, determines if the connection server that connects to the printing device identified by the identification information is the first connection server or the second connection server.

Thus comprised, the management server uses a function of the search unit to find the connection server that connects to the related printer in the group of plural connection servers, and can send the print data received the management device to the identified connection server and through the connection server to the printing device.

In a print control system according to another aspect of the invention the invention, the search unit of the management server searches based on information relating the identification information of the printing device to the connection server information.

Thus comprised the search unit can find the connection server connecting to the related printing device based on the information relating the identification information of the printing device and the connection server information.

In a print control system according to another aspect of the invention the invention, the printing device has a printer storage unit that stores identification information, and a print unit that prints; the management server has a server communication unit that communicates with the connection server, a server reception unit that receives the print information data, and a search unit that looks for address information of the connection server based on relation information relating the identification information of the printing device and the address information of the connection server when the server reception unit receives the print information data including the identification information of the printing device; and the management device has a transmission unit that connects to the connection server and sends the print information data.

Thus comprised, a print control system in which a printer and a server communicate over a network can be made compatible with configurations in which devices communicate over a network.

In a print control system according to another aspect of the invention the invention, the connection server has a communication management unit that detects a connection between the printing device and the connection server, and changes the relation information based on the detected connection between the printing device and the connection server.

Thus comprised, the content of the relation information can be kept current with the connection status of the printing device and the connection server.

A print control system according to another aspect of the invention the invention preferably also has a second printing device that has second identification information and prints. The communication management unit of the connection server adds information relating the second identification information and the address information of the connection server to the relation information when the second printing device is connected to the connection server, and deletes the information relating the second identification information and the address information of the connection server from the relation information when the connection between the second printing device and the connection server is closed.

Thus comprised, when a printing device is connected to a connection server, the identification information of the connected printer can be relationally stored to the address information of the connection server, and when the connection between the connection server and the printing is interrupted, the information related to this connection can be deleted from the relation information.

In a print control system according to another aspect of the invention the invention, the connection server has a connection server storage unit that stores identification information for the printing connected to the connection server.

Thus comprised, the connection server can manage the printing connected to the connection server based on the identification information.

In a print control system according to another aspect of the invention the invention, the printing device and the connection server communicate by asynchronous duplex communication.

Thus comprised, the connection server can send data to the printer and control the printer to execute a process based on the data at any time.

In another aspect of the invention, the management server of the invention has a server communication unit that communicates with a connection server that connects to a printing device having identification information, a server reception unit that receives print command information requesting control of the printing device, and a search unit that looks for address information of the connection server based on relation information relating the identification information of the printing device and the address information of the connection server when the server reception unit receives the print command information.

Thus comprised, the management server of the print control system can use a function of the search unit to find the address of the connection server to which the printing device that sends data based on the print command information is connected, and send print command information to the connection server.

In a print control system according to another aspect of the invention the invention, the printing device has a print unit that prints, a print control unit that generates first data based on the operation of the print unit and second data that is different from the first data, and a communication unit that sends the first data and the second data; the connection server has a connection unit that receives the first data and the second data sent by the communication unit of the printing device, a print data processing unit that generates the print data based on the print information data, a first transceiver unit that sends the first data and receives the print information data, and a second transceiver unit that sends the second data; the management server has a first communication connection unit that receives the first data sent by the first transceiver unit of the connection server and sends the print information data to the first transceiver unit of the connection server, and a second communication connection unit that sends the first data and receives the print information data; and the management device has a control unit that generates the print information data, a first communication interface that receives the first data sent by the second communication connection unit of the management server and sends the print information data to the management server, and a second communication interface that receives the second data sent by the connection server.

Thus comprised, a print control system in which a printer and a server communicate over a network can be made compatible with configurations in which devices communicate over a network.

In a print control system according to another aspect of the invention the invention, the second data is status data indicating a state of the printing device.

Thus comprised, status data generated by the printing device can be efficiently and quickly sent to the management device.

In a print control system according to another aspect of the invention the invention, the connection server establishes a first communication path with the management device when the second data sent by the printing device is received; and the management device establishes a second communication path with the management server to send the print information data to the management server.

Thus comprised, the connection server can send the second data to the management device by the first communication path when second data is received from the printing device. The management device can also send print information data to the management server by the second communication path. The management server can also send the first data sent by the printer to the management device by the second communication path.

In a print control system according to another aspect of the invention the invention, the printing device and the connection server communicate by asynchronous duplex communication.

Thus comprised, the connection server can send print control data to the printer and control the printer to print at any time.

In a print control system according to another aspect of the invention the invention, asynchronous duplex communication is WebSocket communication.

Thus comprised, the connection server and the printing device can communicate by asynchronous duplex communication through a WebSocket connection.

A print control method according to another aspect of the invention includes: sending first data to a connection server when first data is generated based on operation of a print unit of a printing device; the connection server receiving the first data; the connection server sending the first data to a management server that sent print command data for operating the print unit; the management server receiving the first data; the management server sending the first data to the management device that sent the print command data; the management device receiving the first data; the printing device sending second data to the connection server when the printing device generates second data that differs from the first data; the connection server receiving the second data; the connection server sending the second data to the management device; and the management device receiving the second data.

Thus comprised, first data based on the operation of the print unit is sent from the printing device through the connection server and management server to the management device. As a result, when sending print command data from the management device to the management server, the communication path established between these devices can be used to send the first data to the management device. When second data, which is different from the first data, is sent from the printing device to the connection server, the connection server sends the second data to the management device without going through the management server. As a result, second data can be sent to the management device even when a communication path is not established between the management device and the management server. Furthermore, because communication does not go through the management server, processing by the management server when sending second data to the management device is not required, and the second data can be efficiently and quickly sent to the management device. More specifically, the print control method according to another aspect of the invention can make a print control system in which a printer and a management device communicate with a server over a network compatible with configurations in which devices communicate with a server over a network.

In a print control method according to another aspect of the invention, the second data is status data indicating the status of the printing device.

Thus comprised, status data generated by the printing device can be efficiently and quickly sent to the management device.

In a print control system according to another aspect of the invention the invention, the printing device has a communication unit that sends a connection request, and a print unit that prints; the connection server has a first connection server that sends print data, and a second connection server that sends print data; and the print control system includes a gateway server including a server connection unit that connects to the first connection server and the second connection server, a reception unit that receives the connection request, and a connection control unit that controls connecting the printing device to the first connection server or the second connection server based on the connection request received by the reception unit.

Thus comprised, a print control system in which a printer and a server communicate over a network can be made compatible with configurations in which devices communicate over a network.

In a print control system according to another aspect of the invention the invention, the connection request of the printing device is a request to establish a communication path for asynchronous duplex communication with the connection server.

Thus comprised, a communication path can be established in response to a connection request from the printing device between the printing device and whichever of the first connection server and second connection server is better suited as the server for establishing a connection.

In a print control system according to another aspect of the invention the invention, the first connection server has a first connection unit that connects to plural printing devices; the second connection server has a second connection unit that connects to plural printing devices; and the gateway server has a storage unit that stores the number of printing devices connected to the first connection unit, and the number of printing devices connected to the second connection unit.

Thus comprised, the gateway server can manage the number of printing devices connected to the first connection server and the number of printing devices connected to the second connection server, and based thereon can execute appropriate processes.

In a print control system according to another aspect of the invention the invention, the first connection server has a first connection unit that connects to plural printing devices; the second connection server has a second connection unit that connects to plural printing devices; the gateway server has a storage unit that stores the number of printing devices connected to the first connection unit, and the number of printing devices connected to the second connection unit; and the connection control unit of the gateway server selects the first connection server or the second connection server as the connection server to connect to the printing device based on the number of printing devices connected to the first connection unit and the number of printing devices connected to the second connection unit.

Thus comprised, the printing device can be connected to the connection server with the lighter processor load, the processor load can therefore be distributed, and processing efficiency can be improved.

In a print control system according to another aspect of the invention the invention, the printing device has identification information; and the first connection server has a communication management unit that relationally stores the identification information of the printing device and information about the first connection server in a connection information storage unit when the printing device and the first connection server are connected as controlled by the gateway server.

Thus comprised, by referencing the information stored by the connection information storage unit, the management server can know the relationship between the printing device and which connection server the printing device is connected to.

In a print control system according to another aspect of the invention the invention, the print command information includes the identification information of the printing device; and the management server has a search unit that, when the print command information sent by the management device is received, finds the first connection server to which a specified printing device is connected based on the printing device identification information contained in the print command information, and information stored in the connection information storage unit.

Thus comprised, the search unit can find the connection server to which a printing device is connected based on the information stored by the connection information storage unit.

In a print control system according to another aspect of the invention the invention, the gateway server includes a server connection unit that connects to a connection server; a reception unit that receives a connection request sent by a printing device; and a connection control unit that controls connecting the connection server and a printing device based on the connection request received by the reception unit.

Thus comprised, the gateway server can connect the connection server and printing device when a connection request is received from the printing device.

A print control system according to another aspect of the invention the invention includes a print control device that generates print data and sends the generated print data; a printing device that receives the print data and prints based on the print data; and a gateway server that stores a device address of the print control unit, and controls communication between the print control device and the printing device based on the stored device address.

Thus comprised, a print control system in which a printer and a server communicate over a network can be made compatible with configurations in which devices communicate over a network.

In a print control system according to another aspect of the invention the invention, the print control device has a print data processing unit that generates print data, and a connection unit that sends the print data generated by the print data processing unit; the gateway server has a server storage unit that stores the device address of the print control device, and a control unit that sends the device address in response to a device address request; and the printing device has a print unit that prints, a device storage unit that stores a server address of the gateway server, a communication control unit that sends a request for the device address to the gateway server of the server address stored by the device storage unit, and establishes a communication path with the connection unit of the print control unit of the device address received in response to the request, a communication unit that receives the print data by the communication path established by the communication control unit, and a print control unit that controls the print unit based on the print data received by the communication unit.

Thus comprised, a print control system in which a printer and a server communicate over a network can be made compatible with configurations in which devices communicate over a network.

In a print control system according to another aspect of the invention the invention, the printing device has identification information identifying the printing device; the server storage unit of the gateway server relationally stores the identification information and the device address sent to the printing device; the communication control unit of the printing device sends the identification information to the gateway server when sending a request for the device address; and the control unit of the gateway server sends the device address based on information stored in the server storage unit of the gateway server when a request for the device address and the identification information are received.

Thus comprised, when a device address request is received from the printing device, the gateway server can return the corresponding device address based on information stored by the server storage unit.

In a print control system according to another aspect of the invention the invention, the print control device has a first print data processing unit that generates print data, and a connection unit that sends the print data generated by the first print data processing unit; the gateway server has a second print data processing unit that generates the print data, a communication connection unit that sends the print data generated by the second print data processing unit, a server storage unit that stores a device address of the print control device, and a communication management unit that sends the server address or the device address stored in the server storage unit when a request to establish a communication path is received; and the printing device has a print unit that prints, a device storage unit that stores the server address, a communication control unit that sends a request to establish the communication path to the server address stored by the device storage unit, and establishes the communication path based on the server address or the device address received in response to the request, a communication unit that receives the print data by the communication path established by the communication control unit, and a print control unit that controls the print unit based on the print data received by the communication unit.

Thus comprised, a print control system in which a printer and a server communicate over a network can be made compatible with configurations in which devices communicate over a network.

In a print control system according to another aspect of the invention the invention, the communication management unit of the gateway server acquires the state of the load on the gateway server, and the state of the load on the print control device, and based on the acquired state of the load on the gateway server and the state of the load on the print control device, determines if the address to send is the server address or the device address.

Thus comprised, when a request to open a communication path is received from the printing device, the gateway server can open a communication path between the gateway server and whichever of the print control devices currently has the lighter processor load.

In a print control system according to another aspect of the invention the invention, the print control device connects to plural printing devices; the gateway server connects to plural printing devices; and the communication management unit of the gateway server acquires the number of printing devices connected to the print control device, acquires the number of printing devices connected to the gateway server, and determines whether the server address or the device address is the address to send based on the number of printing devices connected to the print control device and the number of printing devices connected to the gateway server.

Thus comprised, the gateway server can connect the printing device to the device with the lighter processor load.

In a print control system according to another aspect of the invention the invention, the communication control unit of the printing device sends a request to establish a communication path when the printing device power turns on.

Thus comprised, the printing device can get the address of the corresponding device and establish a communication path with that device when the power turns on without user intervention.

In a print control system according to another aspect of the invention the invention, the communication path is a communication path enabling asynchronous duplex communication.

Thus comprised, the gateway server and print control devices can send print control data to the printing device and execute a printing process when an event triggering printing by the printing device occurs.

A print control method according to another aspect of the invention includes: requesting establishing a communication path between a printing device and a gateway server based on a server address previously stored in the printing device; the gateway server determining whether to send the server address or the device address of the print control device when a connection request is received; sending the selected server address or device address to the printing device; and the print control device opening a communication path between the gateway server or the print control device based on the server address or device address that was sent.

Thus comprised, the printing device can simply access the gateway server to open a communication path, acquire the address of the device with which to open the communication path by a function of the gateway server, and establish the communication path based on the address. The printing device can therefore store only the address of the gateway server, and does not need to manage the address of the device having the control function. Therefore, when installing the printing device to a system, when opening a communication path, and when the device that establishes the communication path changes, the user does not need to input the address, for example.

In a print control system according to another aspect of the invention the invention, the gateway server acquires the state of the load on the gateway server, and the state of the load on the print control device, and based on the acquired state of the load on the gateway server and the state of the load on the print control device, determines if the address to send is the server address or the device address.

Thus comprised, when a request to open a communication path is received from the printing device, the gateway server can open a communication path between the gateway server and whichever of the print control devices currently has the lighter processor load.

A print control system according to another aspect of the invention the invention includes a printing device including a print unit that prints, and a print control unit that controls the print unit based on print control data; and a print control device including a print data processing unit that generates the print control data, a connection unit that establishes a communication path and sends the print control data generated by the print data processing unit to the printing device by asynchronous duplex communication, and a detection unit that detects the connection state of the communication path to the printing device.

Thus comprised, the print control method according to this aspect of the invention can make a print control system in which a printer and a print control device functioning as a server communicate over a network compatible with configurations in which devices communicate over a network.

A print control system according to another aspect of the invention the invention further preferably has a second print control device having a second connection unit that establishes a communication path and communicates by asynchronous duplex communication. In this aspect of the invention, the print control device has a communication processing unit that executes a process related to communication with the printing device based on a result from the detection unit, and a storage unit that stores address information of the second print control device; the communication processing unit of the print control device sends the address information of the second print control device stored in the storage unit to the printing device based on the detection result of the detection unit, and closes the connection to the printing device; and after the communication path between the printing device and the print control device is closed, the second print control device and the printing device establish a communication path between the printing device and the second print control device based on the address information.

Thus comprised, when a communication error occurs with the print control device, the printing device opens a new communication path with the second print control device and enables communicating with the second print control device.

In a print control system according to another aspect of the invention the invention, the process related to communicating with the printing device reports the connection status of the communication path.

Thus comprised, the print control device can report the connection status of the communication path to the user.

In a print control system according to another aspect of the invention the invention, the detection unit of the print control device sends a request response command to the printing device, and based on the status of the response to the request response command detects the connection status of the communication path.

Thus comprised, the detection unit can detect the connection status of the printing device through the communication path by managing the status of the response to the request response command.

In a print control system according to another aspect of the invention the invention, asynchronous duplex communication is WebSocket communication.

Thus comprised, the print control device and the printing device can communicate by asynchronous duplex communication through a WebSocket connection.

A print control method according to another aspect of the invention includes: establishing an asynchronous duplex communication path between a printing device that prints and a print control device that controls the printing device; the print control device detecting the connection status of the communication path after the communication path is established; and the print control device executing a process related to communication based on the detection result of the connection status of the communication path.

Thus comprised, the print control device detects the connection status of the printing device through the communication path by a function of the detection unit. As a result, the print control device can execute a process appropriate to the connection status based on the detected connection status.

In a print control method according to another aspect of the invention, the process of the print control device related to communication is a process that sends address information of a second print device stored in the print control device to the printing device, and cuts the communication path after sending the address information of the second print device to the printing device.

Thus comprised, when an error occurs in communication with the print control device, the printing device establishes a new communication path with the second print control device and enables communicating with the second print control device.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 8A and 8B show the data structure of selected databases.

FIGS. 19A-19D are flow charts showing the operation of devices in the control system.

FIGS. 25A-25D are flow charts showing the operation of devices in the control server.

FIGS. 27A-27C are flow charts showing the operation of the printer and control server.

FIGS. 30A and 30B are examples of a user interface supplied by the management device.

DESCRIPTION OF EMBODIMENTS

Preferred embodiments of the present invention are described below with reference to the accompanying figures.

Embodiment 1

Figure 1:
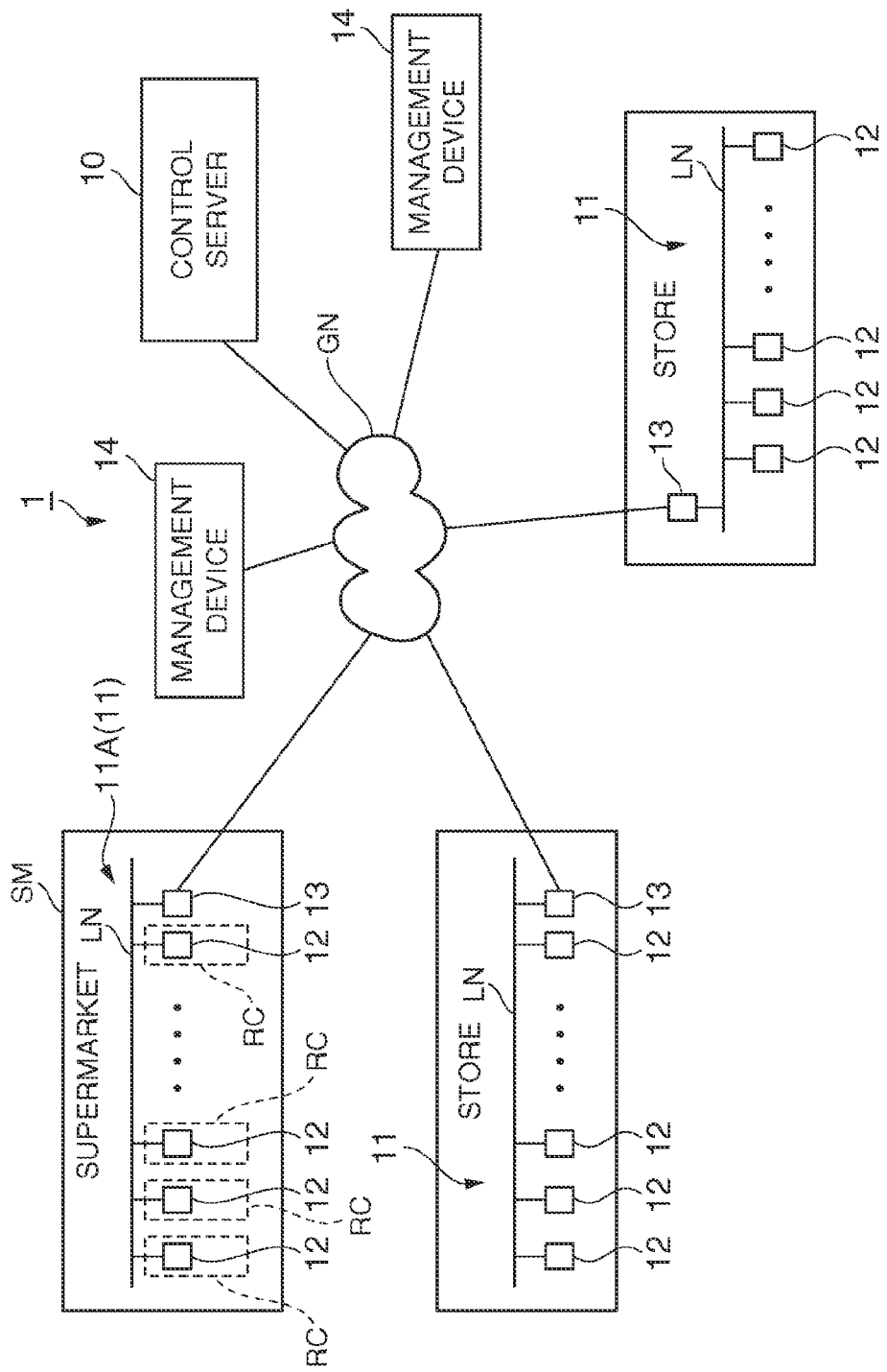
FIG. 1 shows the configuration of a control system according to a first embodiment of the invention.

FIG. 1 shows the configuration of a print control system 1 according to the first embodiment of the invention.

As shown in FIG. 1, the print control system 1 includes a control server 10, and a plurality of store systems 11 that connect to the control server 10 through the Internet or other network GN. Plural management devices 14 are connected to the network GN.

The store system 11 is a system that is used in retail businesses such as supermarkets, convenience stores, department stores, and restaurants. The store system 11 has functions including producing receipts for customers of the business.

The store system 11 has one or a plurality of printers 12 that have a print function for printing on print media and can produce receipts. The printer 12 connects to a local area network LN deployed in the business. A network communication controller 13 configured with a communication device such as a network router or modem connects to the local area network LN. The printer 12 accesses the network GN through the network communication controller 13.

For example, the store system 11A in this example is a system used in a supermarket SM. Plural checkout counters RC are set up in the supermarket SM, and a printer 12 is installed at each checkout counter RC. The printers 12 in the store system 11A are connected to the local area network LN, and access the network GN through the network communication controller 13.

In the print control system 1 according to this embodiment of the invention the printer 12 of the store system 11 establishes a connection with the control server 10, and communicates with the control server 10. The printer 12 executes a process related to printing as controlled by the control server 10.

The management device 14 is a device that manages one or more store systems 11 as described below. For example, the management device 14 may be installed in the headquarters of a company that operates multiple stores, and manage the store systems 11 deployed in multiple stores associated with the corporate group. As described below, the management device 14 can control specific printers 12 in the managed store systems 11, and command the specific printers 12 to print.

Figure 2:
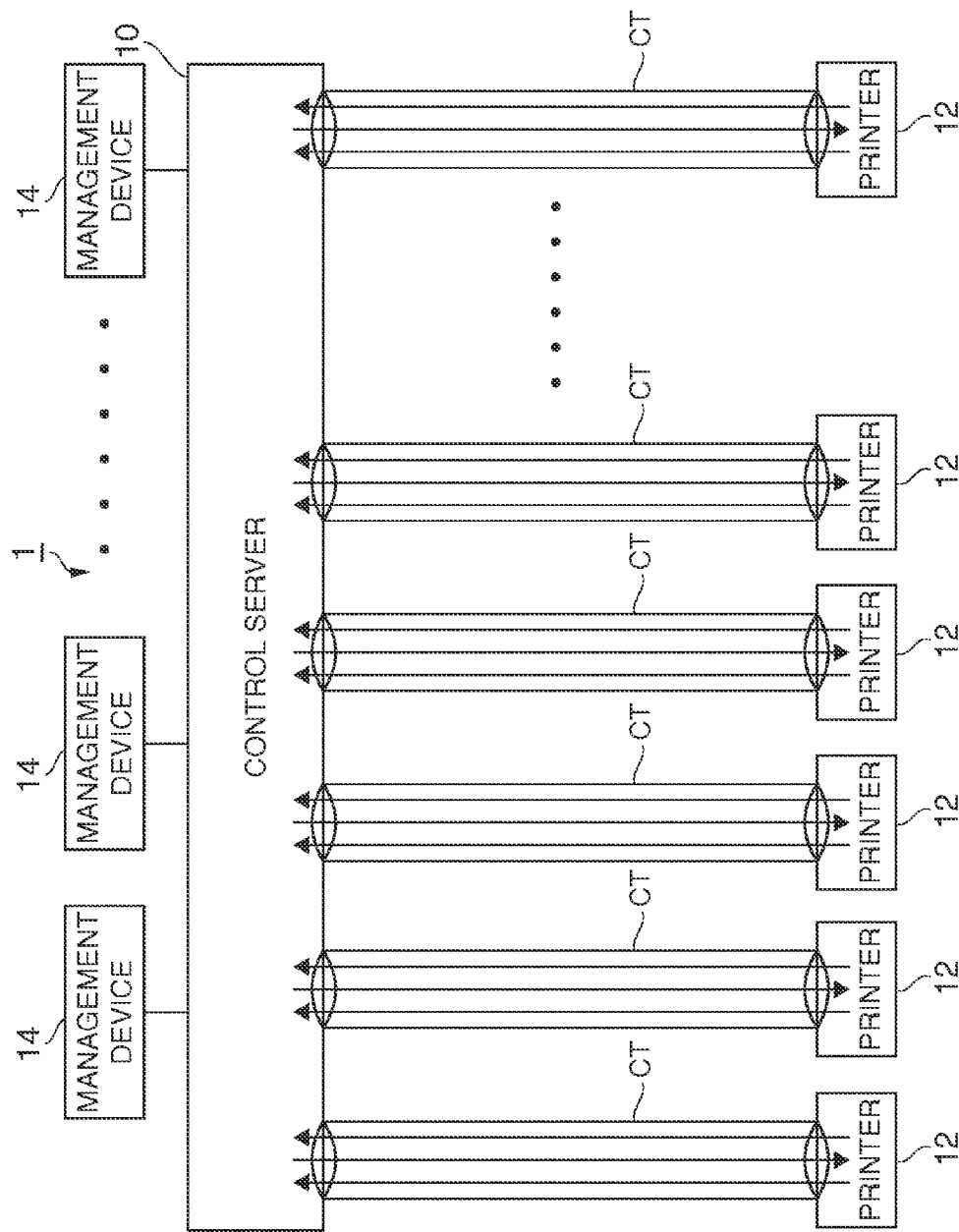
FIG. 2 illustrates communication paths opened between a control server and printers.

FIG. 2 illustrates the communication paths established between the control server 10 and the printers 12 in the print control system 1.

As shown in FIG. 2, a WebSocket connection CT (communication path) is established between the control server 10 and the printers 12 in each store system 11.

WebSocket is a communication standard that enables asynchronous duplex communication. After a server and client open a WebSocket connection CT using the WebSocket standard, sending and receiving data between the devices uses the protocol by means of the connection. It is therefore not necessary to establish a connection every time data is transmitted.

The WebSocket connection CT is a logical communication path for sending and receiving data according to the WebSocket protocol and procedures between the printer 12 and control server 10 connected through the WebSocket connection CT. Therefore, once the printer 12 and control server 10 handshake and establish a WebSocket connection CT, the printer 12 and control server 10 can exchange data asynchronously over the WebSocket connection CT. More specifically, the control server 10 can send data to the printer 12 through the WebSocket connection CT at any time, and the printer 12 can send data to the control server 10 through the WebSocket connection CT at any time.

WebSocket communication is asynchronous, duplex communication between the printer 12 and control server 10 through the WebSocket connection CT based on the WebSocket protocol and methods.

The printer 12 and control server 10 communicate by asynchronous, duplex communication through the WebSocket connection CT. More specifically, the control server 10 can push data to the printer 12 by WebSocket communication through the WebSocket connection CT without receiving a request from the printer 12 operating as a client device at any time. Likewise, the printer 12 can push data to the control server 10 through the WebSocket connection CT at any time.

Plural management devices 14 are also communicatively connected to the control server 10. As described below, the management device 14 can send print data to a specific printer 12 through the control server 10, and command that specific printer 12 to print.

In this embodiment of the invention the control server 10 is a client server in a so-called cloud system in which the printer 12 is a client device. More specifically, the control server 10 can process data, execute a specific operation when triggered by a specific condition being met, such as receiving a request from the printer 12 or a request from the management device 14, and send data based on the result of the process through the WebSocket connection CT to the printer 12.

In FIG. 2 the control server 10 is represented as a single block, but this does not mean that the control server 10 is configured from a single server. In this embodiment of the invention, the control server 10 may be configured from multiple servers, or it may be a server rendered by a function of a specific system. More specifically, the control server 10 may be any configuration that can execute the processes described herein.

The control server 10 and printer 12 communicate according to the WebSocket communication protocol in this embodiment. The invention is not limited to WebSocket communication, however, and other configurations capable of asynchronous, duplex communication in the same way as WebSocket communication may be used.

The print control system 1 thus has multiple (such as a 1000) printers 12 each capable of printing communicatively connected through a WebSocket connection CT to a control server 10.

Such a configuration enables the following.

The control server 10 can collect, manage, and analyze information based on data received from the plural printers 12 connected to the store system 11. The control server 10 can therefore collect valuable information. The collected information can be used as "big data."

Constructing a store system 11 can also be made easier and cheaper. More specifically, the printer 12 is connected to the control server 10 by a WebSocket connection CT in this print control system 1. Using a service provided by the control server 10, this enables controlling the printers 12 to execute processes as controlled by the control server 10. An administrator constructing a store system 11 can therefore build the store system 11 by simply installing the printers 12 where desired, and then connecting the printers 12 to the network GN. This enables controlling the printers 12 to execute a desired process, such as a process related to producing receipts, using a service provided by the control server 10. More specifically, the management device 14 can help reduce cost and facilitate deploying a store system 11.

The administrator configuring the store system 11 therefore does not need to embed a function for controlling the printers 12 in the management device 14 that manages the store system 11. More specifically, by accessing the control server 10 and using a service provided by the control server 10, the management device 14 can control the printers 12 connected to the control server 10. Configuring the store system 11 can therefore be simplified, and cost can be reduced.

In addition, because printers 12 from different store systems 11 are connected to the control server 10 by a WebSocket connection CT, the control server 10 can manage the plural printers 12 in the plural store systems 11. The control server 10 can also coordinate operation of the plural printers 12 connected in the plural store systems 11.

Figure 3:
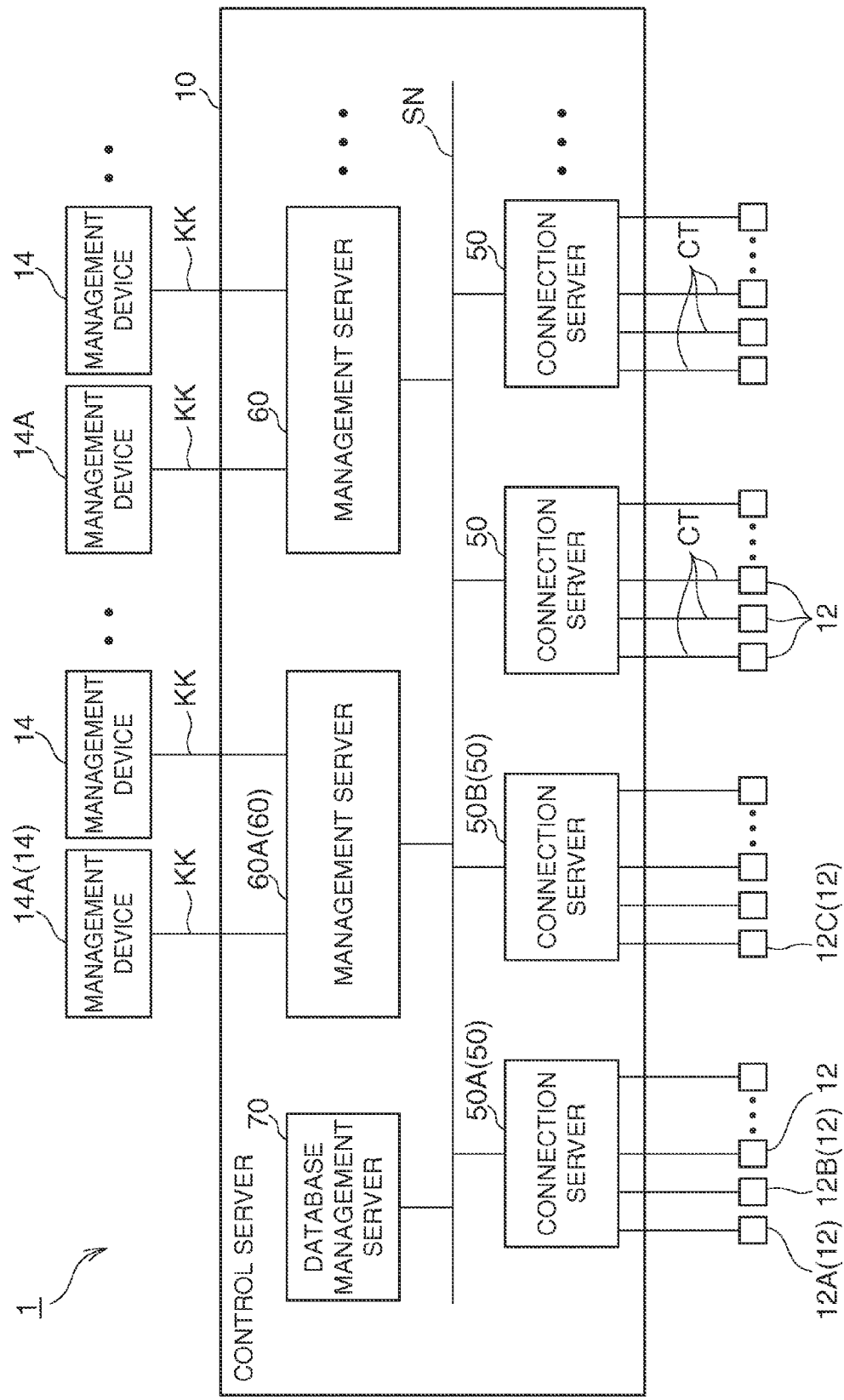
FIG. 3 shows the configuration of devices in the control server in further detail.

FIG. 3 shows the configuration of the print control system 1 according to this embodiment of the invention in further detail.

As shown in FIG. 3, the control server 10 includes a plurality of control servers 50 and a plurality of management servers 60. The plural connection servers 50 and the plural management servers 60 are communicatively connected together in the control server 10 through a server network SN including a LAN, for example.

As shown in FIG. 3, one or a plurality of printers 12 are connected to a connection server 50 through a WebSocket connection CT using the WebSocket protocol. One or a plurality of management devices 14 are connected to each management server 60 by a connection KK. The application-layer connection KK established between the management server 60 and management devices 14 is not limited to an HTTP or WebSocket connection, for example.

As described further below, the connection server 50 has functions for executing processes related to printers 12, such as a process related to communicating with the printers 12, and a process related to controlling the printers 12.

As described further below, the management server 60 has functions for executing processes related to the management devices 14, such as a process related to communicating with the management devices 14.

Communication between one management device 14A in the group of plural management devices 14, and one printer 12A in the group of plural printers 12, is described briefly using FIG. 3 with sending data from the management device 14A to the printer 12A as an example.

In this embodiment of the invention printer 12A is the printer 12 controlled by management device 14A. More specifically, the management device 14A causes the printer 12A to print as controlled by the management device 14A. The printer 12A is therefore a printer 12 included in the store system 11 managed by the management device 14A.

The management device 14A runs the following process to send data to the printer 12A. First, using a method described further below, the management device 14A sends data to a specific management server 60A in the group of plural management servers 60. Information identifying the printer 12A is included in this data. When accessing a service provided by the control server 10 in this embodiment of the invention, the management server 60 accessed by the management device 14 is predetermined by the management device 14.

Using a method described further below, the management server 60A looks for the connection server 50 to which the printer 12A controlled by the management device 14A is connected in the group of plural connection servers 50 connected to the server network SN. In this embodiment of the invention, the connection server 50 to which the printer 12A is connected is connection server 50A. The management server 60A therefore searches connection server 50A in this example.

Next, the management server 60A sends data to the connection server 50A that was found. Next, the connection server 50A, using a method described further below, sends the data to the printer 12A. In this event, the connection server 50A runs a specific process based on the received data to generate and send the data. The printer 12A receives the data and runs a process based on the data.

The control server 10 in this embodiment of the invention thus has multiple connection servers 50 and multiple management servers 60. The management devices 14 and printers 12 communicate through the connection servers 50 and management servers 60 of the control server 10. More specifically, the management devices 14 can print with the corresponding printer 12 through the management server 60 and connection server 50.

This configuration has the following effects.

Because the management servers 60 and connection servers 50 are independent servers, these servers can be separately added to the control server 10.

For example, the number of printers 12 that can connect to the control server 10 may be suddenly increased in order to use a service provided by the control server 10. In this event, a connection server 50A can be added to distribute the processor load related to printer 12 processes. This embodiment of the invention enables increasing the number of connection servers 50 in this event independently of the management servers 60. Because of this configuration, the number of servers can be adjusted according to the configuration (such as the number) of printers 12 that can connect to the connection servers 50, and the configuration (such as the number) of management devices 14 that can connect to the management servers 60. As a result, the server configuration of the control server 10 can be appropriately scaled according to the configuration of the connection servers 50 and management servers 60, and the processor load corresponding to the number of devices that can connect to each server can be distributed.

This configuration also enables providing the connection server 50 with a function for executing processes related to a connected printer 12, and providing the management server 60 with a function for executing processes related to a connected management device 14. As a result, compared with a configuration having a function for relationally executing processes related to different types of devices in a single server, the configuration of the invention can reduce the processor load on a single server, and suppress complicating processes on the one server.

As shown in FIG. 3, a database management server 70 is also connected to the server network SN. This database management server 70 is described further below.

Figure 4:
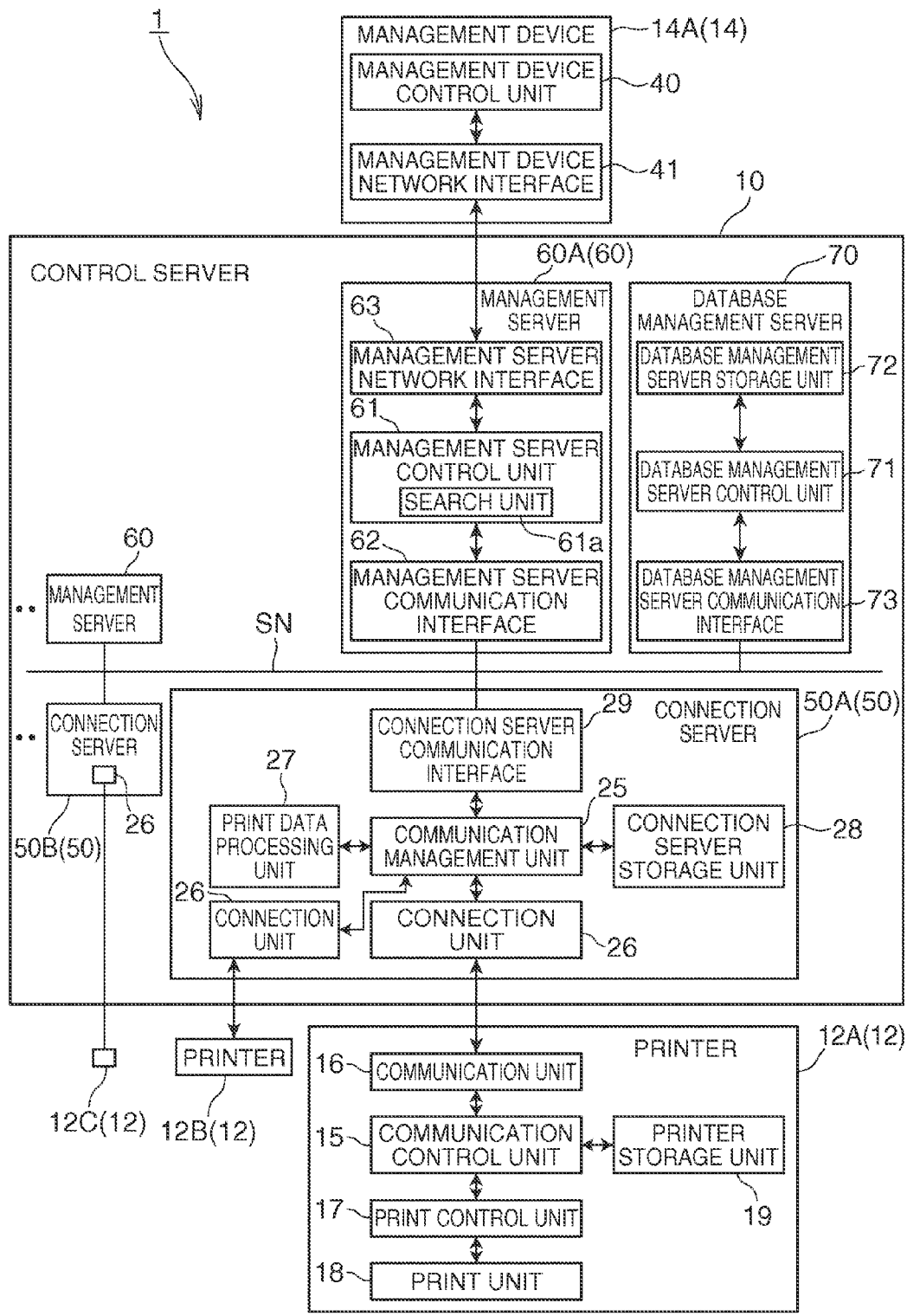
FIG. 4 is a block diagram showing the functional configuration of devices in the control server.

FIG. 4 is a block diagram showing the functional configuration of the printer 12A, the connection server 50A, the management server 60A, the management device 14A, and the database management server 70.

As shown in FIG. 4, the printer 12A includes a communication control unit 15, a communication unit 16, a print control unit 17, a print unit 18, and a printer storage unit 19.

The functions of the communication control unit 15, communication unit 16, and print control unit 17 are described below.

The print unit 18 includes mechanisms related to printing, such as a print mechanism that prints on print media, a conveyance mechanism that conveys the print media, and a cutting mechanism that cuts the print media, and control boards related to controlling the mechanisms.

The printer storage unit 19 is nonvolatile memory, and stores data. Address data and printer identification information, further described below, are stored in the printer storage unit 19.

As shown in FIG. 4, the connection server 50A of the control server 10 includes a communication management unit 25, a connection unit 26, a print data processing unit 27, a connection server storage unit 28, and a connection server communication interface 29.

The functions of the communication management unit 25, connection unit 26, and print data processing unit 27 are described further below.

The connection server storage unit 28 is nonvolatile memory, and stores data. A connection management database (relation information) is stored in the connection server storage unit 28 as described further below.

The connection server communication interface 29 communicates according to a specific communication protocol with another server in the control server 10 through the server network SN as controlled by the communication management unit 25.

As shown in FIG. 4, the management server 60A of the control server 10 includes a management server control unit 61, a management server communication interface 62, and a management server network interface 63.

The management server control unit 61 includes a CPU, and controls the management server 60A. One function block of the management server control unit 61 is a search unit 61a. The function of the search unit 61a is described further below.

The management server communication interface 62 communicates according to a specific communication protocol with another server in the control server 10 through the server network SN as controlled by the management server control unit 61.

The management server network interface 63 communicates with the management device 14 (including management device 14A) through the network GN as controlled by the management server control unit 61.

As shown in FIG. 4, the database management server 70 of the control server 10 includes a database management server control unit 71, a database management server storage unit 72, and a database management server communication interface 73.

The database management server control unit 71 includes a CPU, and controls the database management server 70. One function of the database management server control unit 71 is to read and write the databases stored in the database management server storage unit 72.

The database management server storage unit 72 is nonvolatile memory and stores data. A connection server address management database and a printer-related information database are stored in the database management server storage unit 72 as described further below.

The database management server communication interface 73 communicates with other servers in the control server 10 through the server network SN as controlled by the database management server control unit 71.

As shown in FIG. 4, the management device 14 includes a management device control unit 40, and a management device network interface 41.

The management device control unit 40 includes a CPU, and controls the management device 14.

The management device network interface 41 communicates with the management server 60 as controlled by the management device control unit 40.

The operation of the printer 12A and connection server 50A when the printer 12A power turns on is described next.

Figures 5A, 5B:
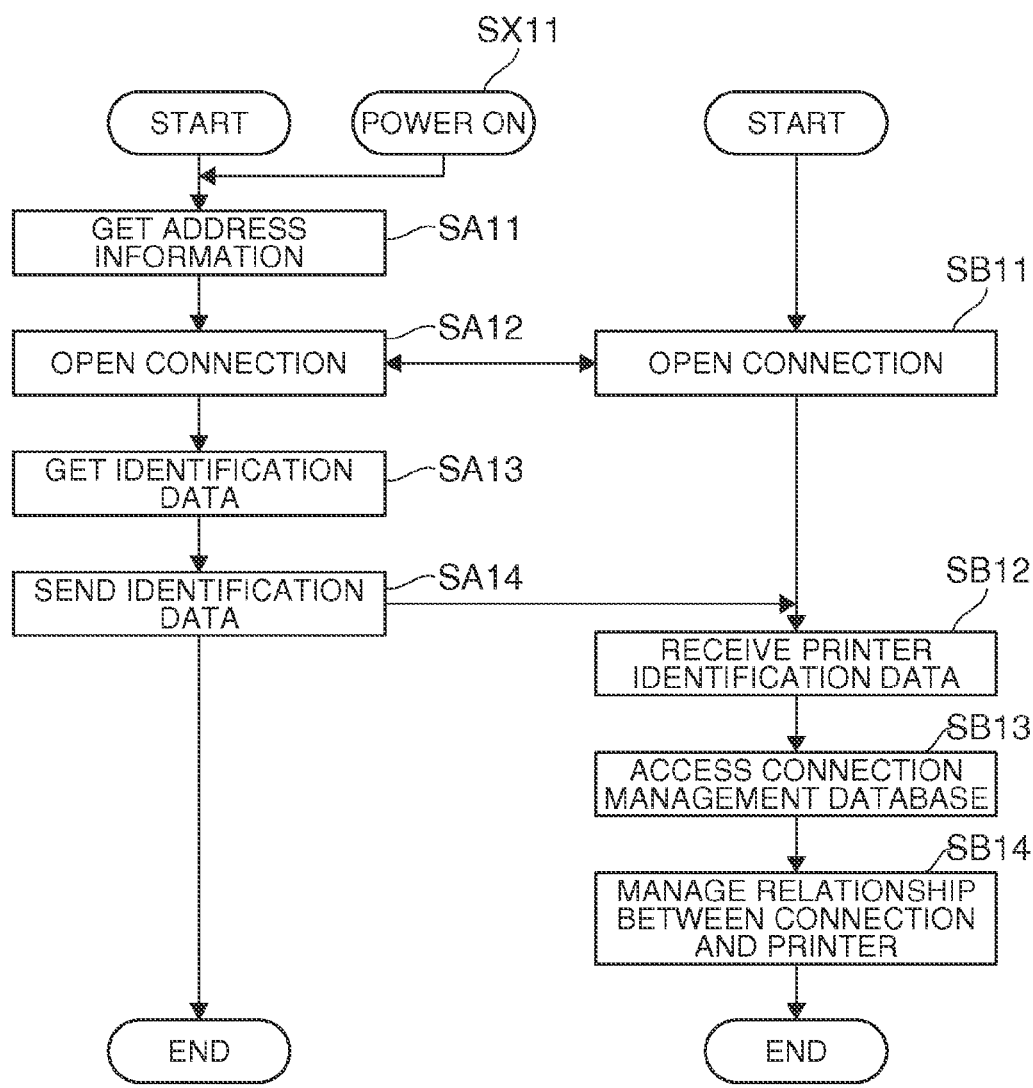
FIGS. 5A and 5B are flow charts showing the operation of a printer and the printer connection server.

FIG. 5 is a flow chart showing the operation of the printer 12A and the connection server 50A after the printer 12A power turns on, column (A) showing the operation of the printer 12A, and column (B) showing the operation of the connection server 50A.

The trigger of the process shown in the flow chart in FIG. 5 is not limited to the power turning on. For example, this process may be triggered by the printer 12A connecting to the network GN and enabling communication, or by an instruction from a user.

Note that in the operation described below the printer 12A is connected to the local area network LN of the store system 11A in which it is used, and can access the network GN.

The functions of the function blocks of the communication control unit 15 and print control unit 17 of the printer 12A, the communication management unit 25 and the print data processing unit 27 of the connection server 50A, and the search unit 61a of the management server 60A, are described below.

More specifically, these function blocks are software objects. An object is an instance created in an object-oriented programming language, and more specifically is a software function block defined by a set of data and methods. The function of a particular function block is rendered by calling (invoking) a method of the function block.

The functions of these function blocks may also be rendered by the CPU or other hardware assets reading and running an application. Configurations in which the function of a single function block is rendered by a single application, configurations in which the function of plural function blocks are rendered by a single application, and configurations in which the function of a single function block is rendered by plural applications, are possible.

In other words, the function blocks represent functions as conceptual blocks, and do not mean any specific application or hardware construction.

As shown in FIG. 5 (A), when the printer 12A power turns on (step SX1), the communication control unit 15 accesses the printer storage unit 19 and gets the address data stored in the printer storage unit 19 (step SA11).

The address data is data identifying the address (such as the domain name, IP address, or path name) of the connection server 50 (connection server 50A in this example) to access when the WebSocket connection CT is established according to the WebSocket protocol. When opening a WebSocket connection CT according to the WebSocket protocol, the client (the printer 12A in this example) handshakes with the server (the connection server 50A in this example) using HTTP (Hypertext Transfer Protocol). When handshaking, the client sends a message containing the domain name of the server, and the address data is data representing this domain name.

The connection server 50 that establishes the WebSocket connection CT when the power turns on is thus predefined for each printer 12 in this embodiment of the invention. Each printer 12 stores information identifying the domain name of the connection server 50 to access to establish the WebSocket connection CT is stored as the server address data.

Next, the communication control unit 15 establishes a WebSocket connection CT with the communication management unit 25 of the connection server 50A through the communication unit 16 and the connection unit 26 based on the domain name in the address data (step SA12, step SB11). In other words, the printer 12 according to this embodiment establishes a WebSocket connection CT when triggered by the power turning on without receiving an instruction from the user or a request from the control server 10.

The communication unit 16 and connection unit 26 are WebSocket interfaces enabling data communication based on the WebSocket protocol and methods. These function blocks are instantiated using a WebSocket Socket.IO library, for example.

If the communication control unit 15 sends data to the communication unit 16, the data can be sent through the WebSocket connection CT according to the WebSocket protocol.

More specifically, the communication unit 16 has functions for processing data that is received from the communication control unit 15 according to WebSocket, and sending the data through the WebSocket connection CT based on WebSocket methods. The communication unit 16 also has functions for processing data that is received through the WebSocket connection CT according to WebSocket, and sending to the communication control unit 15. The connection unit 26 is similarly configured.

By establishing a WebSocket connection CT, the printer 12A and connection server 50A can communicate through an asynchronous, duplex communication link. More specifically, the connection server 50A can push data to the printer 12A through the WebSocket connection CT without receiving a request from the printer 12A operating as a client.

Next, the communication control unit 15 of the printer 12A accesses the printer storage unit 19 and gets the printer identification information stored in the printer storage unit 19 (step SA13). The printer identification information is data representing the identification information of the printer 12A (referred to below as printer identification information). The printer identification information is, for example, a serial number assigned to the printer 12 when the printer 12 is manufactured.

Next, the communication control unit 15 sends the printer identification data over the WebSocket connection CT (step SA14).

As shown in FIG. 5 (B), the communication management unit 25 of the connection server 50A receives the printer identification data (step SB12).

Next, the communication management unit 25 accesses the connection management database stored in the connection server storage unit 28 (step SB13). The connection management database is a database relationally storing for the WebSocket connections CT that were established connection identification information identifying the WebSocket connection CT and the printer identification information of the printer.

Next, the communication management unit 25 creates one record in the connection management database. The communication management unit 25 then stores in the created record the connection identification information of the WebSocket connection CT established in step SB11 related to the printer identification information indicated by the printer identification data received in step SB12 (step SB14).

Note that when a WebSocket connection CT is opened, the communication management unit 25 generates connection identification information for that connection that is different from the connection identification information of any other WebSocket connection CT that was already opened. The relationship between the WebSocket connections CT and printers 12 is managed by the process of step SB14.

A WebSocket connection CT is thus established when triggered by the power turning on without receiving a user instruction or a request from the control server 10. Thus comprised, the user does not need to perform a complicated operation to open a WebSocket connection CT. Special knowledge is also not needed to open a WebSocket connection CT. After the power turns on, the printer 12 can also be quickly enabled to execute processes as controlled by the control server 10.

A WebSocket connection CT is thus established between the communication unit 16b and connection unit 26b. As a result, a function unit communication path KT based on the WebSocket connection CT is established between the print control unit 17 of the printer 12, and the print data processing unit 27 of the connection server 50A. The function unit communication path KT is a logical communication path for data communication between the print control unit 17 and print data processing unit 27. The print control unit 17 and print data processing unit 27 can communicate by asynchronous duplex communication through the function unit communication path KT. Asynchronous duplex communication through the function unit communication path KT is described further below.

Operation of the management device 14A, servers in the control server 10, and printer 12A when the management device 14A drives the printer 12A to print is described next.

Figures 6A, 6B, 6C, 6D:
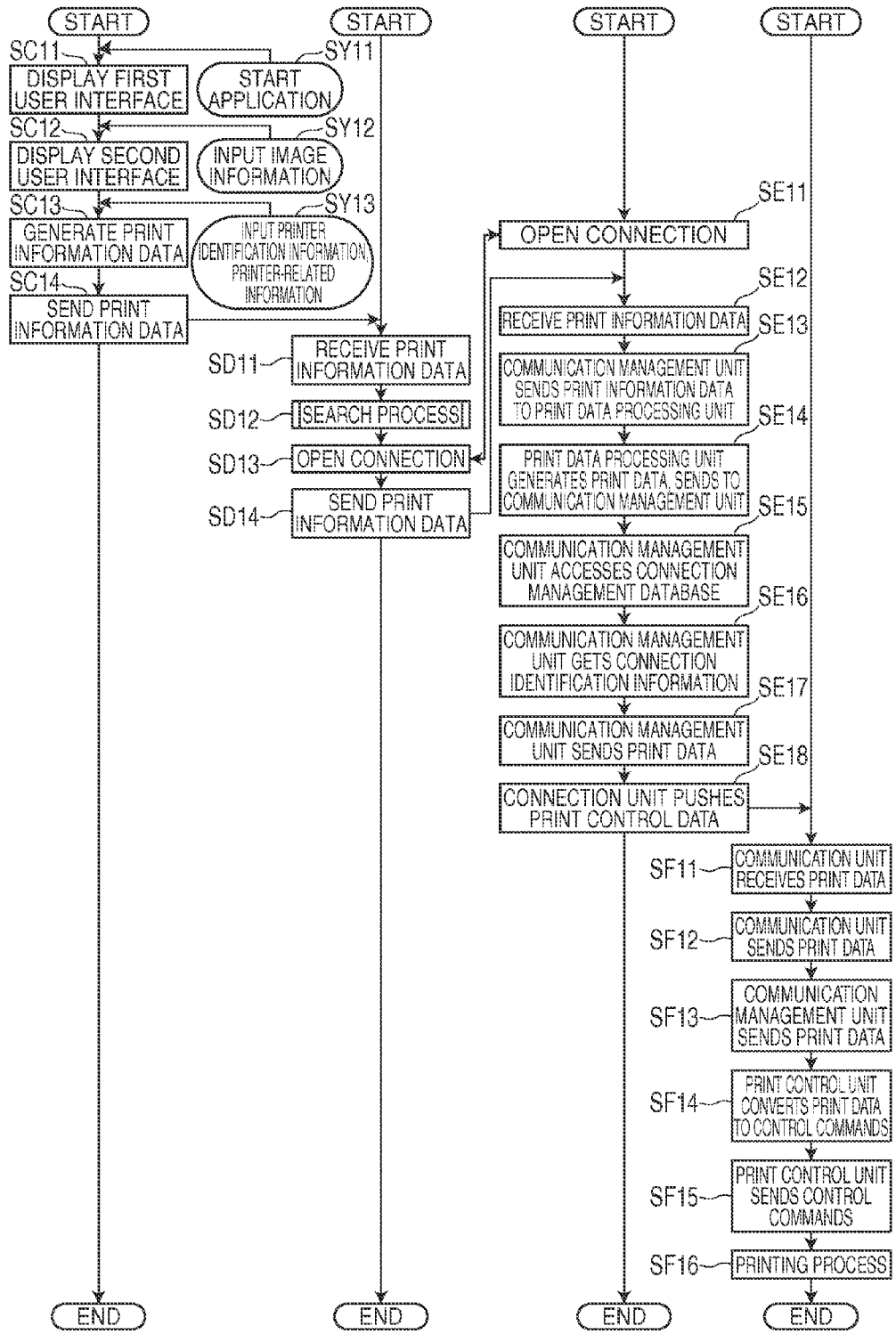
FIGS. 6A-6D are flow charts showing the operation of the devices of the control server.

FIG. 6 is a flow chart showing the operation of the devices when the management device 14A prints through the printer 12A. FIG. 6 (A) shows the operation of the management device 14A, (B) shows the operation of the management server 60A, (C) shows the operation of the connection server 50A, and (D) shows the operation of the printer 12A.

As shown in FIG. 6 (A), to print with the printer 12A, the user starts a dedicated application previously installed on the management device 14A (step SY11).

This application provides a user interface for the user to input the information for printing by the printer 12, and information identifying the printer 12A that is to print. The application also has a function for generating and outputting the print information data (print data) based on the input information to the management server 60A.

When the user starts the application, the management device control unit 40 displays a first user interface through a function of the application on a display panel or other specific display means (step SC11). The first user interface is a user interface for the user to input information for printing by the printer 12 (referred to print information below). The print information includes, for example, the file name where the image data is stored, and information related to where the image is printed on the print medium. The first user interface enables inputting information used later by the print data processing unit 27 to generate the print data.

After the user inputs the print information to the first user interface and confirms the input (step SY12), the management device control unit 40 using a function of the application displays a second user interface (step SC12).

The second user interface is a user interface enabling the user to input the information identifying the printer 12 to print (printer 12A in this example). The second user interface has an input field for inputting the printer identification information, and the user inputs the printer identification information to this field when the user knows the printer identification information of the printer 12 to use for printing.

The second user interface includes fields for inputting the name of the store, the floor, and the lane number of the checkout counter RC where the printer 12 to be used is installed as information related to the printer 12. When the printer identification information of the printer 12 to use for printing is not known, the user inputs the store name, floor, and lane number of the printer 12 to use for printing. Below, this combination of store name, floor, and lane number is referred to as the printer-related information.

After the user inputs the printer identification information or the printer-related information to the second user interface and confirms the input (step SY13), the management device control unit 40 executes the following process.

Using a function of the application, the management device control unit 40 generates the print information data (print data) based on the information input to the first user interface and the second user interface by a function of the application (step SC13). The information to be printed based on the information input to the first user interface is included in the print information data. The printer identification information or the printer-related information of the printer 12 to use for printing is also included in the print information data based on the information input to the second user interface.

Next, by a function of the application, the management device control unit 40 sends the print information data to the management server 60A through the management device network interface 41 (step SC14). In this embodiment, the management server 60 to which the management device 14A sends data is preset to management server 60A. The address of the management server 60A is predefined in the program rendering the function of the application. After the connection KK with the management server 60A based on a specific communication protocol is established, the management device control unit 40 sends the data through the connection KK.

As shown in FIG. 6 (B), the management server control unit 61 receives the print information data by the management server network interface 63 (step SD11).

Next, the search unit 61a of the management server control unit 61 runs a search process based on the received print information data (step SD12).

Figure 7:
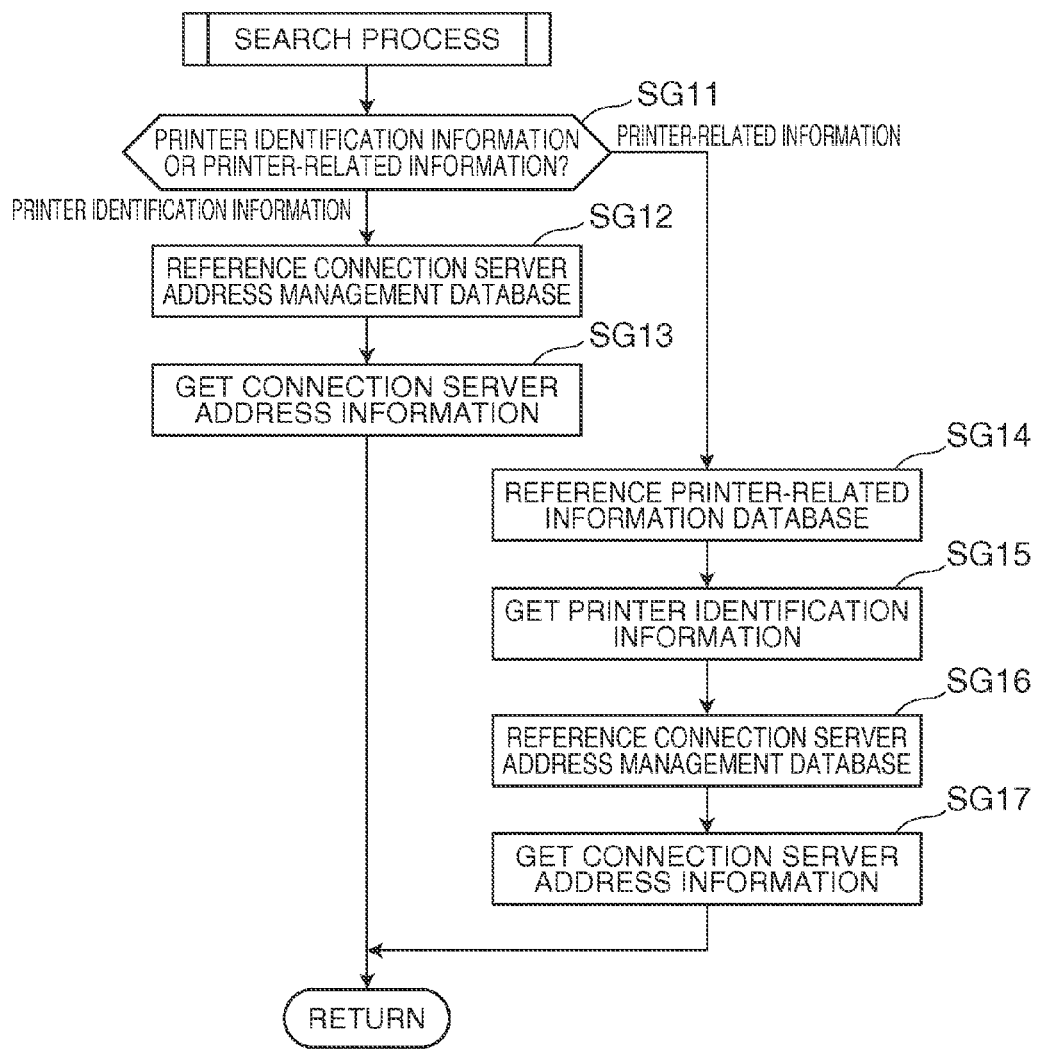
FIG. 7 is a flow chart showing the operation of the search unit in the search process.

FIG. 7 is a flow chart describing the search process in detail.

As shown in FIG. 7, the search unit 61a uses the print information data in the search process to determine if the printer identification information is included or the printer-related information is included in the print information data. (step SG11). If the printer identification information is contained in the print information data (step SG11 returns "printer identification information"), the search unit 61a runs the following process. Specifically, the search unit 61a accesses and searches the connection server address management database stored by the database management server storage unit 72 of the database management server 70 (step SG12).

FIG. 8 (A) shows an example of the data structure of one record in the connection server address management database.

As shown in FIG. 8 (A), the connection server address management database relationally stores for each printer 12 the printer identification information of the printer 12 and information identifying the address of the connection server 50 to which the printer 12 is connected (below referred to below as connection server address information). In this example, the printer 12A is connected to connection server 50A. Therefore, the printer identification information of the printer 12A and the connection server address information of the connection server 50A are relationally stored in one record of the connection server address management database.

Next, after searching the connection server address management database in step SG12, the search unit 61a runs the following process. Specifically, using the printer identification information contained in the print information data, the search unit 61a gets the connection server address information related to the printer identification information from the connection server address management database (step SG13). In this example, the search unit 61a gets the connection server address information of connection server 50A in step SG13.

However, if the printer-related information is included in the print information data instead of the printer identification information in step SG11 (step SG11 returns "printer-related information"), the search unit 61a searches the printer-related information database (step SG14).

FIG. 8 (B) shows an example of the data structure of one record in the printer-related information database.

As shown in FIG. 8 (B), for each printer 12, the printer-related information database relationally stores the printer-related information of the printer 12 (information indicating the set of store name, floor, and lane number), and the printer identification information of the printer 12. In this example, the printer identification information of printer 12A, and the name the store, the floor, and the lane number of the checkout counter RC where printer 12A is installed, are relationally stored in one record of the printer-related information database.

After searching the printer-related information database, the search unit 61a runs the following process. Specifically, using the printer-related information contained in the print information data, the search unit 61a gets the printer identification information related to the printer-related information from the printer-related information database (step SG15). In this example, the search unit 61a retrieves the printer identification information of the printer 12A in step SG15.

Next, the search unit 61a accesses and searches the connection server address management database stored by the database management server storage unit 72 of the database management server 70 (step SG16).

Next, using the printer identification information acquired in step SG15 as the search key, the search unit 61a gets the connection server address information related to the identification information from the connection server address management database (step SG17). In this example, the search unit 61a gets the connection server address information of the connection server 50A in step SG17.

In the search process, the search unit 61a thus gets the address of the connection server 50 to which the printer 12 that is to print is connected.

Note that the content of the connection server address management database and the printer-related information database can be edited by the user using the management device 14.

Referring again to FIG. 6, after the search process in step SD12, the management server control unit 61 establishes a connection with the connection server 50 (connection server 50A in this example) identified by the connection server address information acquired by the search process in step SD12, and enables communication (step SD13, step SE11).

Next, the management server control unit 61 sends the print information data to the connection server 50A by the management server communication interface 62 using the connection established in step SD13 (step SD14).

As shown in FIG. 6 (C), the communication management unit 25 of the connection server 50A receives the print information data through the connection server communication interface 29 (step SE12).

Next, the communication management unit 25 sends the received print information data to the print data processing unit 27 (step SE13).

The print data processing unit 27 generates and outputs print data related to controlling the printer 12 based on the received print information data to the communication management unit 25 (step SE14).

The print data is an XML (Extensible Markup Language) file containing the print information to be printed by the printer 12. The information to be printed by the printer 12, such as the image data and information where the image is to be printed, is included in the print data in XML format. The printer identification information of the printer 12 to be used for printing is also included in the print data. The printer identification information of the printer 12 to use for printing may be written in a specific tag in the print data.

The communication management unit 25 then accesses the connection management database stored in the connection server storage unit 28 (step SE15).

Next, the communication management unit 25 acquires the connection identification information of the WebSocket connection CT related to the printer identification information from the connection management database using the printer identification information written in the received print data as the search key (step SE16). The connection identification information acquired here is the connection identification information of the WebSocket connection CT to the printer 12A that is to print.

Next, the communication management unit 25 sends the print data to the connection unit 26 corresponding to the WebSocket connection CT related to the connection identification information acquired in step SE16 (step SE17).

Next, the connection unit 26 pushes the received print data through the WebSocket connection CT to the printer 12 (step SE18).

As shown in FIG. 6 (D), the communication unit 16 then receives the print data through the WebSocket connection CT (step SF11).

Next, the communication unit 16 sends the received print data to the communication control unit 15 (step SF12).

Next, the communication control unit 15 sends the received print data to the print control unit 17 (step SF13).

Next, the print control unit 17 converts the received print data to control commands in the command language of the print unit 18 (step SF14). More specifically, the print control unit 17 converts the print data in an XML file to commands that can be interpreted by the print unit 18.

Next, the print control unit 17 sends the control commands to the print control unit 17 (step SF15).

Next, the print unit 18 prints on the print medium based on the control commands (step SF16).

Based on the printer identification information or printer-related information of the printers 12 stored in the control server 10, the management device 14 in this embodiment of the invention can send data to a particular printer 12 through the management servers 60 and connection servers 50 of the control server 10. In other words, the management device 14 can control a specific printer 12 in the group of printers 12 connected by a WebSocket connection CT to the control server 10 through the control server 10.

As also described above, the control server 10 in this embodiment of the invention can print from a printer 12 without receiving a request from the printer 12 when an event that prints on the printer 12 occurs. Events that cause the printer 12 to print are events in which predefined conditions are met, such as when an instruction is received from the user, or a request is received from a management device 14 as described in this example.

This configuration also enables starting printing faster than in a configuration in which the printer 12 intermittently sends a request to the control server 10, and the control server 10 sends print data in response to such a request when there is a need to print with the printer 12. Consumption of resources can also be suppressed compared with a configuration in which the control server 10 queues responses to requests.

Through the processes described above, the management device 14A can also print on a printer 12B (second printer, see FIG. 3, FIG. 4) that is difference from the printer 12A connected to the connection server 50A.

More specifically, when the printer identification information or the printer-related information of printer 12B is input to the second user interface supplied by the management device 14A, the printer identification information or the printer-related information of the printer 12B is added to the print information data the management device 14A sends to the management server 60A.

The search unit 61a of the management server 60A that receives this print information data then gets the connection server address information of the connection server 50A that is the connection server 50 to which the printer 12B connects based on the printer identification information or the printer-related information of the printer 12B added to the print information data. Based on the acquired connection server address information, the management server 60A sends the print information data to the connection server 50A. The connection server 50A then generates the print data based on the print information data. Next, the connection server 50A identifies the WebSocket connection CT opened to the printer 12B based on the printer identification information added to the print information data, and sends the data to the printer 12B through the identified WebSocket connection CT.

The management device 14A can also print on a printer 12C (third printer, see FIG. 3, FIG. 4) that is connected to a connection server 50B (second connection server, see FIG. 3, FIG. 4) different from connection server 50A.

More specifically, when the printer identification information or the printer-related information of printer 12C is input to the second user interface supplied by the management device 14A, the printer identification information or the printer-related information of the printer 12C is added to the print information data the management device 14A sends to the management server 60A.

The search unit 61a of the management server 60A that receives this print information data then gets the connection server address information of the connection server 50B that is the connection server 50 to which the printer 12C connects based on the printer identification information or the printer-related information of the printer 12C added to the print information data. Based on the acquired connection server address information, the management server 60A sends the print information data to the connection server 50B. The connection server 50B then generates the print data based on the print information data. Next, the connection server 50B identifies the WebSocket connection CT opened to the printer 12C based on the printer identification information added to the print information data, and sends the data to the printer 12C through the identified WebSocket connection CT.

As described above, a print control system 1 (print control system) according to this embodiment includes a printer 12 having a print unit 18 that prints and a print control unit 17 that controls the print unit 18 based on print data; a connection server 50 to which the printer 12 connects; a management server 60 that connects to the connection server 50 and sends print information data (print data) to the connection server 50; and a management device 14 that connects to the management server 60, generates print information data (print data), and sends print data based on the print information data to the printer 12 through the management server 60 and connection server 50.

In this configuration, the print control system 1 includes a connection server 50 that connects to a printer 12, and a management server 60 that connects to a management device 14. As a result, the connection server 50 can communicate with the printer 12 and run other printer 12 related processes independently of the management server 60; and the management server 60 can communicate with the management device 14 and executes other management device 14 related processes independently of the connection server 50.

The connection server 50 and management server 60 can therefore have functions for executing processes related to the respectively connected devices and execute processes using these functions, process efficiency can be improved, and the processor load of each server can be reduced. In addition, because the number of connection servers 50 and management servers 60 can be changed independently, the server configuration can be appropriately scaled to the configuration (such as the number) of printers 12 that are connected to the connection servers 50, and the configuration (such as the number) of management devices 14 that are connected to the management servers 60, and the processor load can be distributed. This configuration also enables sending data that the management device 14 sent to the management server 60 through the management server 60 and connection server 50 to the printer 12 according to the server configuration of a control server 10 having a connection server 50 and management server 60. More specifically, the invention can make a print control system 1 compatible with the configuration of connection servers 50 and management servers 60 in the control server 10.

A management server 60 in this embodiment of the invention has a search unit 61a that looks for the connection server 50 to which the printer 12 identified by the printer identification information connects based on the printer identification information in the print information data.

Thus comprised, this function of the search unit 61a enables sending data sent from the management device 14 to the management server 60 to the connection server 50 connected to the corresponding printer 12.

The search unit 61a in this embodiment of the invention searches a connection server address management database that relationally stores printer identification information and connection server address information (connection server 50 information).

Thus comprised, the search unit 61a can find the connection server 50 connected to the corresponding printer 12 from the connection server address management database.

The management device 14 in this embodiment of the invention provides a second user interface to which information related to the printer 12 (printer-related information) is input, adds the information related to the printer 12 input to the second user interface to the print information data and outputs to the management server 60. The search unit 61*a* of the management server control unit 61 then searches based on the printer 12 related information added to the print information data and the printer-related information database.

Thus comprised, a specific printer 12 can be controlled to print by inputting information related to the desired printer to the second user interface instead of inputting the printer identification information for the printer 12 to use for printing.

The invention is described above with reference to a preferred embodiment thereof, but the invention is not limited thereto and can be modified and adapted in many ways without departing from the scope of the accompanying claims.

In the embodiment described above the printer 12 is installed as part of a store system 11 deployed in a business. However, the printer 12 is not limited to being part of a store system 11, and can be used in other systems.

In addition, print data is sent as an XML file from the control server 10 to the printer 12 in the foregoing embodiment, but the data format of the print data is not limited to XML. The print data may be data created in another markup language, or control commands in the command language of the print unit 18.

The function blocks shown in FIG. 3 can also be rendered as desired using hardware and software, and do not suggest a specific hardware configuration. Functions of the printer 12 may also be rendered by a separate externally connected device. The printer 12 can also execute the processes described above by running a program stored on an externally connected storage medium.

The information related to the printer 12 (printer-related information) is also not limited to the example described above. Any information other than the printer identification information that can uniquely identify a printer 12 may be used.

Embodiment 2

A second embodiment of the invention is described next. The print control system 1*b* according to the second embodiment of the invention includes a control server 10*b* (print control device), a printer 12*b*, and a management device 14*b*. The control server 10*b*, printer 12*b*, and management device 14*b* connect over a network GN in the same way as the control server 10, printer 12, and management device 14 in the first embodiment. A communication path established between the control server 10*b* and printer 12*b* is the same as the communication path established between the control server 10 and printer 12 in FIG. 2.

Figure 9:
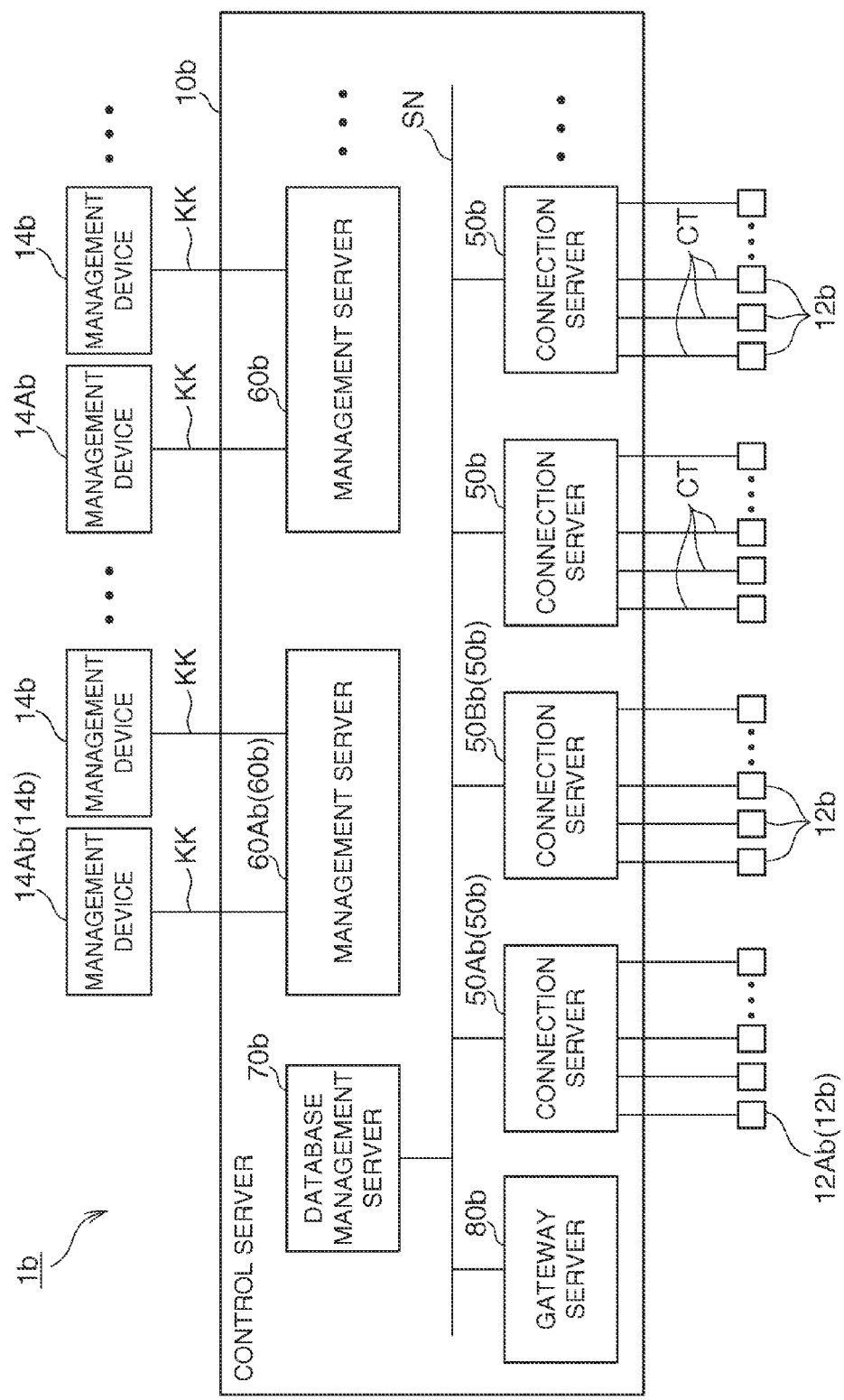
FIG. 9 shows the configuration of devices in the control server according to a second embodiment of the invention in further detail.

FIG. 9 shows the configuration of the print control system 1*b* according to this embodiment of the invention in further detail.

As shown in FIG. 9, the control server 10*b* includes a plurality of control servers 50*b* and a plurality of management servers 60*b*. The plural connection servers 50*b* and the plural management servers 60*b* are communicatively connected together in the control server 10*b* through a server network SN including a LAN, for example.

As shown in FIG. 9, one or a plurality of printers 12*b* are connected to a connection server 50*b* through a WebSocket connection CT using the WebSocket protocol. One or a plurality of management devices 14*b* are connected to each management server 60*b* by a connection KK. The application-layer connection KK established between the management server 60*b* and management devices 14*b* is not limited to a WebSocket connection, for example, and may be a HTTP connection.

As described further below, the connection server 50*b* has functions for executing processes related to the printer 12*b*, including processes related to communicating with the printer 12*b*, and processes related to controlling the printer 12*b*.

The management server 60*b* similarly has functions for executing processes related to the management device 14*b*, including a process related to communicating with the management device 14*b*, as described further below.

As shown in FIG. 9, a database management server 70*b* is also connected to the server network SN. A gateway server 80*b* is also connected to the server network SN. These servers are described further below.

Communication between one management device 14Ab in the group of plural management devices 14*b*, and one printer 12Ab in the group of plural printers 12*b*, is described briefly using FIG. 9 and data being sent from the management device 14Ab to the printer 12Ab for example.

In this embodiment of the invention printer 12Ab is the printer 12*b* controlled by management device 14Ab. More specifically, management device 14Ab causes the printer 12Ab to print as controlled by the management device 14Ab. The printer 12Ab is therefore a printer 12*b* included in the store system 11 managed by the management device 14Ab.

The management device 14Ab runs the following process to send data to the printer 12Ab. First, using a method described further below, the management device 14Ab sends data to a specific management server 60Ab in the group of plural management servers 60*b*. Information identifying the printer 12Ab is included in this data. When accessing a service provided by the control server 10*b* in this embodiment of the invention, the management server 60*b* accessed by the management device 14*b* is predetermined by the management device 14*b*.

Using a method described further below, the management server 60Ab looks for the connection server 50*b* to which the printer 12Ab controlled by the management device 14Ab is connected in the group of plural connection servers 50*b* connected to the server network SN. In this embodiment of the invention, the connection server 50*b* to which the printer 12Ab is connected is first connection server 50Ab. The management server 60Ab therefore searches first connection server 50Ab in this example.

Next, the management server 60Ab sends data to the first connection server 50Ab that was found. Next, the first connection server 50Ab, using a method described further below, sends the data to the printer 12Ab. In this event, the first connection server 50Ab runs a specific process based on the received data to generate and send the new data. The printer 12Ab receives the data and runs a process based on the data.

The control server 10*b* in this embodiment of the invention thus has multiple connection servers 50*b* and multiple management servers 60*b*. The management devices 14*b* and printers 12*b* communicate through the connection servers 50*b* and management servers 60*b* of the control server 10*b*. More specifically, the management devices 14*b* can print with the corresponding printer 12*b* through the management server 60*b* and connection server 50*b*.

This configuration has the following effects.

Because the management servers 60*b* and connection servers 50*b* are independent servers, these servers can be separately added to the control server 10*b*.

For example, the number of printers 12*b* that can connect to the control server 10*b* may be suddenly increased in order to use a service provided by the control server 10*b*. In this event, a first connection server 50Ab can be added to distribute the processor load related to printer 12*b* processes. This embodiment of the invention enables increasing the number of connection servers 50b in this event independently of the management servers 60b. Because of this configuration, the number of servers can be adjusted according to the configuration (such as the number) of printers 12b that can connect to the connection servers 50b, and the configuration (such as the number) of management devices 14b that can connect to the management servers 60b. As a result, the server configuration of the control server 10b can be appropriately scaled according to the configuration of the connection servers 50b and management servers 60b, and the processor load corresponding to the number of devices that can connect to each server can be distributed.

This configuration also enables providing the connection server 50b with a function for executing processes related to a connected printer 12b, and providing the management server 60b with a function for executing processes related to a connected management device 14b. As a result, compared with a configuration having a function for relationally executing processes related to different types of devices in a single server, the configuration of the invention can reduce the processor load on a single server, and suppress complicating processes on the one server.

Figure 10:
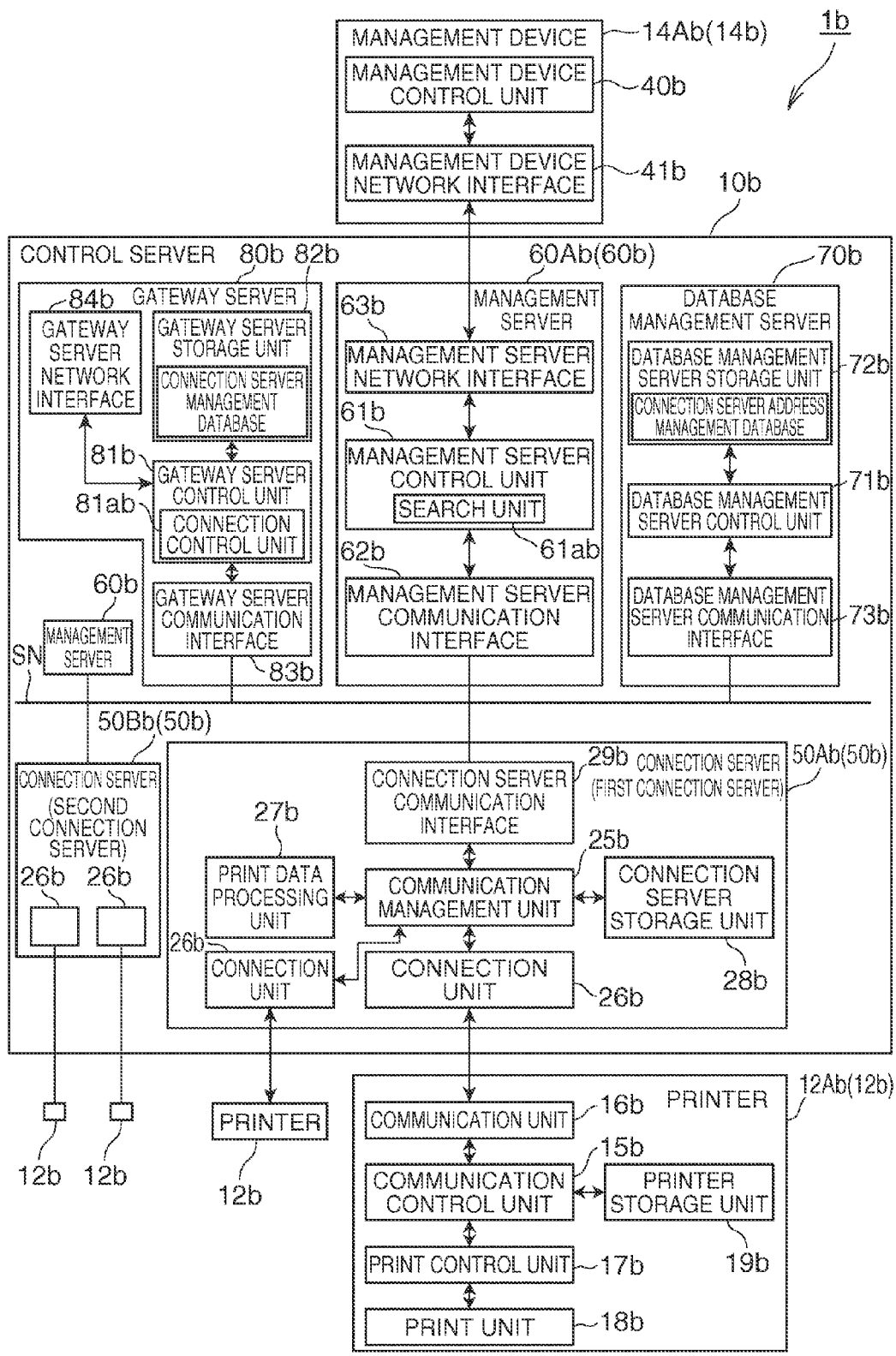
FIG. 10 is a block diagram showing the functional configuration of devices in the control server.

FIG. 10 is a block diagram showing the functional configuration of the printer 12Ab, the first connection server 50Ab, a second connection server 50Bb, the management server 60Ab, the management device 14Ab, the database management server 70b, and the gateway server 80b.

As shown in FIG. 10, the printer 12Ab includes a communication control unit 15b, a communication unit 16b, a print control unit 17b, a print unit 18b, and a printer storage unit 19b.

The functions of the communication control unit 15b, communication unit 16b, and print control unit 17b are described further below.

The print unit 18b includes mechanisms related to printing, such as a print mechanism that prints on print media, a conveyance mechanism that conveys the print media, and a cutting mechanism that cuts the print media, and control boards related to controlling the mechanisms.

The printer storage unit 19b is nonvolatile memory, and stores data. Address data and printer identification information, further described below, are stored in the printer storage unit 19b.

As shown in FIG. 10, the first connection server 50Ab of the control server 10b includes a communication management unit 25b, one or more connection units 26b, a print data processing unit 27b, a connection server storage unit 28b, and a connection server communication interface 29b.

The functions of the communication management unit 25b, connection unit 26b, and print data processing unit 27b are described further below.

The connection server storage unit 28b is nonvolatile memory, and stores data. A connection management database (relation information) is stored in the connection server storage unit 28b as described further below.

The connection server communication interface 29b communicates according to a specific communication protocol with another server in the control server 10b through the server network SN as controlled by the communication management unit 25b.

As shown in FIG. 10, the second connection server 50Bb includes one or more first connection units 26b. A printer 12b is connected to each first connection unit 26b by a WebSocket connection CT.

As shown in FIG. 10, the management server 60Ab of the control server 10b includes a management server control unit 61b, a management server communication interface 62b (server communication unit), and a management server network interface (server reception unit) 63b.

The management server control unit 61b includes a CPU, and controls the management server 60Ab. One function block of the management server control unit 61b is a search unit 61ba. The function of the search unit 61ba is described further below.

The management server communication interface 62b communicates according to a specific communication protocol with another server in the control server 10b through the server network SN as controlled by the management server control unit 61b.

The management server network interface 63b communicates with the management device 14b (including management device 14Ab) according to a specific communication protocol through the network GN as controlled by the management server control unit 61b.

As shown in FIG. 10, the database management server 70b of the control server 10b includes a database management server control unit 71b, a database management server storage unit 72b (connection information storage unit), and a database management server communication interface 73b.

The database management server control unit 71b includes a CPU, and controls the database management server 70b. One function of the database management server control unit 71b is to read and write the databases stored in the database management server storage unit 72b.

The database management server storage unit 72b is nonvolatile memory and stores data. A connection server address management database (relation information) is stored in the database management server storage unit 72b as described further below.

The database management server communication interface 73b communicates with other servers in the control server 10b through the server network SN as controlled by the database management server control unit 71b.

As shown in FIG. 10, the gateway server 80b of the control server 10b includes a gateway server control unit 81b, a gateway server storage unit 82b, a gateway server communication interface 83b, and a gateway server network interface 84b.

The gateway server control unit 81b includes a CPU, and controls the gateway server 80b. A connection control unit 81ab is one function block of the gateway server control unit 81b. The function of the connection control unit 81ab is described further below.

The gateway server storage unit 82b is nonvolatile memory and stores data. A connection server management database as described further below is stored in the gateway server storage unit 82b.

The gateway server communication interface 83b communicates with other servers in the control server 10b through the server network SN as controlled by the gateway server control unit 81b.

The gateway server network interface 84b communicates with other devices (including the printer 12b) according to a specific communication protocol through the network GN as controlled by the gateway server control unit 81b.

As shown in FIG. 10, the management device 14b includes a management device control unit 40b, and a management device network interface 41b (transmission unit).

The management device control unit 40b includes a CPU, and controls the management device 14b.

The management device network interface 41*b* communicates with the management server 60*b* as controlled by the management device control unit 40*b* according to a specific protocol.

The operation of the printer 12Ab, gateway server 80*b*, and first connection server 50Ab when the printer 12Ab power turns on is described next.

Figures 11A, 11B, 11C:
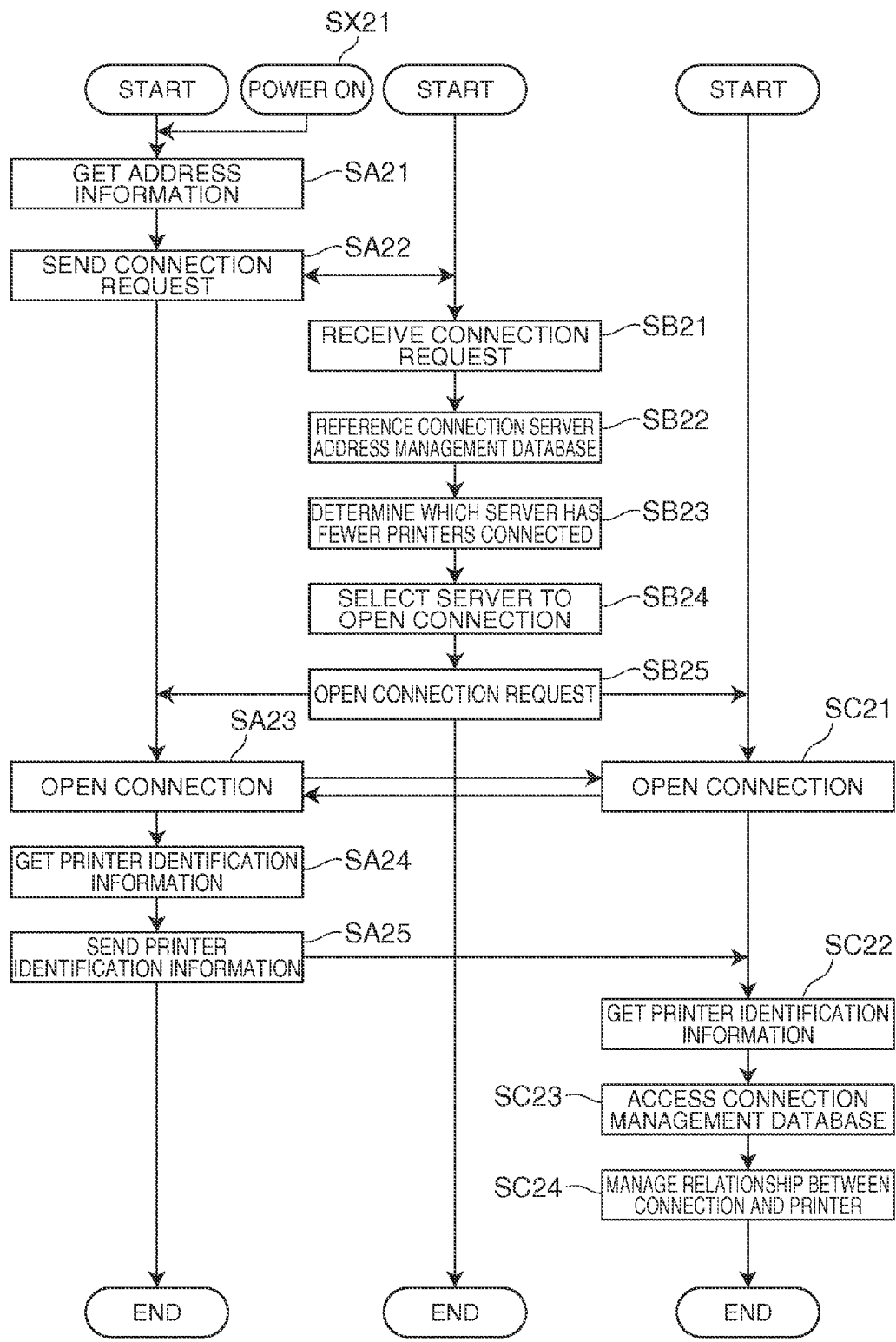
FIGS. 11A-11C are flowcharts showing the operation of a printer, a gateway server, and the printer connection server.

FIG. 11 is a flow chart showing the operation of the printer 12Ab, the gateway server 80*b*, and the first connection server 50Ab after the printer 12Ab power turns on. FIG. 11 (A) shows the operation of the printer 12Ab, (B) shows the operation of the gateway server 80*b*, and (C) shows the operation of the first connection server 50Ab.

There are two connection servers 50*b* in the control server 10*b* in the example described below, first connection server 50Ab and second connection server 50Bb.

The trigger of the process shown in the flow chart in FIG. 11 is not limited to the power turning on. For example, this process may be triggered by the printer 12*b* communicatively connecting to the network GN, or by an instruction from a user.

Note that in the operation described below the printer 12Ab is connected to the local area network LN of the store system 11 in which it is used, and can access the network GN.

The functions of the function blocks of the communication control unit 15*b* and print control unit 17*b* of the printer 12Ab, the communication management unit 25*b* and the print data processing unit 27*b* of the first connection server 50Ab, the search unit 61*ba* of the management server 60Ab, and the connection control unit 81*ab* of the gateway server 80*b* are described below.

More specifically, these function blocks are software objects. An object is an instance created in an object-oriented programming language, and more specifically is a software function block defined by a set of data and methods. The function of a particular function block is rendered by calling (invoking) a method of the function block.

The functions of these function blocks may also be rendered by the CPU or other hardware assets reading and running an application. Configurations in which the function of a single function block is rendered by a single application, configurations in which the function of plural function blocks are rendered by a single application, and configurations in which the function of a single function block is rendered by plural applications, are possible.

In other words, the function blocks represent functions as conceptual blocks, and do not mean any specific application or hardware construction.

As shown in FIG. 11 (A), when the printer 12Ab power turns on (step SX21), the communication control unit 15*b* accesses the printer storage unit 19*b* and gets the address data stored in the printer storage unit 19*b* (step SA21).

The address data is data identifying the address (such as the domain name, IP address, or path name) of the gateway server 80*b* to access when establishing a WebSocket connection CT with one of the plural connection servers 50*b*.

When opening a WebSocket connection CT according to the WebSocket protocol, the client (the printer 12Ab in this example) handshakes with the server using HTTP (Hypertext Transfer Protocol). The address to which the message is sent is included in the address data when handshaking.

The printer 12*b* thus accesses the gateway server 80*b* when establishing a WebSocket connection CT with the control server 10*b* in this embodiment of the invention. More specifically, each printer 12*b* stores information identifying the address, such as the domain name or the IP address, of the gateway server 80*b* to access when establishing the WebSocket connection CT as the server address data.

Next, the communication control unit 15*b* sends a request to establish a WebSocket connection CT with one of the connection servers 50*b* to the gateway server 80*b* based on the address indicated by the address data (sends a connection request) (step SA22).

As shown in FIG. 11 (B), the connection control unit 81*ab* of the gateway server control unit 81*b* of the gateway server 80*b* receives the connection request through the gateway server network interface 84*b* (receives a request to establish a WebSocket connection CT) (step SB21).

Next, the connection control unit 81*ab* references the connection server management database (step SB22).

For the one or more connection servers 50*b* in the control server 10*b*, the connection control unit 81*ab* manages the number of printers 12*b* that have established a WebSocket connection CT with each of the connection servers 50*b*. The connection server management database is a database storing information identifying the number of printers 12*b* that established a WebSocket connection CT with each connection server 50*b*. By referencing this connection server management database, the connection control unit 81*ab* can get the number of printers 12*b* that have established a WebSocket connection CT with any particular connection server 50*b* in the control server 10*b*.

Any desirable method may be used to update the connection server management database. For example, the connection control unit 81*ab* may regularly query each connection server 50*b* for the number of printers 12*b* that have established a WebSocket connection CT with that connection server 50*b*, and update the database based on the responses to the queries. The connection server 50*b* may also inform the connection control unit 81*ab* when a new printer 12*b* is connected to the connection server 50*b*, or when the connection of a printer 12*b* to the connection server 50*b* is cut. The connection control unit 81*ab* may then update the database based on the received report.

In this example, the number of printers 12*b* connected to the first connection server 50Ab, and the number of printers 12*b* connected to the second connection server 50Bb, are stored in the connection server management database.

The connection control unit 81*ab* performs the following operation after referencing the connection server management database in step SB22. First, the connection control unit 81*ab* determines which of the first connection server 50Ab and second connection server 50Bb has the least number of printers 12*b* connected thereto by a WebSocket connection CT (step SB23).

The processor load (the CPU load, communication load, and other loads) is probably lower on the server with fewer connected printers 12*b* than on the server with more. This is because the connection server 50*b* must execute the processes corresponding to the connected printers 12*b*, but because the number of connected printers 12*b* is smaller, the number of executed processes is also less. As a result, the connection control unit 81*ab* selects the connection server 50*b* with fewer connected printers 12*b* as the connection server 50*b* to establish the WebSocket connection CT with in response to the connection request (step SB24).

Of the first connection server 50Ab and the second connection server 50Bb in this example, the first connection server 50Ab has fewer connected printers 12*b*. Therefore, in step SB23, the connection control unit 81*ab* identifies the first connection server 50Ab as the connection server 50*b* with the fewest connected printers 12*b*. In step SB24, the connection control unit 81*ab* selects the first connection server 50Ab as the connection server 50*b* that establishes a WebSocket connection CT in response to the request.

When there is a request from a printer 12*b* to establish a WebSocket connection CT with a connection server 50*b*, the connection control unit 81*ab* thus selects the connection server 50*b* expected to have the lower processor load to establish the WebSocket connection CT.

It will be obvious that other factors may also be considered when selecting the connection server 50*b* to establish the WebSocket connection CT, including the specifications of the individual connection servers 50*b*, the current processor load, the expected processor load, and other conditions.

Next, the connection control unit 81*ab* requests the first connection server 50Ab to establish a WebSocket connection CT with the printer 12Ab (step SB25). The connection control unit 81*ab* manages the addresses of the connection servers 50*b* in the control server 10*b*. The connection control unit 81*ab* also requests the printer 12Ab that requested establishing a WebSocket connection CT to establish a WebSocket connection CT with the first connection server 50Ab (step SB25). Note that when requesting the device to establish a connection in step SB25, the connection control unit 81*ab* sends the device address and other information used to establish the WebSocket connection CT.

As shown in FIG. 11 (A) and FIG. 11 (C), the communication control unit 15*b* of the printer 12Ab, and the communication management unit 25*b* of the first connection server 50Ab, establish a WebSocket connection CT between the communication unit 16*b* and the first connection unit 26*b* (step SA23, step SC21). In other words, the printer 12Ab according to this embodiment establishes a WebSocket connection CT when triggered by the power turning on without receiving an instruction from the user or a request from the control server 10*b*.

The communication unit 16*b* and connection unit 26*b* are WebSocket interfaces enabling data communication based on the WebSocket protocol and methods. These function blocks are instantiated using a WebSocket Socket.IO library, for example.

If the communication control unit 15*b* sends data to the communication unit 16*b*, the data can be sent through the WebSocket connection CT according to the WebSocket protocol.

More specifically, the communication unit 16*b* has functions for processing data that is received from the communication control unit 15*b* according to WebSocket, and sending the data through the WebSocket connection CT based on WebSocket methods. The communication unit 16*b* also has functions for processing data that is received through the WebSocket connection CT according to WebSocket, and sending to the communication control unit 15*b*. The connection unit 26*b* is similarly configured.

By establishing a WebSocket connection CT, the printer 12Ab and first connection server 50Ab can communicate through an asynchronous, duplex communication link. More specifically, the first connection server 50Ab can push data to the printer 12Ab through the WebSocket connection CT without receiving a request from the printer 12Ab operating as a client.

Next, the communication control unit 15*b* of the printer 12Ab accesses the printer storage unit 19*b* and gets the printer identification information stored in the printer storage unit 19*b* (step SA24). The printer identification information is data representing the identification information of the printer 12Ab (referred to below as printer identification information). The printer identification information is, for example, a serial number assigned to the printer 12*b* when the printer 12*b* is manufactured.

Next, the communication control unit 15*b* sends the printer identification data over the WebSocket connection CT (step SA25).

As shown in FIG. 11 (C), the communication management unit 25*b* of the first connection server 50Ab receives the printer identification data (step SC22).

Next, the communication management unit 25*b* accesses the connection management database stored in the connection server storage unit 28*b* (step SC23). The connection management database is a database relationally storing for the WebSocket connections CT that were established connection identification information identifying the WebSocket connection CT and the printer identification information of the printer.

Next, the communication management unit 25*b* creates one record in the connection management database. The communication management unit 25*b* then stores in the created record the connection identification information of the WebSocket connection CT established in step SC21 related to the printer identification information indicated by the identification data received in step SC22 (step SC24).

Note that when a WebSocket connection CT is opened, the communication management unit 25*b* generates connection identification information for that connection that is different from the connection identification information of any other WebSocket connection CT that was already opened. The relationship between the WebSocket connections CT and printers 12*b* is managed by the process of step SC24.

A WebSocket connection CT is thus established when triggered by the power turning on without receiving a user instruction or a request from the control server 10*b*. Thus comprised, the user does not need to perform a complicated operation to open a WebSocket connection CT. Special knowledge is also not needed to open a WebSocket connection CT. After the power turns on, the printer 12*b* can also be quickly enabled to execute processes as controlled by the control server 10*b*.

A WebSocket connection CT is thus established between the communication unit 16*bb* and connection unit 26*bb*. As a result, a function unit communication path KT based on the WebSocket connection CT is established between the print control unit 17*b* of the printer 12Ab, and the print data processing unit 27*b* of the first connection server 50Ab. The print control unit 17*b* and print data processing unit 27*b* can communicate by asynchronous duplex communication through the function unit communication path KT. Asynchronous duplex through the function unit communication path KT is described further below.

As shown in FIG. 9 and FIG. 10, the control server 10*b* also has a database management server 70*b*. The database management server 70*b* has a database management server storage unit 72*b*, and the connection server address management database is stored in the database management server storage unit 72*b*.

The connection server address management database is a database that stores the printer identification information relationally to information (address information) identifying the address of the connection server 50*b* to which the printer 12*b* is connected. The information identifying the address of a connection server 50*b* is called the connection server address information.

As described above, the control server 10*b* has a plurality of connection servers 50*b*, and a printer 12*b* connects by a WebSocket connection CT to a particular connection server 50b selected by the gateway server 80b.

For each printer 12b connected to the control server 10b, the connection server address management database stores the printer identification information of the printer 12b relationally to the connection server address information of the printer connection server to which the printer 12b is connected.

The connection server address management database is continuously updated as described below to reflect the current connection states of the connection server 50b and printer 12b. This process is described in detail below.

Figure 12B:
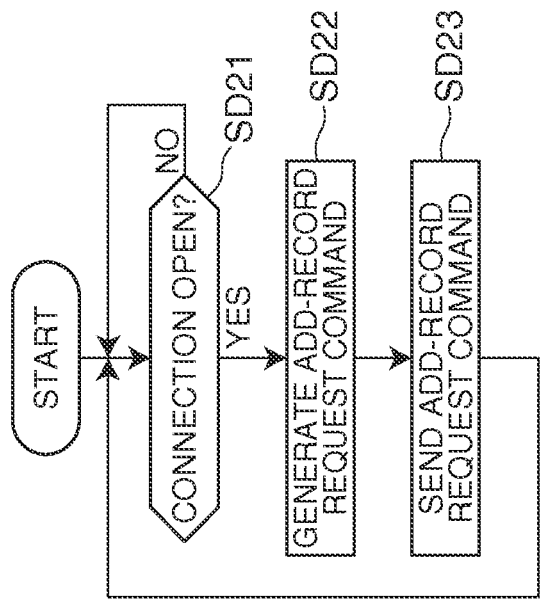
FIGS. 12A and 12B are flow charts showing the operation of the printer connection server.
Figure 12A:
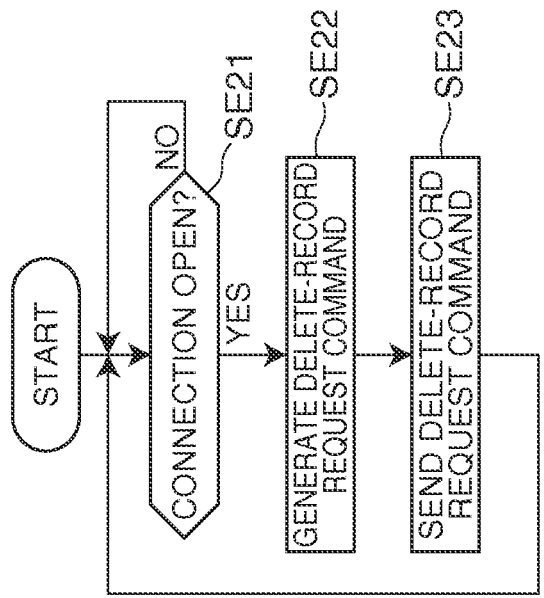
Figure 13A:
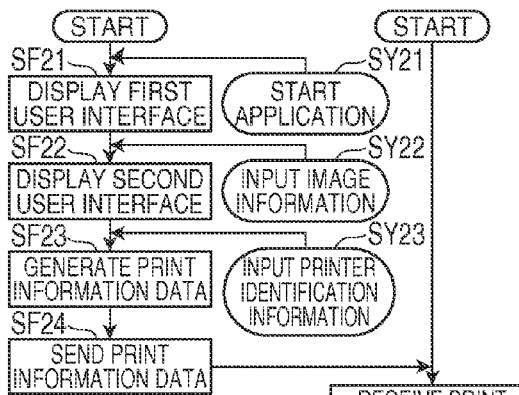
FIGS. 13A-13D are flow charts showing the operation of the devices of the control server.
Figure 13B:
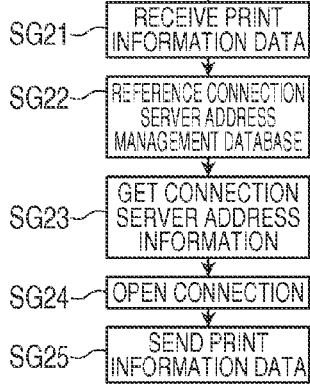
Figure 13C:
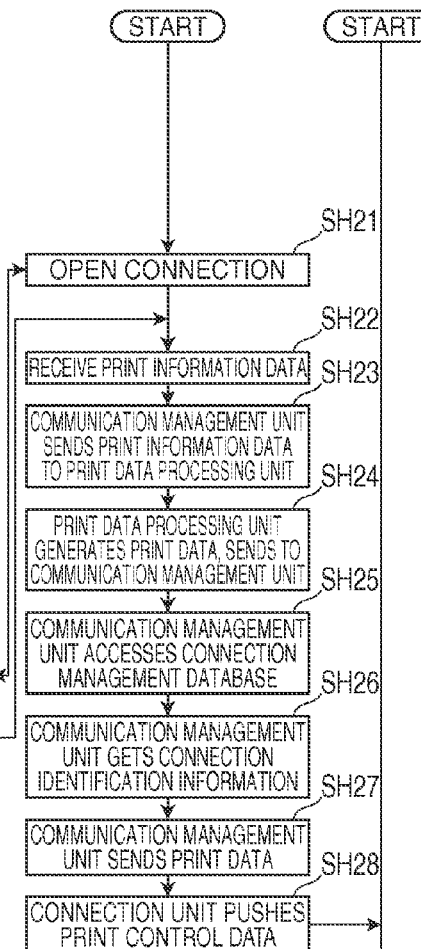
Figure 13D:
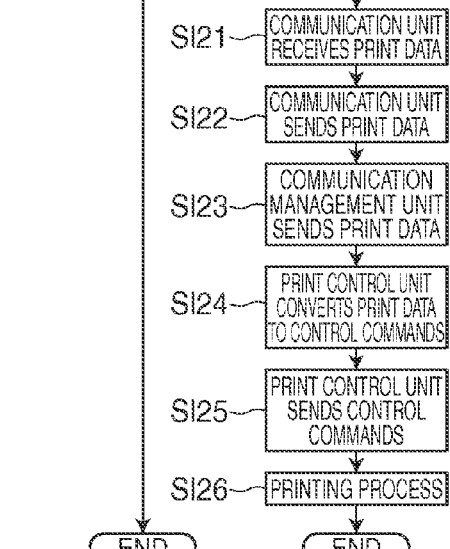

FIG. 12 (A) is a flow chart showing the operation of the first connection server 50Ab when a WebSocket connection CT is established between the first connection server 50Ab and a particular printer 12b (second printer).

As shown in FIG. 12 (A), the communication management unit 25b of the first connection server 50Ab monitors if a WebSocket connection CT is established between the server and a printer 12b (step SD21).

If a new WebSocket connection CT is established (step SD21 returns YES), the communication management unit 25b generates a command requesting creating a record relating the printer identification information (second identification information) of the connected printer 12b to the connection server address information identifying the address of the first connection server 50Ab (step SD22). The command related to this request is an add-record request command. The add-record request command is data in a specific format comprising the printer identification information and the connection server address information.

Next, the communication management unit 25b sends the generated add-record request command to the database management server 70b through the status processing unit 29b (step SD23).

The database management server control unit 71b of the database management server 70b that received the add-record request command then accesses the connection server address management database. The database management server control unit 71b then creates a record in the database relationally storing the printer identification information of the connected printer 12b and the connection server address information of the first connection server 50Ab.

FIG. 12 (B) is a flow chart showing the operation of the first connection server 50Ab when a WebSocket connection CT between the first connection server 50Ab and a particular printer 12b (second printer) is cut.

As shown in FIG. 12 (B), the communication management unit 25b of the first connection server 50Ab monitors if a WebSocket connection CT established between the server and a printer 12b is cut (step SE21).

If a WebSocket connection CT is cut (step SE21 returns YES), the communication management unit 25b generates a command requesting deleting the record relating the printer identification information (second identification information) of the connected printer 12b and the connection server address information identifying the address of the first connection server 50Ab of which the connection was cut (step SE22). The command related to this request is a delete-record request command. The delete-record request command is data in a specific format comprising the printer identification information and the connection server address information.

Next, the communication management unit 25b sends the generated delete-record request command to the database management server 70b through the status processing unit 29b (step SE23).

The database management server control unit 71b of the database management server 70b that received the delete-record request command then accesses the connection server address management database. The database management server control unit 71b then finds the record in the database relationally storing the printer identification information of the connected printer 12b and the connection server address information of the first connection server 50Ab. Next, the database management server control unit 71b deletes the record that was found.

The communication management unit 25b thus has a function for detecting connections between printers 12b and connection servers 50b, and updating (changing) the connection server address management database based on the detected connections between printers 12b and connection servers 50b.

When a printer 12b connects to a connection server 50b in this embodiment, a record relationally storing the address of the server and the identification information of the printer 12b is created in the connection server address management database.

When the connection to a printer 12b connected to the connection server 50b is cut, the record relationally storing the address of the server and the identification information of the printer 12b is deleted from the connection server address management database.

Thus comprised, the content of the connection server address management database corresponds to the actual connections between the connection server 50b and printers 12b.

Operation of the management device 14Ab, servers in the control server 10b, and printer 12Ab when the management device 14Ab drives the printer 12Ab to print is described next.

FIG. 13 is a flow chart showing the operation of the devices when the management device 14Ab prints through the printer 12Ab. FIG. 13 (A) shows the operation of the management device 14Ab, (B) shows the operation of the management server 60Ab, (C) shows the operation of the first connection server 50Ab, and (D) shows the operation of the printer 12Ab.

Communication by the function unit communication path KT between the print data processing unit 27b and the print control unit 17b is described in FIG. 13 when the print data processing unit 27b sends data as an example.

A WebSocket connection CT is already established between the printer 12Ab and the first connection server 50Ab before the following process starts.

As shown in FIG. 13 (A), to print with the printer 12Ab, the user starts an application on the management device 14Ab (step SY21).

This application provides a user interface for the user to input the information for printing by the printer 12b, and information identifying the printer 12Ab that is to print. The application also has a function for generating and outputting the print information data (print information data) based on the input information to the management server 60Ab.

When the user starts the application, the management device control unit 40b displays a first user interface through a function of the application on a display panel or other specific display means (step SF21). The first user interface is a user interface for the user to input information for printing by the printer 12b (referred to below as print information). The print information includes, for example, the file name where the image data is stored, and information related to where the image is printed on the print medium. The first user interface enables inputting information used later by the print data processing unit 27b to generate the print data.

After the user inputs the print information to the first user interface and confirms the input (step SY22), the management device control unit 40b using a function of the application displays a second user interface (step SF22).

The second user interface is a user interface enabling the user to input the information identifying the printer 12b to print (printer 12Ab in this example).

The second user interface has an input field for inputting the printer identification information, and the user inputs the printer identification information to this field.

After the user inputs the printer identification information to the second user interface and confirms the input (step SY23), the management device control unit 40b executes the following process.

Using a function of the application, the management device control unit 40b generates the print information data (print command information) based on the information input to the first user interface and the second user interface by a function of the application (step SF23). The information to be printed based on the information input to the first user interface is included in the print information data. The printer identification information of the printer 12b (command information specifying the printer 12b) to use for printing is also included in the print information data based on the information input to the second user interface.

Next, by a function of the application, the management device control unit 40b sends the print information data to the management server 60Ab through the management device network interface 41b (step SF24). In this embodiment, the management server 60b to which the management device 14Ab sends data is preset to management server 60Ab. The address of the management server 60Ab is predefined in the program rendering the function of the application. After the connection KK with the management server 60Ab is established, the management device control unit 40b sends the data through the connection KK.

As shown in FIG. 13 (B), the management server control unit 61b receives the print information data by the management server network interface 63b (step SG21).

Next, the search unit 61ba of the management server control unit 61b accesses the connection server address management database of the database management server 70b and searches the database (step SG22).

As described above, the connection server address management database is a database relationally storing the printer identification information of the printers 12b and the connection server address information of the connection servers 50b.

Next, using the printer identification information contained in the print information data, the search unit 61ba gets the connection server address information related to the printer identification information from the connection server address management database (step SG23). In this example, the search unit 61ba gets the connection server address information of first connection server 50Ab in step SG23.

Next, the management server control unit 61b establishes a connection with the connection server 50b (first connection server 50Ab in this example) identified by the connection server address information acquired by the search process in step SG23, and enables communication (step SG24, step SH21).

Next, the management server control unit 61b sends the print information data to the first connection server 50Ab by the management server communication interface 62b using the connection established in step SG24 (step SG25).

As shown in FIG. 13 (C), the communication management unit 25b of the first connection server 50Ab receives the print information data through the connection server communication interface 29b (step SH22).

Next, the communication management unit 25b sends the received print information data to the print data processing unit 27b (step SH23).

The print data processing unit 27b generates and outputs print data related to controlling the printer 12b based on the received print information data to the communication management unit 25b (step SH24).

The print data is an XML (Extensible Markup Language) file containing the print information to be printed by the printer 12b. The information to be printed by the printer 12b, such as the image data and information where the image is to be printed, is included in the print data in XML format. The printer identification information of the printer 12b to be used for printing is also included in the print data. The printer identification information of the printer 12b to use for printing may be written in a specific tag in the print data.

The communication management unit 25b then accesses the connection management database stored in the connection server storage unit 28b (step SH25).

Next, the communication management unit 25b acquires the connection identification information of the WebSocket connection CT related to the printer identification information from the connection management database using the printer identification information written in the received print data as the search key (step SH26). The connection identification information acquired here is the connection identification information of the WebSocket connection CT to the printer 12Ab that is to print.

Next, the communication management unit 25b sends the print data to the connection unit 26b corresponding to the WebSocket connection CT related to the connection identification information acquired in step SH26 (step SH27).

Next, the connection unit 26b pushes the received print data through the WebSocket connection CT to the printer 12b (step SH28).

As shown in FIG. 13 (D), the communication unit 16b then receives the print data through the WebSocket connection CT (step SI21).

Next, the communication unit 16b sends the received print data to the communication control unit 15b (step SI22).

Next, the communication control unit 15b sends the received print data to the print control unit 17b (step SI23).

Next, the print control unit 17b converts the received print data to control commands in the command language of the print unit 18b (step SI24). More specifically, the print control unit 17b converts the print data in an XML file to commands that can be interpreted by a control board of print unit 18b.

Next, the print control unit 17b sends the control commands to the print control unit 17b (step SI25).

Next, the print unit 18b prints on the print medium based on the control commands (step SI26).

As described above, the management device 14b in this embodiment of the invention can send data to a particular printer 12b through the management servers 60b and connection servers 50b of the control server 10b. In other words, the management device 14b can control a specific printer 12b in the group of printers 12b connected by a WebSocket connection CT to the control server 10b through the control server 10b.

As also described above, the control server 10b in this embodiment of the invention can print from a printer 12b without receiving a request from the printer 12b when an event for printing on the printer 12b occurs. Events that cause the printer 12b to print are events in which predefined conditions are met, such as when an instruction is received from the user, or a request is received from a management device 14b as described in this example.

This configuration also enables starting printing faster than in a configuration in which the printer 12b intermittently sends a request to the control server 10b, and the control server 10b sends print data in response to such a request when there is a need to print with the printer 12b. Consumption of resources can also be suppressed compared with a configuration in which the control server 10b queues responses to requests.

As described above, the print control system 1b according to this embodiment includes a printer 12b having a printer storage unit 19b that stores printer identification information, and a print unit 18 that prints; a connection server 50b that connects to the printer 12b; a management server 60b that has a management server communication interface 62b (server communication unit) that communicates with a connection server 50b, a management server network interface 63b that receives print command information requesting control of the printer 12b, and a search unit 61a that looks for the connection server address information of the connection server 50b in a connection server address management database (relation information) relationally storing the printer identification information and connection server address information when the print command information is received by the management server network interface 63b; and a management device 14b with a management device network interface 41b (transmission unit) that connects to the management server 60b and sends print command information.

Thus comprised, when print command information is received from the management device 14b, the management server 60b using a function of the 61ab finds the 50a to which the corresponding printer 12b is connected. Based on the result of this search, the print command information the management device 14b sent to the management server 60b is sent to the connection server 50b to which the corresponding printer 12b is connected, and is sent from the connection server 50b through the network GN to the printer 12b. Therefore, because the connection server 50b to which a printer 12b is connected can be found using a function of the search unit 61a even when there are plural connection servers 50b, and the print command information is sent from the management server 60b to the connection server 50b based on the result of this search, the management device 14b can control a related printer 12b through the management server 60b and connection server 50b. In other words, the invention can make a print control system 1b compatible with a configuration in which there are one or more connection servers 50b to which a printer 12b is connected, and a configuration in which the printer 12b and control server 10b communicate through a network GN.

The connection server 50b in this embodiment of the invention also has a communication management unit 25b that detects connections between printers 12b and connection servers 50b, and updates (changes) the content of the connection server address management database based on the detected connections between printers 12b and connection servers 50b.

Thus comprised, the content of the connection server address management database can be kept current with the actual connections between the connection servers 50b and printers 12b.

In this embodiment of the invention, the communication management unit 25b adds the printer identification information (second identification information) and its related connection server address information to the connection server address management database when a printer 12b (second printer) is connected to a connection server 50b.

Thus comprised, when a printer 12b is connected to a connection server 50b, the printer identification information of the connected printer 12b and the connection server address information of the connection server 50b can be relationally stored in the connection server address management database.

When the connection between a printer 12b (second printer) and connection server 50b is cut in this embodiment of the invention, the communication management unit 25b deletes the relation information for these devices from the connection server address management database.

Thus comprised, when the connection between a connection server 50b and printer 12b is cut, the information related to the connection can be deleted from the connection server address management database.

The connection server 50b in this embodiment of the invention also has a connection server storage unit 28b that stores the printer identification information of the printers 12b connected to the connection server 50b.

Thus comprised, the connection server 50b can manage the printers 12b connected to the connection server 50b based on the printer identification information.

The printers 12b and connection servers 50b also communicate by asynchronous duplex communication.

Thus comprised, the connection server 50b can send data to the printer 12b for processing by the printer 12b at any time.

Variation of Embodiment 2

A variation of the second embodiment is described next.

In the second embodiment described above, the search unit 61ab accesses the connection server address management database of the database management server 70b when looking for a connection server 50b. The search unit 61ab searches the accessed databases based on the content thereof.

In this variation of the second embodiment, the search unit 61ab stores data containing the same elements as the content of the database in a working area (a specific storage area) created in RAM in the management server 60b.

For example, the search unit 61ab regularly communicates and requests data of the same content as the connection server address management database from the database management server control unit 71b of the database management server 70b. The database management server control unit 71b has a function for generating data of the same content as the database based on the connection server address management database. The search unit 61ab then stores the data received in response to the request in the working area. Alternatively, the database management server control unit 71b of the database management server 70b may send the data regularly or whenever the database is updated.

When the search unit 61ab looks for a connection server 50b in this event, it searches the data stored in working memory instead of accessing and referencing the connection server address management database. Compared with a process that accesses a database through the server network SN, less time is required to access the working area reserved in RAM over a local bus. As a result, this variation of the second embodiment can shorten the time required for the search unit 61ab to search.

The invention is described above with reference to a preferred embodiment thereof, but the invention is not limited thereto and can be modified and adapted in many ways without departing from the scope of the accompanying claims.

In the embodiment described above the printer 12b is installed as part of a store system 11 deployed in a business.

However, the printer 12*b* is not limited to being part of a store system 11, and can be used in other systems.

In addition, print data is sent as an XML file from the control server 10*b* to the printer 12*b* in the foregoing embodiment, but the data format of the print data is not limited to XML. The print data may be data created in another markup language, or control commands in the command language of the print unit 18*b*.

The function blocks shown in FIG. 9 can also be rendered as desired using hardware and software, and do not suggest a specific hardware configuration. Functions of the printer 12*b* may also be rendered by a separate externally connected device. The printer 12*b* can also execute the processes described above by running a program stored on an externally connected storage medium.

Embodiment 3

A third embodiment of the invention is described next.

The print control system 1*c* according to the third embodiment of the invention includes a control server 10*c* (print control device), a printer 12*c*, and a management device 14*c*. The control server 10*c*, printer 12*c*, and management device 14*c* connect over a network GN in the same way as the control server 10, printer 12, and management device 14 in the first embodiment. A communication path established between the control server 10*c* and printer 12*c* is the same as the communication path established between the control server 10 and printer 12 in FIG. 2.

Figure 14:
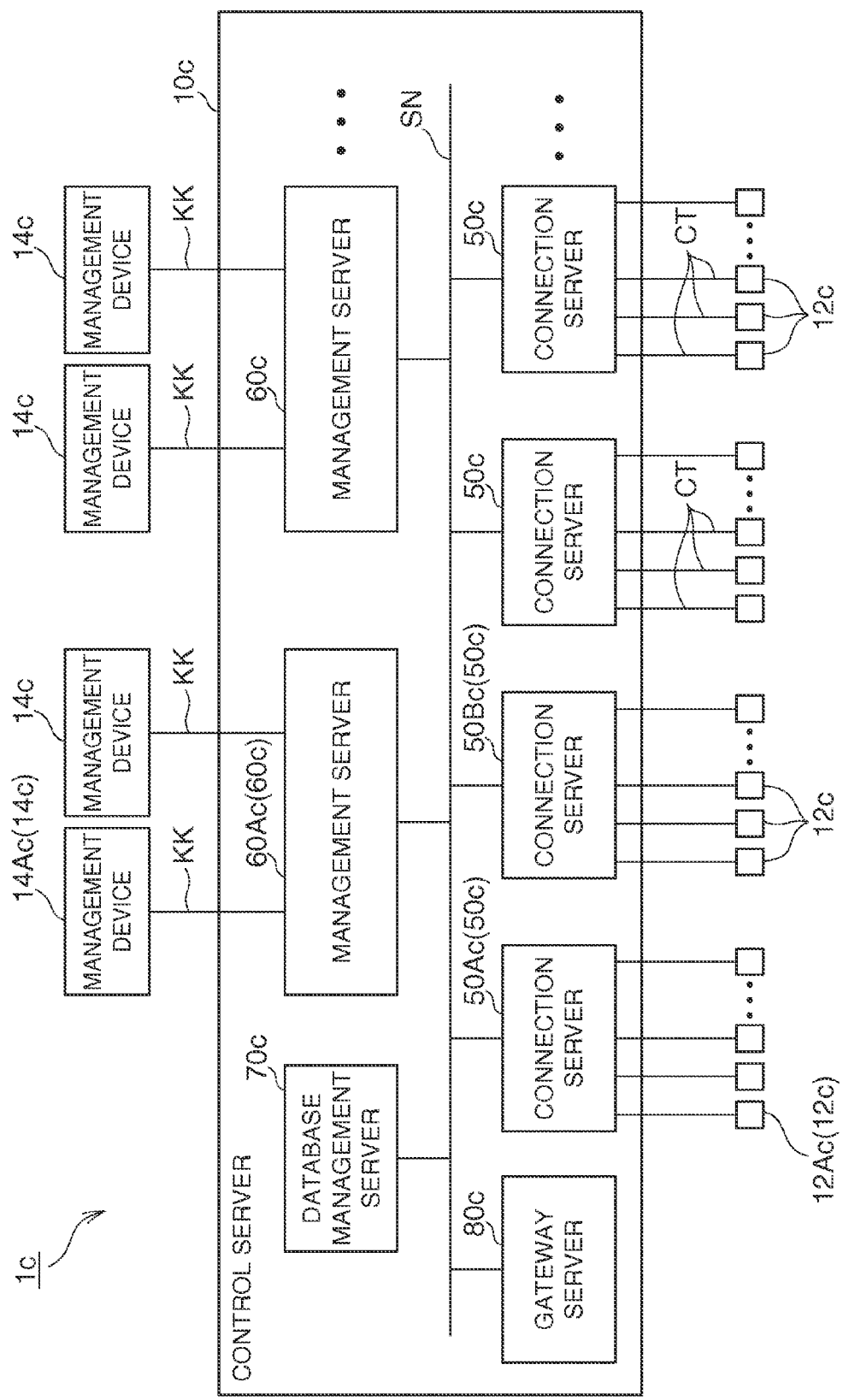
FIG. 14 shows the configuration of devices in the control server according to a third embodiment of the invention in further detail.

FIG. 14 shows the configuration of the print control system 1*c* according to this embodiment of the invention in further detail.

As shown in FIG. 14, the control server 10*c* includes a plurality of control servers 50*c* and a plurality of management servers 60*c*. The plural connection servers 50*c* and the plural management servers 60*c* are communicatively connected together in the control server 10*c* through a server network SN including a LAN, for example.

As shown in FIG. 9, one or a plurality of printers 12*c* are connected to a connection server 50*c* through a WebSocket connection CT using the WebSocket protocol.

One or a plurality of management devices 14*c* are connected to each management server 60*c* by a connection KK (second connection). In this embodiment of the invention, the application-layer connection KK established between the management server 60*c* and management devices 14*c* is a HTTP (Hypertext Transfer Protocol) connection. As a result, the management device 14*c*, which is the client in this configuration, starts communication. More specifically, to send data, the management device 14*c* handshakes with the 60*c* and opens the connection KK based as a TCP connection. The management device 14*c* then sends data through the opened connection KK. When transmitting data and sending and receiving other data associated with the data transmission is completed, the management device 14*c* cuts the connection KK. The management device 14*c* in this embodiment therefore opens a connection KK in order to transmit data.

As described further below, the connection server 50*b* has functions for executing processes related to the printer 12*b*, including processes related to communicating with the printer 12*b*, and processes related to controlling the printer 12*b*.

The management server 60*b* similarly has functions for executing processes related to the management device 14*b*, including a process related to communicating with the management device 14*b*, as described further below.

As shown in FIG. 14, a database management server 70*c* is also connected to the server network SN. A gateway server 80*c* is also connected to the server network SN. These servers are described further below.

Communication between one management device 14Ac in the group of plural management devices 14*c*, and one printer 12Ac in the group of plural printers 12*c*, is described briefly using FIG. 14 and data being sent from the management device 14Ac to the printer 12Ac for example.

In this embodiment of the invention printer 12Ac is the printer 12*c* controlled by management device 14Ac. More specifically, management device 14Ac causes the printer 12Ac to print as controlled by the management device 14Ac. The printer 12Ac is therefore a printer 12*c* included in the store system 11 managed by the management device 14Ac.

The management device 14Ac runs the following process to send data to the printer 12Ac. First, using a method described further below, the management device 14Ac sends data to a specific management server 60Ac in the group of plural management servers 60*c*. Information identifying the printer 12Ac is included in this data. When accessing a service provided by the control server 10*c* in this embodiment of the invention, the management server 60*c* accessed by the management device 14*c* is predetermined by the management device 14*c*.

Using a method described further below, the management server 60Ac looks for the connection server 50*c* to which the printer 12Ac controlled by the management device 14Ac is connected in the group of plural connection servers 50*c* connected to the server network SN. In this embodiment of the invention, the connection server 50*c* to which the printer 12Ac is connected is first connection server 50Ac. The management server 60Ac therefore searches first connection server 50Ac in this example.

Next, the management server 60Ac sends data to the first connection server 50Ac that was found. Next, the first connection server 50Ac, using a method described further below, sends the data to the printer 12Ac. In this event, the first connection server 50Ac runs a specific process based on the received data to generate and send the new data. The printer 12Ac receives the data and runs a process based on the data.

The control server 10*c* in this embodiment of the invention thus has multiple connection servers 50*c* and multiple management servers 60*c*. The management devices 14*c* and printers 12*c* communicate through the connection servers 50*c* and management servers 60*c* of the control server 10*c*. More specifically, the management devices 14*c* can print with the corresponding printer 12*c* through the management server 60*c* and connection server 50*c*.

This configuration has the following effects.

Because the management servers 60*c* and connection servers 50*c* are independent servers, these servers can be separately added to the control server 10*c*.

For example, the number of printers 12*c* that can connect to the control server 10*c* may increase in order to use a service provided by the control server 10*c*. In this event, a first connection server 50Ac can be added to distribute the processor load related to printer 12*c* processes. This embodiment of the invention enables increasing the number of connection servers 50*c* in this event independently of the management servers 60*c*. Because of this configuration, the number of connection servers 50*c* and management servers 60*c* can be adjusted according to the configuration (such as the number) of printers 12*c* that can connect to the connection servers 50*c*, and the configuration (such as the number) of management devices 14*c* that can connect to the management servers 60*c*. As a result, the configuration of the control server 10*c* can be appropriately scaled according to the configuration of the connection servers 50c and management servers 60c, and the processor load corresponding to the number of devices that can connect to each server can be distributed.

This configuration also enables providing the connection server 50c with a function for executing processes related to a connected printer 12c, and providing the management server 60c with a function for executing processes related to a connected management device 14c.

Figure 15:
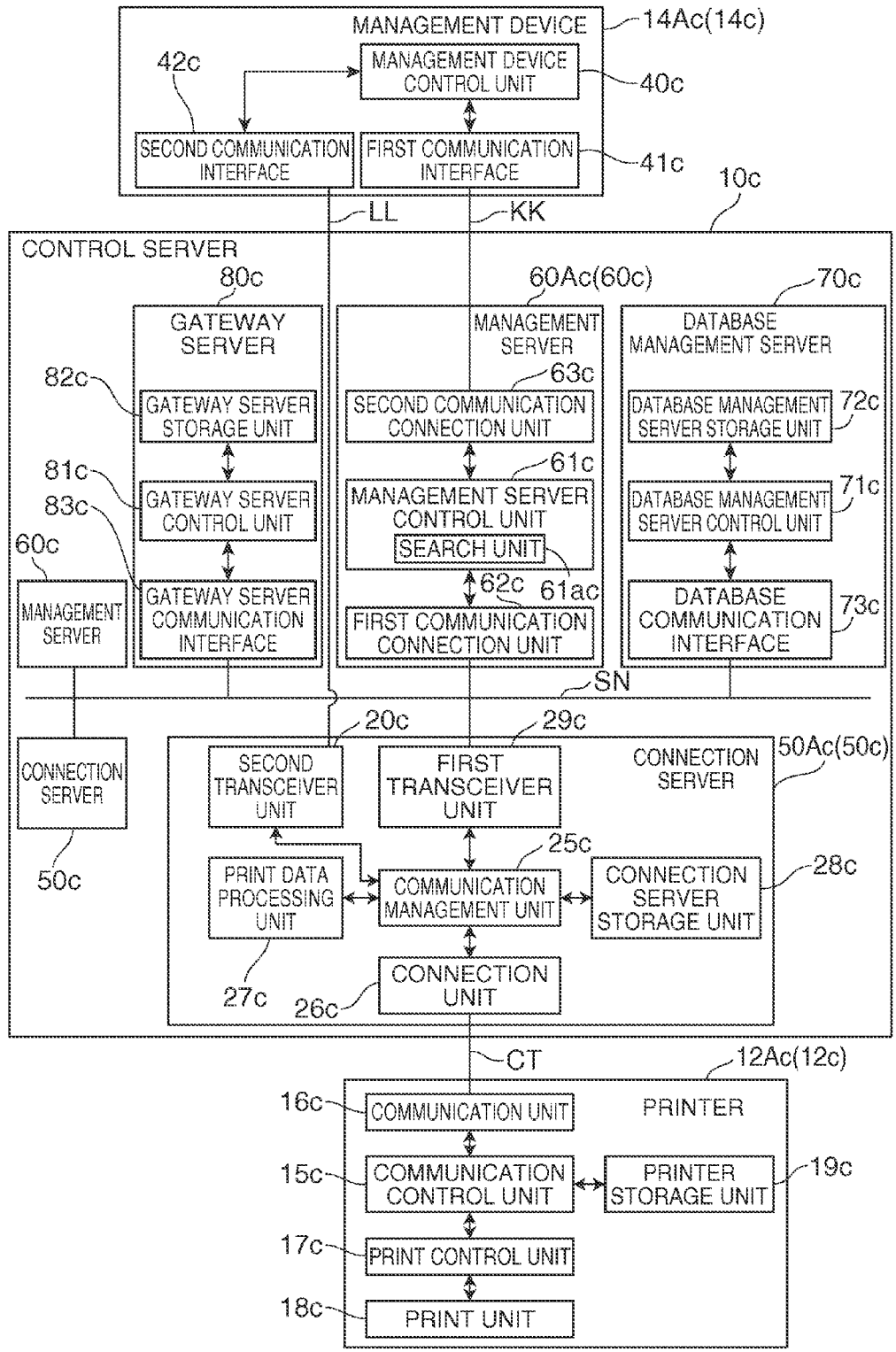
FIG. 15 is a block diagram showing the functional configuration of devices in the control server.

FIG. 15 is a block diagram showing the functional configuration of the printer 12Ac, the first connection server 50Ac, the management server 60Ac, the management device 14Ac, the database management server 70c, and the gateway server 80c.

As shown in FIG. 15, the printer 12Ac includes a communication control unit 15c, a communication unit 16c, a print control unit 17c, a print unit 18c, and a printer storage unit 19c.

The functions of the communication control unit 15c, communication unit 16c, and print control unit 17c are described further below.

The print unit 18c includes mechanisms related to printing, such as a print mechanism that prints on print media, a conveyance mechanism that conveys the print media, and a cutting mechanism that cuts the print media, and control boards related to controlling the mechanisms.

The printer storage unit 19c is nonvolatile memory, and stores data. Address data and printer identification information, further described below, are stored in the printer storage unit 19c.

As shown in FIG. 15, the first connection server 50Ac of the control server 10c includes a communication management unit 25c, a connection unit 26c, a print data processing unit 27c, a connection server storage unit 28c, and a first transceiver unit 29c, and a second transceiver unit 20c.

The functions of the communication management unit 25c, connection unit 26c, print data processing unit 27c, and second transceiver unit 20c are described further below.

The connection server storage unit 28c is nonvolatile memory, and stores data. A connection management database and a management device database are stored in the connection server storage unit 28c as described further below.

The first transceiver unit 29c communicates according to a specific communication protocol with another server in the control server 10c through the server network SN as controlled by the communication management unit 25c.

As shown in FIG. 15, the management server 60Ac of the control server 10c includes a management server control unit 61c, a first communication connection unit 62c, and a second communication connection unit 63c.

The management server control unit 61c includes a CPU, and controls the management server 60Ac. One function block of the management server control unit 61c is a search unit 61ac. The function of the search unit 61ac is described further below.

The first communication connection unit 62c communicates according to a specific communication protocol with another server in the control server 10c through the server network SN as controlled by the management server control unit 61c.

The second communication connection unit 63c communicates with the management device 14c (including management device 14Ac) according to a specific communication protocol through the network GN as controlled by the management server control unit 61c.

As shown in FIG. 15, the database management server 70c of the control server 10c includes a database management server control unit 71c, a database management server storage unit 72c, and a database management server communication interface 73c (referred to below as the database communication interface 73c).

The database management server control unit 71c includes a CPU, and controls the database management server 70c. One function of the database management server control unit 71c is to read and write the databases stored in the database management server storage unit 72c.

The database management server storage unit 72c is nonvolatile memory and stores data. A connection server address management database is stored in the database management server storage unit 72c as described further below.

The database communication interface 73c communicates with other servers in the control server 10c through the server network SN as controlled by the database management server control unit 71c.

As shown in FIG. 15, the gateway server 80c of the control server 10c includes a gateway server control unit 81c, a gateway server storage unit 82c, and a gateway server communication interface 83c.

The gateway server control unit 81c includes a CPU, and controls the gateway server 80c.

The gateway server storage unit 82c is nonvolatile memory and stores data. A connection server management database as described further below is stored in the gateway server storage unit 82c.

The gateway server communication interface 83c communicates with other servers in the control server 10c through the server network SN as controlled by the gateway server control unit 81c.

As shown in FIG. 15, the management device 14c includes a management device control unit 40c, a first communication interface 41c, and a second communication interface 42c.

The function of the second communication interface 42c is described further below.

The management device control unit 40c includes a CPU, and controls the management device 14c.

The first communication interface 41c communicates with the management server 60c as controlled by the management device control unit 40c by HTTP.

FIG. 15 shows the relationship between the control server 10c and one printer 12c (printer 12Ac in the example shown in FIG. 15) connected to the control server 10c. When a plurality of printers 12c are connected to the control server 10c, the control server 10c has as many first connection units 26c (WebSocket interfaces) as there are printers 12c, establishes a WebSocket connection CT with each printer 12c, and communicates by WebSocket with each printer 12c through the respective WebSocket connection CT.

The operation of the printer 12Ac, gateway server 80c, and first connection server 50Ac when the printer 12Ac power turns on is described next.

Figures 16A, 16B, 16C:
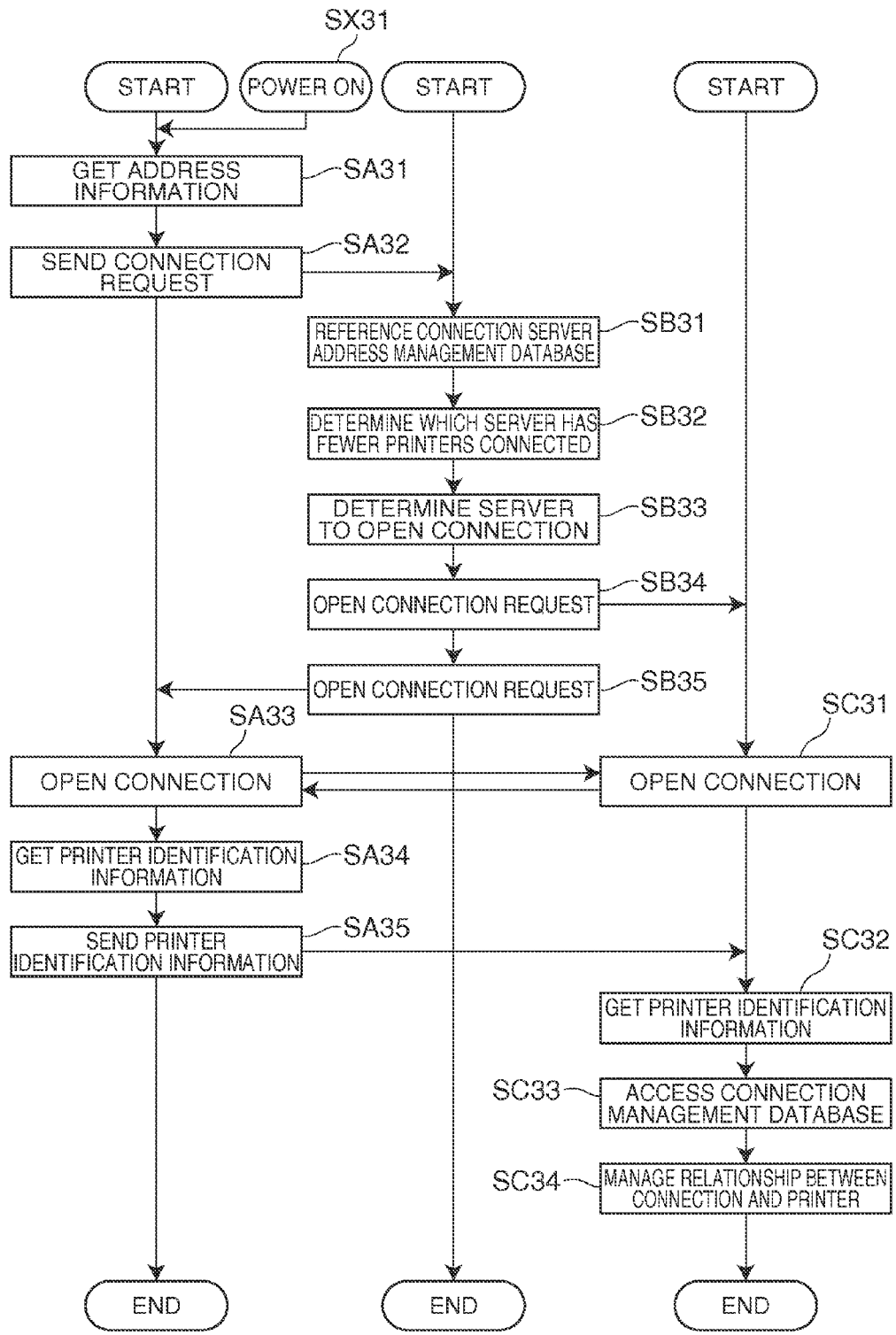
FIGS. 16A-16C are flowcharts showing the operation of a printer, a gateway server, and the printer connection server.

FIG. 16 is a flow chart showing the operation of the printer 12Ac, the gateway server 80c, and the first connection server 50Ac after the printer 12Ac power turns on. FIG. 16 (A) shows the operation of the printer 12Ac, (B) shows the operation of the gateway server 80c, and (C) shows the operation of the first connection server 50Ac.

For simplicity, there are two connection servers 50c in the control server 10c in the example described below, first connection server 50Ac and second connection server 50Bc.

The trigger of the process shown in the flow chart in FIG. 16 is not limited to the power turning on. For example, this process may be triggered by the printer 12c communicatively connecting to the network GN, or by an instruction from a user.

Note that in the operation described below the printer 12Ac is connected to the local area network LN of the store system 11 in which it is used, and can access the network GN.

The functions of the function blocks of the communication control unit 15c and print control unit 17c of the printer 12Ac, the communication management unit 25c and the print data processing unit 27c of the first connection server 50Ac, and the search unit 61ac of the management server 60Ac are described below.

More specifically, these function blocks are software objects. An object is an instance created in an object-oriented programming language, and more specifically is a software function block defined by a set of data and methods. The function of a particular function block is rendered by calling (invoking) a method of the function block.

The functions of these function blocks may also be rendered by the CPU or other hardware assets reading and running an application. Configurations in which the function of a single function block is rendered by a single application, configurations in which the function of plural function blocks are rendered by a single application, and configurations in which the function of a single function block is rendered by plural applications, are possible.

In other words, the function blocks represent functions as conceptual blocks, and do not mean any specific application or hardware construction.

As shown in FIG. 16 (A), when the printer 12Ac power turns on (step SX31), the communication control unit 15c accesses the printer storage unit 19c and gets the address data stored in the printer storage unit 19c (step SA31).

The address data is data identifying the address (such as the domain name, IP address, or path name) of the gateway server 80c the printer 12c accesses when establishing a WebSocket connection CT with one of the plural connection servers 50c.

When opening a WebSocket connection CT according to the WebSocket protocol, the client (the printer 12Ac in this example) handshakes with the server using HTTP (Hypertext Transfer Protocol). The client sends a message containing the address of the server in this handshake, and the address data is data representing this address.

The printer 12c thus accesses the gateway server 80c with establishing a WebSocket connection CT with the control server 10c in this embodiment of the invention. More specifically, each printer 12c stores information identifying the address (such as the domain name) of the gateway server 80c to access when establishing the WebSocket connection CT as the server address data.

Next, the communication control unit 15c sends a request to establish a WebSocket connection CT with one of the connection servers 50c to the gateway server 80c based on the domain name indicated by the address data (step SA32).

When the request from step SA32 is received, the gateway server control unit 81c of the gateway server 80c references the connection server management database (step SB31).

In this embodiment, the gateway server control unit 81c of the gateway server 80c manages for each connection server 50c in the control server 10c the number of printers 12c that have established a WebSocket connection CT with one of the connection servers. The connection server management database is a database storing information identifying the number of printers 12c that established a WebSocket connection CT with a connection server 50c. By referencing this connection server management database, the gateway server control unit 81c can get the number of printers 12c that have established a WebSocket connection CT with any particular connection server 50c in the control server 10c.

Any desirable method may be used to update the connection server management database. For example, the gateway server control unit 81c may regularly query each connection server 50c for the number of printers 12c that have established a WebSocket connection CT with that connection server 50c, and update the database based on the responses to the queries. The connection server 50c may also inform the connection control unit 81cb when a new printer 12c is connected to the connection server 50c, or when the connection of a connected printer 12c is cut. The gateway server control unit 81c may then update the database based on the received report.

In this example, the number of printers 12c connected to the first connection server 50Ac, and the number of printers 12c connected to the second connection server 50Bc, are stored in the connection server management database.

The gateway server control unit 81c performs the following operation after referencing the connection server management database in step SB31. First, the gateway server control unit 81c determines which of the first connection server 50Ac and second connection server 50Bc has the least number of printers 12c connected thereto by a WebSocket connection CT (step SB32).

The processor load (the CPU load, communication load, and other loads) is probably lower on the server with fewer connected printers 12c than on the server with more. This is because the connection server 50c must execute the processes corresponding to the connected printers 12c, but because the number of connected printers 12c is smaller, the number of executed processes is also less. As a result, the gateway server control unit 81c selects the connection server 50c with fewer connected printers 12c as the connection server 50c to establish the WebSocket connection CT with in response to the connection request (step SB33).

Of the first connection server 50Ac and the second connection server 50Bc in this example, the first connection server 50Ac is has fewer connected printers 12c. Therefore, in step SB32, the gateway server control unit 81c identifies the first connection server 50Ac as the connection server 50c with the fewest connected printers 12c. In step SB33, the gateway server control unit 81c selects the first connection server 50Ac as the connection server 50c that establishes a WebSocket connection CT in response to the request.

When there is a request from a printer 12c to establish a WebSocket connection CT with a connection server 50c, the gateway server control unit 81c thus selects the connection server 50c expected to have the lower processor load to establish the WebSocket connection CT.

It will be obvious that other factors may also be considered when selecting the connection server 50c to establish the WebSocket connection CT, including the specifications of the individual connection servers 50c, the current processor load, the expected processor load, and other conditions.

Next, the gateway server control unit 81c requests the first connection server 50Ac to establish a WebSocket connection CT with the printer 12Ac (step SB34). The gateway server control unit 81c manages the addresses of the connection servers 50c in the control server 10c. The gateway server control unit 81c also requests the printer 12Ac that requested establishing a WebSocket connection CT to establish a WebSocket connection CT with the first connection server 50Ac (step SB35). Note that when requesting the device to establish a connection in step SB34 and step SB35, the gateway server control unit 81c sends the device address and other information required to handshake and establish the WebSocket connection CT.

Next, the communication control unit 15c of the printer 12Ac, and the communication management unit 25c of the first connection server 50Ac, establish a WebSocket connection CT between the communication unit 16c and the connection unit 26c (step SA33, step SC31). In other words, the printer 12Ac according to this embodiment establishes a WebSocket connection CT when triggered by the power turning on without receiving an instruction from the user or a request from the control server 10c.

The communication unit 16c and connection unit 26c are WebSocket interfaces enabling data communication based on the WebSocket protocol and methods. These function blocks are instantiated using a WebSocket Socket.IO library, for example.

More specifically, the communication unit 16c has functions for processing data that is received from the communication control unit 15c according to WebSocket, and sending the data through the WebSocket connection CT based on WebSocket methods. The communication unit 16c also has functions for processing data that is received through the WebSocket connection CT according to WebSocket, and sending to the communication control unit 15c. The connection unit 26c is similarly configured.

By establishing a WebSocket connection CT, the printer 12Ac and first connection server 50Ac can communicate through an asynchronous, duplex communication link. More specifically, the first connection server 50Ac can push data to the printer 12Ac through the WebSocket connection CT without receiving a request from the printer 12Ac operating as a client.

Next, the communication control unit 15c of the printer 12Ac accesses the printer storage unit 19c and gets the printer identification information stored in the printer storage unit 19c (step SA34). The printer identification information is data representing the identification information of the printer 12Ac (referred to below as printer identification information). The printer identification information is, for example, a serial number assigned to the printer 12c when the printer 12c is manufactured.

Next, the communication control unit 15c sends the printer identification data over the WebSocket connection CT (step SA35).

As shown in FIG. 16 (C), the communication management unit 25c of the first connection server 50Ac receives the printer identification data (step SC32).

Next, the communication management unit 25c accesses the connection management database stored in the connection server storage unit 28c (step SC33). The connection management database is a database relationally storing for the WebSocket connections CT that were established connection identification information identifying the WebSocket connection CT and the printer identification information of the printer.

Next, the communication management unit 25c creates one record in the connection management database. The communication management unit 25c then stores in the created record the connection identification information of the WebSocket connection CT established in step SC31 related to the printer identification information indicated by the identification data received in step SC32 (step SC34).

Note that when a WebSocket connection CT is opened, the communication management unit 25c generates connection identification information for that connection that is different from the connection identification information of any other WebSocket connection CT that was already opened. The relationship between the WebSocket connections CT and printers 12c is managed by the process of step SC34.

A WebSocket connection CT is thus established when triggered by the power turning on without receiving a user instruction or a request from the control server 10c. Thus comprised, the user does not need to perform a complicated operation to open a WebSocket connection CT. Special knowledge is also not needed to open a WebSocket connection CT. After the power turns on, the printer 12c can also be quickly enabled to execute processes as controlled by the control server 10c.

A WebSocket connection CT is thus established between the communication unit 16c and connection unit 26c. As a result, a function unit communication path KT based on the WebSocket connection CT is established between the print control unit 17c of the printer 12c, and the print data processing unit 27c of the control server 10c. The print control unit 17c and print data processing unit 27c can communicate by asynchronous duplex communication through the function unit communication path KT. Asynchronous duplex communication between function units through the function unit communication path KT is described further below.

As shown in FIG. 14 and FIG. 15, the control server 10c also has a database management server 70c. The database management server 70c has a database management server storage unit 72c, and the connection server address management database is stored in the database management server storage unit 72c.

The connection server address management database is a database that stores printer identification information relationally to information (address information) identifying the address of the connection server 50c to which the printer 12c is connected. The information identifying the address of a connection server 50c is called the connection server address information below.

As described above, the control server 10c has a plurality of connection servers 50c, and a printer 12c connects by a WebSocket connection CT to a particular connection server 50c selected by the gateway server 80c.

For each printer 12c connected to the control server 10c, the connection server address management database stores the printer identification information of the printer 12c relationally to the connection server address information of the printer connection server to which the printer 12c is connected.

The connection server address management database is continuously updated as described below to reflect the actual current connection states of the connection server 50c and printer 12c. This process is described in detail below.

Figure 17B:
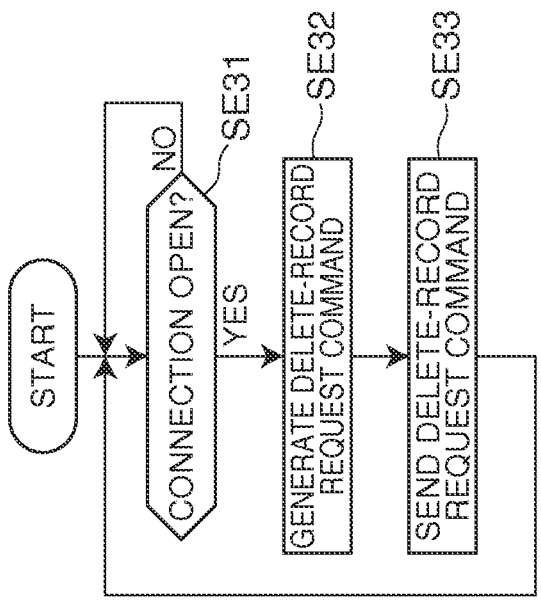
FIGS. 17A and 17B are flow charts showing the operation of the printer connection server.
Figure 17A:
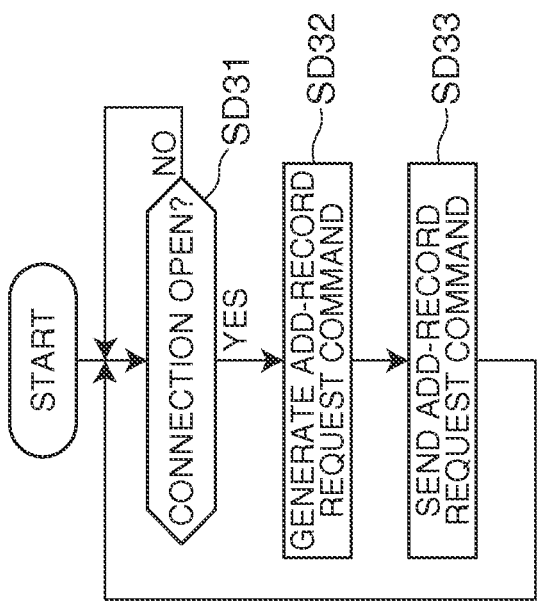

FIG. 17 (A) is a flow chart showing the operation of the first connection server 50Ac when a WebSocket connection CT is established between the first connection server 50Ac and a particular printer 12c.

As shown in FIG. 17 (A), the communication management unit 25c of the first connection server 50Ac monitors if a WebSocket connection CT is established between the server and a printer 12c (step SD31).

If a WebSocket connection CT is established (step SD31 returns YES), the communication management unit 25c generates a command requesting creating a record relating the printer identification information of the connected printer 12c to the connection server address information identifying the address of the first connection server 50Ac (step SD32). The command related to this request is an add-record request command. The add-record request command is data in a specific format comprising the printer identification information and the connection server address information.

Next, the communication management unit 25c controls the first transceiver unit 29c to send the generated add-record request command to the database management server 70c (step SD33).

The database management server control unit 71c of the database management server 70c that received the add-record request command then accesses the connection server address management database. The database management server control unit 71c then creates a record in the database relationally storing the printer identification information of the connected printer 12c and the connection server address information of the first connection server 50Ac.

FIG. 17 (B) is a flow chart showing the operation of the first connection server 50Ac when a WebSocket connection CT between the first connection server 50Ac and a particular printer 12c is cut.

As shown in FIG. 17 (B), the communication management unit 25c of the first connection server 50Ac monitors if a WebSocket connection CT established between the server and a printer 12c is cut (step SE31).

If a WebSocket connection CT is cut (step SE31 returns YES), the communication management unit 25c generates a command requesting deleting the record relating the printer identification information of the connected printer 12c and the connection server address information identifying the address of the first connection server 50Ac of which the connection was cut (step SE32). The command related to this request is a delete-record request command. The delete-record request command is data in a specific format comprising the printer identification information and the connection server address information.

Next, the communication management unit 25c controls the first transceiver unit 29c to send the generated delete-record request command to the database management server 70c (step SE33).

The database management server control unit 71c of the database management server 70c that received the delete-record request command then accesses the connection server address management database. The database management server control unit 71c then finds the record in the database relationally storing the printer identification information of the connected printer 12c and the connection server address information of the first connection server 50Ac. Next, the database management server control unit 71c deletes the record that was found.

When a printer 12c connects to a connection server 50c in this embodiment, a record relationally storing the address of the server and the identification information of the printer 12c is created in the connection server address management database.

When the connection to a printer 12c connected to the connection server 50c is cut, the record relationally storing the address of the server and the identification information of the printer 12c is deleted from the connection server address management database.

Thus comprised, the content of the connection server address management database corresponds to the actual connections between the connection server 50c and printers 12c.

Operation of the management device 14Ac, servers in the control server 10c, and printer 12Ac when the management device 14Ac drives the printer 12Ac to print is described next.

Figures 18A, 18B, 18C, 18D:
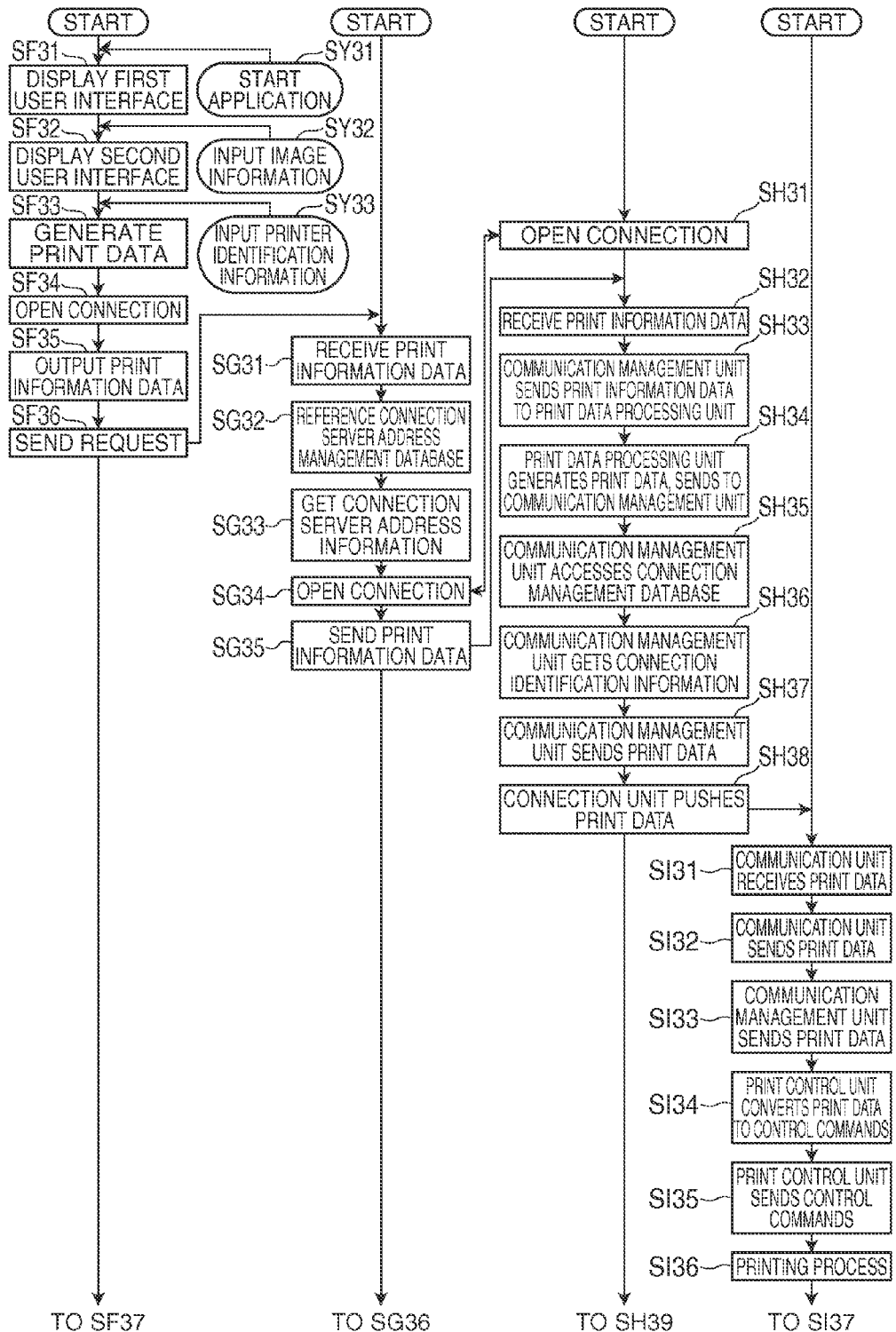
FIGS. 18A-18D are flow charts showing the operation of devices in the control system.

FIG. 18 and FIG. 19 are a flow chart showing the operation of the devices when the management device 14Ac prints through the printer 12Ac. In FIG. 18 and FIG. 19, (A) shows the operation of the management device 14Ac, (B) shows the operation of the management server 60Ac, (C) shows the operation of the first connection server 50Ac, and (D) shows the operation of the printer 12Ac.

A WebSocket connection CT is already established between the printer 12Ac and the first connection server 50Ac before the following process starts.

As shown in FIG. 18 (A), to print with the printer 12Ac, the user starts an application on the management device 14Ac (step SY31).

This application provides a user interface for the user to input the information for printing by the printer 12c, and information identifying the printer 12Ac that is to print. The application also has a function for generating and outputting the print information data based on the input information to the management server 60Ac.

When the user starts the application, the management device control unit 40c displays a first user interface through a function of the application on a display panel or other specific display means (step SF31). The first user interface is a user interface for the user to input information for printing by the printer 12c (referred to below as print information). The print information includes, for example, the file name where the image data is stored, and information related to where the image is printed on the print medium. The first user interface enables inputting information required later by the print data processing unit 27c to generate the print data.

After the user inputs the information for printing to the first user interface and confirms the input (step SY32), the management device control unit 40c using a function of the application displays a second user interface (step SF32).

The second user interface is a user interface enabling the user to input the information identifying the printer 12c to print (printer 12Ac in this example).

The second user interface has an input field for inputting the printer identification information, and the user inputs the printer identification information to this field.

After the user inputs the printer identification information to the second user interface and confirms the input (step SY33), the management device control unit 40c executes the following process.

Using a function of the application, the management device control unit 40c generates the print information data based on the information input to the first user interface and the second user interface by a function of the application (step SF33). The information to be printed based on the information input to the first user interface is included in the print information data. The printer identification information of the printer 12c to use for printing is also included in the print information data based on the information input to the second user interface.

Next, the management device control unit 40c establishes a connection KK by HTTP communication between the first communication interface 41c and the second communication connection unit 63c of the management server 60Ac (step SF34). In this embodiment, the management server 60c to which the management device 14Ac sends data is preset to management server 60Ac. The address of the management server 60Ac is predefined in the program rendering the function of the application. In step SF34, the management device control unit 40c opens a connection KK with the management server 60Ac of this address.

Next, the management device control unit 40c controls the first communication interface 41c to send the print information data to the management server 60Ac through the connection KK (step SF35).

Next, the management device control unit 40c controls the first communication interface 41c to send a request by the connection KK for the management server 60Ac to return the print result data (step SF36). The process of step SF36 enables the management server 60Ac to send the print result data (described below) at a specific time to the management device 14c as a response to the request.

In this embodiment of the invention, a connection between the management device 14c and the management server 60c is established when sending data from the management device 14c to the management server 60c instead of keeping the connection continuously open. More specifically, a connection KK is opened when the management device 14c needs to use a service provided by the control server 10c, such as to print from a printer 12c. Compared with continuously keeping an open connection between the management device 14c and management server 60c, this configuration enables more efficient communication and more effective use of resources. More specifically, in order for a management device 14c to provide a service provided by the control server 10c to the print control system 1b (cloud computing system), these devices must simply be able to communicate with each other. Communication can therefore be made more efficient and resources can be used more effectively by using a configuration in which a connection is established in response to a request from a management device 14c instead of a configuration in which a connection between the devices is constantly open.

As shown in FIG. 18 (B), the management server control unit 61c receives the print information data by the second communication connection unit 63c (step SG31).

Next, the search unit 61ac of the management server control unit 61c accesses the connection server address management database of the database management server 70c and searches the database (step SG32).

As described above, the connection server address management database is a database relationally storing the printer identification information of the printers 12c and the connection server address information of the connection servers 50c.

Next, using the printer identification information contained in the print information data, the search unit 61ac gets the connection server address information related to the printer identification information from the connection server address management database (step SG33). In this example, the search unit 61ac gets the connection server address information of first connection server 50Ac in step SG33.

Next, the management server control unit 61c establishes a connection with the connection server 50c (first connection server 50Ac in this example) identified by the connection server address information acquired by the search process in step SG33, and enables communication (step SG34, step SH31).

Next, the management server control unit 61c controls the first communication connection unit 62c to send the print information data to the first connection server 50Ac by the connection established in step SG34 (step SG35).

As shown in FIG. 18 (C), the communication management unit 25c of the first connection server 50Ac controls the first transceiver unit 29c and receives the print information data (step SH32).

Next, the communication management unit 25c sends the received print information data to the print data processing unit 27c (step SH33).

The print data processing unit 27c generates and outputs print data related to controlling the printer 12c based on the received print information data to the communication management unit 25c (step SH34).

The print data is an XML (Extensible Markup Language) file containing the print information to be printed by the printer 12Ac. The information to be printed by the printer 12Ac, such as the image data and information where the image is to be printed, is included in the print data in XML format. The printer identification information of the printer 12Ac to be used for printing is also included in the print data.

The printer identification information of the printer 12Ac to use for printing may be written in a specific tag in the print data.

The communication management unit 25c then accesses the connection management database stored in the connection server storage unit 28c (step SH35).

Next, the communication management unit 25c acquires the connection identification information of the WebSocket connection CT related to the printer identification information from the connection management database using the printer identification information written in the received print data as the search key (step SH36). The connection identification information acquired here is the connection identification information of the WebSocket connection CT to the printer 12Ac that is to print.

Next, the communication management unit 25c sends the print data to the connection unit 26c corresponding to the WebSocket connection CT related to the connection identification information acquired in step SH36 (step SH37).

Next, the connection unit 26c pushes the received print data through the WebSocket connection CT to the printer 12c (step SH38).

As shown in FIG. 18 (D), the communication unit 16c then receives the print data through the WebSocket connection CT (step SI31).

Next, the communication unit 16c sends the received print data to the communication control unit 15c (step SI32).

Next, the communication control unit 15c sends the received print data to the print control unit 17c (step SI33).

Next, the print control unit 17c converts the received print data to control commands in the command language of the print unit 18c (step SI34). More specifically, the print control unit 17c converts the print data in an XML file to commands that can be interpreted by a control board of print unit 18c.

Next, the print control unit 17c sends the control commands to the print control unit 17c (step SI35).

Next, the print unit 18c prints on the print medium based on the control commands (step SI36).

As described above, the management device 14c in this embodiment of the invention can send data to a particular printer 12c through the management servers 60c and connection servers 50c of the control server 10c. In other words, the management device 14c can control a specific printer 12c in the group of printers 12c connected by a WebSocket connection CT to the control server 10c through the control server 10c.

As also described above, the control server 10c in this embodiment of the invention can print from a printer 12c without receiving a request from the printer 12c when an event for printing on the printer 12c occurs. Events that cause the printer 12c to print are events in which predefined conditions are met, such as when an instruction is received from the user, or a request is received from a management device 14c as described in this example.

This configuration also enables starting printing faster than in a configuration in which the printer 12c intermittently sends a request to the control server 10c, and the control server 10c sends print data in response to such a request when there is a need to print with the printer 12c.

As shown in FIG. 19 (D), the print control unit 17c of the printer 12Ac generates print result data (first data) based on the result of printing by the print unit 18c (step SI37). The print result data is data indicating, for example, if printing by the print unit 18c was successful or failed, and the cause of the failure if printing fails. Next, the print control unit 17c sends the generated print result data to the communication control unit 15c (step SI38).

The communication control unit 15c then sends the received print result data to the communication unit 16c (step SI39).

Next, the communication unit 16c sends the received print result data through the WebSocket connection CT to the first connection server 50Ac (step SI310).

As shown in FIG. 9 (C), the connection unit 26c of the first connection server 50Ac receives the print result data through the WebSocket connection CT (step SH39). Next, the connection unit 26c sends the received print result data to the communication management unit 25c (step SH310).

The communication management unit 25c sends the received print result data to the first transceiver unit 29c (step SH311).

The first transceiver unit 29c then sends the print result data to the management server 60Ac by the connection opened in step SH31 (step SH312).

As shown in FIG. 19 (B), the first communication connection unit 62c of the management server 60Ac receives the print result data (step SG36). Next, the first communication connection unit 62c sends the received print result data to the management server control unit 61c (step SG37).

The management server control unit 61c sends the received print result data to the second communication connection unit 63c (step SG38).

The second communication connection unit 63c sends the received print result data by the connection KK to the management device 14c (step SG39). Sending the print result data in step SG39 is done as a response to the request sent by the management device 14c in step SF36.

As shown in FIG. 19 (A), the first communication interface 41c of the management device 14c receives the print result data by the connection KK (step SF37).

Next, the first communication interface 41c sends the received print result data to the management device control unit 40c (step SF38).

Next, the management device control unit 40c runs a corresponding process based on the received print result data (step SF39). For example, if the received print result data indicates that the printing process failed, the management device control unit 40c displays an appropriate notice on a display panel not shown to inform the user.

When the printer 12c responds to data received from the management device 14c in this embodiment of the invention, the printer 12c sends data to the management device 14c using the connection KK established between the management device 14c and the management server 60c. This method effectively uses the open connection KK when sending data (print information data in this example) from the management device 14c to the management server 60. This configuration does not require a process to open a new connection, and makes communication efficient.

The process executed by the devices when sending data from the printer 12Ac to the management device 14Ac triggered by a specific event instead of as a response to data received from the management device 14Ac is described next.

Figures 20A, 20B, 20C:
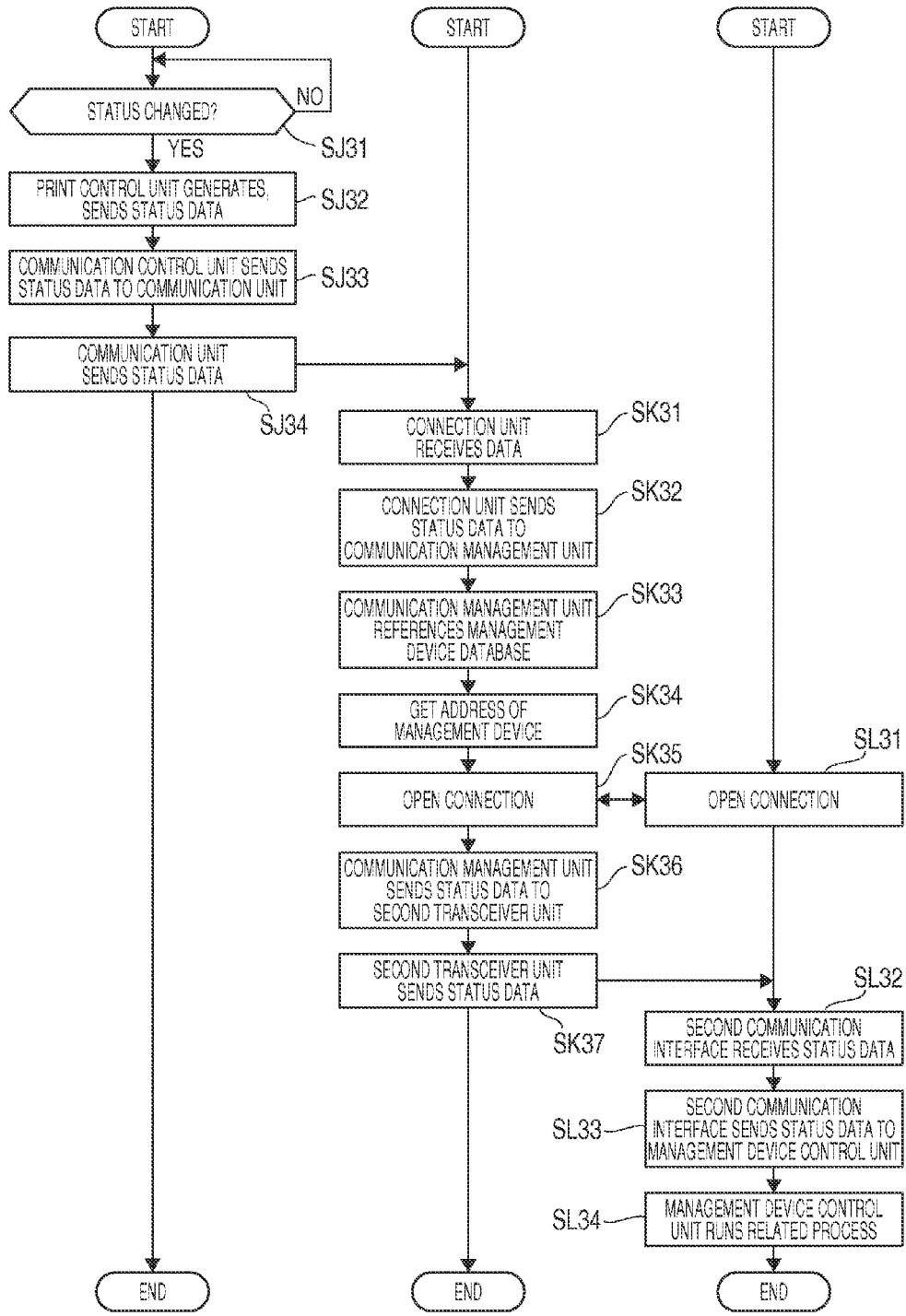
FIGS. 20A-20C are flowcharts showing the operation of the printer, printer connection server, and management device.

FIG. 20 is a flow chart describing the operation when the printer 12Ac sends data to the management device 14Ac, (A) showing the operation of the printer 12Ac, (B) showing the operation of the first connection server 50Ac, and (C) showing the operation of the management device 14Ac.

The print control unit 17c of the printer 12Ac monitors the status of the print unit 18c, and if there is a change in state, generates data indicating the state change.

As shown in FIG. 20 (A), the print control unit 17c of the printer 12Ac monitors whether or not there is a change in the status of the print unit 18c (step SJ31).

If the print unit 18c status changes (step SJ31), the print control unit 17c generates and sends status data (second data) representing the state to the communication control unit 15c (step SJ32).

The communication control unit 15c then sends the received status data to the communication unit 16c (step SJ33).

The communication unit 16c sends the received status data through the WebSocket connection CT to the first connection server 50Ac (step SJ34).

The connection unit 26c of the first connection server 50Ac then receives the status data through the WebSocket connection CT (step SK31).

Next, the connection unit 26c sends the received status data to the communication management unit 25c (step SK32).

Next, the communication management unit 25c references the management device database stored by the connection server storage unit 28c (step SK33).

The management device database is a database that relationally stores, for each printer 12c that can connect to the first connection server 50Ac, the printer identification information of the printer 12c and the address of the management device 14c to which to send the data when data is received from the printer 12c.

Next, the communication management unit 25c uses the printer identification information as the search key to retrieve the address of the management device 14c (management device 14A in this example) related to the printer identification information (step SK34).

Next, the communication management unit 25 accesses the management device 14Ac based on the address acquired in step SK34, and together with the management device control unit 40c of the management device 14Ac opens a connection LL between the second transceiver unit 20c and the second communication interface 42c of the management device 14Ac (step SK35, step SL31). The communication protocol of this connection LL is not limited to WebSocket, and may be any protocol enabling sending data from the first connection server 50Ac to the management device 14c. The second transceiver unit 20c and second communication interface 42c are function blocks for sending and receiving data by the connection LL according to a specific communication protocol.

Next, the communication management unit 25c sends the status data to the second transceiver unit 20c (step SK36).

The second transceiver unit 20c then sends the received status data by the connection LL to the management device 14Ac (step SK37).

The communication management unit 25c also has a function for determining based on information added to the header of the received data, for example, if the received data is a response to transmission data sent by the management device 14Ac. The communication management unit 25c executes the above process when the received data is determined by this function to not be related to a response to transmission data from the management device 14Ac.

As shown in FIG. 20 (C), the second communication interface 42c of the management device 14Ac then receives the status data by the connection LL (step SL32).

Next, the second communication interface 42c sends the received status data to the management device control unit 40c (step SL33).

The management device control unit 40c then executes a corresponding process based on the received status data (step SL34).

When sending data from the printer 12Ac to the management device 14Ac (except when responding to the management device 14c) in this embodiment of the invention, the first connection server 50Ac opens a connection LL with the management device 14Ac. The first connection server 50Ac then sends data to the management device 14Ac by the connection LL. This has the following effect for the reasons described below.

Specifically, as described above, the connection KK between the management device 14Ac and management server 60Ac is not continuously open, and is established as needed. The connection KK between the management device 14Ac and the management server 60Ac is not necessarily open when data is sent from the printer 12Ac to the management device 14Ac. Furthermore, even if the connection KK is established, a state enabling sending data from the management server 60Ac to the management device 14c must be created by, for example, intermittently sending a request from the management server 60Ac to the management device 14Ac management server 60Ac. This embodiment of the invention can therefore enable sending data from the printer 12Ac to the management device 14Ac without using a configuration in which the connection between the management device 14Ac and management server 60Ac is constantly open, thereby enabling efficient communication and effective use of resources. More particularly, data sent by the printer 12Ac to the first connection server 50Ac in this embodiment is sent from the first connection server 50Ac to the management device 14Ac. Therefore, processing by the management server 60Ac is not needed to send data from the printer 12Ac to the management device 14Ac, and this further improves the efficiency of communication.

As described above, a print control system 1c according to this embodiment includes a printer 12c, connection server 50c, management server 60c, and management device 14c.

The printer 12c includes a print unit 18c that prints; a print control unit 17c that generates print result data (first data) based on the operation of the print unit 18c, and status data (second data) that is different from the print result data; and a communication unit 16c that sends the print result data and status data.

The connection server 50c includes a connection unit 26c that receives the print result data and status data sent by the communication unit 16c of the printer 12c; a print data processing unit 27c that generates print data to control the print unit 18c of the printer 12c based on print information data commanding printing; a first transceiver unit 29c that sends the print result data and receives the print information data; and a second transceiver unit 20c that sends the status data.

The management server 60c includes a first communication connection unit 62c that receives the print result data sent by the first transceiver unit 29c of the connection server 50c, and sends the print information data to the first transceiver unit 29c of the connection server 50c; and a second communication connection unit 63c that sends print result data and receives print information data.

The management device 14c includes a management device control unit 40c (control unit) that generates the print information data; a management device network interface 41 that receives the print result data sent by the second communication connection unit 63c of the management server 60c, and sends the print information data to the management server 60c; and a second communication interface 42c that receives the status data sent by the connection server 50c.

Thus comprised, print result data (first data) based on the operation of the print unit 18c according to print data generated based on print information data sent by the management device 14c is sent from the printer 12c through the connection server 50c and management server 60c to the management device 14c. As a result, print result data can be sent to the management device 14c using the connection KK established to send print information data from the management device 14c to the management server 60c. Status data (second data), which is different from the print result data, sent from the printer 12c to the connection server 50c is then sent by the connection server 50c to the management device 14c without going through the management server 60c. As a result, status data can be sent to the management device 14c even when the connection KK is not open between the management device 14c and management server 60c.

In addition, because communication does not go through the management server 60c, processing by the management server 60c when sending status data to the management device 14c is not necessary, and status data can be sent efficiently and quickly to the management device 14c. In other words, this embodiment of the invention can make a print control system 1b (print control system) in which a printer 12c and management device 14c communicate with a control server 10c through a network GN compatible with a configuration in which devices communicate through the network GN with the control server 10c.

When status data sent from the printer 12c is received, the connection server 50c in this embodiment of the invention establishes a connection LL with the management device 14c.

Thus comprised, the connection server 50c can send the status data to the management device 14c by the connection LL when status data is received from a printer 12c.

Furthermore, in this embodiment the management device 14c establishes a connection KK with the management server 60c to send print information data to the management server 60c.

Thus comprised, the management device 14c can send print information data to the management server 60c through the connection KK. The management server 60c can also send print result data sent by the printer 12c to the management device 14c by the connection KK.

The invention is described above with reference to a preferred embodiment thereof, but the invention is not limited thereto and can be modified and adapted in many ways without departing from the scope of the accompanying claims.

In the embodiment described above the printer 12c is installed as part of a store system 11 deployed in a business. However, the printer 12c is not limited to being part of a store system 11, and can be used in other systems.

In addition, print data is sent as an XML file from the control server 10c to the printer 12c in the foregoing embodiment, but the data format of the print data is not limited to XML. The print data may be data created in another markup language, or control commands in the command language of the print unit 18c.

The function blocks shown in FIG. 14 can also be rendered as desired using hardware and software, and do not suggest a specific hardware configuration. Functions of the printer 12c may also be rendered by a separate externally connected device. The printer 12c can also execute the processes described above by running a program stored on an externally connected storage medium.

Embodiment 4

A fourth embodiment of the invention is described next.

The print control system 1d according to the fourth embodiment of the invention includes a control server 10d (print control device), a printer 12d, and a management device 14d. The control server 10d, printer 12d, and management device 14d connect over a network GN in the same way as the control server 10, printer 12, and management device 14 in the first embodiment. A communication path established between the control server 10d and printer 12d is the same as the communication path established between the control server 10 and printer 12 in FIG. 2.

Figure 21:
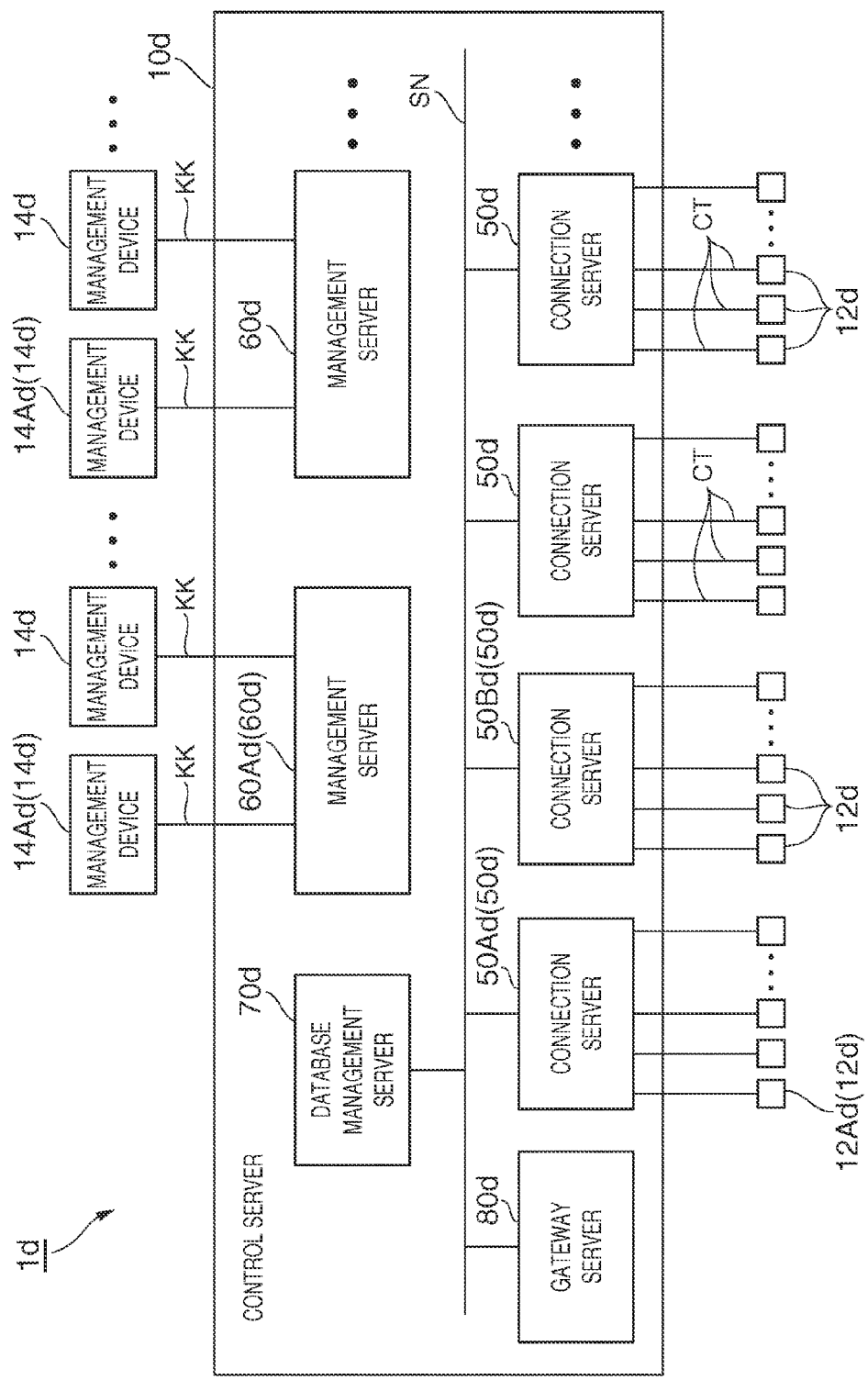
FIG. 21 shows the configuration of devices in the control server according to a fourth embodiment of the invention in further detail.

FIG. 21 shows the configuration of the print control system 1d according to this embodiment of the invention in further detail.

As shown in FIG. 21, the control server 10d includes a plurality of control servers 50d and a plurality of management servers 60d. The plural connection servers 50d and the plural management servers 60d are communicatively connected together in the control server 10d through a server network SN including a LAN, for example.

As shown in FIG. 9, one or a plurality of printers 12d are connected to a connection server 50d through a WebSocket connection CT using the WebSocket protocol.

One or a plurality of management devices 14d are connected to each management server 60d by a connection KK. In this embodiment of the invention, the application-layer connection KK established between the management server 60d and management devices 14d is not limited to a WebSocket connection, and may be a HTTP connection.

As described further below, the connection server 50b has functions for executing processes related to the printer 12b, including processes related to communicating with the printer 12b, and processes related to controlling the printer 12b. The management server 60b similarly has functions for executing processes related to the management device 14b, including a process related to communicating with the management device 14b, as described further below.

As shown in FIG. 21, a database management server 70d is also connected to the server network SN. A gateway server 80d is also connected to the server network SN. These servers are described further below.

Communication between one management device 14Ad in the group of plural management devices 14d, and one printer 12Ad in the group of plural printers 12d, is described briefly using FIG. 21 and data being sent from the management device 14Ad to the printer 12Ad for example.

In this embodiment of the invention printer 12Ad is the printer 12d controlled by management device 14Ad. More specifically, management device 14Ad addresses printer 12Ad as the printer 12d to print as controlled by the management device 14Ad. The printer 12Ad is therefore a printer 12d included in the store system 11 managed by the management device 14Ad.

The management device 14Ad runs the following process to send data to the printer 12Ad. First, using a method described further below, the management device 14Ad sends data to a specific management server 60Ad in the group of plural management servers 60d. Information identifying the printer 12Ad is included in this data. When accessing a service provided by the control server 10d in this embodiment of the invention, the management server 60d accessed by the management device 14d is predetermined by the management device 14d.

Using a method described further below, the management server 60Ad looks for the connection server 50d to which the printer 12Ad controlled by the management device 14Ad is connected in the group of plural connection servers 50d connected to the server network SN. In this embodiment of the invention, the connection server 50d to which the printer 12Ad is connected is first connection server 50Ad. The management server 60Ad therefore searches first connection server 50Ad in this example.

Next, the management server 60Ad sends data to the first connection server 50Ad that was found. Next, the first connection server 50Ad, using a method described further below, sends the data to the printer 12Ad. In this event, the first connection server 50Ad runs a specific process based on the received data to generate and send the new data. The printer 12Ad receives the data and runs a process based on the data.

The control server 10d in this embodiment of the invention thus has multiple connection servers 50d and multiple management servers 60d. The management devices 14d and printers 12d communicate through the connection servers 50d and management servers 60d of the control server 10d. More specifically, the management devices 14d can print with the corresponding printer 12d through the management server 60d and connection server 50d.

This configuration has the following effects.

Because the management servers 60d and connection servers 50d are independent servers, these servers can be separately added to the control server 10d.

For example, the number of printers 12d that can connect to the control server 10d may increase in order to use a service provided by the control server 10d. In this event, a first connection server 50Ad can be added to distribute the processor load related to printer 12d processes. This embodiment of the invention enables increasing the number of connection servers 50d in this event independently of the management servers 60d. Because of this configuration, the number of connection servers 50d and management servers 60d can be adjusted according to the configuration (such as the number) of printers 12d that can connect to the connection servers 50d, and the configuration (such as the number) of management devices 14d that can connect to the management servers 60d. As a result, the server configuration of the control server 10d can be appropriately scaled according to the conditions of the connection servers 50d and management servers 60d, and the processor load corresponding to the number of devices that can connect to each server can be distributed.

This configuration also enables providing the connection server 50d with a function for executing processes related to a connected printer 12d, and providing the management server 60d with a function for executing processes related to a connected management device 14d. As a result, compared with a configuration having a function for relationally executing processes related to different types of devices in a single server, the configuration of the invention can reduce the processor load on a single server, and suppress complicating processes on the one server.

Figure 22:
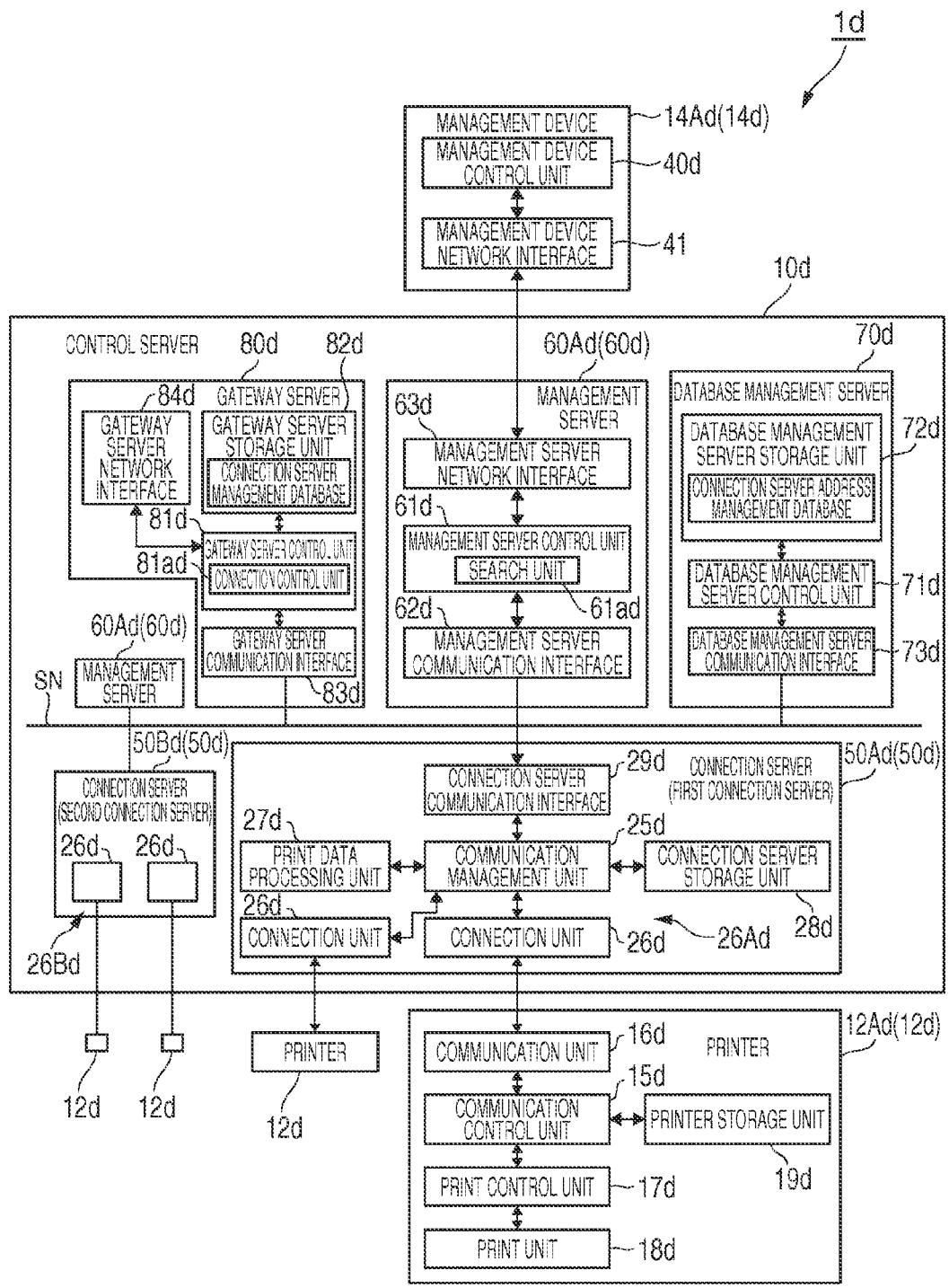
FIG. 22 is a block diagram showing the functional configuration of devices in the control server.

FIG. 22 is a block diagram showing the functional configuration of the printer 12Ad, the first connection server 50Ad, a second connection server 50Bd, the management server 60Ad, the management device 14Ad, the database management server 70d, and the gateway server 80d.

As shown in FIG. 22, the printer 12Ad includes a communication control unit 15d, a communication unit 16d, a print control unit 17d, a print unit 18d, and a printer storage unit 19d.

The functions of the communication control unit 15d, communication unit 16d, and print control unit 17d are described further below.

The print unit 18d includes mechanisms related to printing, such as a print mechanism that prints on print media, a conveyance mechanism that conveys the print media, and a cutting mechanism that cuts the print media, and control boards related to controlling the mechanisms.

The printer storage unit 19d is nonvolatile memory, and stores data. Address data and printer identification information, further described below, are stored in the printer storage unit 19d.

As shown in FIG. 22, the first connection server 50Ad of the control server 10d includes a communication management unit 25d, one or a plurality of connection units 26d, a print data processing unit 27d, a connection server storage unit 28d, and a connection server communication interface 29d.

The functions of the communication management unit 25d, connection unit 26d, and print data processing unit 27d are described further below.

The connection server storage unit 28d is nonvolatile memory, and stores data. A connection management database is stored in the connection server storage unit 28d as described further below.

The connection server communication interface 29d communicates according to a specific communication protocol with another server in the control server 10d through the server network SN as controlled by the communication management unit 25d.

In the first connection server 50Ad, the one or plural connection units 26d function as a first connection unit 26Ad (first connection unit) that connects with plural printers 12d.

As shown in FIG. 22, the second connection server 50Bd also has one or a plurality of connection units 26. A printer 12d is connected to each connection unit 26d by a WebSocket connection CT. The one or more connection units 26 of the second connection server 50Bd function as second connection units 26Bd (second connection unit) that connect with plural printers 12d.

As shown in FIG. 22, the management server 60Ad of the control server 10d includes a management server control unit 61d, a management server communication interface 62d, and a management server network interface 63d.

The management server control unit 61d includes a CPU, and controls the management server 60Ad. One function block of the management server control unit 61d is a search unit 61ad. The function of the search unit 61ad is described further below.

The first communication connection unit 62d communicates according to a specific communication protocol with another server in the control server 10d through the server network SN as controlled by the management server control unit 61d.

The second communication connection unit 63d communicates with the management device 14d (including management device 14Ac) according to a specific communication protocol through the network GN as controlled by the management server control unit 61d.

As shown in FIG. 22, the database management server 70d of the control server 10d includes a database management server control unit 71d, a database management server storage unit 72d, and a database management server communication interface 73d (referred to below as the database communication interface 73d).

The database management server control unit 71d includes a CPU, and controls the database management server 70d. One function of the database management server control unit 71d is to read and write the databases stored in the database management server storage unit 72d.

The database management server storage unit 72d is nonvolatile memory and stores data. A connection server address management database is stored in the database management server storage unit 72d as described further below.

The database communication interface 73d communicates with other servers in the control server 10d through the server network SN as controlled by the database management server control unit 71d.

As shown in FIG. 22, the gateway server 80d of the control server 10d includes a gateway server control unit 81d, a gateway server storage unit 82d (storage unit), a gateway server communication interface 83d (server connection unit), and a gateway server network interface 84d.

The gateway server control unit 81d includes a CPU, and controls the gateway server 80d. A connection control unit 81ad is one function block of the gateway server control unit 81d. The function of the connection control unit 81ad is described further below.

The gateway server storage unit 82d is nonvolatile memory and stores data. A connection server management database as described further below is stored in the gateway server storage unit 82d.

The gateway server communication interface 83d communicates with other servers in the control server 10d through the server network SN as controlled by the gateway server control unit 81d.

The gateway server network interface 84d communicates with other devices (including the printer 12d) according to a specific communication protocol through the network GN as controlled by the gateway server control unit 81d.

As shown in FIG. 22, the management device 14d includes a management device control unit 40d, and a management device network interface 41d.

The management device control unit 40d includes a CPU, and controls the management device 14d.

The management device network interface 41d communicates as controlled by the management device control unit 40d by HTTP.

The operation of the printer 12Ad, gateway server 80d, and first connection server 50Ad when the printer 12Ad power turns on is described next.

Figures 23A, 23B, 23C:
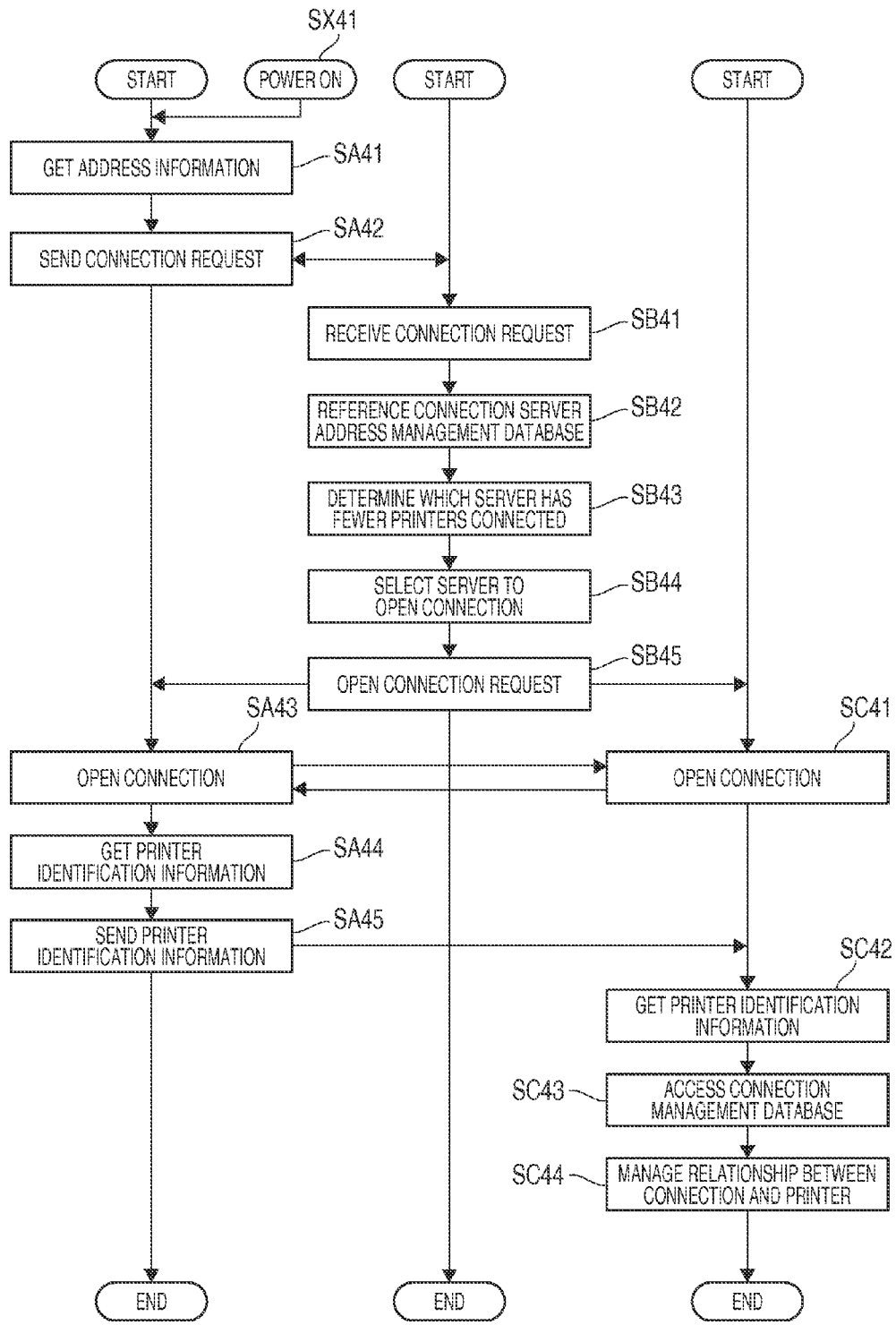
FIGS. 23A-23C are flowcharts showing the operation of the printer, gateway server, and printer connection server.

FIG. 23 is a flow chart showing the operation of the printer 12Ad, the gateway server 80d, and the first connection server 50Ad after the printer 12Ad power turns on. FIG. 23 (A) shows the operation of the printer 12Ad, (B) shows the operation of the gateway server 80d, and (C) shows the operation of the first connection server 50Ad.

For simplicity, there are two connection servers 50d in the control server 10d in the example described below, first connection server 50Ad and second connection server 50Bd.

The trigger of the process shown in the flow chart in FIG. 23 is not limited to the power turning on. For example, this process may be triggered by the printer 12d communicatively connecting to the network GN, or by an instruction from a user.

Note that in the operation described below the printer 12Ad is connected to the local area network LN of the store system 11 in which it is used, and can access the network GN.

The functions of the function blocks of the communication control unit 15d and print control unit 17d of the printer 12Ad, the communication management unit 25d and the print data processing unit 27d of the first connection server 50Ad, the search unit 61ad of the management server 60Ad, and the connection control unit 81ad of the gateway server 80d, are described below.

More specifically, these function blocks are software objects. An object is an instance created in an object-oriented programming language, and more specifically is a software function block defined by a set of data and methods. The function of a particular function block is rendered by calling (invoking) a method of the function block.

The functions of these function blocks may also be rendered by the CPU or other hardware assets reading and running an application. Configurations in which the function of a single function block is rendered by a single application, configurations in which the function of plural function blocks are rendered by a single application, and configurations in which the function of a single function block is rendered by plural applications, are possible.

In other words, the function blocks represent functions as conceptual blocks, and do not mean any specific application or hardware construction.

As shown in FIG. 23 (A), when the printer 12Ad power turns on (step SX41), the communication control unit 15d accesses the printer storage unit 19d and gets the address data stored in the printer storage unit 19d (step SA41).

The address data is data identifying the address (such as the domain name, IP address, or path name) of the gateway server 80d accessed when establishing a WebSocket connection CT with one of the plural connection servers 50d. The address to which the message is sent is included in the address data when handshaking.

The printer 12d thus accesses the gateway server 80d when establishing a WebSocket connection CT with the control server 10d in this embodiment of the invention. More specifically, each printer 12d stores information identifying the address, such as the domain name or the IP address, of the gateway server 80d to access when establishing the WebSocket connection CT as the server address data.

Next, the communication control unit 15d sends a request to establish a WebSocket connection CT with one of the connection servers 50d to the gateway server 80d based on the address indicated by the address data (sends a connection request) (step SA42).

As shown in FIG. 23 (B), the connection control unit 81ad of the gateway server control unit 81d of the gateway server 80d receives the connection request through the gateway server network interface 84d (receives a request to establishes a WebSocket connection CT) (step SB41).

Next, the connection control unit 81ad references the connection server management database (step SB42).

For the one or more connection servers 50d in the control server 10d, the connection control unit 81ad manages the number of printers 12d that have established a WebSocket connection CT with each of the connection servers 50d. The connection server management database is a database storing information identifying the number of printers 12d that established a WebSocket connection CT with each connection server 50d. By referencing this connection server management database, the connection control unit 81ad can get the number of printers 12d that have established a WebSocket connection CT with any particular connection server 50d in the control server 10d.

Any desirable method may be used to update the connection server management database. For example, the connection control unit 81ad may regularly query each connection server 50d for the number of printers 12d that have established a WebSocket connection CT with that connection server 50d, and update the database based on the responses to the queries. The connection server 50d may also inform the connection control unit 81ad when a new printer 12d is connected to the connection server 50d, or when the connection of a printer 12d to the connection server 50d is cut. The connection control unit 81ad may then update the database based on the received report.

In this example, the number of printers 12d connected to the first connection server 50Ac, and the number of printers 12d connected to the second connection server 50Bc, are stored in the connection server management database.

The gateway server control unit 81d performs the following operation after referencing the connection server management database in step SB42. First, the gateway server control unit 81d determines which of the first connection server 50Ac and second connection server 50Bc has the least number of printers 12d connected thereto by a WebSocket connection CT (step SB43).

The processor load (the CPU load, communication load, and other loads) is probably lower on the server with fewer connected printers 12d than on the server with more. This is because the connection server 50d must execute the processes corresponding to the connected printers 12d, but because the number of connected printers 12d is smaller, the number of executed processes is also less. As a result, the gateway server control unit 81d selects the connection server 50d with fewer connected printers 12d as the connection server 50d to establish the WebSocket connection CT in response to the connection request (step SB44).

Of the first connection server 50Ad and the second connection server 50Bd in this example, the first connection server 50Ad is has fewer connected printers 12d. Therefore, in step SB43, the gateway server control unit 81d identifies the first connection server 50Ad as the connection server 50d with the fewest connected printers 12d. In step SB44, the gateway server control unit 81d selects the first connection server 50Ad as the connection server 50d that establishes a WebSocket connection CT in response to the request.

When there is a request from a printer 12d to establish a WebSocket connection CT with a connection server 50d, the gateway server control unit 81d thus selects the connection server 50d expected to have the lower processor load to establish the WebSocket connection CT.

It will be obvious that other factors may also be considered when selecting the connection server 50d to establish the WebSocket connection CT, including the specifications of the individual connection servers 50d, the current processor load, the expected processor load, and other conditions.

Next, the gateway server control unit 81d requests the first connection server 50Ad to establish a WebSocket connection CT with the printer 12Ad (step SB45). The gateway server control unit 81d manages the addresses of the connection servers 50d in the control server 10d. The gateway server control unit 81d also requests the printer 12Ad that requested establishing a WebSocket connection CT to establish a WebSocket connection CT with the first connection server 50Ad (step SB45). Note that when requesting the device to establish a connection in step SB44 and step SB45, the gateway server control unit 81d sends the device address and other information used to establish the WebSocket connection CT.

As shown in FIG. 23 (A) and FIG. 23 (C), the communication control unit 15d of the printer 12Ad, and the communication management unit 25d of the first connection server 50Ad, establish a WebSocket connection CT between the communication unit 16d and the first connection unit 26d (step SA43, step SC41). In other words, the printer 12Ad according to this embodiment establishes a WebSocket connection CT when triggered by the power turning on without receiving an instruction from the user or a request from the control server 10d.

The communication unit 16d and connection unit 26d are WebSocket interfaces enabling data communication based on the WebSocket protocol and methods. These function blocks are instantiated using a WebSocket Socket.IO library, for example.

If the communication control unit 15*d* sends data to the communication unit 16*d*, the data can be sent through the WebSocket connection CT according to the WebSocket protocol.

More specifically, the communication unit 16*d* has functions for processing data that is received from the communication control unit 15*d* according to WebSocket, and sending the data through the WebSocket connection CT based on WebSocket methods. The communication unit 16*d* also has functions for processing data that is received through the WebSocket connection CT according to WebSocket, and sending to the communication control unit 15*d*. The connection unit 26*d* is similarly configured.

By establishing a WebSocket connection CT, the printer 12Ad and first connection server 50Ad can communicate through an asynchronous, duplex communication link. More specifically, the first connection server 50Ad can push data to the printer 12Ad through the WebSocket connection CT without receiving a request from the printer 12Ad operating as a client.

Next, the communication control unit 15*d* of the printer 12Ad accesses the printer storage unit 19*d* and gets the printer identification information stored in the printer storage unit 19*d* (step SA44). The printer identification information is data representing the identification information of the printer 12Ad (referred to below as printer identification information). The printer identification information is, for example, a serial number assigned to the printer 12*d* when the printer 12*d* is manufactured.

Next, the communication control unit 15*d* sends the printer identification data over the WebSocket connection CT (step SA45).

As shown in FIG. 23 (C), the communication management unit 25*d* of the first connection server 50Ad receives the printer identification data (step SC42).

Next, the communication management unit 25*d* accesses the connection management database stored in the connection server storage unit 28*d* (step SC43). The connection management database is a database relationally storing for the WebSocket connections CT that were established connection identification information identifying the WebSocket connection CT and the printer identification information of the printer.

Next, the communication management unit 25*d* creates one record in the connection management database. The communication management unit 25*d* then stores in the created record the connection identification information of the WebSocket connection CT established in step SC41 related to the printer identification information indicated by the identification data received in step SC42 (step SC44).

Note that when a WebSocket connection CT is opened, the communication management unit 25*d* generates connection identification information for that connection that is different from the connection identification information of any other WebSocket connection CT that was already opened. The relationship between the WebSocket connections CT and printers 12*d* is managed by the process of step SC44.

A WebSocket connection CT is thus established when triggered by the power turning on without receiving a user instruction or a request from the control server 10*d*. Thus comprised, the user does not need to perform a complicated operation to open a WebSocket connection CT. Special knowledge is also not needed to open a WebSocket connection CT. After the power turns on, the printer 12*d* can also be quickly enabled to execute processes as controlled by the control server 10*d*.

A WebSocket connection CT is thus established between the communication unit 16*db* and connection unit 26*db*. As a result, a function unit communication path KT based on the WebSocket connection CT is established between the print control unit 17*d* of the printer 12Ad, and the print data processing unit 27*d* of the first connection server 50Ad. The print control unit 17*d* and print data processing unit 27*d* can communicate by asynchronous duplex communication through the function unit communication path KT. Asynchronous duplex communication between a function unit and a process unit through the function unit communication path KT is described further below.

As shown in FIG. 21 and FIG. 22, the control server 10*d* also has a database management server 70*d*. The database management server 70*d* has a database management server storage unit 72*d*, and the connection server address management database is stored in the database management server storage unit 72*d*.

The connection server address management database is a database that stores the printer identification information relationally to information (address information) identifying the address of the connection server 50*d* to which the printer 12*d* is connected. The information identifying the address of a connection server 50*d* is called the connection server address information.

As described above, the control server 10*d* has a plurality of connection servers 50*d*, and a printer 12*d* connects by a WebSocket connection CT to a particular connection server 50*d* selected by the gateway server 80*d*.

For each printer 12*d* connected to the control server 10*d*, the connection server address management database stores the printer identification information of the printer 12*d* relationally to the connection server address information of the printer connection server to which the printer 12*d* is connected.

The connection server address management database is continuously updated as described below to reflect the current connection states of the connection server 50*d* and printer 12*d*. This process is described in detail below.

Figure 24B:
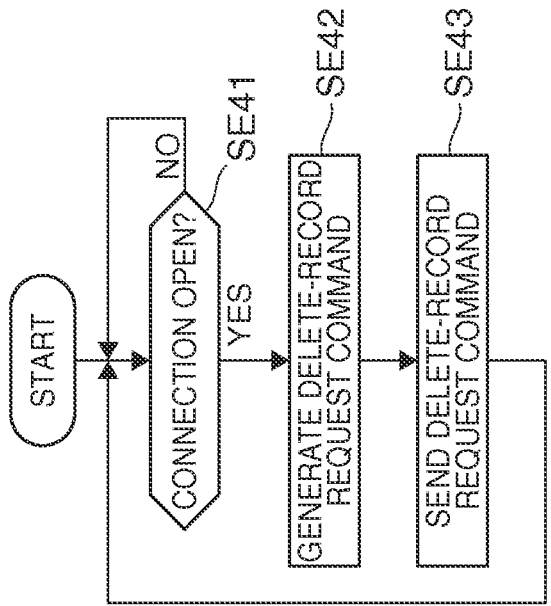
FIGS. 24A and 24B are flow charts showing the operation of the printer connection server.
Figure 24A:
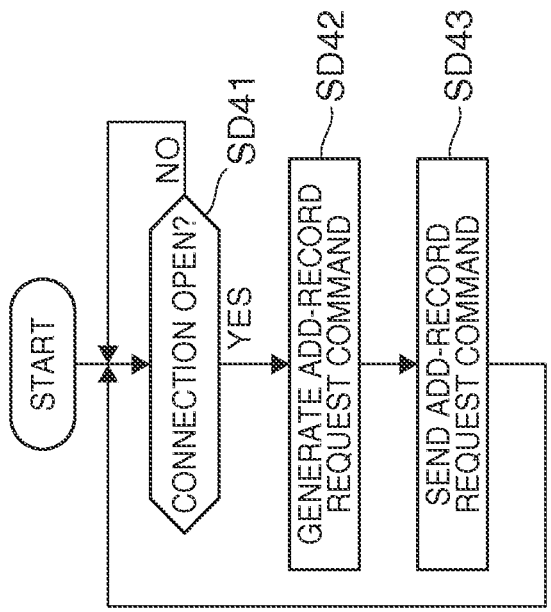

FIG. 24 (A) is a flow chart showing the operation of the first connection server 50Ad when a WebSocket connection CT is established between the first connection server 50Ad and a particular printer 12*d*.

As shown in FIG. 24 (A), the communication management unit 25*d* of the first connection server 50Ad monitors if a WebSocket connection CT is established between the server and a printer 12*d* (step SD41).

If a new WebSocket connection CT is established (step SD41 returns YES), the communication management unit 25*d* generates a command requesting creating a record relating the printer identification information (second identification information) of the connected printer 12*d* to the connection server address information identifying the address of the first connection server 50Ad (step SD42). The command related to this request is an add-record request command. The add-record request command is data in a specific format comprising the printer identification information and the connection server address information.

Next, the communication management unit 25*d* sends the generated add-record request command to the database management server 70*d* through the status processing unit 29*d* (step SD43).

The database management server control unit 71*d* of the database management server 70*d* that received the add-record request command then accesses the connection server address management database. The database management server control unit 71*d* then creates a record in the database relationally storing the printer identification information of the connected printer 12d and the connection server address information of the first connection server 50Ad.

FIG. 24 (B) is a flow chart showing the operation of the first connection server 50Ad when a WebSocket connection CT between the first connection server 50Ad and a particular printer 12d (second printer) is cut.

As shown in FIG. 24 (B), the communication management unit 25d of the first connection server 50Ad monitors if a WebSocket connection CT established between the server and a printer 12d is cut (step SE41).

If a WebSocket connection CT is cut (step SE41 returns YES), the communication management unit 25d generates a command requesting deleting the record relating the printer identification information (second identification information) of the connected printer 12d and the connection server address information identifying the address of the first connection server 50Ad of which the connection was cut (step SE42). The command related to this request is a delete-record request command. The delete-record request command is data in a specific format comprising the printer identification information and the connection server address information.

Next, the communication management unit 25d sends the generated delete-record request command to the database management server 70d through the status processing unit 29d (step SE43).

The database management server control unit 71d of the database management server 70d that received the delete-record request command then accesses the connection server address management database. The database management server control unit 71d then finds the record in the database relationally storing the printer identification information of the connected printer 12d and the connection server address information of the first connection server 50Ad. Next, the database management server control unit 71d deletes the record that was found.

When a printer 12d connects to a connection server 50d in this embodiment, a record relationally storing the address of the server and the identification information of the printer 12d is created in the connection server address management database.

When the connection to a printer 12d connected to the connection server 50d is cut, the record relationally storing the address of the server and the identification information of the printer 12d is deleted from the connection server address management database.

Thus comprised, the content of the connection server address management database corresponds to the actual connections between the connection server 50d and printers 12d.

Operation of the management device 14Ad, servers in the control server 10d, and printer 12Ad when the management device 14Ad drives the printer 12Ad to print is described next.

FIG. 25 is a flow chart showing the operation of the devices when the management device 14Ad prints through the printer 12Ad. FIG. 25 (A) shows the operation of the management device 14Ad, (B) shows the operation of the management server 60Ad, (C) shows the operation of the first connection server 50Ad, and (D) shows the operation of the printer 12Ad.

Communication by the function unit communication path KT between the print data processing unit 27d and the print control unit 17d is described in FIG. 25 when the print data processing unit 27d sends data as an example.

A WebSocket connection CT is already established between the printer 12Ad and the first connection server 50Ad before the following process starts.

As shown in FIG. 25 (A), to print with the printer 12Ad, the user starts an application on the management device 14Ad (step SY41).

This application provides a user interface for the user to input the information for printing by the printer 12d, and information identifying the printer 12Ad that is to print. The application also has a function for generating and outputting the print information data (print information data) based on the input information to the management server 60Ad.

When the user starts the application, the management device control unit 40d displays a first user interface through a function of the application on a display panel or other specific display means (step SF41). The first user interface is a user interface for the user to input print information to the printer 12d. The print information includes, for example, the file name where the image data is stored, and information related to where the image is printed on the print medium. The first user interface enables inputting information used later by the print data processing unit 27d to generate the print data.

After the user inputs the print information to the first user interface and confirms the input (step SY42), the management device control unit 40d using a function of the application displays a second user interface (step SF42).

The second user interface is a user interface enabling the user to input the information identifying the printer 12d to print (printer 12Ad in this example).

The second user interface has an input field for inputting the printer identification information, and the user inputs the printer identification information to this field.

After the user inputs the printer identification information to the second user interface and confirms the input (step SY43), the management device control unit 40d executes the following process.

Using a function of the application, the management device control unit 40d generates the print information data (print command information) based on the information input to the first user interface and the second user interface by a function of the application (step SF43). The information to be printed based on the information input to the first user interface is included in the print information data. The printer identification information of the printer 12d (command information specifying the printer 12d) to use for printing based on the information input to the second user interface is also included in the print information data.

Next, by a function of the application, the management device control unit 40d sends the print information data to the management server 60Ad through the management device network interface 41d (step SF44). In this embodiment, the management server 60d to which the management device 14Ad sends data is preset to management server 60Ad. The address of the management server 60Ad is predefined in the program rendering the function of the application. After the connection KK with the management server 60Ad is established, the management device control unit 40d sends the data through the connection KK.

As shown in FIG. 25 (B), the management server control unit 61d receives the print information data by the second communication connection unit 63d (step SG41).

Next, the search unit 61ac of the management server control unit 61d accesses the connection server address management database of the database management server 70d and searches the database (step SG42).

As described above, the connection server address management database is a database relationally storing the printer identification information of the printers 12d and the connection server address information of the connection servers 50d.

Next, using the printer identification information contained in the print information data, the search unit 61ac gets the connection server address information related to the printer identification information from the connection server address management database (step SG43). In this example, the search unit 61ac gets the connection server address information of first connection server 50Ad in step SG43.

Next, the management server control unit 61d establishes a connection with the connection server 50d (first connection server 50Ad in this example) identified by the connection server address information acquired by the search process in step SG43, and enables communication (step SG44, step SH41).

Next, the management server control unit 61d sends the print information data to the first connection server 50Ad by the first communication connection unit 62d using the connection established in step SG44 (step SG45).

As shown in FIG. 25 (C), the communication management unit 25d of the first connection server 50Ad receives the print information data through the first transceiver unit 29d (step SH42).

Next, the communication management unit 25d sends the received print information data to the print data processing unit 27d (step SH43).

The print data processing unit 27d generates and outputs print data related to controlling the printer 12d based on the received print information data to the communication management unit 25d (step SH44).

The print data is an XML (Extensible Markup Language) file containing the print information to be printed by the printer 12d. The information to be printed by the printer 12d, such as the image data and information where the image is to be printed, is included in the print data in XML format. The printer identification information of the printer 12d to be used for printing is also included in the print data. The printer identification information of the printer 12d to use for printing may be written in a specific tag in the print data.

The communication management unit 25d then accesses the connection management database stored in the connection server storage unit 28d (step SH45).

Next, the communication management unit 25d acquires the connection identification information of the WebSocket connection CT related to the printer identification information from the connection management database using the printer identification information written in the received print data as the search key (step SH46). The connection identification information acquired here is the connection identification information of the WebSocket connection CT to the printer 12Ad that is to print.

Next, the communication management unit 25d sends the print data to the connection unit 26d corresponding to the WebSocket connection CT related to the connection identification information acquired in step SH46 (step SH47).

Next, the connection unit 26d pushes the received print data through the WebSocket connection CT to the printer 12d (step SH48).

As shown in FIG. 25 (D), the communication unit 16d then receives the print data through the WebSocket connection CT (step SI41).

Next, the communication unit 16d sends the received print data to the communication control unit 15d (step SI42).

Next, the communication control unit 15d sends the received print data to the print control unit 17d (step SI43).

Next, the print control unit 17d converts the received print data to control commands in the command language of the print unit 18d (step SI44). More specifically, the print control unit 17d converts the print data in an XML file to commands that can be interpreted by a control board of print unit 18d.

Next, the print control unit 17d sends the control commands to the print control unit 17d (step SI45).

Next, the print unit 18d prints on the print medium based on the control commands (step SI46).

As described above, the management device 14d in this embodiment of the invention can send data to a particular printer 12d through the management servers 60d and connection servers 50d of the control server 10d. In other words, the management device 14d can control a desired printer 12d in the group of printers 12d connected by a WebSocket connection CT to the control server 10d through the control server 10d.

As also described above, the control server 10d in this embodiment of the invention can print from a printer 12d without receiving a request from the printer 12d when an event for printing on the printer 12d occurs. Events that cause the printer 12d to print are events in which predefined conditions are met, such as when an instruction is received from the user, or a request is received from a management device 14d as described in this example.

This configuration also enables starting printing faster than in a configuration in which the printer 12d intermittently sends a request to the control server 10d, and the control server 10d sends print data in response to such a request when there is a need to print with the printer 12d. Consumption of resources can also be suppressed compared with a configuration in which the control server 10d queues responses to requests.

As described above, the print control system 1d according to this embodiment of the invention includes a printer 12d having a communication unit 16d that sends a connection request, and a print unit 18d that prints; a first connection server 50Ad (first connection server) that sends print data; a second connection server 50Bd (second connection server) that sends print data; and a gateway server 80d including a gateway server communication interface 83d (server connection unit) that connects to the first connection server 50Ad and the second connection server 50Bd, a gateway server network interface 84d that receives connection requests from the printers 12d, and a connection control unit 81ad that controls connection between the first connection server 50Ad or second connection server 50Bd and the printer 12d based on the connection request received by the gateway server network interface 84d.

Thus comprised, when a connection request is sent from a printer 12d through the network GN to the control server 10d, the gateway server 80d connects the printer 12d to the first connection server 50Ad or the second connection server 50Bd. As a result, a function of the gateway server 80d connects the printer 12d to whichever of the first connection server 50Ad and the second connection server 50Bd is determined desirable as the connection server. In other words, this embodiment of the invention can make the print control system 1d compatible with a server configuration including plural servers, the first connection server 50Ad and the second connection server 50Bd in this example, as servers that can connect to the printer 12d, and a configuration in which the printer 12d and control server 10d communicate over a network GN.

The print control system 1d in this embodiment of the invention also has a management server 60d that connects to the first connection server 50Ad and the second connection server 50Bd and controls printing, and a management device 14d that connects to the management server 60d and sends print information data (print command data) instructing printing to the management server 60d.

Thus comprised, the management device 14d can control the printer 12d through the management server 60d, and the first connection server 50Ad or the second connection server 50Bd.

The connection request of the printer 12d in this embodiment of the invention is a request to establish an asynchronous duplex communication WebSocket connection CT to a connection server 50d.

Thus comprised, a function of the gateway server 80d can establish a WebSocket connection CT between the printer 12d and the first connection server 50Ad or the second connection server 50Bd that is determined to be the server suitable as the connection server in response to a connection request from the printer 12d.

In this embodiment of the invention, the first connection server 50Ad has a first connection unit 26Ad (first connection unit) that connects to plural printers 12d; the second connection server 50Bd has a second connection unit 26Bd (second connection unit) that connects to plural printers 12d; and the gateway server 80d has a gateway server storage unit 82d that stores the number of printers 12d connected to the first connection unit 26Ad, and the number of printers 12d connected to the second connection unit 26Bd.

Thus comprised, the gateway server 80d can manage the number of printers 12d connected to the first connection server 50Ad and the number of printers 12d connected to the second connection server 50Bd, and run an appropriate process based on thus managing the number of connected printers 12d.

Based on the number of printers 12d connected to the first connection unit 26Ad and the number of printers 12d connected to the second connection unit 26Bd that are stored in the gateway server storage unit 82d, the connection control unit 81ad of the gateway server 80d selects either first connection server 50Ad or the second connection server 50Bd as the connection server 50d to connect to the printer 12d.

The processor load (the CPU load, communication load, and other loads) of the connection server 50d with fewer connected printers 12d is probably lower on the server with more connected printers 12d. Based thereon, this embodiment of the invention can connect the printer 12d to the connection server 50d with the lighter processor load, and can thereby distribute the load and improve processing efficiency.

In this embodiment of the invention, the printer 12d stores printer identification information; and the first connection server 50Ad has a communication management unit 25d that, when a printer 12d connects to the first connection server 50Ad as controlled by the gateway server 80d, stores the printer identification information of the printer 12d relationally to the address information (information about the first connection server) of the first connection server 50Ad in a database management server storage unit 72d.

Thus comprised, the management server 60d can know the relationship between a printer 12d and the connection server 50d to which the printer 12d is connected by referencing the information stored in the database management server storage unit 72d.

In this embodiment of the invention, the print information data (print command data) contains printer identification information, and the management server 60d has a search unit Glad that, when print information data sent by the management device 14d is received, finds the connection server 50d to which the printer 12d is connected based on the printer identification information from the print information data and the information stored in the database management server storage unit 72d.

Thus comprised, the search unit Glad can find the connection server 50d to which the printer 12d is connected based on the information stored in the database management server storage unit 72d.

Variation of Embodiment 4

A variation of the fourth embodiment is described next.

In the fourth embodiment described above, the search unit Glad accesses the connection server address management database of the database management server 70d when looking for a connection server 50d. The search unit Glad searches the accessed databases based on the content thereof.

In this variation of the fourth embodiment, the search unit Glad stores data of the same content as the content of the database in a working area (a specific storage area) created in RAM in the management server 60d.

For example, the search unit Glad regularly communicates and requests data of the same content as the connection server address management database from the database management server control unit 71d of the database management server 70d. The database management server control unit 71d has a function for generating data of the same content as the database based on the connection server address management database. The search unit Glad then stores the data received in response to the request in the working area. Alternatively, the database management server control unit 71d of the database management server 70d may send the data regularly or whenever the database is updated.

When the search unit Glad looks for a connection server 50d in this event, it searches the data stored in working memory instead of accessing and referencing the connection server address management database. Compared with a process that accesses a database through the server network SN, less time is required to access the working area reserved in RAM over a local bus. As a result, this variation of the fourth embodiment can shorten the time required for the search unit 61db to search.

The invention is described above with reference to a preferred embodiment thereof, but the invention is not limited thereto and can be modified and adapted in many ways without departing from the scope of the accompanying claims.

In the embodiment described above the printer 12d is installed as part of a store system 11 deployed in a business. However, the printer 12d is not limited to being part of a store system 11, and can be used in other systems.

In addition, print data is sent as an XML file from the control server 10d to the printer 12d in the foregoing embodiment, but the data format of the print data is not limited to XML. The print data may be data created in another markup language, or control commands in the command language of the print unit 18d.

The function blocks shown in FIG. 9 can also be rendered as desired using hardware and software, and do not suggest a specific hardware configuration. Functions of the printer 12d may also be rendered by a separate externally connected device. The printer 12d can also execute the processes described above by running a program stored on an externally connected storage medium.

Embodiment 5

A fifth embodiment of the invention is described next.

The print control system 1e according to the fifth embodiment of the invention includes a control server 10e (print control device), a printer 12e, and a management device 14e. The control server 10e, printer 12e, and management device 14e connect over a network GN in the same way as the control server 10, printer 12, and management device 14 in the first embodiment. A communication path established between the control server 10e and printer 12e is the same as the communication path established between the control server 10 and printer 12 in FIG. 2.

Figure 26:
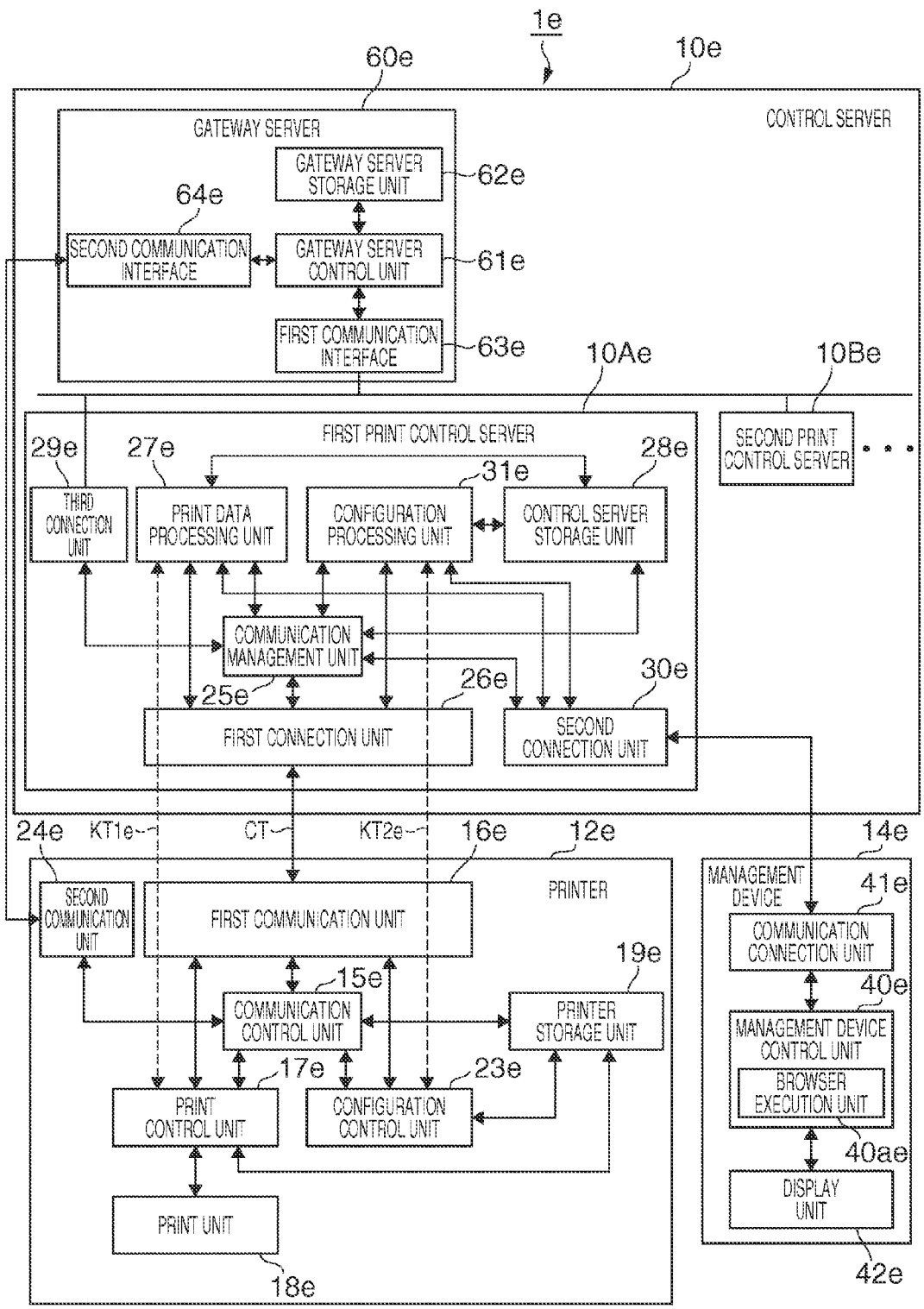
FIG. 26 is a block diagram showing the functional configuration of the printer, control server, and management device in a fifth embodiment of the invention.

FIG. 26 is a block diagram showing the functional configuration of the printer 12e, the control server 10e, and the management device 14e.

As shown in FIG. 26, the printer 12e includes a communication control unit 15e, a first communication unit 16e, a print control unit 17e, a print unit 18e, a configuration control unit 23e, a printer storage unit 19e, and a second communication unit 24e.

The functions of the communication control unit 15e, first communication unit 16e, print control unit 17e, and configuration control unit 23e are described below.

The print unit 18e includes mechanisms related to printing, such as a print mechanism that prints on print media, a conveyance mechanism that conveys the print media, and a cutting mechanism that cuts the print media, and control boards related to controlling the mechanisms.

The printer storage unit 19e is nonvolatile memory, and stores data. Server address data, printer identification information, and a function unit management database further described below are stored in the printer storage unit 19e.

The second communication unit 24e communicates with external devices including a gateway server 60e described below through a network GN according to a specific communication protocol.

When not differentiating between the print control unit 17e and the configuration control unit 23e below, these function blocks are referred to as function units.

The printer 12e has two function units, a print control unit 17e and a configuration control unit 23e.

As shown in FIG. 26, the control server 10e includes a plurality of print control servers including a first print control server 10Ae (print control device) and a second print control server 10Be (second print control device) in this embodiment, and a gateway server 60e. The first print control server 10Ae, second print control server 10Be, and gateway server 60e are communicatively connected through a server network SN configured including a LAN or other network.

As shown in FIG. 26, the first print control server 10Ae includes the communication management unit 25e, a first connection unit 26e (connection unit), print data processing unit 27e, configuration processing unit 31e, control server storage unit 28e (storage unit), a second connection unit 30e, and a third connection unit 29e.

The functions of the communication management unit 25e, first connection unit 26e, print data processing unit 27e, and configuration processing unit 31e are described further below.

The control server storage unit 28e is nonvolatile memory, and stores data. A connection management database, process unit management database, and a configuration settings database are stored in the control server storage unit 28e as described further below.

The second connection unit 30e communicates with the management device 14e by HTTP as controlled by the communication management unit 25e. More specifically, a web browser is installed on the management device 14e, and the second connection unit 30e connects by HTTP with the management device 14e.

The third connection unit 29e communicates with other devices in the control server 10e according to a specific communication protocol through the server network SN.

When not differentiating between the print data processing unit 27e and the configuration processing unit 31e below, these function blocks are referred to generically as process units. The control server 10e has two process units, the print data processing unit 27e and the configuration processing unit 31e.

The second print control server 10Be is configured identically to the first print control server 10Ae.

As shown in FIG. 26, the gateway server 60e includes a gateway server control unit 61e, a gateway server storage unit 62e, a first communication interface 63e, and a second communication interface 64e.

The gateway server control unit 61e includes a CPU, and controls the gateway server 60e.

The gateway server storage unit 62e is nonvolatile memory and stores data. A control server management database as described further below is stored in the gateway server storage unit 62e.

The first communication interface 63e communicates with other servers in the control server 10e through the server network SN.

The second communication interface 64e communicates with other devices (including the printer 12e) according to a specific communication protocol through the network GN.

As shown in FIG. 26, the management device 14e includes a management device control unit 40e, a communication connection unit 41e, and a display unit 42e.

The management device control unit 40e includes CPU, and controls the management device 14e. One function block of the management device control unit 40e is a browser execution unit 40ae. The browser execution unit 40ae is a function block rendered by a function of a web browser.

The communication connection unit 41e communicates by HTTP as controlled by the management device control unit 40e with the first print control server 10Ae.

The display unit 42e has an LCD or other type of display panel, and displays images on the display panel as controlled by the management device control unit 40e.

Note that FIG. 26 shows the relationship between the first print control server 10Ae and one printer 12e connected to the first print control server 10Ae. When plural printers 12e are connected to the first print control server 10Ae, the first print control server 10Ae has the same number of WebSocket interfaces as there are printers 12e, establishes a WebSocket connection CT with each printer 12e, and communicates by WebSocket protocol through the connections to each printer 12e.

FIG. 26 also shows the relationship between the first print control server 10Ae and one management device 14e connected to the first print control server 10Ae. When management devices 14e are connected to the first print control server 10Ae, the first print control server 10Ae has the same number of second connection units 30e as there are management device 14e, and communicates with each management device 14e.

This also applies to the second print control server 10Be and the printer 12e and management device 14e.

The operation of the printer 12e, gateway server 60e, and first print control server 10Ae when the printer 12e power turns on is described next.

Figures 28A, 28C:
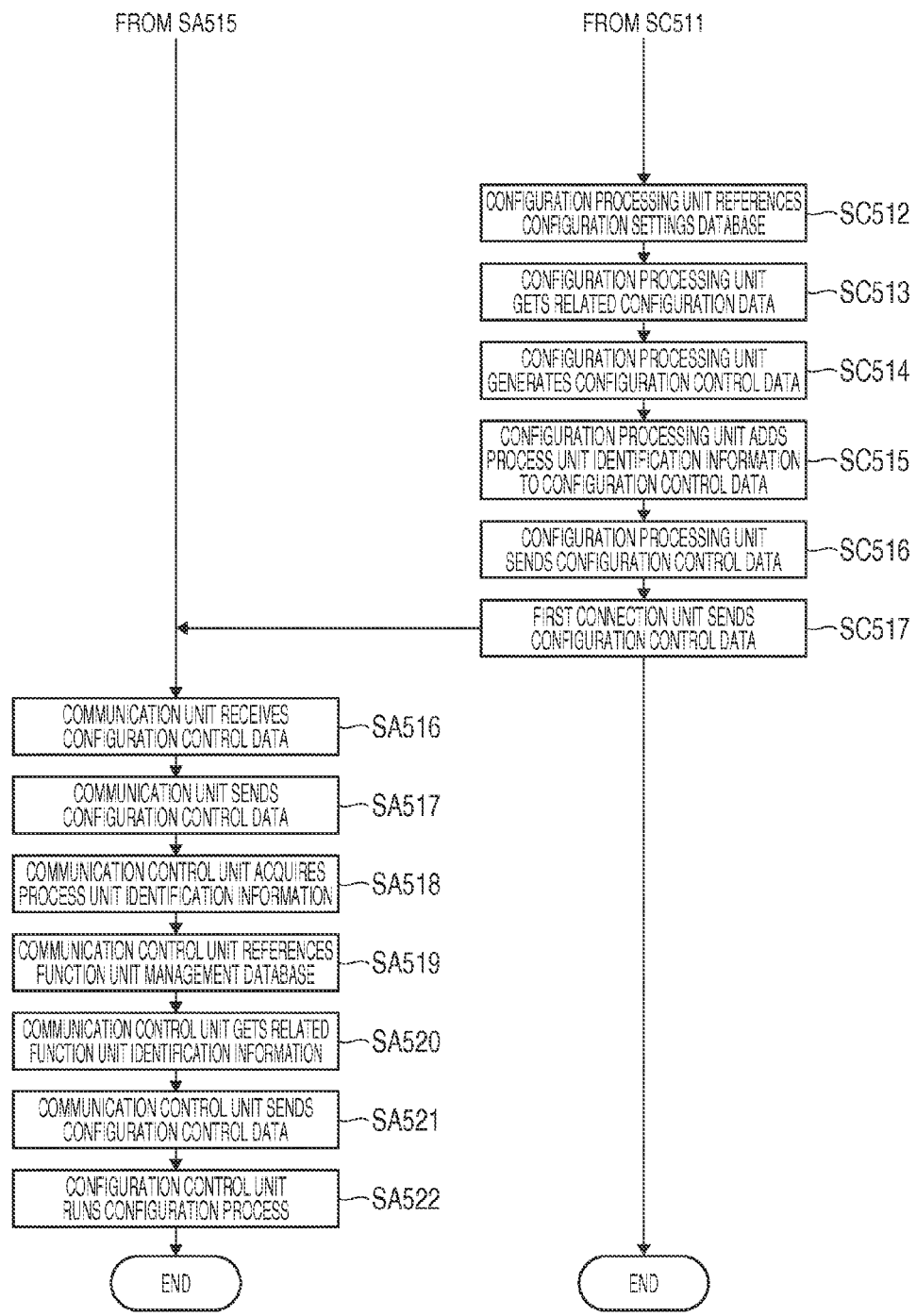
FIGS. 28A and 28C are flow charts showing the operation of the printer and control server.

FIG. 27 and FIG. 28 are a flow chart showing the operation of the printer 12e, the gateway server 60e, and the first print control server 10Ae after the printer 12e power turns on. In the figures, column (A) shows the operation of the printer 12e, (B) shows the operation of the gateway server 60e, and (C) shows the operation of the first print control server 10Ae.

The trigger of the process shown in the flow chart in FIG. 27 and FIG. 28 is not limited to the power turning on. For example, this process may be triggered by the printer 12e communicatively connecting to the network GN, or by an instruction from a user.

Note that in the operation described below the printer 12e is connected to the local area network LN of the store system 11 in which it is used, and can access the network GN.

In the example described below, the control server 10e has two servers, first print control server 10Ae and second print control server 10Be, as print control servers.

The functions of the function blocks of the communication control unit 15e, print control unit 17e, and configuration control unit 23e of the printer 12e, the communication management unit 25e, the print data processing unit 27e, and configuration processing unit 31e of the first print control server 10Ae are embodied as described below.

More specifically, these function blocks are software objects. An object is an instance created in an object-oriented programming language, and more specifically is a software function block defined by a set of data and methods. The function of a particular function block is rendered by calling (invoking) a method of the function block.

The functions of these function blocks may also be rendered by the CPU or other hardware assets reading and running an application. Configurations in which the function of a single function block is rendered by a single application, configurations in which the function of plural function blocks are rendered by a single application, and configurations in which the function of a single function block is rendered by plural applications, are possible.

In other words, the function blocks represent functions as conceptual blocks, and do not mean any specific application or hardware construction.

As shown in FIG. 27 (A), when the printer 12e power turns on (step SX51), the communication control unit 15e of the printer 12e gets the server address data stored in the printer storage unit 19e (step SA51). The server address data is data identifying the address of the gateway server 60e.

Next, the communication control unit 15e gets the printer identification information stored by the printer storage unit 19e (step SA52). The printer identification information is data representing the identification information of the printer 12A (referred to below as printer identification information). The printer identification information is, for example, a serial number assigned to the printer 12e when the printer 12e is manufactured.

Next, the communication control unit 15e controls the second communication unit 24e to access the gateway server 60e of the address indicated by the server address data acquired in step SA51, and sends an address information request and the printer identification information acquired in step SA52 (step SA53). This address information request is a command requesting the gateway server 60e to send the address information data described further below.

As shown in FIG. 27 (B), the gateway server control unit 61e controls the second communication interface 64e to receive the address information request and printer identification information (step SB51).

Next, the gateway server control unit 61e references the control server management database stored by the gateway server storage unit 62e (step SB52). The control server management database is a database that, for each printer 12e connected to the control server 10e, stores the printer identification information relationally to the device address information of the print control server with which the printer 12e established a WebSocket connection CT. The device address information is information identifying the address of the print control server. Therefore, the device address information of the first print control server 10Ae (referred to below as first device address information) is the address of the first print control server 10Ae. The device address information of the second print control server 10Be (referred to below as the second device address information) is the address of the second print control server 10Be.

As described above, the control server 10e in this embodiment of the invention has a plurality of print control servers (first print control server 10Ae and second print control server 10Be in this example). Of the plural print control server, the gateway server 60e in this embodiment manages the print control server that established a WebSocket connection CT with a printer 12e. More specifically, the printer identification information of one printer 12e is relationally stored to the device address information of the print control server that established the WebSocket connection CT with the one printer 12e in the control server management database. For example, when printer 12e in this example establishes a WebSocket connection CT with the first print control server 10Ae, the control server management database relationally stores the printer identification information with the first device address information. When the printer 12e establishes a WebSocket connection CT with the second print control server 10Be, the control server management database relationally stores the printer identification information with the second device address information.

The correlation between the printer identification information and device address information in the control server management database may be predetermined or change dynamically. Ina configuration in which the relationship changes dynamically, the gateway server 60e may execute the following process.

For each of the plural print control servers in the control server 10e, the gateway server control unit 61e of the gateway server 60e in this configuration manages the number of printers 12e connected to each print control server. A configuration in which an administrator regularly queries each print control server, and a configuration in which the print control server regularly reports the number of connected printers, are both conceivable.

Next, the gateway server control unit 61e relates the printer identification information to the device address information of the print control server to which the fewest number of printers 12e are connected in the control server management database. The processor load (the CPU load, communication load, and other loads) is probably lower on the server with fewer connected printers 12e than on the server with more. This is because the print control server must execute the processes corresponding to the connected printers 12e, but because the number of connected printers 12e is smaller, the number of executed processes is also less. Therefore, by relating the printer identification information to the device address information of the print control server having the fewest connected printers 12e, the following operations are possible. When the server is accessed by a printer 12e, the printer identification information of the printer 12e can be used to connect the printer 12e to a print control server with the lighter processor load. It will be obvious that other factors may also be considered when selecting the print control server with the lighter processor load, including the specifications of the individual print control servers, the current processor load, the expected processor load, and other conditions.

In this embodiment of the invention, the printer identification information of the printers 12e and the first device address information of the first print control server 10Ae are relationally stored in the control server management database.

Next, the gateway server control unit 61e gets the device address information related to the printer identification information from the control server management database using the printer identification information acquired from the printer identification data acquired in step SB51 (step SB53). In this example, the gateway server control unit 61e gets the first device address information in step SB53.

Next, the gateway server control unit 61e controls the second communication interface 64e to send the first device address information data acquired in step SB53 to the printer 12e (step SB54).

As shown in FIG. 27 (A), the communication control unit 15e of the printer 12e controls the second communication unit 24e and receives the first device address information data (step SA54).

Next, the communication control unit 15e accesses the printer storage unit 19e (step SA55), and stores the first device address information data that was received in the printer storage unit 19e (step SA56).

Next, the communication control unit 15e acquires the address identified by the first device address information data stored in the printer storage unit 19e (step SA57).

Next, the communication control unit 15e accesses the first print control server 10Ae based on the address of the first print control server 10Ae identified by the first device address information data. The communication control unit 15e communicates with the communication management unit 25e of the first print control server 10Ae, and establishes a WebSocket connection CT between the first communication unit 16e and the first connection unit 26e (step SA58, step SC51). The printer 12e thus establishes a WebSocket connection CT when triggered by the power turning on without receiving a user instruction or a request from the first print control server 10Ae. Establishing a WebSocket connection CT is done according to the WebSocket protocol.

The communication unit 16e and first connection unit 26e are WebSocket interfaces enabling data communication based on the WebSocket protocol and methods. These function blocks are instantiated using a WebSocket Socket.IO library, for example.

More specifically, the first communication unit 16e has functions for processing data that is received from the communication control unit 15e, the print control unit 17e, and the configuration control unit 23e according to WebSocket, and sending the data through the WebSocket connection CT based on WebSocket methods. The first connection unit 26e also has functions for processing data that is received through the WebSocket connection CT according to WebSocket, and outputting to the communication control unit 15e. The second connection unit 30e is similarly configured. By establishing a WebSocket connection CT, the printer 12Ac and first print control server 10Ae can communicate through an asynchronous, duplex communication link. More specifically, the first print control server 10Ae can push data to the printer 12e through the WebSocket connection CT without receiving a request from the printer 12e operating as a client.

By establishing a WebSocket connection CT, a first function unit communication path KT1e based on the WebSocket connection CT is established between the print control unit 17e of the printer 12e, and the print data processing unit 27e of the first print control server 10Ae. The first function unit communication path KT1e is a logical communication path for data communication between the print control unit 17e and print data processing unit 27e. The print control unit 17e and print data processing unit 27e can communicate by asynchronous duplex communication through the first function unit communication path KT1e. Asynchronous duplex communication through the first function unit communication path KT1e is described further below.

By establishing a WebSocket connection CT, a second function unit communication path KT2e based on the WebSocket connection CT is established between the configuration control unit 23e of the printer 12e, and the configuration processing unit 31e of the first print control server 10Ae. The second function unit communication path KT2e is a logical communication path for data communication between the configuration control unit 23e and the configuration processing unit 31e. The configuration control unit 23e and the configuration processing unit 31e can communicate by asynchronous duplex communication through the second function unit communication path KT2e. Asynchronous duplex communication through the second function unit communication path KT2e is described further below.

Next, communication control unit 15e accesses the printer storage unit 19e and gets the printer identification information stored in the printer storage unit 19e (step SA59).

Next, the communication control unit 15e sends the acquired printer identification information to the first communication unit 16e (step SA510).

The first communication unit 16e then sends the received printer identification information through the WebSocket connection CT to the first print control server 10Ae (step SA511).

As shown in FIG. 27 (C), the first connection unit 26e of the first print control server 10Ae receives the printer identification information through the WebSocket connection CT (step SC52).

Next, the first connection unit 26e sends the received printer identification information data to the communication management unit 25e (step SC53).

The communication management unit 25e accesses the connection management database stored in the control server storage unit 28e (step SC54). The connection management database is a database relationally storing for the WebSocket connections CT that were established connection identification information identifying the WebSocket connection CT and the printer identification information of the printer.

Next, the communication management unit 25e creates one record in the connection management database. The communication management unit 25e then stores in the created record the connection identification information of the WebSocket connection CT established in step SC51 related to the printer identification information indicated by the identification data received in step SC52 (step SC55).

Note that when a WebSocket connection CT is opened, the communication management unit 25e generates connection identification information for that connection that is different from the connection identification information of any other WebSocket connection CT that was already opened. The first print control server 10Ae manages the relationships between WebSocket connections CT and printers 12e by the process of step SC55.

The printer 12e thus establishes a WebSocket connection CT when triggered by the power turning on without receiving a user instruction or a request from the first print control server 10Ae. Thus comprised, the user does not need to perform a complicated operation to open a WebSocket connection CT. Special knowledge is also not needed to open a WebSocket connection CT. After the power turns on, the printer 12e can also be quickly enabled to execute processes as controlled by the first print control server 10Ae.

As shown in FIG. 27 (A), the configuration control unit 23e of the printer 12e generates a request (step SA512). This request is a command requesting the first print control server 10Ae to send configuration control data (described below). The request conforms to a specific format.

Next, the configuration control unit 23e adds the printer identification information and the function unit identification information of the configuration control unit 23e to the generated request (step SA513). The function unit identification information is identification information identifying a particular function unit of the printer 12e. A different value is assigned as the function unit identification information of the print control unit 17e and the configuration control unit 23e of the printer 12e. In step SA513, the configuration control unit 23e references the printer identification information stored in the printer storage unit 19e, and based on this data adds the printer identification information to the request. The configuration control unit 23e also manages the function unit identification information assigned to the configuration control unit 23e, and based thereon adds the function unit identification information to the request.

Next, the configuration control unit 23e sends the request to the first communication unit 16e (step SA514).

The first communication unit 16e sends the request to the first print control server 10Ae through the WebSocket connection CT (step SA515).

As shown in FIG. 27 (C), the first connection unit 26e of the first print control server 10Ae receives the request through the WebSocket connection CT (step SC56).

Next, the first connection unit 26e sends the received request to the communication management unit 25e (step SC57).

The communication management unit 25e then acquires the printer identification information and the function unit identification information added to the request (step SC58).

Next, the communication management unit 25e references the process unit management database stored by the control server storage unit 28e (step SC59). The process unit management database is a database that relationally stores a set of printer identification information and function unit identification information with process unit identification information.

Next, the communication management unit 25e acquires the process unit identification information related to this set of identification information from the process unit management database using the printer identification information and function unit identification information acquired in step SC58 as the search key (step SC510). The process unit identification information is identification information of a process unit of the first print control server 10Ae. A different value is therefore assigned to the print data processing unit 27e and the configuration processing unit 31e of the first print control server 10Ae.

Next, the communication management unit 25e sends the request (step SC511) to the process unit identified by the process unit identification information acquired in step SC510 (configuration processing unit 31e in this example). Note that the communication management unit 25e manages the relationships between process unit and process unit identification information, and can send data to the process unit corresponding to the process unit identification information based on the value of a single process unit identification information value.

As shown in FIG. 28 (C), when a request is received, the configuration processing unit 31e of the first print control server 10Ae references the configuration settings database stored by the control server storage unit 28e (step SC512).

The configuration settings database relationally stores printer identification information and configuration data for each printer 12e connected to the first print control server 10Ae.

The configuration data is information relating one or a plurality of settings related to the print unit 18e of the printer 12e to the value of that setting.

Configurable settings of the printer 12e in this embodiment of the invention include a print density setting, which is a setting related to the image density when printing; a print speed setting, which relates to the speed of printing; and a paper width setting, which is a setting related to the width of the print medium (roll paper in this example) that is set in the printer 12e. The settings are not limited to those described in this embodiment, and may further include network-related settings, audio-related settings when the device has an audio output function, and other settings.

Values available as the print density setting of the printer 12e according to this embodiment include DARK indicating the print density is dark, and LIGHT indicating the print density is light. Values available as the print speed setting of the printer 12e according to this embodiment include FAST indicating a high print speed, and SLOW indicating a low print speed. Values available as the paper width setting of the printer 12e according to this embodiment include 80 mm indicating the width of the installed roll paper is 80 mm, and 58 mm indicating the width of the installed roll paper is 58 mm.

For example, the configuration data may be information relating the print density setting and DARK, the print speed setting and FAST, and the paper width setting and 80 mm.

Next, the configuration processing unit 31e acquires the configuration data related to the identification information from the configuration settings database using the printer identification information added to the request as the search key (step SC513).

Next, the configuration processing unit 31e generates the configuration control data based on the acquired configuration data (step SC514).

The configuration control data specifies the values of specific settings, and is data instructing setting the values of the configuration items to the specified values in the configuration control unit 23e of the printer 12e. In this example, the configuration control data is data instructing setting the print density setting to DARK, the print speed setting to FAST, and the paper width setting to 80 mm.

Next, the configuration processing unit 31e adds the process unit identification information to the configuration control data (step SC515). The configuration processing unit 31e manages the process unit identification information assigned to the configuration processing unit 31e.

Next, the configuration processing unit 31e sends the configuration control data to the first connection unit 26e (step SC516).

The first connection unit 26e then sends the received configuration control data through the WebSocket connection CT to the printer 12e (step SC517).

As shown in FIG. 28 (A), the first communication unit 16e of the printer 12e receives the configuration control data through the WebSocket connection CT (step SA516). Next, the first communication unit 16*e* sends the configuration control data to the communication control unit 15*e* (step SA517).

The communication control unit 15*e* then acquires the process unit identification information added to the configuration control data (step SA518).

Next, the communication control unit 15*e* references the function unit management database (step SA519).

The function unit management database is a database that relationally stores the function unit identification information, which is the identification information of the function units of the printer 12*e*, and the process unit identification information of the corresponding process unit.

When there is a 1:1 correspondence between the function unit and process unit, the one function unit can process the data sent by the one process unit, and the one process unit can process data sent by the one function unit. The one process unit can therefore send data to the corresponding one function unit for processing by the one function unit using a function of the one function unit. The one function unit can also send data to the corresponding one process unit for processing by the one process unit using a function of the one process unit. In this example, the print control unit 17*e* of the printer 12*e* is related to the print data processing unit 27*e* of the first print control server 10Ae. The configuration control unit 23*e* of the printer 12*e* is also related to the configuration processing unit 31*e* of the first print control server 10Ae.

Next, the communication control unit 15*e* acquires the function unit identification information related to the process unit identification information from the function unit management database using the process unit identification information acquired in step SA518 as the search key (step SA520).

Next, the communication control unit 15*e* sends the configuration control data to the function unit identified by the function unit identification information acquired in step SA520 (the configuration control unit 23*e* in this example) (step SA521). The communication control unit 15*e* manages the relationships between function unit identification information and function units. Therefore, based on the acquired function unit identification information, the communication control unit 15*e* can send data to the function unit identified by the one function unit identification information.

Based on the received configuration control data, the configuration control unit 23*e* executes the configuration process (step SA522).

The configuration process is a process in which the configuration control unit 23*e* sets specific configuration settings to the values specified by the configuration control data.

In this example, the printer storage unit 19*e* of the printer 12*e* stores a configuration file containing information relating settings to their corresponding values. In the configuration process of step SA516, the configuration control unit 23*e* accesses the configuration file, and rewrites the content of the configuration file so that the settings are set to the corresponding values specified in the configuration control data. The configuration process may be a process of changing the values of variables related to settings defined in a program.

As described above, a WebSocket connection CT is established between the printer 12*e* and the first print control server 10Ae triggered by the printer 12*e* power turning on in this embodiment of the invention. After the WebSocket connection CT is established, the printer 12*e* requests transmission of the configuration control data through the connection, and the first print control server 10Ae sends the configuration control data in response to the request. The printer 12*e* then runs a configuration process based on the received configuration control data. As a result, the printer 12*e* can set the values corresponding to specific settings without receiving a user instruction or request from the first print control server 10Ae. The user therefore does not need to make settings manually, and the user requires no special knowledge to configure settings.

After the WebSocket connection CT is established, the configuration processing unit 31*e* of the first print control server 10Ae and the configuration control unit 23*e* of the printer 12*e* can communicate by asynchronous duplex communication through the second function unit communication path KT2*e* based on the WebSocket connection CT.

As described above, the communication management unit 25*e* of the first print control server 10Ae sends the received request to the configuration processing unit 31*e*. As a result, requests received by the first print control server 10Ae are sent to the configuration processing unit 31*e*, and the appropriate process is run by the configuration processing unit 31*e*. Likewise, the communication control unit 15*e* of the printer 12*e* sends the received configuration control data to the configuration control unit 23*e*. As a result, configuration control data received by the printer 12*e* is sent to the configuration control unit 23*e*, and the appropriate process is run by the configuration control unit 23*e*.

In this embodiment of the invention as described above, using a function of the configuration control unit 23*e* when the power turns on, the printer 12*e* queries the gateway server 60*e* for the address of the print control server with which to establish a WebSocket connection CT. Next, the printer 12*e* gets the address of the print control server with which to establish a WebSocket connection CT using a function of the configuration control unit 23*e*. Next, the printer 12*e* establishes the WebSocket connection CT with the print control server of the acquired address.

The effect of this configuration is described below.

The printer 12*e* establishes a WebSocket connection CT with the related print control server using a function of the gateway server 60*e* when the printer power turns on. As a result, the user does not need to input the address of the print control server to open a WebSocket connection CT, and user convenience is improved.

There is also no need to store the address of different print control servers appropriately to a particular printer 12*e* at the time of printer 12*e* manufacture or when the printer 12*e* is installed in a store system 11, and only the address of the gateway server 60*e* need be stored in each printer 12*e*. As a result, the printer 12*e* is easier to manufacture, and the printers 12*e* can be prevented from accessing the wrong address.

Operation of the first print control server 10Ae and the management device 14*e* when changing the content of the configuration data of a specific printer 12*e* is described next.

As described above, the control server storage unit 28*e* of the first print control server 10Ae stores the configuration settings database. The configuration settings database stores printer identification information and configuration data for printers 12*e* that connect to the first print control server 10Ae.

In the print control system 1*e* according to this embodiment, the management device 14*e* can change the content of the configuration data of a specific printer 12*e*.

Figures 29A, 29B:
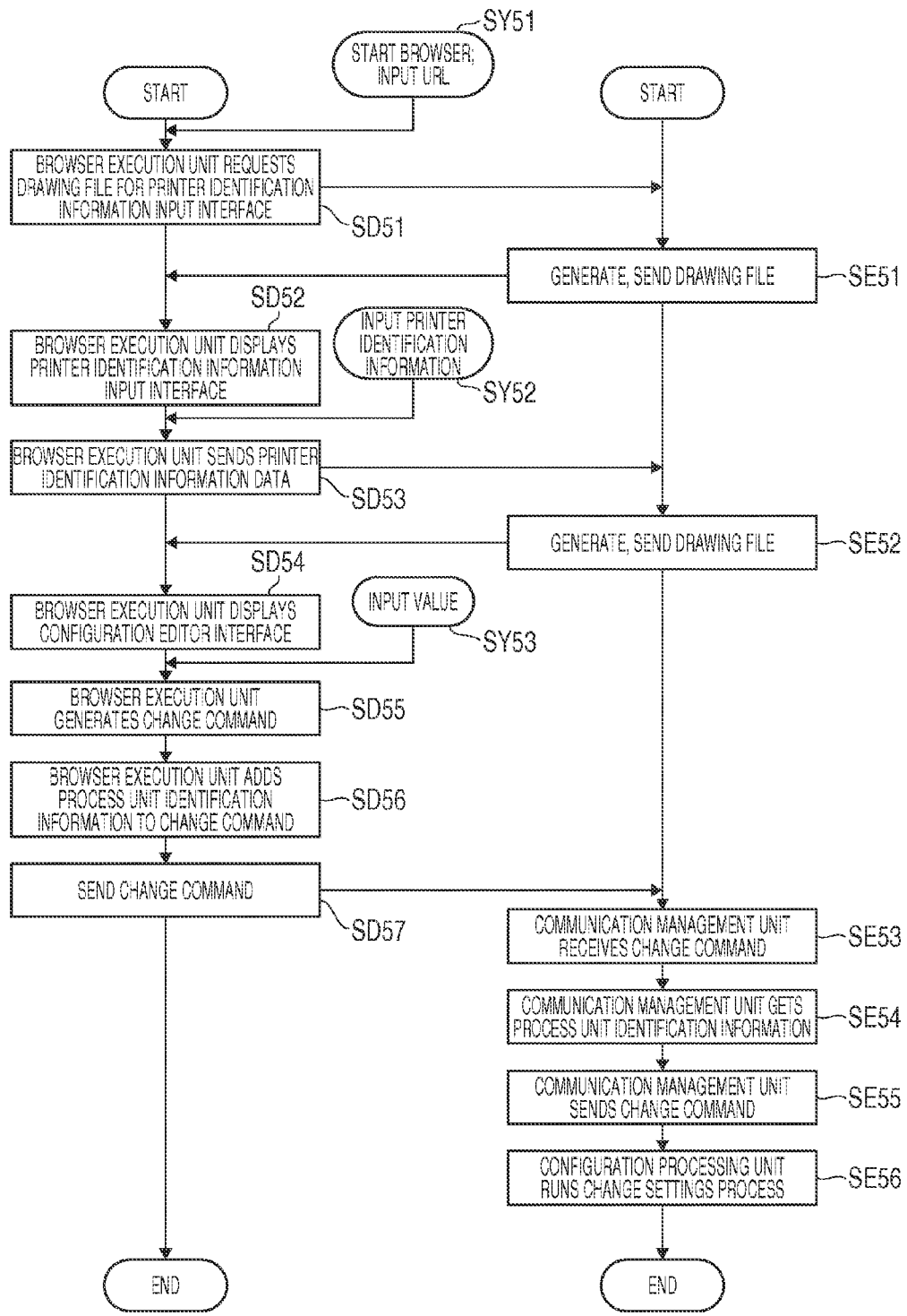
FIGS. 29A and 29B are flow charts showing the operation of the management device and control server.

FIG. 29 is a flow chart showing the operation of the first print control server 10Ae and the management device 14*e* when changing the content of the configuration data of a specific printer 12*e*. FIG. 29 (A) shows the operation of the management device 14*e*, and (B) shows the operation of the first print control server 10Ae.

Note that the operation described below is executed by a function of the browser execution unit 40*ae* of the management device control unit 40*e* of the management device 14*e*, such as by an application that runs on the browser, or a function of a script in a drawing file (described below).

The user first starts the browser on the management device 14e, and inputs a command to access a specific URL (step SY51). This URL is the URL accessed by the management device 14e to display a user interface 50e for inputting printer identification information (referred to below as the printer identification information input interface 50e) in a browser window. This specific URL is a URL managed by the first print control server 10Ae, and is given in advance by the administrator that manages the first print control server 10Ae to the user.

As shown in FIG. 29 (A), in response to the user instruction in step SX6, the browser execution unit 40ae of the management device control unit 40e of the management device 14e accesses the specified URL, and requests the drawing file for displaying the printer identification information input interface 50e (step SD51). This drawing file is a file written in markup language such as HTML (HyperText Markup Language), and is a file for displaying a web page in a browser window on the management device 14e.

As shown in FIG. 29 (B), in response to the request of the management device 14e in step SD51, the first print control server 10Ae generates and sends a drawing file for the printer identification information input interface 50e to the management device 14e (step SE51).

As shown in FIG. 29 (A), the browser execution unit 40ae of the management device control unit 40e of the management device 14e then displays the printer identification information input interface 50e based on the drawing file acquired in response to the request of step SD51 (step SD52).

FIG. 30 (A) shows an example of a printer identification information input interface 50e.

As shown in FIG. 30 (A), the printer identification information input interface 50e has an input field R1e to which the user inputs the printer identification information, and a button B1e for confirming the input to the input field R1e.

The user inputs the printer identification information of the printer 12e for which to change the content of the configuration data to the input field R1e, and then clicks the button B1e (step SY52).

The browser execution unit 40ae of the management device control unit 40e of the management device 14e then sends the printer identification information data input to the printer identification information input interface 50e to the first print control server 10Ae according to a specific protocol (step SD53). The process of step SD53 is executed by a function of a script embedded in the drawing file related to the printer identification information input interface 50e, for example.

As shown in FIG. 29 (B), when the printer identification information data is received, the first print control server 10Ae executes the following process.

The first print control server 10Ae generates and outputs to the management device 14e a drawing file related to the user interface for changing settings (below, the configuration editor interface 51e) of the printer 12e identified by the printer identification information (step SE52). In this example, the control server storage unit 28e of the first print control server 10Ae stores the information (referred to below as drawing data) required to generate the drawing file of the configuration editor interface 51e relationally to the printer identification information for each printer 12e that connects to the first print control server 10Ae. In step SE52, the first print control server 10Ae acquires the drawing data corresponding to the printer identification information identified by the received data, and generates the drawing file based on the acquired drawing data.

As shown in FIG. 29 (A), the browser execution unit 40ae of the management device control unit 40e of the management device 14e displays the configuration editor interface 51e based on the drawing file acquired in response to the request of step SD53 (step SD54).

FIG. 30 (B) shows an example of the configuration editor interface 51e.

As shown in FIG. 30 (B), the configuration editor interface 51e has fields for inputting the desired values of specific settings.

As shown in FIG. 30 (B), the printer identification information of the printer 12e for which the configuration data is to be changed is also displayed in the configuration editor interface 51e.

The configuration editor interface 51e has sprint density setting area AR1e for setting the value of the print density setting. The print density setting area AR1e has a print density setting input field RA1e. The print density setting input field RA1e is a field for inputting the value of the print density setting. The print density setting input field RA1e is a pull-down menu. The user can input the value of the print density setting to the print density setting input field RA1e by selecting either DARK or LIGHT from the pull-down menu.

The configuration editor interface 51e also has a print speed setting area AR2e for setting the value of the print speed setting. The print speed setting area AR2e has a print speed setting input field RA2e. The print speed setting input field RA2e is a field for inputting the value of the print speed setting. The print speed setting input field RA2e is a pull-down menu. The user can input the value of the print speed setting to the print speed setting input field RA2e by selecting either FAST or SLOW from the pull-down menu.

The configuration editor interface 51e also has a paper width setting area AR3e for setting the value of the paper width setting. The paper width setting area AR3e has a paper width setting input field RA3e. The paper width setting input field RA3e is a field for inputting the value of the paper width setting. The paper width setting input field RA3e is a pull-down menu. The user can input the value of the paper width setting to the paper width setting input field RA3e by selecting either 80 mm or 58 mm from the pull-down menu.

The configuration editor interface 51e also has a button B2e for confirming the input to the print density setting input field RA1e, print speed setting input field RA2e, and paper width setting input field RA3e.

The user inputs the desired values to the print density setting input field RA1e, print speed setting input field RA2e, and paper width setting input field RA3e of the configuration editor interface 51e, and then clicks the button B2e (step SY53).

Based on user input to the configuration editor interface 51e, the browser execution unit 40ae generates a change command (step SD55).

The change command is a command including printer identification information, and instructing changing the values of specific settings in the configuration data related to the printer identification information to the values the user input to the fields in the configuration editor interface 51e.

Next, the browser execution unit 40ae adds the process unit identification information of the process unit (the configuration processing unit 31e in this example) that executes the process based on the change command to the generated change command (step SD56). The browser execution unit 40ae manages the process unit identification information of the process unit that processes the change command, and based thereon adds the process unit identification information to the change command. A configuration in which the user inputs the process unit identification information is also conceivable.

Next, the browser execution unit 40ae controls the communication connection unit 41e, and sends the change command to the first print control server 10Ae (step SD57).

When the management device 14e and first print control server 10Ae communicate by HTTP, the browser execution unit 40ae makes an HTTP handshake with the first print control server 10Ae and establishes a connection in step SD57. Next, the browser execution unit 40ae controls the communication connection unit 41e to output the change command through the opened connection.

As shown in FIG. 29 (B), the communication management unit 25e controls the second connection unit 30e to receive the change command (step SE53).

Next, the communication management unit 25e acquires the process unit identification information contained in the change command (step SE54).

Next, the communication management unit 25e sends the change command to the process unit (configuration processing unit 31e in this example) identified by the process unit identification information acquired in step SE54 (step SE55).

Next, the configuration processing unit 31e runs the change settings process based on the change command (step SE56).

The change settings process is a process that changes the content of the corresponding configuration data in the configuration settings database. As described above, the configuration settings database is a database relationally storing printer identification information and configuration data for the printers 12e that connect to the first print control server 10Ae.

In the change settings process, the configuration processing unit 31e accesses the configuration settings database. Next, the configuration processing unit 31e finds the corresponding record using the printer identification information contained in the change command as the search key. Next, the configuration processing unit 31e changes the values of the settings in the configuration data of the retrieved record to the values specified in the change command.

After executing the change settings process, the configuration control data generated based on the configuration data is data reflecting the values changed based on the change command.

As described above, the content of the configuration data is changed based on a change command generated by the management device 14e.

The change of configuration data based on the change command is reflected in the settings of the printer 12e as described below at the timing described below, for example.

For example, when the configuration data is changed based on the change command, the configuration processing unit 31e of the first print control server 10Ae generates and outputs configuration control data based on the new configuration data (the configuration data after being changed) to the corresponding printer 12e. Thus comprised, when the content of the configuration data changes, the change in the content of the configuration data can be more quickly reflected in the settings of the printer 12e.

When a request is received from one printer 12e, the configuration processing unit 31e of the first print control server 10Ae generates and outputs configuration control data based on the configuration data related to the one printer 12e. In this event, the configuration processing unit 31e generates the configuration control data based on the new configuration data when the content of the configuration data changes. The printer 12e executes the configuration process based on the received configuration control data. As a result, when one printer 12e sends a request to the first print control server 10Ae, the changed content of the configuration data is reflected in the settings of the one printer 12e.

The printer 12e according to this embodiment is configured to send a request command when the power turns on. As a result, if there is a change in the content of the configuration data based on a change command before the power turns on, the changes to the content of the configuration data are reflected in the settings of the printer 12e when the power turns on. Therefore, a process that changes the plural printers 12e in the store system 11 of a particular store when the store opens for business is possible. Note that a configuration in which the printer 12e sends a request at a regular interval after the power turns on is also conceivable.

The configuration processing unit 31e of the first print control server 10Ae may also execute the following process when a request is received.

More specifically, the configuration processing unit 31e manages the current values of the settings for each printer 12e that connects to the first print control server 10Ae. When a request is received from one printer 12e, the configuration processing unit 31e determines for each setting of the one printer 12e if there is a difference between the value of the current setting in the one printer 12e, and the value indicated by the configuration data for the one printer 12e. If there is a change in the content of the configuration data based on a change command, the configuration processing unit 31e determines there is a difference.

Next, the configuration processing unit 31e generates configuration control data specifying the new value and an instruction to set the specified value to the setting for which a difference was detected. Next, the configuration processing unit 31e outputs the generated configuration control data. If the configuration processing unit 31e determines there are no settings for which the value was changed, it reports the same. This configuration minimizes the amount of configuration control data and helps improve communication efficiency.

The operation of the management device 14e, first print control server 10Ae, and printer 12e when the management device 14e controls the printer 12e to print is described next.

Figures 31A, 31B, 31C:
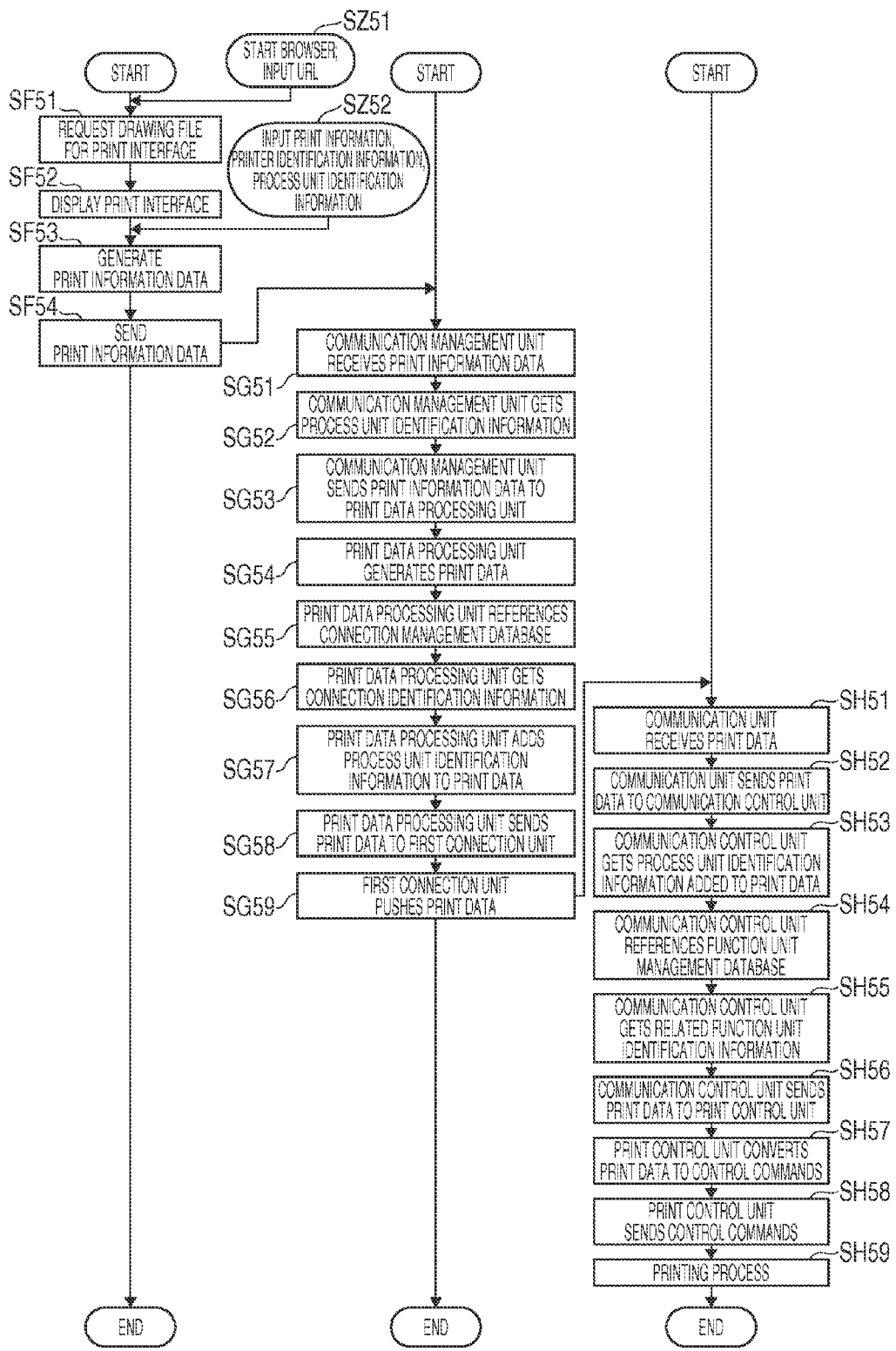
FIGS. 31A-31C are flow charts showing the operation of the management device, control server, and printer.

FIG. 31 is a flowchart showing the operation of the devices when the management device 14e controls printing by the printer 12e, (A) showing the operation the management device 14e, (B) showing the operation of the first print control server 10Ae, and (C) showing the operation of the printer 12e.

Using the flow chart in FIG. 31, asynchronous duplex communication through the first function unit communication path KT1e between the print data processing unit 27e of the first print control server 10Ae and the print control unit 17e of the printer 12e is described using as an example the print data processing unit 27e sending data (print data in this example).

As shown in FIG. 31 (A), to print from a printer 12e, the user first starts the browser on the management device 14e, and inputs a command to access a specific URL (step SZ51). This URL is the URL accessed to display a print information input interface (referred to below as the print interface) described below in the browser window. This specific URL is previously made known to the user. The URL may be a URL managed by the first print control server 10Ae, or a URL managed by another server.

In response to the user instruction in step SZ51, the browser execution unit 40ae of the management device control unit 40e of the management device 14e accesses the specified URL, and requests the drawing file for displaying the print interface (step SF51). This drawing file is a file written in markup language such as HTML (HyperText Markup Language), and is a file for displaying a web page in a browser window on the management device 14e.

Next, the browser execution unit 40ae displays the print interface based on the drawing file acquired in response to the request of step SF51 (step SF52).

The print interface is a user interface for the user to input the print information to be printed by the printer 12e. The print information may include the name of a file storing image data, or information related to where to print the image on the print medium. In the print interface, the print data processing unit 27e of the first print control server 10Ae can input information used to generate print data.

The print interface also enables the user to input the printer identification information of the printer 12e for printing, and the process unit identification information of the process unit (the print data processing unit 27e in this example) in the process units of the first print control server 10Ae to which to send the print information data for executing a process based on the print information data. Fields for inputting the print information, printer identification information, and process unit identification information are provided in the print interface, and the user inputs the print information, printer identification information, and process unit identification information to the appropriate fields.

When the user has input the print information, printer identification information, and process unit identification information to the print interface and confirms input (step SZ52), the browser execution unit 40ae runs the following process.

The browser execution unit 40ae then generates the print information data (step SF53). The print information data is data in a specific format containing the print information, printer identification information, and process unit identification information based on the input to the print interface. The print information data is in a format enabling the print data processing unit 27e of the first print control server 10Ae to execute a process based on the data.

Next, the browser execution unit 40ae controls the communication connection unit 41e and sends the print information data to the first print control server 10Ae (step SF54). In step SF54, the communication connection unit 41e opens a connection by a HTTP handshake with the first print control server 10Ae, for example, and sends the print information data through the connection.

In this embodiment of the invention the user inputs the process unit identification information to the print interface, and the process unit identification information input by the user is added to the print information data. The invention is not so limited, and a configuration in which the management device control unit 40e determines what process unit is to process the data sent to the first print control server 10Ae, and adds the process unit identification information of that process unit to the transmitted data is also conceivable. For example, the management device control unit 40e may manage the relationship between the type of data that is transmitted and the process unit that processes the data, and based on this managed relationship determine the process unit identification information to add to the data that is sent.

As shown in FIG. 31 (B), the communication management unit 25e controls the second connection unit 30e to receive the print information data (step SG51).

Next, the communication management unit 25e acquires the process unit identification information contained in the print information data (step SG52).

Next, the communication management unit 25e sends the print information data to the process unit (print data processing unit 27e in this example) identified by the process unit identification information acquired in step SG52 (step SG53).

The communication management unit 25e manages the relationships between process unit and process unit identification information, and sends data to the process unit corresponding to the process unit identification information based on the value of the process unit identification information.

The print data processing unit 27e generates print data based on the received print information data (step SG54). The print data is an XML (eXtensible Markup Language) file containing the print information to be printed by the printer 12e. The print data includes the information to be printed by the printer 12e, including image data and information identifying the location of the images on the print medium, in XML format.

The printer identification information of the printer 12e to use for printing is also written in the print data. The print data processing unit 27e adds the printer identification information to the print data based on the printer identification information contained in the print information data.

The printer identification information may be written in an area where control information is carried, such as the header of the print data, or may be written in a specific tag in the print data.

The print data processing unit 27e then accesses the connection management database stored in the control server storage unit 28b (step SG55).

Next, the print data processing unit 27e acquires the connection identification information of the WebSocket connection CT related to the received identification information from the connection management database using the printer identification information as the search key (step SG56). The connection identification information acquired here is the connection identification information of the WebSocket connection CT to the printer 12e that is to print.

Next, the print data processing unit 27e adds the process unit identification information of the print data processing unit 27e to the print data (step SG57). The print data processing unit 27e manages the process unit identification information assigned to the print data processing unit 27e.

Next, the print data processing unit 27e sends the print data to the first connection unit 26e corresponding to the connection identification information acquired in step SG56 (step SG58).

The first connection unit 26e then pushes the received print data through the WebSocket connection CT to the printer 12e (step SG59).

As shown in FIG. 31 (C), the first communication unit 16e then receives the print data through the WebSocket connection CT (step SH51).

Next, the first communication unit 16e sends the print data to the communication control unit 15e (step SH52).

The communication control unit 15e then acquires the process unit identification information added to the print data (step SH53). Next, the communication control unit 15e references the function unit management database (step SH54). Next, the communication control unit 15e gets the function unit identification information related to the identification information from the function unit management database using the process unit identification information as the search key (step SH55). Next, the communication control unit 15e sends the print data to the function unit (the print control unit 17e in this example) identified by the function unit identification information acquired in step SH55 (step SH56).

The communication control unit 15e manages the relationships between function unit identification information and function units. The communication control unit 15e can therefore send data to a particular single function unit based on the function unit identification information.

Next, the print control unit 17e converts the received print data to control commands in the command language of the print unit 18e (step SH57). More specifically, the print control unit 17b converts the print data, which is an XML file, to control commands that can be interpreted by the print unit 18e. Next, the print control unit 17e sends the control commands to the print unit 18e (step SH58).

Next, the print unit 18e prints on the print medium based on the control commands (step SH59). The print unit 18e uses the settings of the configuration file to print.

The first print control server 10Ae in this embodiment of the invention can thus send print data to the printer 12e and control the printer 12e to print when there is a need to print with the printer 12e without receiving a request from the printer 12e. Events that cause the printer 12e to print are events in which predefined conditions are met, such as when an instruction is received from the user, or a request is received from a communicatively connected external device.

This configuration also enables starting printing faster when an event requiring printing occurs than in a configuration in which the printer 12e intermittently sends a request to the first print control server 10Ae, and the first print control server 10Ae sends print data in response to such a request. Consumption of resources can also be suppressed compared with a configuration in which the first print control server 10Ae queues responses to requests.

After printing by the print unit 18e, the printer 12e, first print control server 10Ae, and management device 14e execute the following process.

The print control unit 17e generates print result data based on the result of printing by the print unit 18e. The print result data is data indicating, for example, if printing by the print unit 18e was successful or failed, and the cause of the failure if printing fails.

The print control unit 17e sends the print result data to the print data processing unit 27e through the first function unit communication path KT1e of the WebSocket connection CT. Sending data from the print control unit 17e to the print data processing unit 27e using the first function unit communication path KT1e is done using the same method as sending data from the configuration control unit 23e to the configuration processing unit 31e using the second function unit communication path KT2e.

The print data processing unit 27e sends the received print result data to the management device 14e that sent the print information data. For example, the print data processing unit 27e manages the connection used to send the print information data, and sends the print result data to the management device 14e using this connection. The browser execution unit 40ae of the management device control unit 40e of the management device 14e runs a corresponding process based on the received print result data. For example, the management device control unit 40e may display information representing the print result on the display unit 42e and report the print result to the user.

In this embodiment of the invention the control server 10c has process units with different functions, the print data processing unit 27e and the configuration processing unit 31e.

The effect of this is described below.

That is, as described above, when print result data is received, the print data processing unit 27e sends the received print result data to the management device 14e that sent the print information data. As a result, the management device 14e that instructed printing can get the result of printing. When a request is received from the printer 12e, the configuration processing unit 31e generates and outputs configuration control data to the printer 12e.

The method of processing received data, particularly how to handle the data in relation to the management device 14e, differs for the print data processing unit 27e and the configuration processing unit 31e. Based on this, the first print control server 10Ae has a configuration processing unit 31e as a process unit separate from the print data processing unit 27e. Note that with this method, data sent by the print control unit 17e is sent to the print data processing unit 27e, and data sent by the configuration control unit 23e is sent to the configuration processing unit 31e.

As described above, the print control system 1e according to this embodiment has a first print control server 10Ae (print control device), a gateway server 60e, and a printer 12e.

The first print control server 10Ae has a print data processing unit 27e that generates print data, and a first connection unit 26e (connection unit) that sends the print data generated by the print data processing unit 27e.

The gateway server 60e has a gateway server storage unit 62e (server storage unit) that stores device address information identifying the address of the first print control server 10Ae, and a gateway server control unit 61e (control unit) that outputs device address information in response to an address information request.

The printer 12e has a print unit 18e that prints; a printer storage unit 19e (device storage unit) that stores server address information identifying the address of the gateway server 60e; a communication control unit 15e that sends the address information request to the gateway server 60e of the address identified by the server address information stored by the printer storage unit 19e, and establishes a WebSocket connection CT for asynchronous duplex communication with the first print control server 10Ae at the address identified by the device address information received in response to the request; a first communication unit 16e that receives print data by the WebSocket connection CT; and a print control unit 17e that controls the print unit 18e based on the print data received by the first communication unit 16e.

Thus comprised, the printer 12e stores the address of the gateway server 60e. When a WebSocket connection CT is established with the print control server, the printer 12e queries the gateway server 60e for the address of the print control server, and based on the address acquired by this query establishes a WebSocket connection CT with the print control server. As a result, to open a WebSocket connection CT with the print control server, the printer 12e can simply access the gateway server 60e, and does not need to manage the address of the print control server. Therefore, if the print control server for connecting a WebSocket connection CT has changed when the user installs a printer 12e to a store system 11 or establishes a WebSocket connection CT, the user does not need to input the address of the print control server. In addition, the first print control server 10Ae can exchange print data with the printer 12e by an asynchronous duplex WebSocket connection CT. As a result, when an event triggering printing with the printer 12e occurs, the first print control server 10Ae can send the print data to the printer 12e to execute the printing process.

The print control system 1e according to this embodiment of the invention also has a second print control server 10Be (second print control device). The gateway server storage unit 62e relationally stores the printer identification information of the printer with the first device address information of the first print control server 10Ae or the second device address information of the second print control server 10Be.

The communication control unit 15e of the printer 12e sends the printer identification information when sending the address information request. When an address information request and printer identification information are received, the gateway server control unit 61e of the gateway server 60e sends whichever of the first device address information and second device address information is related to the received printer identification information.

Thus comprised, when an address information request is received from the printer 12e, the gateway server 60e can send the address of the device with which the printer 12e established a WebSocket connection CT, that is, first print control server 10Ae or second print control server 10Be, to the printer 12e based on the printer identification information received with the request and information stored by the gateway server storage unit 62e.

In this embodiment of the invention, the communication control unit 15e of the printer 12e sends an address information request when the printer 12e power turns on.

Thus comprised, the printer 12d can acquire the address of the related print control server without user intervention when the power turns on, and can establish a WebSocket connection CT with the related print control server.

The first print control server 10Ae in this embodiment of the invention also has a configuration processing unit 31e that generates configuration control data. The configuration control unit 23e of the printer 12e runs a configuration process that sets device settings related to the print unit 18e based on the configuration control data.

Thus comprised, the first print control server 10Ae generates and outputs configuration control data to the printer 12e by a function of the configuration processing unit 31e, and the printer 12e runs a configuration process based on the configuration control data using a function of the configuration control unit 23e. As a result, the first print control server 10Ae can change the settings of the printer 12e using a configuration that communicates with the printer 12e through a network GN.

When a WebSocket connection CT is opened in this embodiment of the invention, the configuration control unit 23e of the printer 12e sends a request for the configuration control data through the connection.

Thus comprised, the printer 12e can run a configuration process based on the configuration control data when the WebSocket connection CT is established. In addition, after the WebSocket connection CT is established, the printer 12e can execute a printing process reflecting the current settings.

The communication control unit 15e of the printer 12e in this embodiment of the invention sends print data sent from the first print control server 10Ae to the print control unit 17e, and sends configuration control data sent from the first print control server 10Ae to the configuration control unit 23e.

Thus comprised, the printer 12e can send print data to the print control unit 17e for printing, and can send configuration control data to the configuration control unit 23e to run a configuration process, by a function of the communication control unit 15e.

The invention is described above with reference to a preferred embodiment thereof, but the invention is not limited thereto and can be modified and adapted in many ways without departing from the scope of the accompanying claims.

In the embodiment described above the printer 12e is installed as part of a store system 11 deployed in a business. However, the printer 12e is not limited to being part of a store system 11, and can be used in other systems.

In addition, print data is sent as an XML file from the control server 10e to the printer 12e in the foregoing embodiment, but the data format of the print data is not limited to XML. The print data may be data created in another markup language, or control commands in the command language of the print unit 18e.

The function blocks shown in FIG. 26 can also be rendered as desired using hardware and software, and do not suggest a specific hardware configuration. Functions of the printer 12e may also be rendered by a separate externally connected device. The printer 12e can also execute the processes described above by running a program stored on an externally connected storage medium.

Embodiment 6

A sixth embodiment of the invention is described next. The print control system if according to the sixth embodiment of the invention includes a control server 10f (print control device), a printer 12f, and a management device 14f. The control server 10f, printer 12f, and management device 14f connect over a network GN in the same way as the control server 10, printer 12, and management device 14 in the first embodiment. A communication path established between the control server 10f and printer 12f is the same as the communication path established between the control server 10 and printer 12 in FIG. 2.

Figure 32:
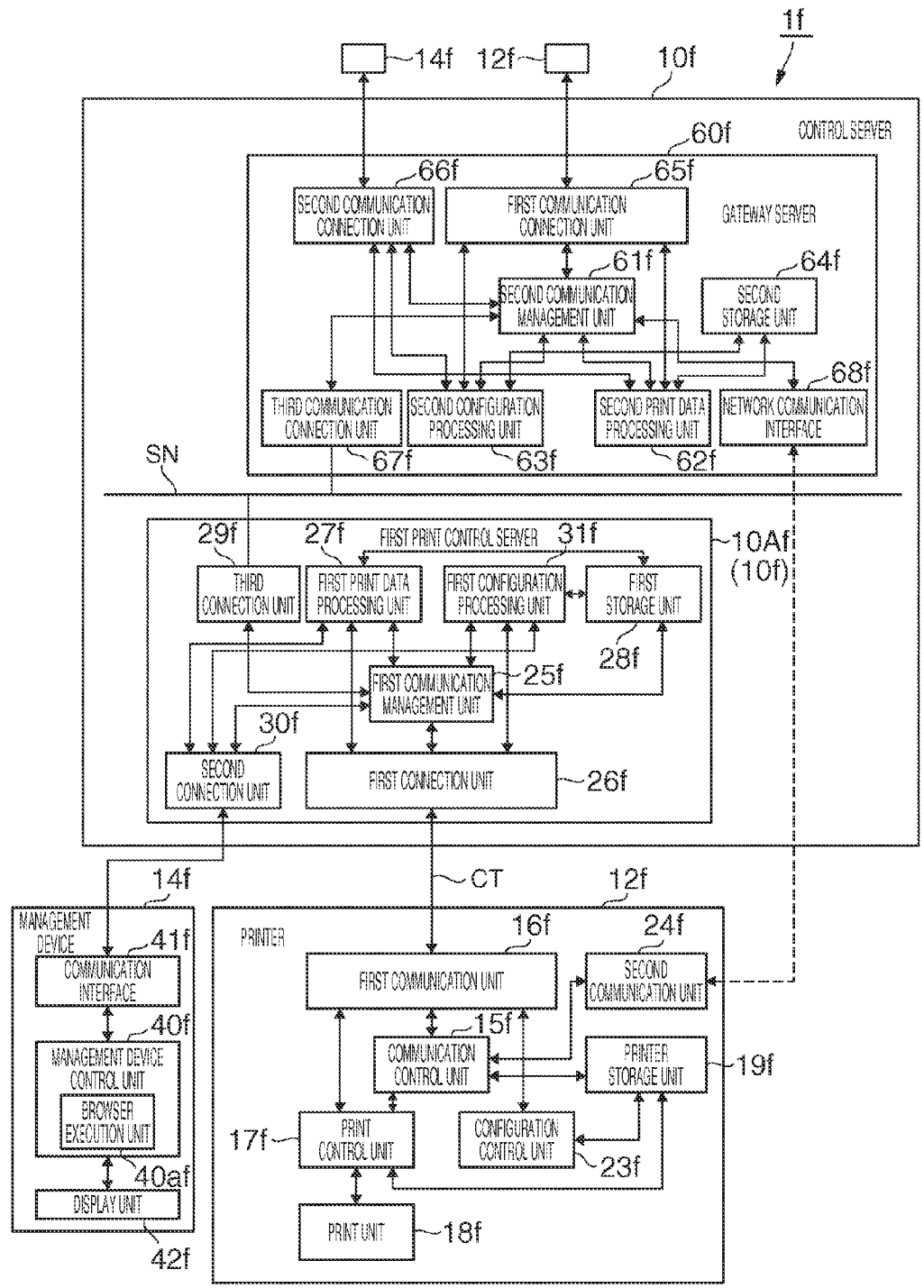
FIG. 32 is a block diagram showing the functional configuration of a printer, control server, and management device in a sixth embodiment of the invention.

FIG. 32 is a block diagram showing the functional configuration of the printer 12f, the control server 10f, and the management device 14f.

As shown in FIG. 32, the printer 12f includes a communication control unit 15f, a first communication unit 16f, a print control unit 17f, a print unit 18f, a configuration control unit 23f, a printer storage unit 19f (device storage unit), and a second communication unit 24f.

The functions of the communication control unit 15f, first communication unit 16f, print control unit 17f, and configuration control unit 23f are described below.

The print unit 18f includes mechanisms related to printing, such as a print mechanism that prints on print media, a conveyance mechanism that conveys the print media, and a cutting mechanism that cuts the print media, and control boards related to controlling the mechanisms.

The printer storage unit 19f is nonvolatile memory, and stores data. Server address data, printer identification information, and a function unit management database further described below are stored in the printer storage unit 19f.

The second communication unit 24f communicates with external devices including a gateway server 60f described below through a network GN according to a specific communication protocol.

When not differentiating between the print control unit 17f and the configuration control unit 23f below, these function blocks are referred to as function units.

The printer 12f has two function units, a print control unit 17f and a configuration control unit 23f.

As shown in FIG. 32, the control server 10f includes a print control server 10Af (print control device) and a gateway server 60f. The control server 10f may have a plurality of print control servers 10Af. The print control server 10Af and gateway server 60f are communicatively connected through a server network SN configured including a LAN or other network.

As shown in FIG. 32, the print control server 10Af includes a first communication management unit 25f, a first connection unit 26f (connection unit), first print data processing unit 27f, first configuration processing unit 31*f*, first storage unit 28*f* (storage unit), a second connection unit 30*f*, and a third connection unit 29*f*.

The functions of the first communication management unit 25*f*, the first connection unit 26*f*, the first print data processing unit 27*f*, and the first configuration processing unit 31*f* are described further below.

The first storage unit 28*f* is nonvolatile memory, and stores data. A connection management database, process unit management database, and a configuration settings database are stored in the first storage unit 28*f* as described further below.

The second connection unit 30*f* communicates with the management device 14*f* by HTTP as controlled by the first communication management unit 25*f*. More specifically, a web browser is installed on the management device 14*f*, and the second connection unit 30*f* connects by HTTP with the management device 14*f*.

The third connection unit 29*f* communicates with other devices in the control server 10*f* according to a specific communication protocol through the server network SN.

When not differentiating between the first print data processing unit 27*f* and the first configuration processing unit 31*f* below, these function blocks are referred to generically as process units. The control server 10*f* has two process units, the first print data processing unit 27*f* and the first configuration processing unit 31*f*.

As shown in FIG. 32, the gateway server 60*f* includes a second communication management unit 61*f* (communication management unit), a second print data processing unit 62*f*, a second configuration processing unit 63*f*, a second storage unit 64*f* (server storage unit), a first communication connection unit 65*f* (communication connection unit), a second communication connection unit 66*f*, a third communication connection unit 67*f*, and a network communication interface 68*f*.

The functions of the first communication connection unit 65*f*, second print data processing unit 62*f*, and second configuration processing unit 63*f* are the same as the functions of the first connection unit 26*f*, first print data processing unit 27*f*, and first configuration processing unit 31*f* of the print control server 10Af, and are described below. The function of the second communication management unit 61*f* is also described below.

The second communication connection unit 66*f* communicates by HTTP with the management device 14*f* as controlled by the second communication management unit 61*f*.

The third communication connection unit 67*f* communicates as controlled by the second communication management unit 61*f* with other devices of the control server 10*f* according to a specific communication protocol through the server network SN.

The second storage unit 64*f* stores a control server management database in addition to the same data as the first storage unit 28*f* as described further below.

The network communication interface 68*f* communicates with external devices, including the 12*f*, through the network GN according to a specific communication protocol.

As shown in FIG. 32, the management device 14*f* includes a management device control unit 40*f*, a communication interface 41*f*, and a display unit 42*f*.

The management device control unit 40*f* includes CPU, and controls the management device 14*f*. One function block of the management device control unit 40*f* is a browser execution unit 40*ae*. The browser execution unit 40*ae* is a function block rendered by a function of a web browser.

The communication interface 41*f* communicates by HTTP as controlled by the management device control unit 40*f* with the print control server 10Af.

The display unit 42*f* has an LCD or other type of display panel, and displays images on the display panel as controlled by the management device control unit 40*f*.

Note that FIG. 32 shows the relationship between the print control server 10Af and one printer 12*f* connected to the print control server 10Af. When plural printers 12*f* are connected to the print control server 10Af, the print control server 10Af has the same number of WebSocket interfaces as there are printers 12*f*, establishes a WebSocket connection CT with each printer 12*f*, and communicates by WebSocket protocol through the connections to each printer 12*f*.

FIG. 32 also shows the relationship between the print control server 10Af and one management device 14*f* connected to the print control server 10Af. When management devices 14*f* are connected to the print control server 10Af, the print control server 10Af has the same number of second connection units 30*f* as there are management device 14*f*, and communicates with each management device 14*f*.

This also applies to the gateway server 60*f*, the printer 12*f*, and the management device 14*f*.

The operation of the printer 12*f*, gateway server 60*f*, and print control server 10Af when the printer 12*f* power turns on is described next.

Figure 33A:
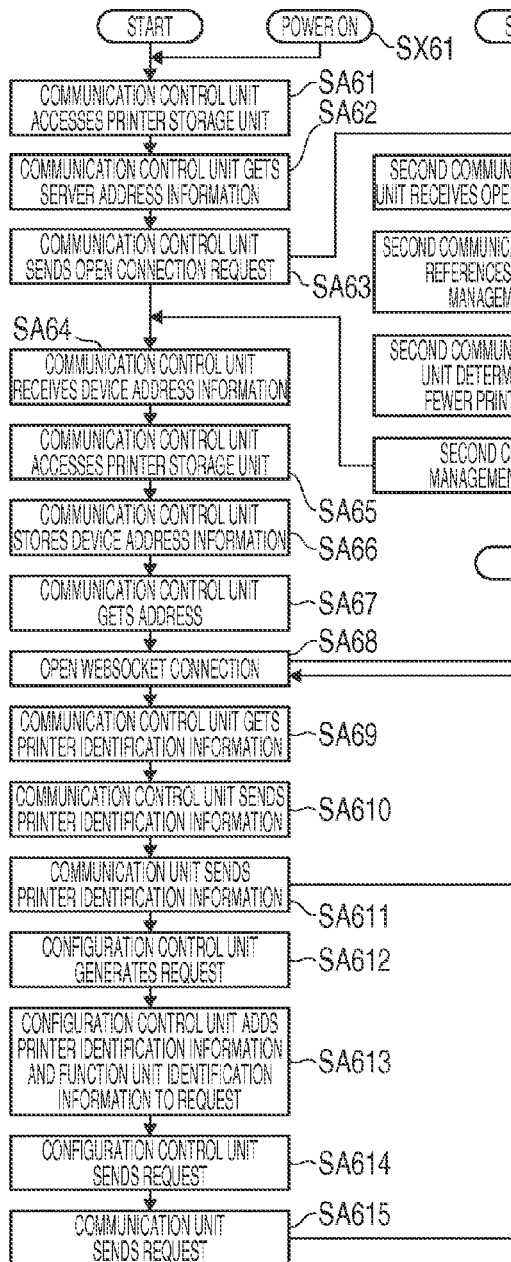
FIGS. 33A-33C are flow charts showing the operation of the printer and control server.
Figure 33B:
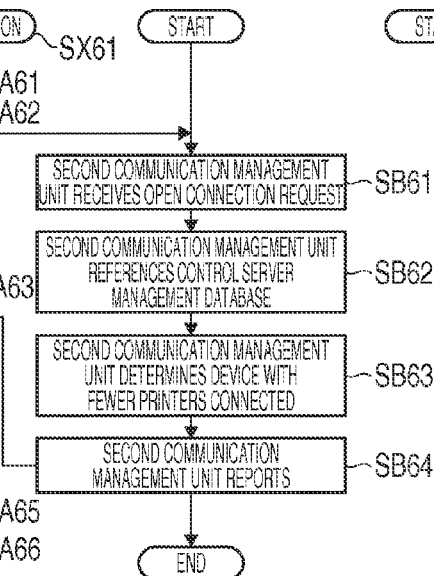
Figure 33C:
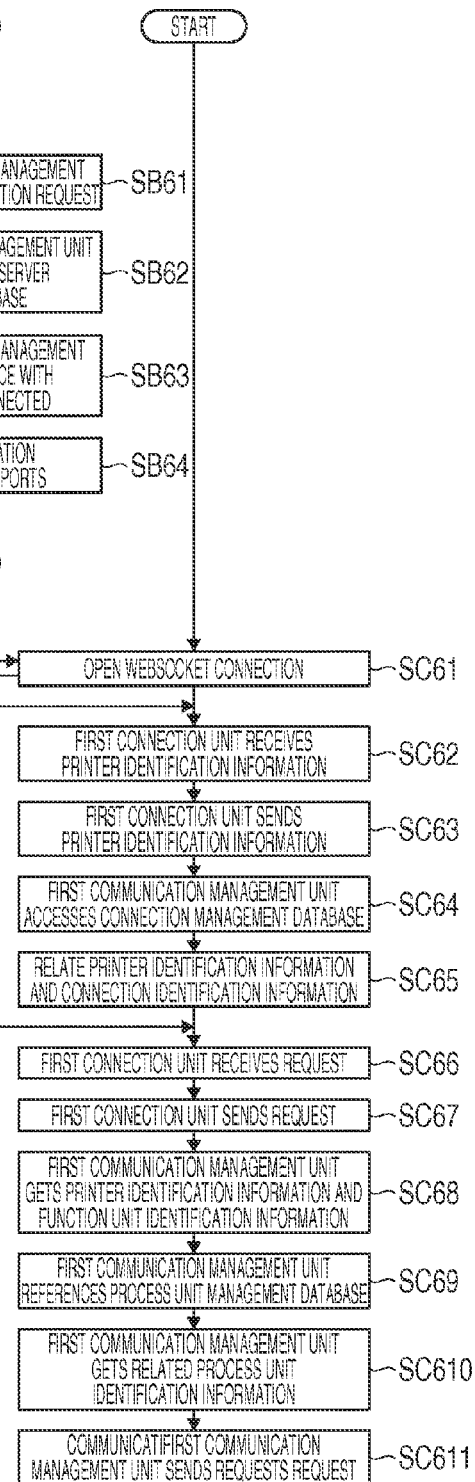
Figures 34A, 34C:
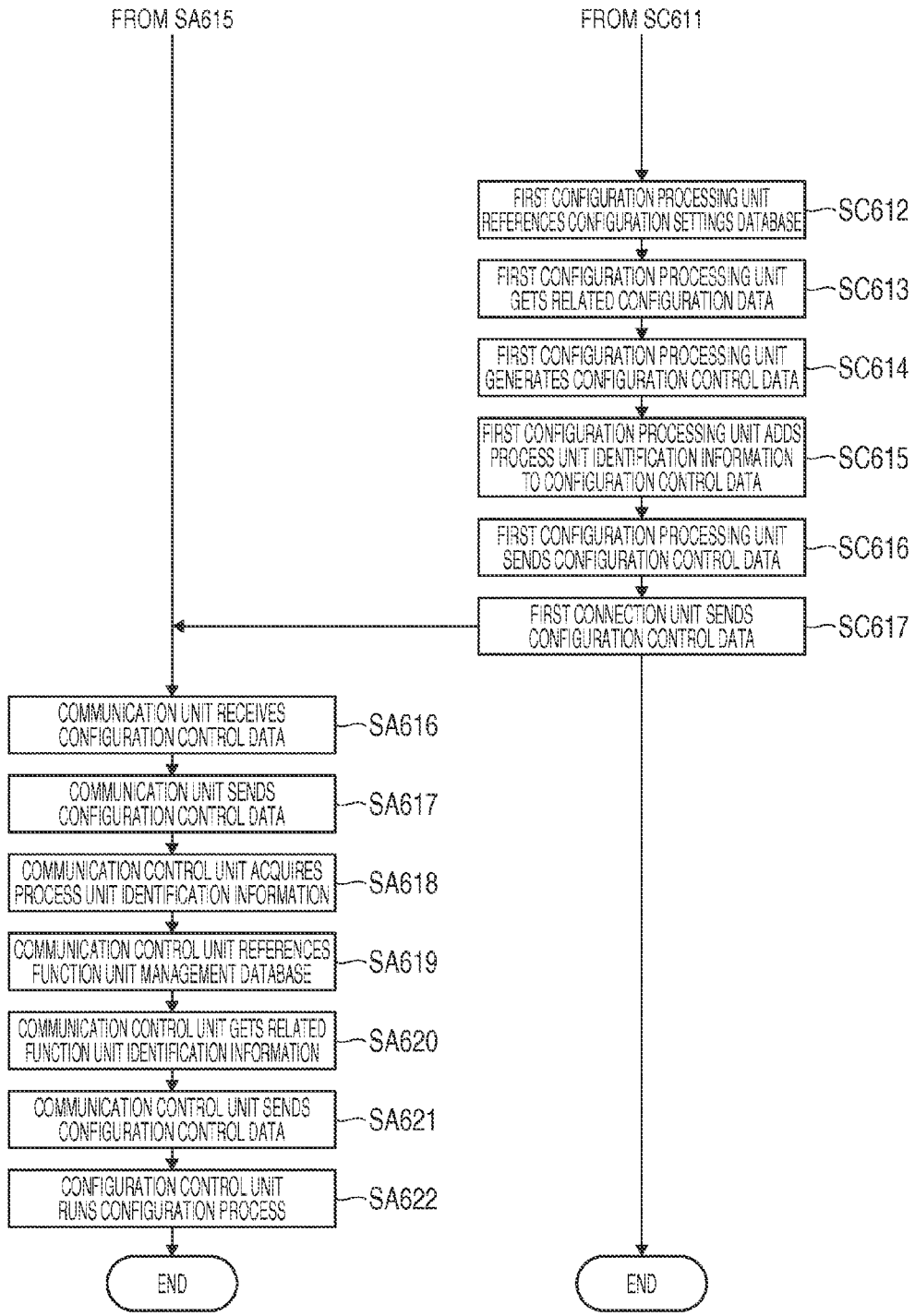
FIGS. 34A and 34C are flow charts showing the operation of the printer and control server.

FIG. 33 and FIG. 34 are a flow chart showing the operation of the printer 12*f*, the gateway server 60*f*, and the print control server 10Af after the printer 12*f* power turns on. In the figures, column (A) shows the operation of the printer 12*f*, (B) shows the operation of the gateway server 60*f*, and (C) shows the operation of the print control server 10Af.

The trigger of the process shown in the flow chart in FIG. 33 and FIG. 34 is not limited to the power turning on. For example, this process may be triggered by the printer 12*f* communicatively connecting to the network GN, or by an instruction from a user.

Note that in the operation described below the printer 12*f* is connected to the local area network LN of the store system 11 in which it is used, and can access the network GN.

The functions of the function blocks of the communication control unit 15*f*, print control unit 17*f*, and configuration control unit 23*f* of the printer 12*f*; the first communication management unit 25*f*, the first print data processing unit 27*f*, and the first configuration processing unit 31*f* of the print control server 10Af; and the second communication management unit 61*f*, second print data processing unit 62*f*, and second configuration processing unit 63*f* of the gateway server 60*f* are embodied as described below.

More specifically, these function blocks are software objects. An object is an instance created in an object-oriented programming language, and more specifically is a software function block defined by a set of data and methods. The function of a particular function block is rendered by calling (invoking) a method of the function block.

The functions of these function blocks may also be rendered by the CPU or other hardware assets reading and running an application. Configurations in which the function of a single function block is rendered by a single application, configurations in which the function of plural function blocks are rendered by a single application, and configurations in which the function of a single function block is rendered by plural applications, are possible.

In other words, the function blocks represent functions as conceptual blocks, and do not mean any specific application or hardware construction.

As shown in FIG. 33 (A), when the printer 12*f* power turns on (step SX61), the communication control unit 15*f* of the printer 12*f* accesses the printer storage unit 19*f* (step SA61) and gets the server address data stored in the printer storage unit 19*f* (step SA62). The server address data is data identifying the address of the gateway server 60*f*.

Next, the communication control unit 15*f* controls the second communication unit 24*f* to access the gateway server 60*f* of the address indicated by the server address data acquired in step SA62, and sends an open connection request (step SA63). This open connection request is a command requesting the gateway server 60*f* to establish a WebSocket connection CT with either the gateway server 60*f* or one of the print control servers of the control server 10*f*.

As shown in FIG. 33 (B), the second communication management unit 61*f* of the gateway server 60*f* controls the second communication interface 64*f* to receive the address information request and printer identification information (step SB61).

Next, the second communication management unit 61*f* references the control server management database stored by the second storage unit 64*f* (step SB62).

The control server management database is a database that stores information indicating the number of printers 12*f* that have established a WebSocket connection CT with the gateway server 60*f* and the print control server 10Af. By referencing the control server management database, the second communication management unit 61*f* can therefore know the number of printers 12*f* connected to the gateway server 60*f*, and the number of printers 12*f* connected to the print control server 10Af.

The second communication management unit 61*f* manages the number of printers 12*f* connected to the gateway server 60*f* and print control server 10Af, and updates the control server management database accordingly.

The second communication management unit 61*f* manages the number of printers 12*f* connected to the gateway server 60*f* based on the content of the connection management database described further below.

The second communication management unit 61*f* manages the number of printers 12*f* connected to the print control server 10Af as described below, for example. The second communication management unit 61*f* may regularly query each print control server 10Af for the number of printers 12*f* that have established a WebSocket connection CT with that server. Based on the response to the query, the second communication management unit 61*f* manages the number of printers 12*f* connected to the print control server 10Af. The print control server 10Af may also inform the gateway server 60*f* when a new printer 12*f* is connected or when the connection of a connected printer 12*f* is cut. Based on the received report, the second communication management unit 61*f* then manages the number of printers 12*f* connected to the print control server 10Af.

Next, based on the content of the control server management database, the second communication management unit 61*f* determines whether fewer printers 12*f* are connected to the gateway server 60*f* or the print control server 10Af (step SB63).

The processor load (the CPU load, communication load, and other loads) is probably lower on the device with fewer connected printers 12*f* than on the device with more. This is because the device must execute the processes corresponding to the connected printers 12*f*, but because the number of connected printers 12*f* is smaller, the number of executed processes is also less.

In step SB64, the second communication management unit 61*f* runs the following process.

If the device identified in step SB63 is the gateway server 60*f*, the second communication management unit 61*f* sends data (referred to below as server address information data) including the server address information identifying the address of the gateway server 60*f* to the printer 12*f*. In this event as described further below, a WebSocket connection CT is established between the gateway server 60*f* and printer 12*f*, and the printer 12*f* runs processes including a printing process as controlled by the gateway server 60*f*. If the device identified in step SB63 is the gateway server 60*f*, the second communication management unit 61*f* sends data corresponding to the server address information data, such as data instructing establishing a WebSocket connection CT with the gateway server 60*f*.

However, if the device identified in step SB63 is the print control server 10Af, the second communication management unit 61*f* sends data (referred to below as device address information data) including the device address information identifying the address of the print control server 10Af to the printer 12*f*. In this event, a WebSocket connection CT is established between the print control server 10Af and printer 12*f*, and the printer 12*f* runs processes including a printing process as controlled by the print control server 10Af. The second storage unit 64*f* of the gateway server 60*f* stores the device address information data.

The gateway server 60*f* in this embodiment of the invention executes the following process when a request to establish a WebSocket connection CT is received from the printer 12*f*. The gateway server 60*f* requests establishing a WebSocket connection CT with whichever of the gateway server 60*f* and the print control servers (print control server 10Af in this example) of the control server 10*f* is expected to have the lowest processor load. This enables distributing the processor load of the control server 10*f*, thereby improving communication efficiency and processing efficiency. It will be obvious that other factors may also be considered when determining the device expected to have a low processor load, including the specifications of the devices, the current processor load, the expected processor load, and other conditions.

In this example, the number of printers 12*f* connected to the print control server 10Af is smaller than the number of printers 12*f* connected to the gateway server 60*f*. The second communication management unit 61*f* therefore identifies the print control server 10Af as the device with fewer connected printers 12*f* in step SB63, and in step SB64 sends the device address information data to the printer 12*f*.

A method whereby the printer 12*f* and print control server 10Af establish a communication path, and the printer 12*f* executes a configuration process as controlled by the print control server 10Af after the communication path is opened is described below. Note, however, that when the number of printers 12*f* connected to the gateway server 60*f* is smaller, and the gateway server 60*f* sends the server address information data to the printer 12*f* in step SB64, the printer 12*f* and gateway server 60*f* execute the same process as described below. The gateway server 60*f* has the ability to execute the same process as the print control server 10Af described below.

In step SB64, the second communication management unit 61*f* of the gateway server 60*f* outputs the device address information data identifying the address of the print control server 10Af.

As shown in FIG. 33 (A), the communication control unit 15*f* of the printer 12*f* controls the second communication unit 24*f* and receives the device address information data (step SA64).

Next, the communication control unit 15*f* accesses the printer storage unit 19*f* (step SA65), and stores the device address information data that was received in the printer storage unit 19*f* (step SA66).

Next, the communication control unit 15*f* acquires the address identified by the device address information data stored in the printer storage unit 19*f* (step SA67).

Next, the communication control unit 15*f* accesses the print control server 10Af based on the address of the print control server 10Af identified by the device address information data. The communication control unit 15*f* communicates with the first communication management unit 25*f* of the print control server 10Af, and establishes a WebSocket connection CT between the first communication unit 16*f* and the first connection unit 26*f* (step SA68, step SC51). The printer 12*f* thus establishes a WebSocket connection CT when triggered by the power turning on without receiving a user instruction or a request from the print control server 10Af. Establishing a WebSocket connection CT is done according to the WebSocket protocol.

The communication unit 16*f* and first connection unit 26*f* are WebSocket interfaces enabling data communication based on the WebSocket protocol and methods. These function blocks are instantiated using a WebSocket Socket.IO library, for example.

More specifically, the first communication unit 16*f* has functions for processing data that is received from the communication control unit 15*f*, the print control unit 17*f*, and the configuration control unit 23*f* according to WebSocket, and sending the data through the WebSocket connection CT based on WebSocket methods. The first connection unit 26*f* also has functions for processing data that is received through the WebSocket connection CT according to WebSocket, and outputting to the communication control unit 15*f*. The first connection unit 26*f* and first communication connection unit 65*f* are similarly configured.

By establishing a WebSocket connection CT, the printer 12Ac and print control server 10Af can communicate through an asynchronous, duplex communication link. More specifically, the print control server 10Af can push data to the printer 12*f* through the WebSocket connection CT without receiving a request from the printer 12*f* operating as a client.

By establishing a WebSocket connection CT, a first function unit communication path KT1f based on the WebSocket connection CT is established between the print control unit 17*f* of the printer 12*f*, and the first print data processing unit 27*f* of the print control server 10Af. The first function unit communication path KT1f is a logical communication path for data communication between the print control unit 17*f* and first print data processing unit 27*f*. The print control unit 17*f* and first print data processing unit 27*f* can communicate by asynchronous duplex communication through the first function unit communication path KT1f. Asynchronous duplex communication through the first function unit communication path KT1f is described further below.

By establishing a WebSocket connection CT, a second function unit communication path KT2f based on the WebSocket connection CT is established between the configuration control unit 23*f* of the printer 12*f*, and the first configuration processing unit 31*f* of the print control server 10Af. The second function unit communication path KT2f is a logical communication path for data communication between the configuration control unit 23*f* and the first configuration processing unit 31*f*. The configuration control unit 23*f* and the first configuration processing unit 31*f* can communicate by asynchronous duplex communication through the second function unit communication path KT2f.

Asynchronous duplex communication through the second function unit communication path KT2f is described further below.

Next, communication control unit 15*f* accesses the printer storage unit 19*f* and gets the printer identification information stored in the printer storage unit 19*f* (step SA69).

Next, the communication control unit 15*f* sends the acquired printer identification information data to the first communication unit 16*f* (step SA610).

The first communication unit 16*f* then sends the received printer identification information through the WebSocket connection CT to the print control server 10Af (step SA611).

As shown in FIG. 33 (C), the first connection unit 26*f* of the print control server 10Af receives the printer identification information through the WebSocket connection CT (step SC62).

Next, the first connection unit 26*f* sends the received printer identification information data to the first communication management unit 25*f* (step SC63).

The first communication management unit 25*f* accesses the connection management database stored in the first storage unit 28*f* (step SC64). The connection management database is a database relationally storing for the WebSocket connections CT that were established connection identification information identifying the WebSocket connection CT and the printer identification information of the printer.

Next, the first communication management unit 25*f* creates one record in the connection management database. The first communication management unit 25*f* then stores in the created record the connection identification information of the WebSocket connection CT established in step SC61 related to the printer identification information indicated by the identification data received in step SC62 identification information (step SC65).

Note that when a WebSocket connection CT is opened, the first communication management unit 25*f* generates connection identification information for that connection that is different from the connection identification information of any other WebSocket connection CT that was already opened. The print control server 10Af manages the relationships between WebSocket connections CT and printers 12*f* by the process of step SC65.

The printer 12*f* thus establishes a WebSocket connection CT when triggered by the power turning on without receiving a user instruction or a request from the print control server 10Af. Thus comprised, the user does not need to perform a complicated operation to open a WebSocket connection CT. Special knowledge is also not needed to open a WebSocket connection CT. After the power turns on, the printer 12*f* can also be quickly enabled to execute processes as controlled by the print control server 10Af.

As shown in FIG. 33 (A), the configuration control unit 23*f* of the printer 12*f* generates a request (step SA612). This request is a command requesting the print control server 10*f* to send configuration control data (described below). The request conforms to a specific format.

Next, the configuration control unit 23*f* adds the printer identification information and the function unit identification information of the configuration control unit 23*f* to the generated request (step SA613). The function unit identification information is identification information identifying a particular function unit of the printer 12*f*. A different value is assigned as the function unit identification information of the print control unit 17f and the configuration control unit 23f of the printer 12f. In step SA613, the configuration control unit 23f references the printer identification information stored in the printer storage unit 19f, and based on this data adds the printer identification information to the request. The configuration control unit 23f also manages the function unit identification information assigned to the configuration control unit 23f, and based thereon adds the function unit identification information to the request.

Next, the configuration control unit 23f sends the request to the first communication unit 16f (step SA614).

The first communication unit 16f sends the request to the print control server 10Af through the WebSocket connection CT (step SA615).

As shown in FIG. 33 (C), the first connection unit 26f of the print control server 10Af receives the request through the WebSocket connection CT (step SC66).

Next, the first connection unit 26f sends the received request to the first communication management unit 25f (step SC67).

The first communication management unit 25f then acquires the printer identification information and the function unit identification information added to the request (step SC68).

Next, the first communication management unit 25f references the process unit management database stored by the first storage unit 28f (step SC69). The process unit management database is a database that relationally stores a set of printer identification information and function unit identification information with process unit identification information.

Next, the first communication management unit 25f acquires the process unit identification information related to this set of identification information from the process unit management database using the printer identification information and function unit identification information acquired in step SC68 as the search key (step SC610). The process unit identification information is identification information of a process unit of the print control server 10Af. A different value is therefore assigned to the first print data processing unit 27f and the first configuration processing unit 31f of the print control server 10Af.

Next, the first communication management unit 25f sends the request (step SC611) to the process unit identified by the process unit identification information acquired in step SC610 (first configuration processing unit 31f in this example). Note that the first communication management unit 25f manages the relationships between process unit and process unit identification information, and can send data to the process unit corresponding to the process unit identification information based on the value of a single process unit identification information value.

As shown in FIG. 34 (C), when a request is received, the first configuration processing unit 31f of the print control server 10Af references the configuration settings database stored by the first storage unit 28f (step SC612).

The configuration settings database relationally stores printer identification information and configuration data for each printer 12f connected to the print control server 10Af.

The configuration data is information relating one or a plurality of settings related to the print unit 18f of the printer 12f to the value of that setting.

Configurable settings of the printer 12f in this embodiment of the invention include a print density setting, which is a setting related to the image density when printing; a print speed setting, which relates to the speed of printing; and a paper width setting, which is a setting related to the width of the print medium (roll paper in this example) that is set in the printer 12f. The settings are not limited to those described in this embodiment, and may further include network-related settings, audio-related settings when the device has an audio output function, and other settings.

Values available as the print density setting of the printer 12f according to this embodiment include DARK indicating the print density is dark, and LIGHT indicating the print density is light. Values available as the print speed setting of the printer 12f according to this embodiment include FAST indicating a high print speed, and SLOW indicating a low print speed. Values available as the paper width setting of the printer 12f according to this embodiment include 80 mm indicating the width of the installed roll paper is 80 mm, and 58 mm indicating the width of the installed roll paper is 58 mm.

For example, the configuration data may be information relating the print density setting and DARK, the print speed setting and FAST, and the paper width setting and 80 mm.

Next, the first configuration processing unit 31f acquires the configuration data related to the identification information from the configuration settings database using the printer identification information added to the request as the search key (step SC613).

Next, the first configuration processing unit 31f generates the configuration control data based on the acquired configuration data (step SC614).

The configuration control data specifies the values of specific settings, and is data instructing setting the values of the configuration items to the specified values in the configuration control unit 23f of the printer 12f. In this example, the configuration control data is data instructing setting the print density setting to DARK, the print speed setting to FAST, and the paper width setting to 80 mm.

Next, the first configuration processing unit 31f adds the process unit identification information to the configuration control data (step SC615). The first configuration processing unit 31f manages the process unit identification information assigned to the first configuration processing unit 31f.

Next, the first configuration processing unit 31f sends the configuration control data to the first connection unit 26f (step SC616).

The first connection unit 26f then sends the received configuration control data through the WebSocket connection CT to the printer 12f (step SC617).

As shown in FIG. 34 (A), the first communication unit 16f of the printer 12f receives the configuration control data through the WebSocket connection CT (step SA616). Next, the first communication unit 16f sends the configuration control data to the communication control unit 15f (step SA617).

The communication control unit 15f then acquires the process unit identification information added to the configuration control data (step SA618).

Next, the communication control unit 15f references the function unit management database (step SA619).

The function unit management database is a database that relationally stores the function unit identification information, which is the identification information of the function units of the printer 12f, and the process unit identification information of the corresponding process unit.

When there is a 1:1 correspondence between the function unit and process unit, the one function unit can process the data sent by the one process unit, and the one process unit can process data sent by the one function unit. The one process unit can therefore send data to the corresponding one function unit for processing by the one function unit using a function of the one function unit. The one function unit can also send data to the corresponding one process unit for processing by the one process unit using a function of the one process unit. In this example, the print control unit 17f of the printer 12f is related to the first print data processing unit 27f of the print control server 10Af. The configuration control unit 23f of the printer 12f is also related to the first configuration processing unit 31f of the print control server 10Af.

Next, the communication control unit 15f acquires the function unit identification information related to the process unit identification information from the function unit management database using the process unit identification information acquired in step SA618 as the search key (step SA620).

Next, the communication control unit 15f sends the configuration control data to the function unit identified by the function unit identification information acquired in step SA620 (the configuration control unit 23f in this example) (step SA621). The communication control unit 15f manages the relationships between function unit identification information and function units. Therefore, based on the acquired function unit identification information, the communication control unit 15f can send data to the function unit identified by the one function unit identification information.

Based on the received configuration control data, the configuration control unit 23f executes the configuration process (step SA622).

The configuration process is a process in which the configuration control unit 23f sets specific configuration settings to the values specified by the configuration control data.

In this example, the printer storage unit 19f of the printer 12f stores a configuration file containing information relating settings to their corresponding values. In the configuration process of step SA616, the configuration control unit 23f accesses the configuration file, and rewrites the content of the configuration file so that the settings are set to the corresponding values specified in the configuration control data. The configuration process may be a process of changing the values of variables related to settings defined in a program.

As described above, a WebSocket connection CT is established between the printer 12f and the print control server 10Af triggered by the printer 12f power turning on in this embodiment of the invention. After the WebSocket connection CT is established, the printer 12f requests transmission of the configuration control data through the connection, and the print control server 10Af sends the configuration control data in response to the request. The printer 12f then runs a configuration process based on the received configuration control data. As a result, the printer 12f can set the values corresponding to specific settings without receiving a user instruction or request from the print control server 10Af. The user therefore does not need to make settings manually, and the user requires no special knowledge to configure settings.

After the WebSocket connection CT is established, the first configuration processing unit 31f of the print control server 10Af and the configuration control unit 23f of the printer 12f can communicate by asynchronous duplex communication through the second function unit communication path KT2f based on the WebSocket connection CT.

As described above, the first communication management unit 25f of the print control server 10Af sends the received request to the first configuration processing unit 31f. Thus comprised, requests received by the print control server 10Af are sent to the first configuration processing unit 31f, and the appropriate process is run by the first configuration processing unit 31f. Likewise, the communication control unit 15f of the printer 12f sends the received configuration control data to the configuration control unit 23f. Thus comprised, configuration control data received by the printer 12f is sent to the configuration control unit 23f, and the appropriate process is run by the configuration control unit 23f.

In this embodiment of the invention, the printer 12f stores the address of the gateway server 60f. As described further below, the gateway server 60f has a function for controlling the printer 12f by generating and sending print data. When establishing a WebSocket connection CT, the printer 12f requests the gateway server 60f of the stored address to establish a communication path. Based on the processor load of the print control server 10Af with a control function and the gateway server 60f, the gateway server 60f establishes a communication path between the printer 12f and the device expected to have the lighter processor load.

The effect of this configuration is described below.

Because the printer 12f establishes a WebSocket connection CT with the device expected to have the lower processor load, the processor load of the control server 10f can be distributed, and communication efficiency and processing efficiency can be improved.

The printer 12f also establishes a WebSocket connection CT with the related print control server using a function of the gateway server 60f when the printer power turns on. As a result, the user does not need to perform any particular task to open a WebSocket connection CT, and user convenience is improved.

There is also no need to store the address of different print control servers appropriately to a particular printer 12f at the time of printer 12f manufacture or when the printer 12f is installed in a store system 11, and only the address of the gateway server 60f need be stored in each printer 12f. As a result, the printer 12f is easier to manufacture, and the printers 12f can be prevented from accessing the wrong address.

Operation of the print control server 10Af and the management device 14f when changing the content of the configuration data of a specific printer 12f is described next.

As described above, the first storage unit 28f of the print control server 10Af stores the configuration settings database. The configuration settings database stores printer identification information and configuration data for printers 12f that connect to the print control server 10Af.

In the print control system if according to this embodiment, the management device 14f can change the content of the configuration data of a specific printer 12f.

Figures 35A, 35B:
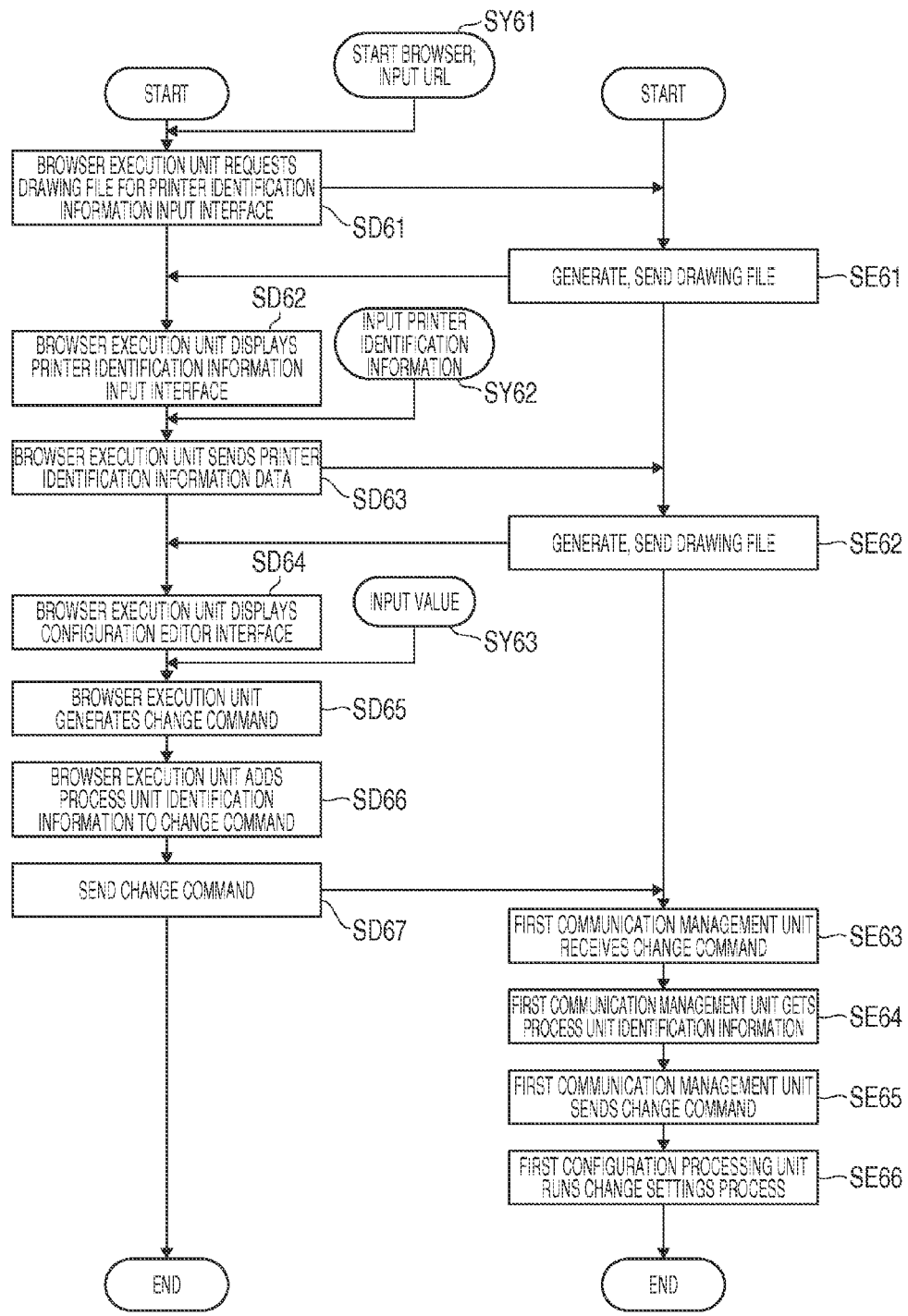
FIGS. 35A and 35B are flow charts showing the operation of the management device and control server.

FIG. 35 is a flow chart showing the operation of the print control server 10Af and the management device 14f when changing the content of the configuration data of a specific printer 12f. FIG. 35 (A) shows the operation of the management device 14f, and (B) shows the operation of the print control server 10Af.

Note that the operation described below is executed by a function of the browser execution unit 40af of the management device control unit 40f of the management device 14f, such as by an application that runs on the browser, or a function of a script in a drawing file (described below).

The process executes by the print control server 10Af is described below, but it should be noted that the gateway server 60f also has the ability to execute the same process as the print control server 10Af described below.

The user first starts the browser on the management device 14f, and inputs a command to access a specific URL (step SY61). This URL is the URL accessed by the management device 14f to display a user interface 50f for inputting printer identification information (referred to below as the printer identification information input interface 50f) in a browser window. This specific URL is a URL managed by the print control server 10Af, and is given in advance by the administrator that manages the print control server 10Af to the user.

As shown in FIG. 35 (A), in response to the user instruction in step SY61, the browser execution unit 40af of the management device control unit 40f of the management device 14f accesses the specified URL, and requests the drawing file for displaying the printer identification information input interface 50f (step SD61). This drawing file is a file written in markup language such as HTML (HyperText Markup Language), and is a file for displaying a web page in a browser window on the management device 14f.

As shown in FIG. 35 (B), in response to the request of the management device 14f in step SD61, the print control server 10Af generates and sends a drawing file for the printer identification information input interface 50f to the management device 14f (step SE61).

As shown in FIG. 35 (A), the browser execution unit 40af of the management device control unit 40f of the management device 14f then displays the printer identification information input interface 50f based on the drawing file acquired in response to the request of step SD61 (step SD62).

Figure 36A:
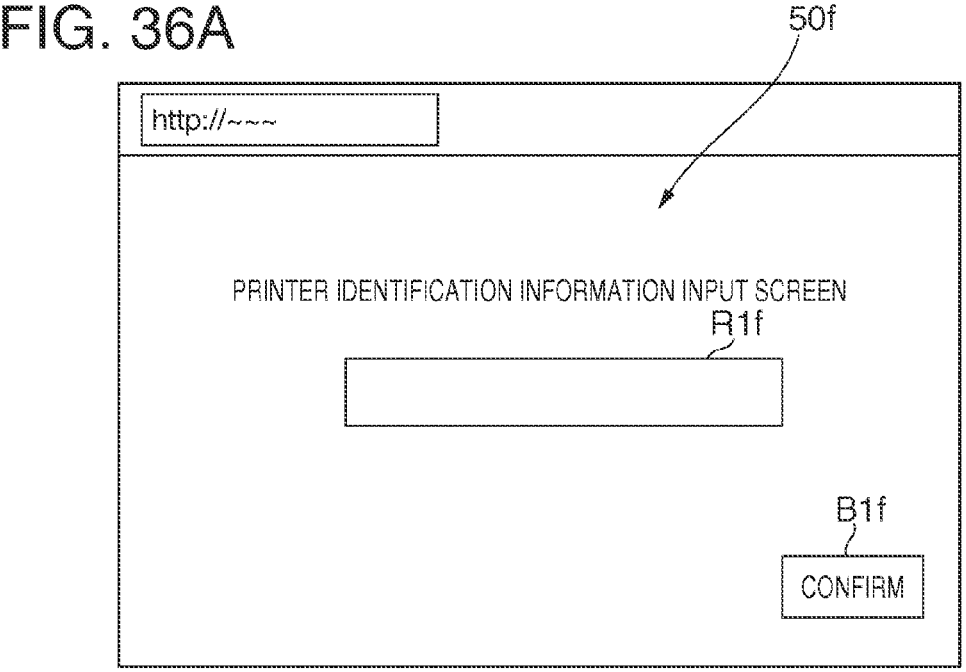
FIGS. 36A and 36B are examples of a user interface supplied by the management device.
Figure 36B:
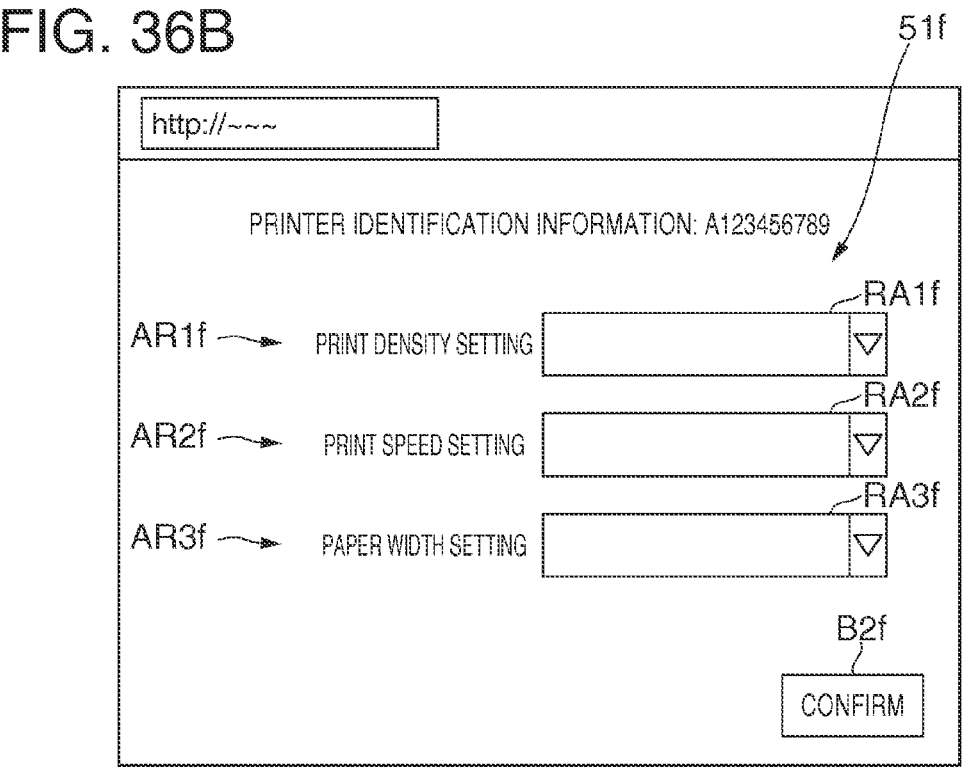

FIG. 36 (A) shows an example of a printer identification information input interface 50f.

As shown in FIG. 36 (A), the printer identification information input interface 50f has an input field R1f to which the user inputs the printer identification information, and a button B1f for confirming the input to the input field R1f.

The user inputs the printer identification information of the printer 12f for which to change the content of the configuration data to the input field R1f, and then clicks the button B1f (step SY62).

The browser execution unit 40af of the management device control unit 40f of the management device 14f then sends the printer identification information data input to the printer identification information input interface 50f to the print control server 10Af according to a specific protocol (step SD63). The process of step SD63 is executed by a function of a script embedded in the drawing file related to the printer identification information input interface 50f, for example.

As shown in FIG. 35 (B), when the printer identification information data is received, the print control server 10Af executes the following process.

The print control server 10Af generates and outputs to the management device 14f a drawing file related to the user interface for changing settings (below, the configuration editor interface 51f) of the printer 12f identified by the printer identification information (step SE62). In this example, the first storage unit 28f of the print control server 10Af stores the information (referred to below as drawing data) required to generate the drawing file of the configuration editor interface 51f relationally to the printer identification information for each printer 12f that connects to the print control server 10Af. In step SE62, the print control server 10Af acquires the drawing data corresponding to the printer identification information identified by the received data, and generates the drawing file based on the acquired drawing data.

As shown in FIG. 35 (A), the browser execution unit 40af of the management device control unit 40f of the management device 14f displays the configuration editor interface 51f based on the drawing file acquired in response to the request of step SD63 (step SD64).

FIG. 36 (B) shows an example of the configuration editor interface 51f.

As shown in FIG. 36 (B), the configuration editor interface 51f has fields for inputting the desired values of specific settings.

As shown in FIG. 36 (B), the printer identification information of the printer 12f for which the configuration data is to be changed is also displayed in the configuration editor interface 51f.

The configuration editor interface 51f has a print density setting area AR1f for setting the value of the print density setting. The print density setting area AR1f has a print density setting input field RA1f. The print density setting input field RA1f is a field for inputting the value of the print density setting. The print density setting input field RA1f is a pull-down menu. The user can input the value of the print density setting to the print density setting input field RA1f by selecting either DARK or LIGHT from the pull-down menu.

The configuration editor interface 51f also has a print speed setting area AR2f for setting the value of the print speed setting. The print speed setting area AR2f has a print speed setting input field RA2f. The print speed setting input field RA2f is a field for inputting the value of the print speed setting. The print speed setting input field RA2f is a pull-down menu. The user can input the value of the print speed setting to the print speed setting input field RA2f by selecting either FAST or SLOW from the pull-down menu.

The configuration editor interface 51f also has a paper width setting area AR3f for setting the value of the paper width setting. The paper width setting area AR3f has a paper width setting input field RA3f. The paper width setting input field RA3f is a field for inputting the value of the paper width setting. The paper width setting input field RA3f is a pull-down menu. The user can input the value of the paper width setting to the paper width setting input field RA3f by selecting either 80 mm or 58 mm from the pull-down menu.

The configuration editor interface 51f also has a button B2f for confirming the input to the print density setting input field RA1f, print speed setting input field RA2f, and paper width setting input field RA3f.

The user inputs the desired values to the print density setting input field RA1f, print speed setting input field RA2f, and paper width setting input field RA3f of the configuration editor interface 51f, and then clicks the button B2f (step SY63).

Based on user input to the configuration editor interface 51f, the browser execution unit 40af generates a change command (step SD65).

The change command is a command including printer identification information, and instructing changing the values of specific settings in the configuration data related to the printer identification information to the values the user input to the fields in the configuration editor interface 51f.

Next, the browser execution unit 40af adds the process unit identification information of the process unit (the first configuration processing unit 31f in this example) that executes the process based on the change command to the generated change command (step SD66). The browser execution unit 40af manages the process unit identification information of the process unit that processes the change command, and based thereon adds the process unit identification information to the change command. A configuration in which the user inputs the process unit identification information is also conceivable.

Next, the browser execution unit 40af controls the communication interface 41f, and sends the change command to the print control server 10Af (step SD67).

When the management device 14f and print control server 10Af communicate by HTTP, the browser execution unit 40af makes an HTTP handshake with the print control server 10Af and establishes a connection in step SD67. Next, the browser execution unit 40af controls the communication interface 41f to output the change command through the opened connection.

As shown in FIG. 35 (B), the first communication management unit 25f controls the second connect ion unit 30f to receive the change command (step SE63).

Next, the first communication management unit 25f acquires the process unit identification information contained in the change command (step SE64).

Next, the first communication management unit 25f sends the change command to the process unit (first configuration processing unit 31f in this example) identified by the process unit identification information acquired in step SE64 (step SE65).

Next, the first configuration processing unit 31f runs the change settings process based on the change command (step SE66).

The change settings process is a process that changes the content of the corresponding configuration data in the configuration settings database. As described above, the configuration settings database is a database relationally storing printer identification information and configuration data for the printers 12f that connect to the print control server 10Af.

In the change settings process, the first configuration processing unit 31f accesses the configuration settings database. Next, the first configuration processing unit 31f finds the corresponding record using the printer identification information contained in the change command as the search key. Next, the first configuration processing unit 31f changes the values of the settings in the configuration data of the retrieved record to the values specified in the change command.

After executing the change settings process, the configuration control data generated based on the configuration data is data reflecting the values changed based on the change command.

As described above, the content of the configuration data is changed based on a change command generated by the management device 14f.

The change of configuration data based on the change command is reflected in the settings of the printer 12f as described below at the timing described below, for example.

For example, when the configuration data is changed based on the change command, the first configuration processing unit 31f of the print control server 10Af generates and outputs configuration control data based on the new configuration data (the configuration data after being changed) to the corresponding printer 12f. Thus comprised, when the content of the configuration data changes, the change in the content of the configuration data can be more quickly reflected in the settings of the printer 12f.

When a request is received from one printer 12f, the first configuration processing unit 31f of the print control server 10Af generates and outputs configuration control data based on the configuration data related to the one printer 12f. In this event, the first configuration processing unit 31f generates the configuration control data based on the new configuration data when the content of the configuration data changes. The printer 12f executes the configuration process based on the received configuration control data. As a result, when one printer 12f sends a request to the print control server 10Af, the changed content of the configuration data is reflected in the settings of the one printer 12f.

The printer 12f according to this embodiment is configured to send a request command when the power turns on. As a result, if there is a change in the content of the configuration data based on a change command before the power turns on, the changes to the content of the configuration data are reflected in the settings of the printer 12f when the power turns on. Therefore, a process that changes the plural printers 12f in the store system 11 of a particular store when the store opens for business is possible. Note that a configuration in which the printer 12f sends a request at a regular interval after the power turns on is also conceivable.

The first configuration processing unit 31f of the print control server 10Af may also execute the following process when a request is received.

More specifically, the first configuration processing unit 31f manages the current values of the settings for each printer 12f that connects to the print control server 10Af. When a request is received from one printer 12f, the first configuration processing unit 31f determines for each setting of the one printer 12f if there is a difference between the value of the current setting in the one printer 12f, and the value indicated by the configuration data for the one printer 12f. If there is a change in the content of the configuration data based on a change command, the first configuration processing unit 31f determines there is a difference.

Next, the first configuration processing unit 31f generates configuration control data specifying the new value and an instruction to set the specified value to the setting for which a difference was detected. Next, the first configuration processing unit 31f outputs the generated configuration control data. If the first configuration processing unit 31f determines there are no settings for which the value was changed, it reports the same. This configuration minimizes the amount of configuration control data and helps improve communication efficiency.

The operation of the management device 14f, print control server 10Af, and printer 12f when the management device 14f controls the printer 12f to print is described next.

Figures 37A, 37B, 37C:
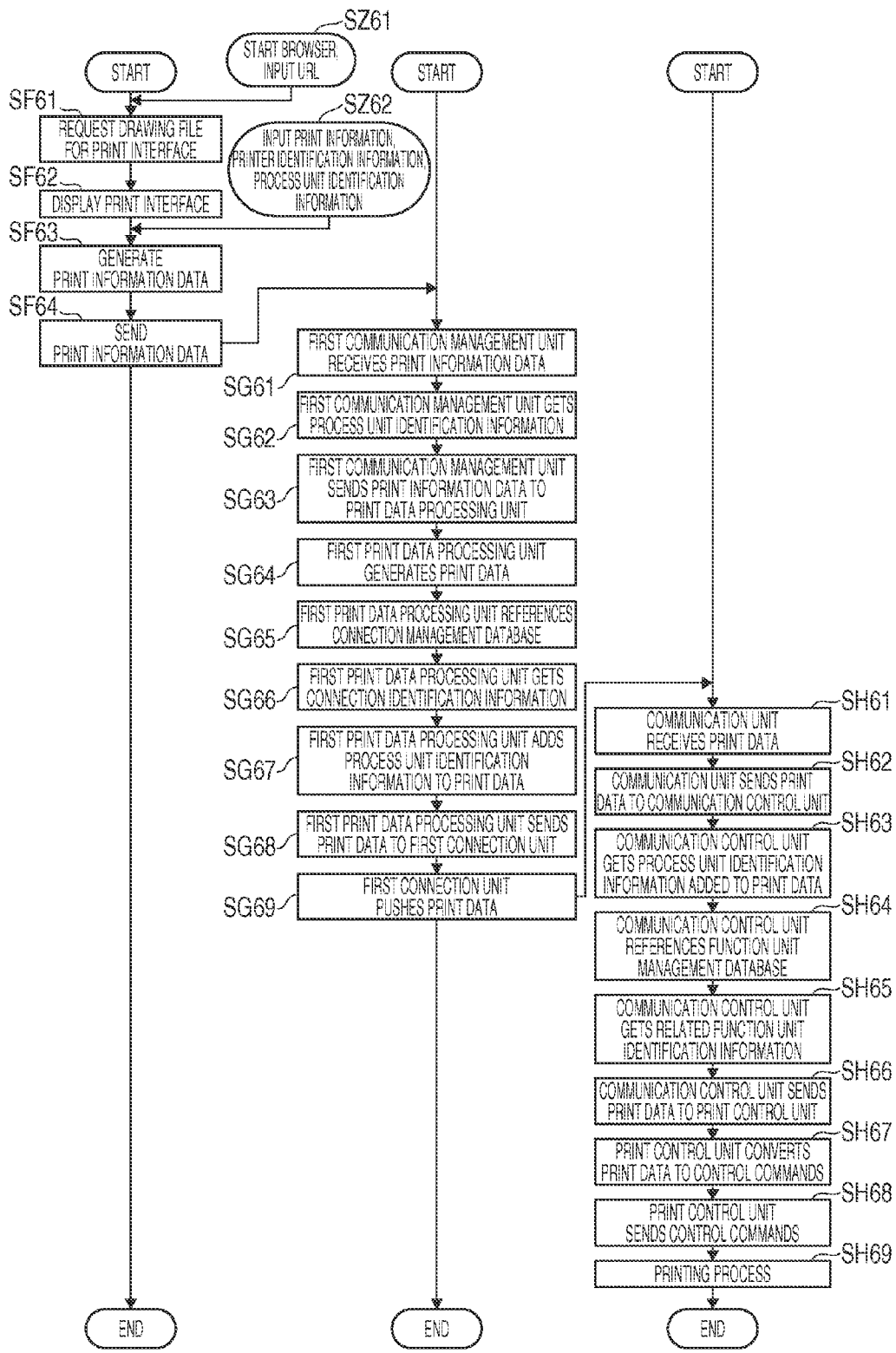
FIGS. 37A-37C are flow charts showing the operation of the management device, control server, and printer.

FIG. 37 is a flowchart showing the operation of the devices when the management device 14f controls printing by the printer 12f, (A) showing the operation the management device 14f, (B) showing the operation of the print control server 10Af, and (C) showing the operation of the printer 12f.

Using the flow chart in FIG. 37, asynchronous duplex communication through the first function unit communication path KT1 between the first print data processing unit 27f of the print control server 10Af and the print control unit 17f of the printer 12f is described using as an example the first print data processing unit 27f sending data (print data in this example).

As shown in FIG. 37 (A), to print from a printer 12f, the user first starts the browser on the management device 14f, and inputs a command to access a specific URL (step SZ61). This URL is the URL accessed to display a print information input interface (referred to below as the print interface) described below in the browser window. This specific URL is previously made known to the user. The URL may be a URL managed by the print control server 10Af, or a URL managed by another server.

In response to the user instruction in step SZ61, the browser execution unit 40af of the management device control unit 40f of the management device 14f accesses the specified URL, and requests the drawing file for displaying the print interface (step SF61). This drawing file is a file written in markup language such as HTML (HyperText Markup Language), and is a file for displaying a web page in a browser window on the management device 14f.

Next, the browser execution unit 40af displays the print interface based on the drawing file acquired in response to the request of step SF61 (step SF62).

The print interface is a user interface for the user to input the print information to be printed by the printer 12f. The print information may include the name of a file storing image data, or information related to where to print the image on the print medium. In the print interface, the first print data processing unit 27f of the print control server 10Af can input information used to generate print data.

The print interface also enables the user to input the printer identification information of the printer 12f for printing, and the process unit identification information of the process unit (the first print data processing unit 27f in this example) in the process units of the print control server 10Af to which to send the print information data for executing a process based on the print information data. Fields for inputting the print information, printer identification information, and process unit identification information are provided in the print interface, and the user inputs the print information, printer identification information, and process unit identification information to the appropriate fields.

When the user has input the print information, printer identification information, and process unit identification information to the print interface and confirms input (step SZ62), the browser execution unit 40af runs the following process.

The browser execution unit 40af then generates the print information data (step SF63). The print information data is data in a specific format containing the print information, printer identification information, and process unit identification information based on the input to the print interface. The print information data is in a format enabling the first print data processing unit 27f of the print control server 10Af to execute a process based on the data.

Next, the browser execution unit 40af controls the communication interface 41f and sends the print information data to the print control server 10Af (step SF64). In step SF64, the communication interface 41f opens a connection by a HTTP handshake with the print control server 10Af, for example, and sends the print information data through the connection.

In this embodiment of the invention the user inputs the process unit identification information to the print interface, and the process unit identification information input by the user is added to the print information data. The invention is not so limited, and a configuration in which the management device control unit 40f determines what process unit is to process the data sent to the print control server 10Af, and adds the process unit identification information of that process unit to the transmitted data is also conceivable. For example, the management device control unit 40f may manage the relationship between the type of data that is transmitted and the process unit that processes the data, and based on this managed relationship determine the process unit identification information to add to the data that is sent.

As shown in FIG. 37 (B), the first communication management unit 25f controls the second connection unit 30f to receive the print information data (step SG61).

Next, the first communication management unit 25f acquires the process unit identification information contained in the print information data (step SG62).

Next, the first communication management unit 25f sends the print information data to the process unit (first print data processing unit 27f in this example) identified by the process unit identification information acquired in step SG62 (step SG63).

The first communication management unit 25f manages the relationships between process unit and process unit identification information, and sends data to the process unit corresponding to the process unit identification information based on the value of the process unit identification information.

The first print data processing unit 27f generates print data based on the received print information data (step SG64). The print data is an XML (eXtensible Markup Language) file containing the print information to be printed by the printer 12f. The print data includes the information to be printed by the printer 12f, including image data and information identifying the location of the images on the print medium, in XML format.

The printer identification information of the printer 12f to use for printing is also written in the print data. The first print data processing unit 27f adds the printer identification information to the print data based on the printer identification information contained in the print information data.

The printer identification information may be written in an area where control information is carried, such as the header of the print data, or may be written in a specific tag in the print data.

The first print data processing unit 27f then accesses the connection management database stored in the control server storage unit 28b (step SG65).

Next, the first print data processing unit 27f acquires the connection identification information of the WebSocket connection CT related to the received identification information from the connection management database using the printer identification information as the search key (step SG66). The connection identification information acquired here is the connection identification information of the WebSocket connection CT to the printer 12f that is to print.

Next, the first print data processing unit 27f adds the process unit identification information of the first print data processing unit 27f to the print data (step SG67). The first print data processing unit 27f manages the process unit identification information assigned to the first print data processing unit 27f.

Next, the first print data processing unit 27f sends the print data to the first connection unit 26f corresponding to the connection identification information acquired in step SG66 (step SG68).

The first connection unit 26f then pushes the received print data through the WebSocket connection CT to the printer 12f (step SG69).

As shown in FIG. 37 (C), the first communication unit 16f then receives the print data through the WebSocket connection CT (step SH61).

Next, the first communication unit 16f sends the print data to the communication control unit 15f (step SH62).

The communication control unit 15f then acquires the process unit identification information added to the print data (step SH63). Next, the communication control unit 15f references the function unit management database (step SH64). Next, the communication control unit 15f gets the function unit identification information related to the identification information from the function unit management database using the process unit identification information as the search key (step SH65). Next, the communication control unit 15f sends the print data to the function unit (the print control unit 17f in this example) identified by the function unit identification information acquired in step SH65 (step SH66).

The communication control unit 15f manages the relationships between function unit identification information and function units. The communication control unit 15f can therefore send data to a particular single function unit based on the function unit identification information.

Next, the print control unit 17f converts the received print data to control commands in the command language of the print unit 18f (step SH67). More specifically, the print control unit 17b converts the print data, which is an XML file, to control commands that can be interpreted by the print unit 18*f*. Next, the print control unit 17*f* sends the control commands to the print unit 18*f* (step SH68).

Next, the print unit 18*f* prints on the print medium based on the control commands (step SH69). The print unit 18*f* uses the settings of the configuration file to print.

The print control server 10Af in this embodiment of the invention can thus send print data to the printer 12*f* and control the printer 12*f* to print when there is a need to print with the printer 12*f* without receiving a request from the printer 12*f*. Events that cause the printer 12*f* to print are events in which predefined conditions are met, such as when an instruction is received from the user, or a request is received from a communicatively connected external device.

This configuration also enables starting printing faster when an event requiring printing occurs than in a configuration in which the printer 12*f* intermittently sends a request to the print control server 10Af, and the print control server 10Af sends print data in response to such a request. Consumption of resources can also be suppressed compared with a configuration in which the print control server 10Af queues responses to requests.

After printing by the print unit 18*f*, the printer 12*f*, print control server 10Af, and management device 14*f* execute the following process.

The print control unit 17*f* generates print result data based on the result of printing by the print unit 18*f*. The print result data is data indicating, for example, if printing by the print unit 18*f* was successful or failed, and the cause of the failure if printing fails.

The print control unit 17*f* sends the print result data to the first print data processing unit 27*f* through the first function unit communication path KT1 of the WebSocket connection CT. Sending data from the print control unit 17*f* to the first print data processing unit 27*f* using the first function unit communication path KT1 is done using the same method as sending data from the configuration control unit 23*f* to the first configuration processing unit 31*f* using the second function unit communication path KT2*f*.

The first print data processing unit 27*f* sends the received print result data to the management device 14*f* that sent the print information data. For example, the first print data processing unit 27*f* manages the connection used to send the print information data, and sends the print result data to the management device 14*f* using this connection. The browser execution unit 40*af* of the management device control unit 40*f* of the management device 14*f* runs a corresponding process based on the received print result data. For example, the management device control unit 40*f* may display information representing the print result on the display unit 42*f* and report the print result to the user.

In this embodiment of the invention the control server 10*c* has process units with different functions, the first print data processing unit 27*f* and the first configuration processing unit 31*f*.

The effect of this is described below.

That is, as described above, when print result data is received, the first print data processing unit 27*f* sends the received print result data to the management device 14*f* that sent the print information data. As a result, the management device 14*f* that instructed printing can get the result of printing. When a request is received from the printer 12*f*, the first configuration processing unit 31*f* generates and outputs configuration control data to the printer 12*f*.

The method of processing received data, particularly how to handle the data in relation to the management device 14*f*, differs for the first print data processing unit 27*f* and the first configuration processing unit 31*f*. Based on this, the print control server 10Af has a first configuration processing unit 31*f* as a process unit separate from the first print data processing unit 27*f*. Note that with this method, data sent by the print control unit 17*f* is sent to the first print data processing unit 27*f*, and data sent by the configuration control unit 23*f* is sent to the first configuration processing unit 31*f*. This also applies to the gateway server 60*f*.

As described above, the print control system if according to this embodiment has a print control server 10Af (print control device), a gateway server 60*f*, and a printer 12*f*.

The print control server 10Af has a first print data processing unit 27*f* that generates print data, and a first connection unit 26*f* (connection unit) that sends the print data generated by the first print data processing unit 27*f*.

The gateway server 60*f* has a second print data processing unit 62*f* that generates print data; a first communication connection unit 65*f* (communication connection unit) that transmits the print data generated by the second print data processing unit 62*f*; a second storage unit 64*f* (server storage unit) that stores the address (device address) of the print control server 10Af; and a second communication management unit 61*f* that transmits the server address or the address of the print control server 10Af stored in the second storage unit 64*f* when a request to establish a communication path is received.

The printer 12*f* has a print unit 18*f* that prints; a printer storage unit 19*f* (device storage unit) that stores server address information identifying the address of the gateway server 60*f*; a communication control unit 15*f* that sends a request to establish a communication path to the gateway server 60*f* of the address identified by the server address information stored by the printer storage unit 19*f*, and establishes a WebSocket connection CT based on the address of the print control server 10Af or the address of the gateway server 60*f* received in response to the request; a first communication unit 16*f* (communication unit) that receives print data by the WebSocket connection CT established by the communication control unit 15*f*; and a print control unit 17*f* that controls the print unit 18*f* based on the print data received by the first communication unit 16*f*.

Thus comprised, by accessing the gateway server 60*f* when establishing a communication path, the printer 12*f* can get the address of the device with which to establish the communication path by a function of the gateway server 60*f*, and can establish a communication path based on the received address. As a result, the printer 12*f* can simply store the address of the gateway server 60*f*, and does not need to manage the address of the print control server 10Af or other server. The user therefore does not need to perform tasks such as inputting the address when introducing the printer 12*f* to a system, when opening a communication path, or when there is a change in the device with which to establish a communication path.

The second communication management unit 61*f* of the gateway server 60*f* can also determine the current processor load of the gateway server 60*f* and the processor load of the print control server 10Af, and can determine whether to send a server address or a device address based on the processor load of the gateway server 60*f* and the processor load of the print control server 10Af that was acquired.

Thus comprised, when a request to open a communication path is received from the printer 12*f*, the gateway server 60*f* can establish a communication path with whichever of the gateway server 60*f* and the print control server 10Af that has the lighter processor load.

The second communication management unit 61ƒ of the gateway server 60ƒ also gets the number of printers 12ƒ connected to the print control server 10Aƒ.

Thus comprised, the gateway server 60ƒ can estimate the processor load on the print control server 10Aƒ based on the number of printers 12ƒ connected to the print control server 10Aƒ.

The gateway server 60ƒ connects to multiple printers 12ƒ, and the second communication management unit 61ƒ of the gateway server 60ƒ gets the number of printers 12ƒ connected to the gateway server 60ƒ, and determines whether to send a server address or a device address based on the number of printers 12ƒ connected to the print control server 10Aƒ and the number of printers 12ƒ connected to the gateway server 60ƒ.

The processor load (the CPU load, communication load, and other loads) of the device with fewer connected printers 12ƒ is probably lower on the device with more connected printers 12ƒ. Based thereon, the gateway server 60ƒ can connect the printer 12d to the device with the lighter processor load.

The communication control unit 15ƒ of the printer 12ƒ in this embodiment of the invention sends a request to open a communication path when the printer 12ƒ power turns on.

Thus comprised, the printer 12ƒ can acquire the address of the related device without user intervention when the power turns on, and can open a communication path with the related device.

The invention is described above with reference to a preferred embodiment thereof, but the invention is not limited thereto and can be modified and adapted in many ways without departing from the scope of the accompanying claims.

In the embodiment described above the printer 12ƒ is installed as part of a store system 11 deployed in a business. However, the printer 12ƒ is not limited to being part of a store system 11, and can be used in other systems.

In addition, print data is sent as an XML file from the control server 10ƒ to the printer 12ƒ in the foregoing embodiment, but the data format of the print data is not limited to XML. The print data may be data created in another markup language, or control commands in the command language of the print unit 18ƒ.

The function blocks shown in FIG. 32 can also be rendered as desired using hardware and software, and do not suggest a specific hardware configuration. Functions of the printer 12ƒ may also be rendered by a separate externally connected device. The printer 12ƒ can also execute the processes described above by running a program stored on an externally connected storage medium.

Embodiment 7

Figure 38:
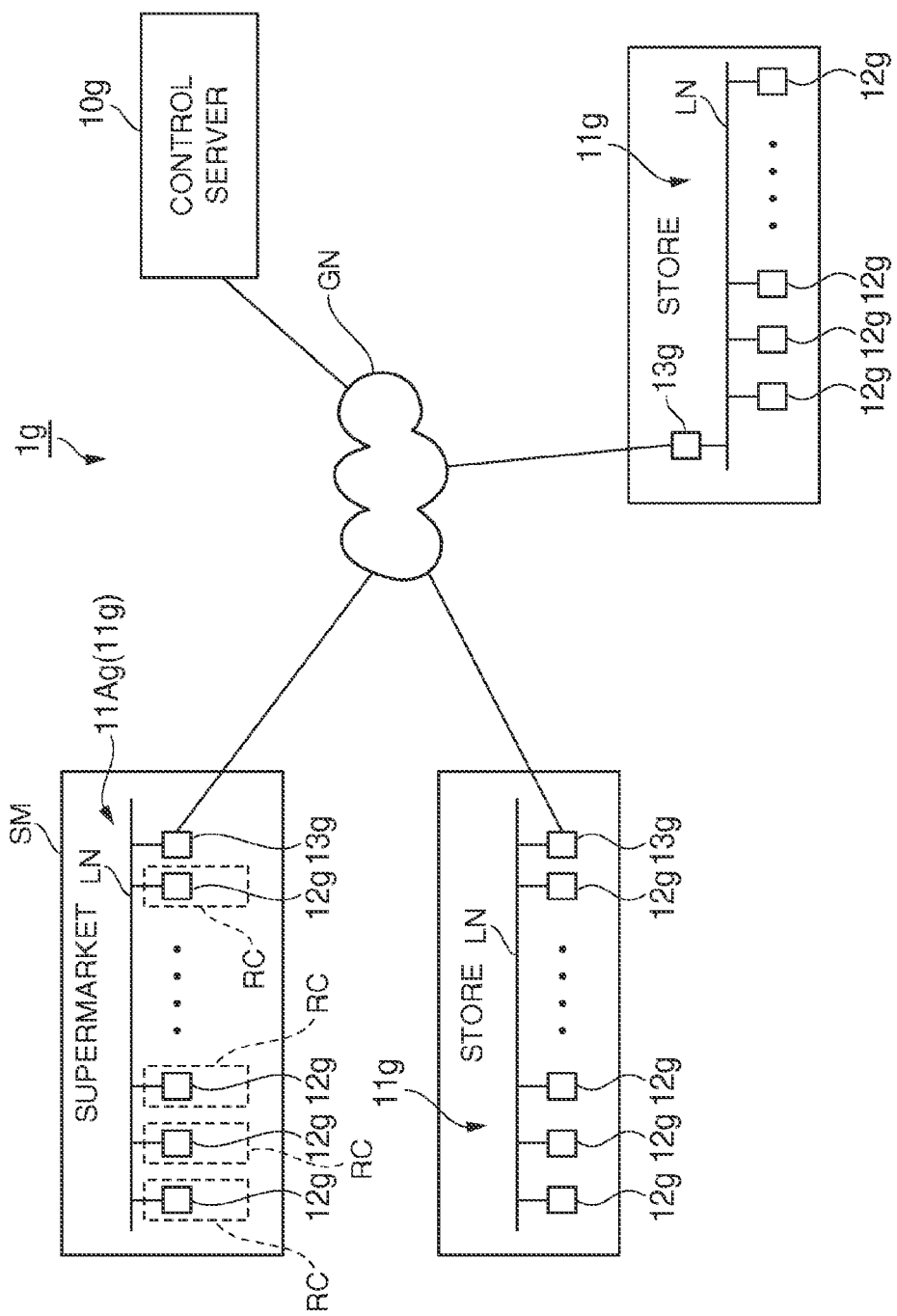
FIG. 38 shows the configuration of a control system according to a seventh embodiment of the invention.

FIG. 38 shows the configuration of a print control system 1g according to a seventh embodiment of the invention.

As shown in FIG. 38, the print control system 1g includes a control server 10g, and a plurality of store systems 11g that connect to the control server 10g through the Internet or other network GN.

The store system 11g is a system that is used in retail businesses such as supermarkets, convenience stores, department stores, and restaurants. The store system 11g has functions including producing receipts for customers of the business.

The store system 11g has one or a plurality of printers 12g that can produce receipts. The printer 12g connects to a local area network LN deployed in the business. A network communication controller 13g configured with a communication device such as a network router or modem connects to the local area network LN. The printer 12g accesses the network GN through the network communication controller 13g.

For example, the store system 11Ag in this example is a system used in a supermarket SM. Plural checkout counters RC are set up in the supermarket SM, and a printer 12g is installed at each checkout counter RC. The printers 12g in the store system 11Ag are connected to the local area network LN, and access the network GN through the network communication controller 13g.

In the print control system 1g according to this embodiment of the invention, the printer 12g of the store system 11g establishes a connection with the control server 10g, and communicates with the control server 10g. The printer 12g executes a process related to printing as controlled by the control server 10g.

Figure 39:
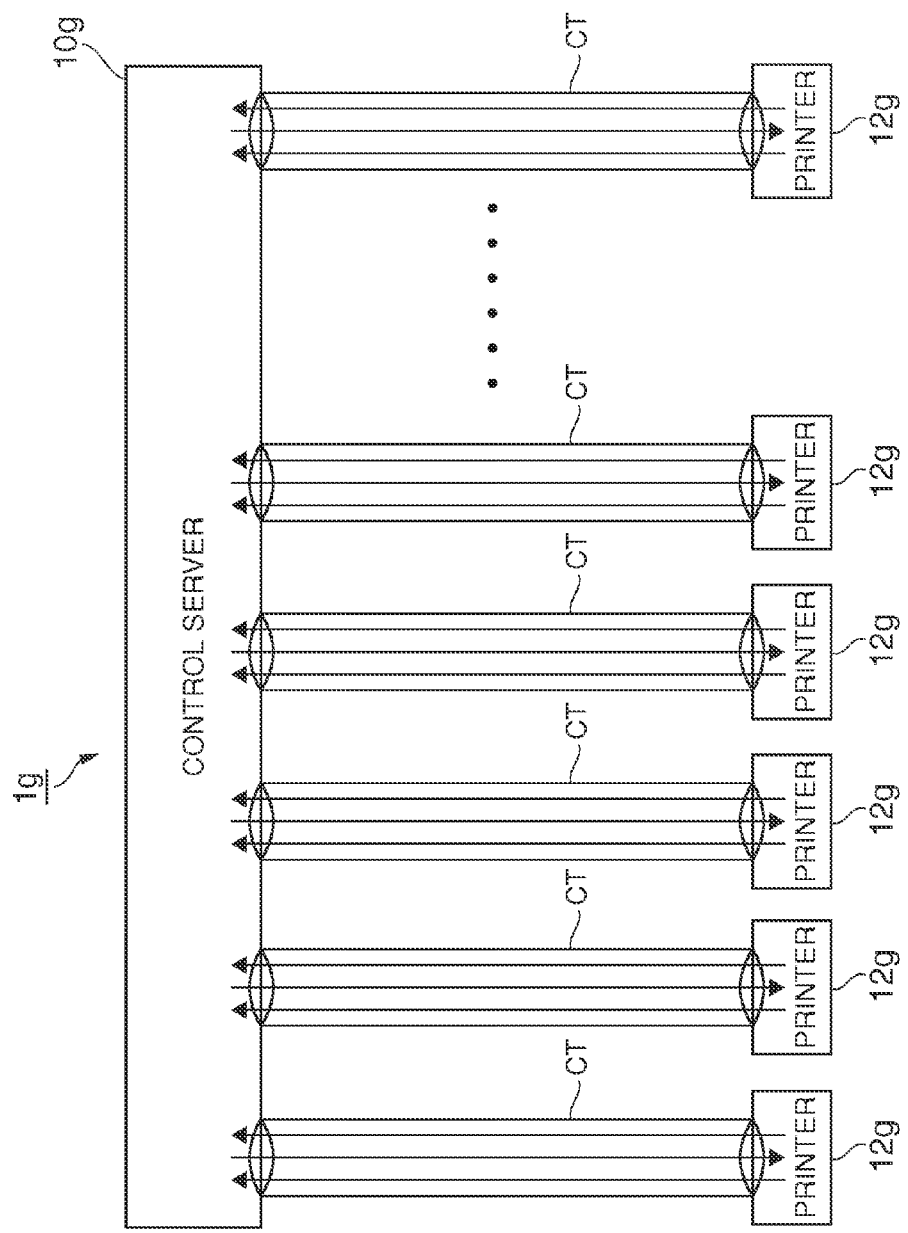
FIG. 39 illustrates communication paths opened between a control server and printers.

FIG. 39 illustrates the communication paths established between the control server 10g and the printers 12g in the print control system 1g.

As shown in FIG. 39, a WebSocket connection CT (communication path enabling asynchronous duplex communication) is established between the control server 10g and the printers 12g in each store system 11g.

WebSocket is a communication standard that enables asynchronous duplex communication. After a server and client open a WebSocket connection CT using the WebSocket standard, sending and receiving data between the devices uses the protocol by means of the connection. It is therefore not necessary to establish a connection every time data is transmitted.

The WebSocket connection CT is a logical communication path for sending and receiving data according to the WebSocket protocol and procedures between the printer 12g and control server 10g connected through the WebSocket connection CT. Therefore, once the printer 12g and control server 10g handshake and establish a WebSocket connection CT, the printer 12g and control server 10g can exchange data asynchronously over the WebSocket connection CT. More specifically, the control server 10g can send data to the printer 12g through the WebSocket connection CT at any time, and the printer 12g can send data to the control server 10g through the WebSocket connection CT at any time.

WebSocket communication is asynchronous, duplex communication between the printer 12g and control server 10g through the WebSocket connection CT based on the WebSocket protocol and methods.

The control server 10g and printer 12g communicate by asynchronous, duplex communication through the WebSocket connection CT. More specifically, the control server 10g can push data to the printer 12g by WebSocket communication through the WebSocket connection CT without receiving a request from the printer 12g operating as a client device at any time. Likewise, the printer 12g can push data to the control server 10g through the WebSocket connection CT at any time.

In this embodiment of the invention the control server 10g is a client server in a so-called cloud computing system. More specifically, the control server 10g can process data, execute a specific operation when triggered by a specific condition being met, such as receiving a request from an external device, and send data based on the result of the process through the WebSocket connection CT to the printer 12g.

In FIG. 39 the control server 10g is represented as a single block, but this does not mean that the control server 10g is configured from a single server. For example, the control server 10g may be configured from multiple servers, or it may be a server rendered by a function of a specific system. More specifically, the control server 10g may be any configuration that can execute the processes described herein.

The control server 10g and printer 12g communicate according to the WebSocket communication protocol in this embodiment. The invention is not limited to WebSocket communication, however, and other configurations capable of asynchronous, duplex communication in the same way as WebSocket communication may be used.

The print control system 1g thus has multiple (such as a 1000) printers 12g each capable of printing communicatively connected through a WebSocket connection CT to a control server 10g.

Such a configuration enables the following.

The control server 10g can collect, manage, and analyze information based on data received from the plural printers 12g connected to the store system 11g. The control server 10g can therefore collect valuable information. The collected information can be used as "big data."

Constructing a store system 11g can also be made easier and cheaper. More specifically, the printer 12g is connected to the control server 10g by a WebSocket connection CT in this print control system 1g. Using a service provided by the control server 10g, this enables controlling the printers 12g to execute processes as controlled by the control server 10g. An administrator constructing a store system 11g can therefore build the store system 11g by simply installing the printers 12g where desired, and then connecting the printers 12g to the network GN. This enables controlling the printers 12g to execute a desired process, such as a process related to producing receipts, using a service provided by the control server 10g.

In addition, because printers 12g from different store systems 11g are connected to the control server 10g by a WebSocket connection CT, the control server 10g can manage the plural printers 12g in the plural store systems 11g. The control server 10g can also coordinate operation of the plural printers 12g connected in the plural store systems 11g.

Figure 40:
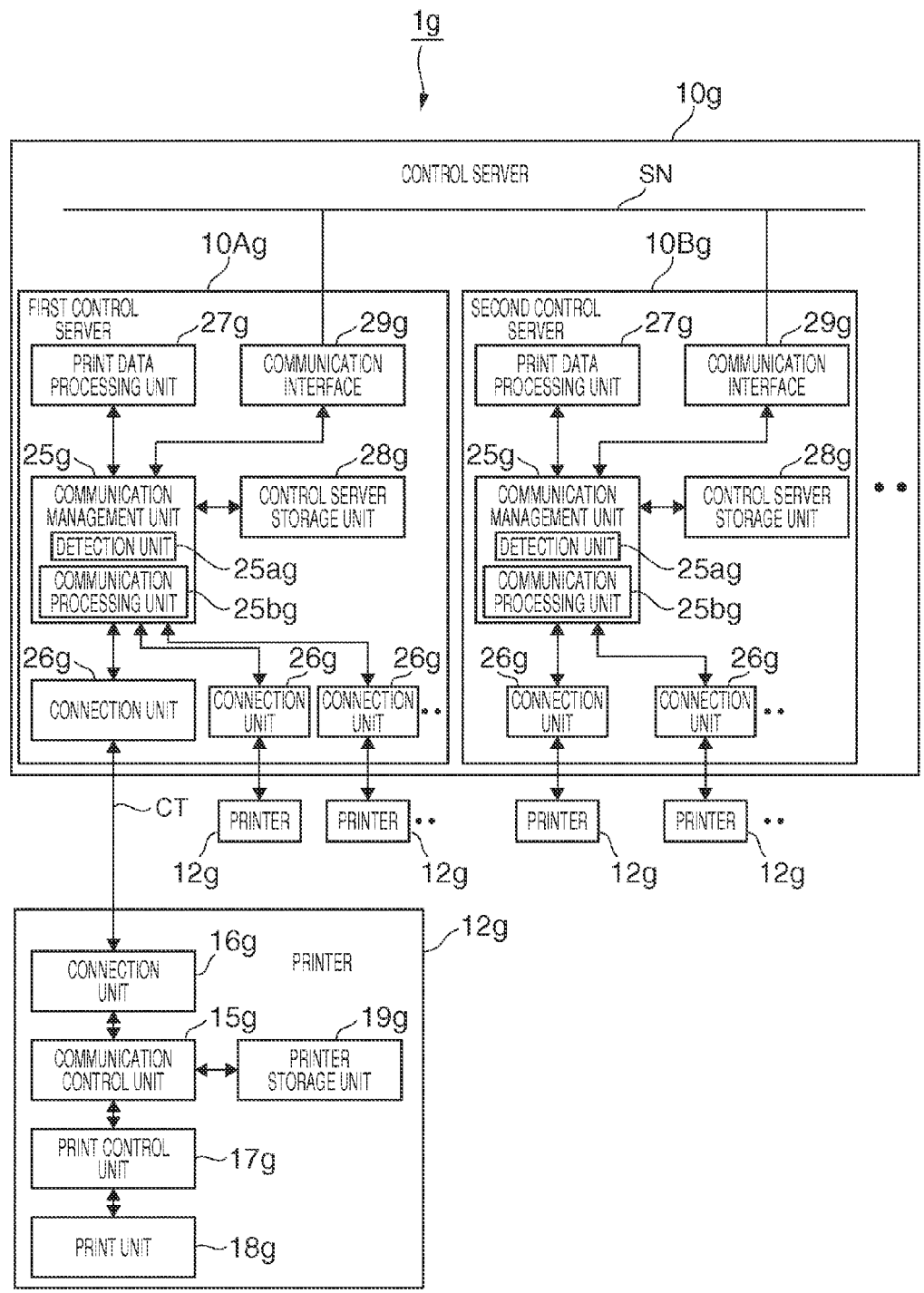
FIG. 40 is a block diagram showing the functional configuration of the control server and printer.

FIG. 40 is a block diagram showing the functional configuration of the printer 12g and the control server 10g according to this embodiment.

As shown in FIG. 40, the printer 12g includes a communication control unit 15g, a communication unit 16g, a print control unit 17g, a print unit 18g, and a printer storage unit 19g.

The functions of the communication control unit 15g, communication unit 16g, and print control unit 17g are described below.

The print unit 18g includes mechanisms related to printing, such as a print mechanism that prints on print media, a conveyance mechanism that conveys the print media, and a cutting mechanism that cuts the print media, and control boards related to controlling the mechanisms.

The printer storage unit 19g is nonvolatile memory, and stores data. Address data and identification information, further described below, are stored in the printer storage unit 19g.

As shown in FIG. 40, the control server 10g includes a first control server 10Ag (print control device), and a second control server 10Bg (second print control device). The first control server 10Ag and the second control server 10Bg are identically configured, and the functional configuration of the first control server 10Ag is described below for example.

The control server 10g includes multiple server devices, specifically the first control server 10Ag and the second control server 10Bg in this example, and the plural server devices are communicatively connected through a server network SN configured with a LAN, for example.

The first control server 10Ag includes a communication management unit 25g, a connection unit 26g, a print data processing unit 27g, a control server storage unit 28g, and a communication interface 29g. The communication management unit 25g includes a detection unit 25ag and a communication processing unit 25bg as function blocks.

The function of the communication management unit 25g, the detection unit 25ag and communication processing unit 25bg of the communication management unit 25g, the connection unit 26g, and the print data processing unit 27g are described further below.

The control server storage unit 28g is nonvolatile memory, and stores data. A connection management database, a connection state management database, and an address information database are stored in the control server storage unit 28g as described further below.

The communication interface 29g communicates according to a specific communication protocol with another server in the control server 10g through the server network SN.

As shown in FIG. 40, a plurality of printers 12g connect to the control server 10g. The control server 10g has a connection unit 26g, which is a WebSocket interface, for each of the plural printers 12g, establishes a WebSocket connection CT with each printer 12g, and communicates through the connection by WebSocket with each printer 12g.

The operation of the printer 12g and first control server 10Ag when the printer 12g power turns on is described next.

Figures 41A, 41B:
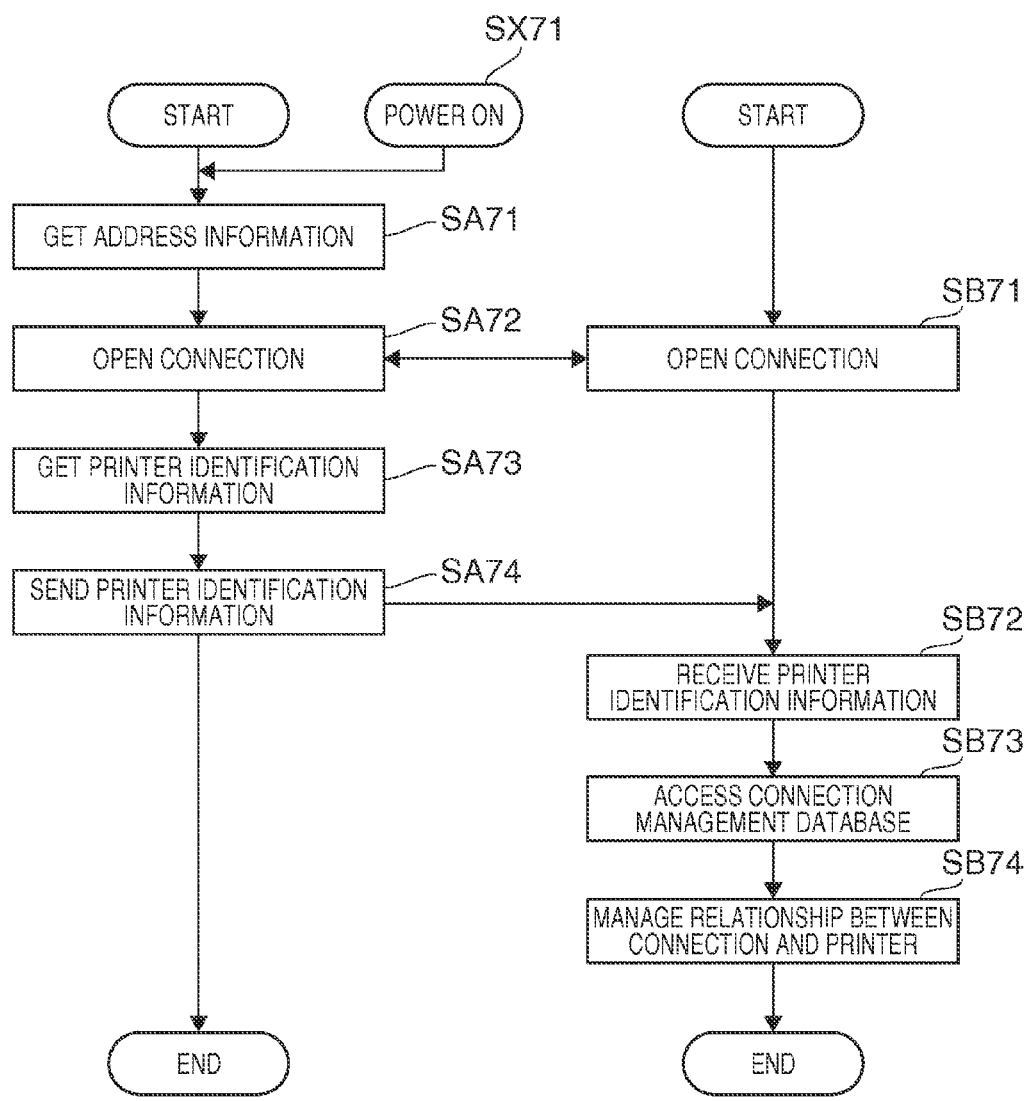
FIGS. 41A and 41B are flow charts showing the operation of the control server and printer.

FIG. 41 is a flow chart showing the operation of the printer 12g and the first control server 10Ag after the printer 12g power turns on, column (A) showing the operation of the printer 12g, and column (B) showing the operation of the first control server 10Ag.

Note that in the operation described below the printer 12g is connected to the local area network LN of the store system 11Ag in which it is used, and can access the network GN.

The trigger of the process shown in the flow chart in FIG. 41 is not limited to the power turning on. For example, this process may be triggered by the printer 12g connecting to the network GN and enabling communication, or by an instruction from a user.

The functions of the function blocks of the communication control unit 15g and print control unit 17g of the printer 12g, and the print data processing unit 27g, detection unit 25ag, and communication processing unit 25bg of the first control server 10Ag, are described below.

More specifically, these function blocks are software objects. An object is an instance created in an object-oriented programming language, and more specifically is a software function block defined by a set of data and methods. The function of a particular function block is rendered by calling (invoking) a method of the function block.

The functions of these function blocks may also be rendered by the CPU or other hardware assets reading and running an application. Configurations in which the function of a single function block is rendered by a single application, configurations in which the function of plural function blocks are rendered by a single application, and configurations in which the function of a single function block is rendered by plural applications, are possible.

In other words, the function blocks represent functions as conceptual blocks, and do not mean any specific application or hardware construction.

As shown in FIG. 41 (A), when the printer 12g power turns on (step SX71), the communication control unit 15g accesses the printer storage unit 19g and gets the address data stored in the printer storage unit 19g (step SA71).

The address data is data identifying the address (such as the domain name, IP address, or path name) of the first control server 10Ag to access when the WebSocket connection CT is established according to the WebSocket protocol. When opening a WebSocket connection CT according to the WebSocket protocol, the client (the printer 12g in this example) handshakes with the server (the first control server 10Ag in this example) using HTTP (Hypertext Transfer Protocol). When handshaking, the client sends a message containing the domain name of the server, and the address data is data representing this domain name.

Next, the communication control unit 15g accesses the first control server 10Ag based on the address indicated by the address data, and establishes a WebSocket connection CT between the communication unit 16g and the connection unit 26g as controlled by the communication management unit 25g of the first control server 10Ag (step SA72, step SB71). In other words, the printer 12g according to this embodiment establishes a WebSocket connection CT when triggered by the power turning on without receiving an instruction from the user or a request from the control server 10g.

By establishing a WebSocket connection CT, the printer 12g and first control server 10Ag can communicate through an asynchronous, duplex communication link. More specifically, the first control server 10Ag can push data to the printer 12g through the WebSocket connection CT without receiving a request from the printer 12g operating as a client.

The communication unit 16g and connection unit 26g are WebSocket interfaces enabling data communication based on the WebSocket protocol and methods. These function blocks are instantiated using a WebSocket Socket.IO library, for example.

More specifically, the communication unit 16g has functions for processing data that is received from the communication control unit 15g according to WebSocket, and sending the data through the WebSocket connection CT based on WebSocket methods. The communication unit 16g also has functions for processing data that is received through the WebSocket connection CT according to WebSocket, and sending to the communication control unit 15g. The connection unit 26g is similarly configured.

Next, the communication control unit 15g of the printer 12g accesses the printer storage unit 19g and gets the identification information stored in the printer storage unit 19g (step SA73). The identification information is data representing the identity of the printer 12g (referred to below as printer identification information). The printer identification information is, for example, a serial number assigned to the printer 12g when the printer 12g is manufactured.

Next, the communication control unit 15g sends the identification data over the WebSocket connection CT (step SA74).

As shown in FIG. 41 (B), the communication management unit 25g of the first control server 10Ag receives the identification data (step SB72).

Next, the communication management unit 25g accesses the connection management database stored in the control server storage unit 28g (step SB73). The connection management database is a database relationally storing for the WebSocket connections CT that were established connection identification information identifying the WebSocket connection CT and the printer identification information.

Next, the communication management unit 25g creates one record in the connection management database. The communication management unit 25g then stores in the created record the connection identification information of the WebSocket connection CT established in step SB71 related to the printer identification information indicated by the identification data received in step SB72 (step SB74).

Note that when a WebSocket connection CT is opened, the communication management unit 25g generates connection identification information for that connection that is different from the connection identification information of any other WebSocket connection CT that was already opened. The relationship between the WebSocket connections CT and printers 12g is managed by the process of step SB74.

A WebSocket connection CT is thus established when triggered by the power turning on without receiving a user instruction or a request from the control server 10g. Thus comprised, the user does not need to perform a complicated operation to open a WebSocket connection CT. Special knowledge is also not needed to open a WebSocket connection CT. After the power turns on, the printer 12g can also be quickly enabled to execute processes as controlled by the control server 10g.

Operation of the first control server 10Ag and printer 12g when printer 12g prints on the print medium as controlled by the first control server 10Ag is described next.

Figures 42A, 42B:
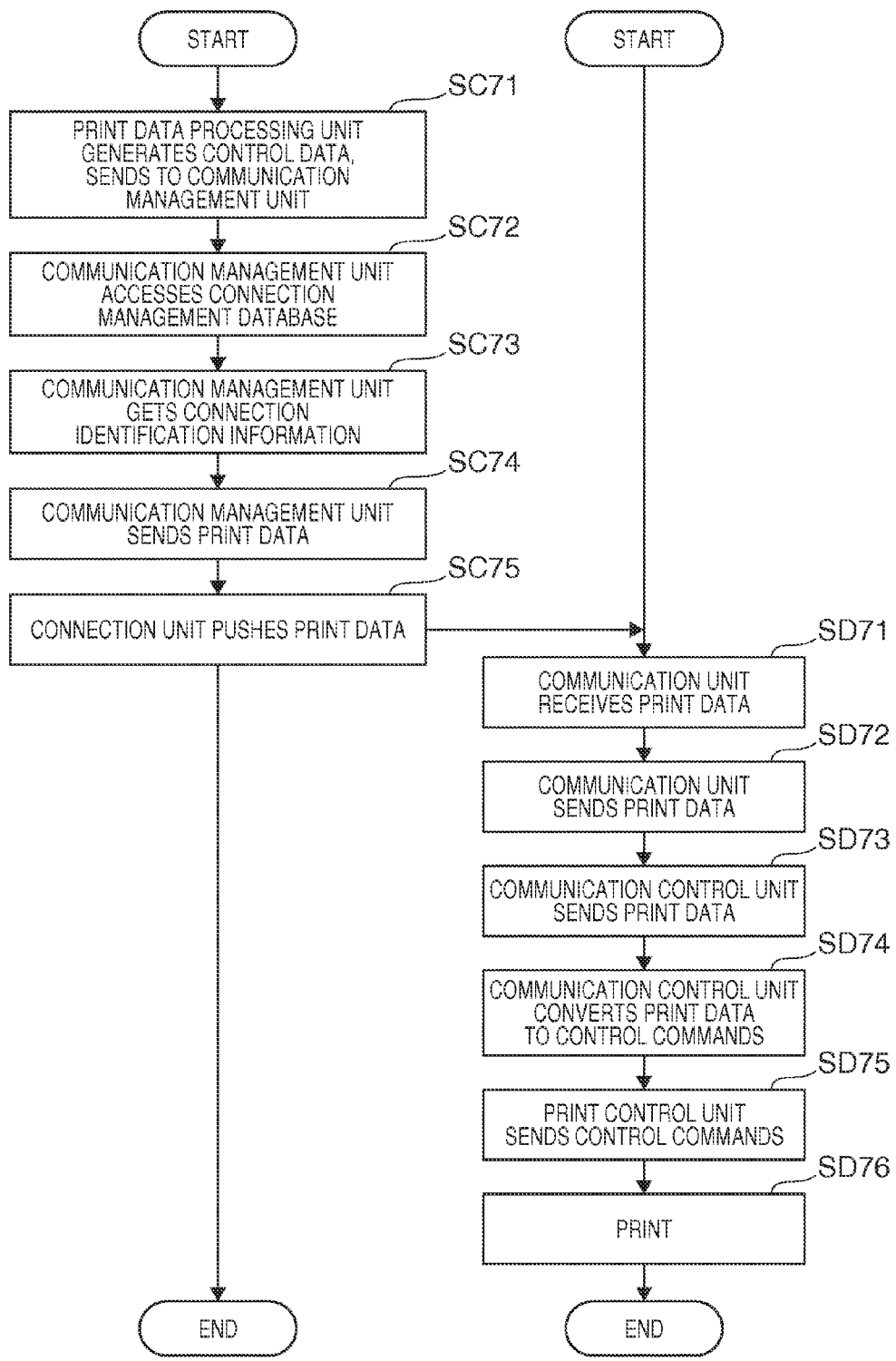
FIGS. 42A and 42B are flow charts showing the operation of the control server and printer.

FIG. 42 is a flow chart showing the operation of the printer 12g and the first control server 10Ag when the printer 12g prints on the print medium, column (A) showing the operation of the first control server 10Ag, and column (B) showing the operation of the printer 12g.

As shown in FIG. 42 (A), the print data processing unit 27g generates and sends print data for controlling the printer 12g to the communication management unit 25g (step SC71). The print data includes the information to be printed by the printer 12g in an XML format, and may include image data to print and information identifying the location of the image on the print medium. The printer identification information of the printer 12g to use for printing is also written as a tag in the print data. The print data processing unit 27g manages the printer identification information of the printers 12g connected to the first control server 10Ag, and can get the printer identification information of the printer 12g that is to print.

Next, the communication management unit 25g accesses the connection management database stored in the control server storage unit 28g (step SC72). Next, the communication management unit 25g retrieves the connection ID number of the WebSocket connection CT related to the printer identification information from the connection management database using the printer identification information contained in the received print data as the search key (step SC73). The connection identification information acquired here is the connection identification information of the WebSocket connection CT established with the printer 12g that is to print.

Next, the communication management unit 25g sends the print data to the connection unit 26g corresponding to the WebSocket connection CT related to the connection identification information acquired in step SC3 (step SC74).

Next, the connection unit 26g pushes the received print data through the WebSocket connection CT by WebSocket communication (step SC75).

As shown in FIG. 42 (B), the communication unit 16g then receives the print data by WebSocket communication (step SD71).

Next, the communication unit 16g sends the received print data to the communication control unit 15g (step SD72).

Next, the communication control unit 15g sends the received print data to the print control unit 17g (step SD73).

Next, the print control unit 17g converts the received print data to control commands in the command language of the print unit 18g (step SD74). In other words, the print control unit 17g converts the print data, which is an XML file, to control commands that can be interpreted by the control board of the print unit 18g.

Next, the print control unit 17g sends the control commands to the print unit 18g (step SD5).

Next, the print unit 18g prints on the print medium based on the control commands (step SD76).

The first control server 10Ag in this embodiment of the invention can thus control a printer 12g to print when there is a need for the printer 12g to print without receiving a request from the printer 12g. Events that cause the printer 12g to print are events in which predefined conditions are met, such as when an instruction is received from the user, or a request is received from a communicatively connected external device.

This configuration enables starting printing faster than in a configuration in which the printer 12g intermittently sends a request to the first control server 10Ag, and the first control server 10Ag sends control data in response to such a request when there is a need to print with the printer 12g. Consumption of resources can also be suppressed compared with a configuration in which the first control server 10Ag queues responses to requests.

The function of the detection unit 25*ag* of the communication management unit 25g of the first control server 10Ag is described next.

The detection unit 25*ag* has a function for detecting, for each printer 12g connected to the first control server 10Ag, the state of the WebSocket connection CT to the printer 12g.

The operation of the detection unit 25*ag* when detecting the connection status of any one printer 12g is described below. When multiple printers 12g are connected to the first control server 10Ag, the detection unit 25*ag* detects the status of the printer 12g connection by the operation described below.

Figure 43:
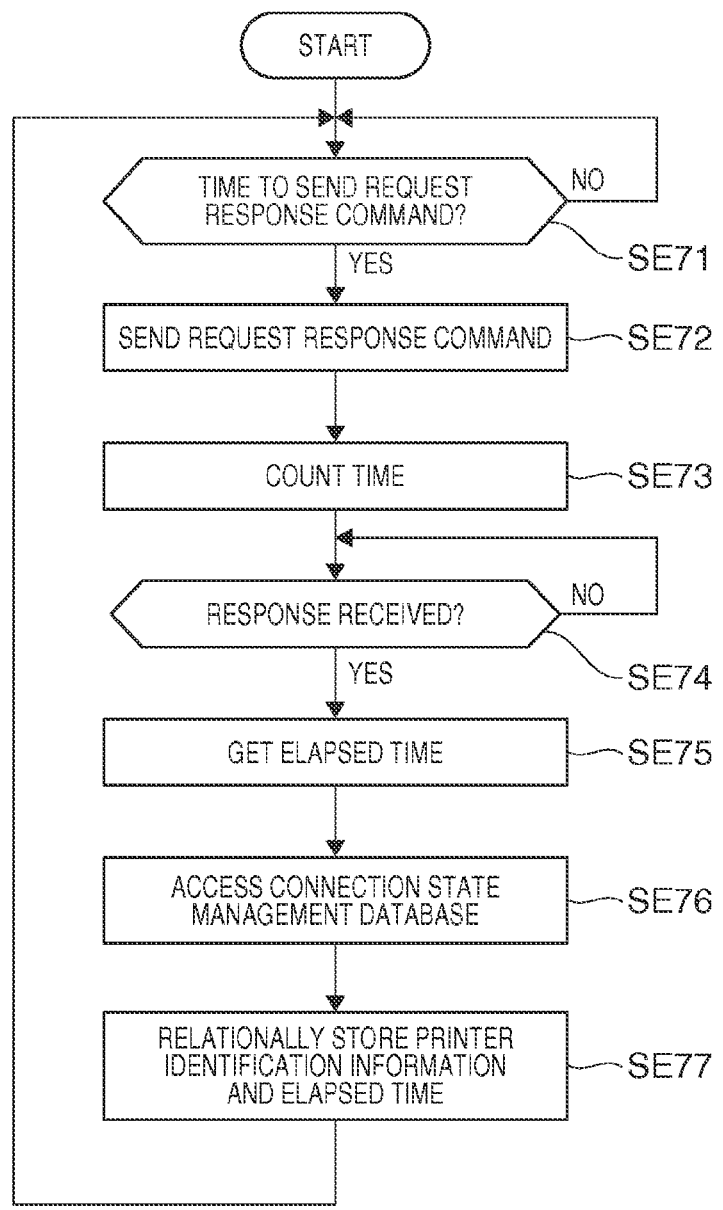
FIG. 43 is a flow chart showing the operation of the control server.

FIG. 43 is a flow chart showing the operation of the detection unit 25*ag*.

As shown in FIG. 43, the detection unit 25*ag* determines if it is time to send a request response command (step SE71). The timing for sending a request response command is predetermined. For example, the request response command may be sent at a regular time (such as once every minute), or the request response command may be sent when a specific condition is met.

When it is time to send the request response command (step SE71 returns YES), the detection unit 25*ag* generates the request response command and controls the connection unit 26g to send the command by the WebSocket connection CT (step SE72).

Next, the detection unit 25*ag* starts counting how much time passes (step SE73).

Next, the detection unit 25*ag* checks if a response to the request response command is received (step SE74). The communication control unit 15g of the printer 12g has a function for sending a response to the request response command.

When a response to the request response command is received (step SE74 returns YES), the detection unit 25*ag* stops counting the time and gets the current count (step SE75). The elapsed time acquired by the detection unit 25*ag* in step SE75 is the time required to receive the response after the communication management unit 25g sends the request response command.

Next, the detection unit 25*ag* accesses the connection state management database stored by the connection server storage unit 28*d* (step SE76).

Next, the detection unit 25*ag* stores information representing the elapsed time acquired in step SE75 and information about the current date (date and time) relationally to the printer identification information of the printer 12g in the connection state management database (step SE77).

Next, the detection unit 25*ag* returns to step SE71.

For each printer 12g connected to the first control server 10Ag, the detection unit 25*ag* thus sends a request response command at a specific time, gets the time passed before receiving a response, and stores information indicating the elapsed time in the connection state management database.

The longer the elapsed time, the greater the likelihood that communication by the WebSocket connection CT between the first control server 10Ag and the printer 12g is not going smoothly.

The function of the communication processing unit 25*bg* of the communication management unit 25g of the first control server 10Ag is described next.

Based on the elapsed time information stored in the connection state management database, the communication processing unit 25*bg* runs the following process.

When the elapsed time exceeds a specific level, the communication processing unit 25*bg* reports that a communication-related error may have occurred to the administrator by displaying a message or other means. The administrator can therefore know that there is the possibility of a communication error between the control server 10g and printer 12g, and based thereon can take appropriate action to determine and rectify the problem, for example. The communication processing unit 25*bg* may also report the elapsed time as the connection status of the WebSocket connection CT.

The communication processing unit 25*bg* also collects statistics, such as the average, about the elapsed time related to a particular printer 12g, and calculates the trend of the elapsed time related to that printer 12g. Because a printer 12g for which the elapsed time trends long may not be communicating smoothly compared to a printer 12g for which the elapsed time trends short, the communication processing unit 25*bg* may enhance monitoring the connection status by shortening the interval at which the request response command is sent, for example, so that errors can be detected more quickly when an error occurs.

Based on the elapsed time information stored in the connection state management database, the communication processing unit 25*bg* also determines if a communication error has occurred, or if a communication delay exceeding an allowable range occurred. If a communication-related error has occurred, the communication processing unit 25*bg* executes the following process.

Specifically, for the printer 12g to establish a WebSocket connection CT with the second control server 10Bg, the communication processing unit 25*bg* reports address information identifying the address for the printer 12g to access to the printer 12g. This report is sent using a specific protocol. The address information of the second control server 10Bg is stored in an address information database stored by the control server storage unit 28g. Next, the communication processing unit 25*bg* terminates the WebSocket connection CT to the printer 12g according to the WebSocket protocol. The communication control unit 15g of the printer 12g that receives this report then establishes a WebSocket connection CT with the second control server 10Bg based on the address information. The printer 12g then communicates with the second control server 10Bg by the new WebSocket connection CT. When the cause of the communication-related error or the cause of a communication delay is related to the first control server 10Ag or to communication between the printer 12g and the first control server 10Ag, running this process can solve the problem. Note that the second control server 10Bg can also control the printer 12g using the same method as the first control server 10Ag.

A configuration in which the server to which the first control server 10Ag reports the address information changes dynamically is also conceivable. For example, the communication processing unit 25*bg* may manage the servers of the control server 10g that are communicating smoothly. The communication processing unit 25*bg* reports the address information of those servers that are communicating smoothly to the printer 12*g*.

The communication processing unit 25*bg* may also manage the number of printers 12*g* connected to the server devices in the control server 10*g*. This may be done by querying the other servers for the number of connected printers 12*g* and managing the responses to these requests, or the other servers may regularly report the number of connected printers 12*g*. The communication processing unit 25*bg* then reports to the printer 12*g* the address information of the server device with fewer connected printers 12*g* in the group of other server devices. This is because the processor load is likely lower on the server device with fewer connected printers 12*g*.

A specific example of the process the communication processing unit 25*bg* runs is described based on the content of the connection state management database, but the process run by the communication processing unit 25*bg* is not limited thereto. More specifically, the communication processing unit 25*bg* may diagnose the state of the connection with the printer 12*g* based on the content of the connection state management database, and execute an appropriate process based on the result of the diagnosis.

The detection unit 25*ag* and the communication processing unit 25*bg* may also execute the following processes.

The detection unit 25*ag* monitors if the WebSocket connection CT to each printer 12*g* is closed unexpectedly. Closing a connection unexpectedly here means that the WebSocket connection CT was closed without using the standard WebSocket method of closing a connection. A connection may be closed unexpectedly due to a communication error or other cause. If the detection unit 25*ag* determines the WebSocket connection CT closed unexpectedly, the detection unit 25*ag* accesses the connection state management database, and relationally stores in the database the printer identification information of the printer 12*g* and the date (date and time) the connected closed unexpectedly.

Based on the information stored in the connection state management database, the communication processing unit 25*bg* executes the following process.

The communication processing unit 25*bg* calculates how frequently the WebSocket connection CT to the printer 12*g* closes unexpectedly. Based on the calculated frequency, the stability of communication with that printer 12*g* is evaluated. If the calculated stability is less than the allowed stability, the communication processing unit 25*bg* executes an appropriate as described above.

Based on the content of the connection state management database, the communication processing unit 25*bg* calculates the period of time when the likelihood of an unexpected interruption is high, and stores information indicating the result in a specific storage area. The stored information can be used as valuable information when maintaining the network environment of the print control system 1*g*.

As described above, the print control system 1*g* according to this embodiment includes a printer 12*g* and a first control server 10A*g* (print control device).

The printer 12*g* includes a print unit 18*g* that prints, and a print control unit 17*g* that controls the print unit 18*g* based on print data.

The first control server 10A*g* has a print data processing unit 27*g* that generates print data; a connection unit 26*g* that establishes a WebSocket connection CT and sends print data generated by the print data processing unit 27*g* by asynchronous duplex communication to the printer 12*g*; and a detection unit 25*ag* that detects the connection status of the printer 12*g* to the WebSocket connection CT.

Thus comprised, the first control server 10A*g* detects the connection status to the printer 12*g* through the WebSocket connection CT by a function of the detection unit 25*ag*. As a result, the first control server 10A*g* can execute a process appropriate to the connection status based on the detected connection status. In addition, the first control server 10A*g* can send print data to the printer 12*g* by asynchronous duplex communication in this print control system 1*g*. As a result, the first control server 10A*g* can send print data to the printer 12*g* by the WebSocket connection CT at any time. Therefore, the first control server 10A*g* can send print data by the WebSocket connection CT to the printer 12*g* when an event requiring printing by the printer 12*g* occurs, and can control printing by the printer 12*g* based on the print data.

The first control server 10A*g* in this embodiment of the invention also has a communication processing unit 25*bg* that executes a process related to communication with the printer 12*g* based on the detection result from the detection unit 25*ag*.

Thus comprised, the first control server 10A*g* can use a function of the communication processing unit 25*bg* to execute a process appropriate to the connection status of the printer 12*g* over the WebSocket connection CT based on the detection result from the detection unit 25*ag*.

In this embodiment of the invention, the process related to communication with the printer 12*g* is reporting the connection status of the WebSocket connection CT.

Thus comprised, the first control server 10A*g* can report the connection status of the WebSocket connection CT to the user.

In this embodiment of the invention, the first control server 10A*g* has a control server storage unit 28*g* (storage unit) that stores address information for the second control server 10B*g* (second print control device). Based on the detection result form the detection unit 25*ag*, the communication processing unit 25*bg* sends the address information for the second control server 10B*g* stored in the control server storage unit 28*g* to the printer 12*g*, and cuts the connection to the printer 12*g*. The second control server 10B*g* then establishes a WebSocket connection CT with the printer 12*g* based on the address information after the WebSocket connection CT between the printer 12*g* and the first control server 10A*g* is cut.

Thus comprised, the printer 12*g* establishes a WebSocket connection CT with the second control server 10B*g* and enables communication with the second control server 10B*g* when a communication error occurs in the connection to the first control server 10A*g*.

The detection unit 25*ag* of the first control server 10A*g* sends a request response command to the printer 12*g*, and based on the condition of the response to this request response command, detects the connection status of the WebSocket connection CT.

Thus comprised, the detection unit 25*ag* can detect the connection status of the printer 12*g* through a particular communication path by detecting the condition of the response to the request response command.

The invention is described above with reference to a preferred embodiment thereof, but the invention is not limited thereto and can be modified and adapted in many ways without departing from the scope of the accompanying claims.

In the embodiment described above the printer 12*g* is installed as part of a store system 11*g* deployed in a business. However, the printer 12*g* is not limited to being part of a store system 11*g*, and can be used in other systems.

In addition, print data is sent as an XML file from the control server 10*g* to the printer 12*g* in the foregoing embodiment, but the data format of the print data is not limited to XML. The print data may be data created in another markup language, or control commands in the command language of the print unit 18g.

The function blocks shown in FIG. 3 can also be rendered as desired using hardware and software, and do not suggest a specific hardware configuration. Functions of the printer 12g may also be rendered by a separate externally connected device. The printer 12g can also execute the processes described above by running a program stored on an externally connected storage medium.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A print control system comprising:
a printing device that prints based on print data;
a connection server that connects to the printing device, generates the print data based on print information data, and sends the print data to the printing device;
a management server that connects to the connection server and sends the print information data to the connection server; and
a management device that connects to the management server, generates the print information data and sends the generated print information data to the management server; wherein:
the printing device has a print unit that prints, a print control unit that generates first data based on the operation of the print unit and second data different from the first data, and a communication unit that sends the first data and the second data;
the connection server has a connection unit that receives the first data and the second data sent by the communication unit of the printing device, a print data processing unit that generates the print data based on the print information data, a first transceiver unit that sends the first data and receives the print information data, and a second transceiver unit that sends the second data;
the management server has a first communication connection unit that receives the first data sent by the first transceiver unit of the connection server and sends the print information data to the first transceiver unit of the connection server, and a second communication connection unit that sends the first data and receives the print information data; and
the management device has a control unit that generates the print information data, a first communication interface that receives the first data sent by the second communication connection unit of the management server and sends the print information data to the management server, and a second communication interface that receives the second data sent by the connection server.

2. The print control system described in claim 1, wherein:
the second data is status data indicating a state of the printing device.

3. The print control system described in claim 1, wherein:
the connection server establishes a first communication path with the management device when the second data sent by the printing device is received; and
the management device establishes a second communication path with the management server to send the print information data to the management server.

4. A print control system comprising:
a printing device that prints based on print data;
a connection server that connects to the printing device, generates the print data based on print information data, and sends the print data to the printing device;
a management server that connects to the connection server and sends the print information data to the connection server; and
a management device that connects to the management server, generates the print information data, and sends the generated print information data to the management server; wherein:
the printing device has a communication unit that sends a connection request, and a print unit that prints;
the connection server has a first connection server that sends print data, and a second connection server that sends print data; and
the print control system includes a gateway server including a server connection unit that connects to the first connection server and the second connection server, a reception unit that receives the connection request, and a connection control unit that controls connecting the printing device to the first connection server or the second connection server based on the connection request received by the reception unit.

5. The print control system described in claim 4, wherein:
the first connection server has a first connection unit that connects to plural printing devices;
the second connection server has a second connection unit that connects to plural printing devices;
the gateway server has a storage unit that stores the number of printing devices connected to the first connection unit, and the number of printing devices connected to the second connection unit; and
the connection control unit of the gateway server selects the first connection server or the second connection server as the connection server to connect to the printing device based on the number of printing devices connected to the first connection unit and the number of printing devices connected to the second connection unit.

6. A print control system comprising:
a printing device including a print unit that prints, and a print control unit that controls the print unit based on print control data;
a print control device including a print data processing unit that generates the print control data,
a connection unit that establishes a communication path and sends the print control data generated by the print data processing unit to the printing device by asynchronous duplex communication, and
a detection unit that detects the connection state of the communication path to the printing device; and
a second print control device having a second connection unit that establishes a communication path and communicates by asynchronous duplex communication;
wherein the print control device has a communication processing unit that executes a process related to communication with the printing device based on a result from the detection unit, and a storage unit that stores address information of the second print control device;
the communication processing unit of the print control device sends the address information of the second print control device stored in the storage unit to the printing device based on the detection result of the detection unit, and closes the connection to the printing device; and after the communication path between the printing device and the print control device is closed, the second print control device and the printing device establish a communication path between the printing device and the second print control device based on the address information.

\* \* \* \* \*